(12) United States Patent
Behzadi et al.

(10) Patent No.: US 11,966,556 B2
(45) Date of Patent: Apr. 23, 2024

(54) USER INTERFACES FOR TRACKING AND FINDING ITEMS

(71) Applicant: Apple Inc., Cupertino, CA (US)

(72) Inventors: Arian Behzadi, San Francisco, CA (US); Marcel Van Os, San Francisco, CA (US); Nicole R. Ryan, San Francisco, CA (US); Corey K. Wang, San Francisco, CA (US); Frank De Jong, San Francisco, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/452,971

(22) Filed: Oct. 29, 2021

(65) Prior Publication Data

US 2022/0050563 A1     Feb. 17, 2022

Related U.S. Application Data

(63) Continuation of application No. 17/503,246, filed on Oct. 15, 2021, which is a continuation of application No. PCT/US2020/028595, filed on Apr. 16, 2020.
(Continued)

(51) Int. Cl.
   *G06F 3/048*      (2013.01)
   *G06F 3/01*       (2006.01)
   (Continued)

(52) U.S. Cl.
   CPC .......... *G06F 3/04815* (2013.01); *G06F 3/016* (2013.01); *G06F 3/0482* (2013.01);
   (Continued)

(58) Field of Classification Search
   CPC ....... H04W 4/02; H04W 4/029; H04W 4/025; H04W 12/63; G06F 3/0484; G06F 3/0482
   See application file for complete search history.

(56) References Cited

U.S. PATENT DOCUMENTS

| 5,672,820 | A | * | 9/1997 | Rossi | ............. | G01C 21/20 |
| | | | | | | 73/178 R |
| 5,956,038 | A | * | 9/1999 | Rekimoto | ........... | H04L 61/4511 |
| | | | | | | 345/419 |

(Continued)

FOREIGN PATENT DOCUMENTS

| CN | 103269510 A | 8/2013 |
| CN | 109146954 A | 1/2019 |

(Continued)

OTHER PUBLICATIONS

Non-Final Office Action received for U.S. Appl. No. 17/503,246, dated Feb. 3, 2022, 15 pages.

(Continued)

*Primary Examiner* — Steven B Theriault
(74) *Attorney, Agent, or Firm* — Kubota & Basol LLP

(57) ABSTRACT

In some embodiments, an electronic device present user interfaces for initializing a remote locator object. In some embodiments, an electronic device presents notifications when a remote locator object is separated from the user. In some embodiments, an electronic device presents notifications when an unknown remote locator object is tracking the user. In some embodiments, an electronic device presents a user interface for a short distance locator user interface for finding a remote locator object. In some embodiments, an electronic device presents user interfaces for finding a remote locator object using a map user interface or using a short distance locator user interface.

60 Claims, 132 Drawing Sheets

Related U.S. Application Data

(60) Provisional application No. 62/856,004, filed on Jun. 1, 2019, provisional application No. 62/835,495, filed on Apr. 17, 2019.

(51) Int. Cl.

| | | |
|---|---|---|
| *G06F 3/04815* | (2022.01) | |
| *G06F 3/0482* | (2013.01) | |
| *G06F 3/0484* | (2022.01) | |
| *G06T 19/00* | (2011.01) | |
| *G08B 5/22* | (2006.01) | |
| *H04W 4/029* | (2018.01) | |
| *G06F 3/0346* | (2013.01) | |

(52) U.S. Cl.
CPC .......... *G06F 3/0484* (2013.01); *G06T 19/006* (2013.01); *G08B 5/22* (2013.01); *H04W 4/029* (2018.02); *G06F 3/0346* (2013.01)

(56) References Cited

U.S. PATENT DOCUMENTS

| | | | |
|---|---|---|---|
| 6,144,956 A * | 11/2000 | Yajima | G06F 16/29 |
| 6,323,846 B1 | 11/2001 | Westerman et al. | |
| 6,421,608 B1 * | 7/2002 | Motoyama | G01S 5/0027 |
| | | | 342/357.31 |
| 6,570,557 B1 | 5/2003 | Westerman et al. | |
| 6,636,249 B1 * | 10/2003 | Rekimoto | G06F 3/002 |
| | | | 715/849 |
| 6,677,932 B1 | 1/2004 | Westerman | |
| 7,274,292 B2 | 9/2007 | Velhal et al. | |
| 7,372,276 B2 | 5/2008 | Mulcahey | |
| 7,523,871 B1 | 4/2009 | Wilson et al. | |
| 7,575,065 B1 | 8/2009 | Podhrasky | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,788,032 B2 | 8/2010 | Moloney | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,094,011 B2 * | 1/2012 | Faris | G08B 21/24 |
| | | | 340/539.13 |
| 8,239,784 B2 | 8/2012 | Hotelling et al. | |
| 8,279,180 B2 | 10/2012 | Hotelling et al. | |
| 8,380,430 B2 | 2/2013 | Malone et al. | |
| 8,381,135 B2 | 2/2013 | Hotelling et al. | |
| 8,433,722 B2 | 4/2013 | Shin et al. | |
| 8,462,591 B1 | 6/2013 | Marhaben | |
| 8,479,122 B2 | 7/2013 | Hotelling et al. | |
| 8,526,677 B1 | 9/2013 | Crichton et al. | |
| 8,576,669 B2 * | 11/2013 | Onda | G04G 21/04 |
| | | | 368/74 |
| 8,847,754 B2 | 9/2014 | Buchheim et al. | |
| 8,878,671 B2 * | 11/2014 | Buchheim | H04W 4/023 |
| | | | 455/456.6 |
| 9,002,372 B2 | 4/2015 | Shakespeare et al. | |
| 9,348,458 B2 | 5/2016 | Hotelling et al. | |
| 9,357,348 B2 | 5/2016 | Evans et al. | |
| 9,443,414 B2 | 9/2016 | Scavezze et al. | |
| 9,514,630 B1 * | 12/2016 | Steven | G08B 21/24 |
| 9,547,939 B2 * | 1/2017 | Hittel | H04W 4/02 |
| 9,549,282 B1 * | 1/2017 | McDonough | H04L 67/306 |
| 9,609,515 B2 * | 3/2017 | Tredoux | G06F 21/35 |
| 9,654,598 B1 * | 5/2017 | Crawford | H04W 4/023 |
| 9,706,357 B2 * | 7/2017 | Heo | H04W 4/027 |
| 9,836,187 B2 * | 12/2017 | Lee | G06F 16/2477 |
| 9,892,535 B1 | 2/2018 | Guy | |
| 9,900,733 B2 * | 2/2018 | Beattie, Jr. | H04W 4/02 |
| 9,911,310 B2 | 3/2018 | Neumeyer et al. | |
| 9,933,937 B2 | 4/2018 | Lemay et al. | |
| 9,997,043 B2 | 6/2018 | H. Kazerouni | |
| 10,102,749 B1 * | 10/2018 | Wagner | G08G 1/13 |
| 10,147,303 B1 * | 12/2018 | Carter | G08B 25/001 |
| 10,154,379 B2 | 12/2018 | Mei et al. | |
| 10,212,541 B1 | 2/2019 | Brody et al. | |
| 10,292,006 B2 * | 5/2019 | Yu | H04L 67/52 |
| 10,318,811 B1 | 6/2019 | Gold et al. | |
| 10,386,960 B1 | 8/2019 | Smith | |
| 10,424,189 B2 | 9/2019 | Daoura et al. | |
| 10,438,409 B2 * | 10/2019 | Todeschini | G06F 3/011 |
| 10,448,211 B1 * | 10/2019 | Shen | G06K 7/10366 |
| 10,462,611 B1 * | 10/2019 | Klinkner | H04W 4/029 |
| 10,568,035 B1 * | 2/2020 | Tong | H04W 52/0261 |
| 10,757,057 B2 * | 8/2020 | Friend | H04L 51/42 |
| 10,757,676 B1 * | 8/2020 | de la Broise | H04L 9/0866 |
| 10,777,053 B2 * | 9/2020 | Jenkins | G08B 21/0233 |
| 10,852,918 B1 | 12/2020 | Voss | |
| 11,047,702 B1 | 6/2021 | Meyer et al. | |
| 11,138,251 B2 * | 10/2021 | Estruch Tena | G06F 16/173 |
| 11,145,183 B2 * | 10/2021 | Daoura | G08B 21/24 |
| 11,216,624 B2 * | 1/2022 | Zarshchikov | H04W 4/80 |
| 11,221,752 B2 * | 1/2022 | Howard | G06F 3/0236 |
| 11,222,203 B2 * | 1/2022 | Dante | G06V 10/471 |
| 2002/0015024 A1 | 2/2002 | Westerman et al. | |
| 2002/0183077 A1 | 12/2002 | Fomukong | |
| 2004/0021567 A1 * | 2/2004 | Dunn | G01S 19/51 |
| | | | 340/539.13 |
| 2004/0212630 A1 | 10/2004 | Hobgood et al. | |
| 2004/0217859 A1 | 11/2004 | Pucci et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2006/0255935 A1 * | 11/2006 | Scalisi | G01S 5/0027 |
| | | | 340/539.13 |
| 2006/0277469 A1 | 12/2006 | Chaudhri et al. | |
| 2007/0021108 A1 * | 1/2007 | Bocking | H04M 19/04 |
| | | | 455/414.1 |
| 2007/0037582 A1 | 2/2007 | Mohi et al. | |
| 2007/0037587 A1 | 2/2007 | Mohi et al. | |
| 2007/0037588 A1 | 2/2007 | Mohi et al. | |
| 2007/0042790 A1 | 2/2007 | Mohi et al. | |
| 2007/0101291 A1 | 5/2007 | Forstall et al. | |
| 2007/0106457 A1 | 5/2007 | Rosenberg | |
| 2007/0157089 A1 | 7/2007 | Van et al. | |
| 2007/0197229 A1 | 8/2007 | Kalliola et al. | |
| 2007/0229350 A1 * | 10/2007 | Scalisi | G08B 21/0247 |
| | | | 342/350 |
| 2007/0252696 A1 * | 11/2007 | Belisle | G06Q 50/30 |
| | | | 340/572.1 |
| 2007/0291104 A1 * | 12/2007 | Petersen | G01S 3/7865 |
| | | | 348/E5.042 |
| 2008/0102786 A1 * | 5/2008 | Griffin | H04L 12/66 |
| | | | 455/404.2 |
| 2008/0170118 A1 | 7/2008 | Albertson et al. | |
| 2008/0242278 A1 * | 10/2008 | Rekimoto | H04W 4/021 |
| | | | 455/456.3 |
| 2008/0254808 A1 * | 10/2008 | Rekimoto | H04W 64/00 |
| | | | 455/456.1 |
| 2009/0076723 A1 | 3/2009 | Moloney | |
| 2009/0260022 A1 | 10/2009 | Louch et al. | |
| 2009/0300511 A1 * | 12/2009 | Behar | G06F 1/162 |
| | | | 715/745 |
| 2010/0002938 A1 | 1/2010 | Mulcahey | |
| 2010/0107179 A1 * | 4/2010 | Quintanilla | G06F 9/542 |
| | | | 719/318 |
| 2010/0198867 A1 | 8/2010 | Rekimoto | |
| 2010/0255882 A1 | 10/2010 | Kozitsyn et al. | |
| 2010/0325194 A1 | 12/2010 | Williamson et al. | |
| 2011/0052083 A1 * | 3/2011 | Rekimoto | H04N 1/00307 |
| | | | 382/218 |
| 2011/0081920 A1 | 4/2011 | Hung et al. | |
| 2011/0148625 A1 | 6/2011 | Velusamy | |
| 2011/0181289 A1 | 7/2011 | Rushing | |
| 2011/0187527 A1 | 8/2011 | Goodwill et al. | |
| 2011/0210847 A1 | 9/2011 | Howard et al. | |
| 2011/0222729 A1 | 9/2011 | Gabara | |
| 2011/0234399 A1 | 9/2011 | Yan | |

(56) References Cited

U.S. PATENT DOCUMENTS

| | | | |
|---|---|---|---|
| 2011/0285506 A1* | 11/2011 | Hillis | G08B 21/025 340/8.1 |
| 2011/0286310 A1* | 11/2011 | Onda | H04M 1/72457 368/14 |
| 2012/0008526 A1 | 1/2012 | Borghei | |
| 2012/0052870 A1 | 3/2012 | Habicher | |
| 2012/0075099 A1* | 3/2012 | Brown | H04W 4/20 340/540 |
| 2012/0092373 A1* | 4/2012 | Ryu | G06T 19/006 345/633 |
| 2012/0166077 A1 | 6/2012 | Herzog et al. | |
| 2012/0171998 A1* | 7/2012 | Kang | G06F 21/88 455/411 |
| 2012/0229400 A1 | 9/2012 | Birnbaum et al. | |
| 2013/0030931 A1 | 1/2013 | Moshfeghi | |
| 2013/0107057 A1* | 5/2013 | Zhou | H04N 21/42204 348/169 |
| 2013/0113715 A1 | 5/2013 | Grant et al. | |
| 2013/0172016 A1 | 7/2013 | Ooka | |
| 2013/0288719 A1 | 10/2013 | Alonzo | |
| 2013/0328665 A1* | 12/2013 | Cranfill | G06Q 10/109 340/7.55 |
| 2013/0332721 A1* | 12/2013 | Chaudhri | G06F 3/167 713/100 |
| 2014/0044305 A1 | 2/2014 | Scavezze et al. | |
| 2014/0089810 A1* | 3/2014 | Chen | G06F 3/048 715/738 |
| 2014/0101189 A1* | 4/2014 | Schenkel | G06Q 10/109 707/758 |
| 2014/0135042 A1* | 5/2014 | Buchheim | G01S 1/725 455/566 |
| 2014/0136633 A1* | 5/2014 | Murillo, Jr. | H04L 51/224 709/206 |
| 2014/0173439 A1* | 6/2014 | Gutierrez | G08B 21/0236 715/727 |
| 2014/0213301 A1 | 7/2014 | Evans et al. | |
| 2014/0242972 A1 | 8/2014 | Slotznick | |
| 2014/0267411 A1 | 9/2014 | Fein et al. | |
| 2014/0300452 A1 | 10/2014 | Rofe et al. | |
| 2014/0327518 A1* | 11/2014 | Loutit | G06F 3/048 340/7.58 |
| 2014/0329460 A1* | 11/2014 | Loutit | G06Q 40/08 455/39 |
| 2014/0364099 A1 | 12/2014 | Pai et al. | |
| 2014/0365923 A1 | 12/2014 | Lee et al. | |
| 2015/0012307 A1 | 1/2015 | Moss | |
| 2015/0058744 A1 | 2/2015 | Dhingra et al. | |
| 2015/0154851 A1* | 6/2015 | Vincent | G06F 16/9537 340/539.13 |
| 2015/0172393 A1 | 6/2015 | Oplinger et al. | |
| 2016/0026869 A1* | 1/2016 | Rekimoto | G06F 16/68 345/633 |
| 2016/0027307 A1 | 1/2016 | Abhyanker et al. | |
| 2016/0055676 A1* | 2/2016 | Kasahara | G06T 19/003 345/633 |
| 2016/0092705 A1* | 3/2016 | Wadman | G06K 7/10009 340/10.1 |
| 2016/0203641 A1* | 7/2016 | Bostick | G06T 19/006 345/633 |
| 2016/0350639 A1* | 12/2016 | Tere | A45C 11/00 |
| 2017/0006577 A1* | 1/2017 | Koum | H04M 3/02 |
| 2017/0048686 A1 | 2/2017 | Chang et al. | |
| 2017/0053560 A1 | 2/2017 | Aldossary et al. | |
| 2017/0064511 A1* | 3/2017 | McCormick | H04W 4/60 |
| 2017/0092085 A1 | 3/2017 | Agarwal | |
| 2017/0092090 A1 | 3/2017 | Lerner | |
| 2017/0168159 A1 | 6/2017 | Gatland | |
| 2017/0180934 A1 | 6/2017 | Brice et al. | |
| 2017/0353833 A1* | 12/2017 | de Barros Chapiewski | H04W 4/029 |
| 2017/0365100 A1* | 12/2017 | Walton | G06T 7/30 |
| 2018/0077097 A1* | 3/2018 | Alfaro | H04L 51/216 |
| 2018/0084517 A1 | 3/2018 | Do et al. | |
| 2018/0147472 A1* | 5/2018 | DeAngelis | G06K 7/10366 |
| 2018/0158197 A1 | 6/2018 | Dasgupta et al. | |
| 2018/0165924 A9 | 6/2018 | Olsson et al. | |
| 2018/0184286 A1* | 6/2018 | Patterson | H04W 4/80 |
| 2018/0189567 A1 | 7/2018 | Maheriya et al. | |
| 2018/0198973 A1 | 7/2018 | Eronen et al. | |
| 2018/0227393 A1* | 8/2018 | Daub | H04L 67/01 |
| 2018/0240176 A1 | 8/2018 | Cronin et al. | |
| 2018/0276427 A1* | 9/2018 | Depew | G06Q 10/0833 |
| 2018/0278888 A1* | 9/2018 | Kasahara | G06F 16/00 |
| 2018/0349516 A1 | 12/2018 | Dutta et al. | |
| 2018/0357876 A1* | 12/2018 | Smoak | G08B 21/0283 |
| 2019/0050901 A1* | 2/2019 | Vincent | G06Q 30/0261 |
| 2019/0073113 A1* | 3/2019 | Yang | G06F 3/04847 |
| 2019/0086666 A1 | 3/2019 | Wu | |
| 2019/0102372 A1* | 4/2019 | Hailpern | G06F 40/103 |
| 2019/0103012 A1 | 4/2019 | Daoura et al. | |
| 2019/0114921 A1 | 4/2019 | Cazzoli | |
| 2019/0163748 A1* | 5/2019 | Cuthbert | G06F 3/018 |
| 2019/0174265 A1 | 6/2019 | Chen | |
| 2019/0285413 A1 | 9/2019 | Hallett | |
| 2019/0362556 A1 | 11/2019 | Ben-dor et al. | |
| 2019/0370544 A1* | 12/2019 | Wright, Jr. | G02B 27/0101 |
| 2020/0107165 A1 | 4/2020 | Pai et al. | |
| 2020/0110934 A1 | 4/2020 | Paul | |
| 2020/0117339 A1 | 4/2020 | Amitay et al. | |
| 2020/0139929 A1* | 5/2020 | Turley | G01S 19/16 |
| 2020/0242848 A1 | 7/2020 | Ambler et al. | |
| 2020/0257865 A1* | 8/2020 | Zarshchikov | H04W 4/02 |
| 2020/0259908 A1* | 8/2020 | Klinkner | G06F 9/542 |
| 2020/0260142 A1* | 8/2020 | Kasahara | H04N 21/41407 |
| 2020/0273235 A1 | 8/2020 | Emami et al. | |
| 2020/0382908 A1 | 12/2020 | Behzadi et al. | |
| 2020/0382912 A1 | 12/2020 | Dancie et al. | |
| 2021/0264154 A1 | 8/2021 | Amont | |
| 2021/0314735 A1 | 10/2021 | Klinkner et al. | |
| 2022/0035510 A1* | 2/2022 | Behzadi | G06F 3/0484 |
| 2022/0075503 A1 | 3/2022 | Behzadi et al. | |
| 2022/0100286 A1 | 3/2022 | De Jong et al. | |
| 2022/0103974 A1 | 3/2022 | De Jong et al. | |
| 2022/0223013 A1 | 7/2022 | Persson et al. | |
| 2022/0335807 A1 | 10/2022 | Jong et al. | |
| 2022/0365633 A1 | 11/2022 | Rochette et al. | |
| 2023/0164103 A1* | 5/2023 | Ham | H04L 51/224 709/207 |
| 2023/0262420 A1 | 8/2023 | Behzadi et al. | |
| 2023/0342009 A1 | 10/2023 | De Jong et al. | |

FOREIGN PATENT DOCUMENTS

| | | |
|---|---|---|
| EP | 2439920 A1 | 4/2012 |
| JP | 2006-284458 A | 10/2006 |
| JP | 2007-88943 A | 4/2007 |
| JP | 2017-15593 A | 1/2017 |
| WO | 2012/047920 A1 | 4/2012 |
| WO | 2013/169849 A2 | 11/2013 |
| WO | 2014/105276 A1 | 7/2014 |
| WO | 2018/034053 A1 | 2/2018 |
| WO | 2020/214864 A1 | 10/2020 |

OTHER PUBLICATIONS

Mokatren et al., "Exploring the Potential of a Mobile Eye Tracker as an Intuitive Indoor Pointing Device: A Case Study in Cultural Heritage", Future Generation Computer Systems, Available online at: <https://is-web.hevra.haifa.ac.il/images/lecturers_files/ishimshoni_files/MokatrenFGCS.pdf> [retrieved on Jul. 26, 2020], Jul. 1, 2017, 14 pages.

International Search Report received for PCT Patent Application No. PCT/US2020/028595, dated Aug. 14, 2020, 5 pages.

International Search Report received for PCT Patent Application No. PCT/US2020/030149, dated Sep. 4, 2020, 6 pages.

International Search Report received for PCT Patent Application No. PCT/US2021/071555, dated Feb. 14, 2022, 6 pages.

Non-Final Office Action received for U.S. Appl. No. 17/455,821, dated Apr. 7, 2022, 18 Pages.

(56) References Cited

OTHER PUBLICATIONS

Final Office Action received for U.S. Appl. No. 17/455,821, dated Jul. 29, 2022, 20 Pages.
Final Office Action received for U.S. Appl. No. 17/455,843, dated Oct. 3, 2022, 27 Pages.
Final Office Action received for U.S. Appl. No. 17/503,246, dated May 20, 2022, 17 Pages.
Non-Final Office Action received for U.S. Appl. No. 17/448,491, dated Jul. 27, 2022, 16 Pages.
Non-Final Office Action received for U.S. Appl. No. 17/455,843, dated May 26, 2022, 20 Pages.
Extended European Search Report received for European Patent Application No. 20790659.5, dated Nov. 29, 2022, 11 pages.
Extended European Search Report received for European Patent Application No. 20798438.6, dated Jan. 3, 2023, 11 pages.
International Search Report received for PCT Patent Application No. PCT/US2022/071806, dated Oct. 21, 2022, 6 pages.
International Search Report received for PCT Patent Application No. PCT/US2022/072389, dated Nov. 30, 2022, 7 pages.
Non-Final Office Action received for U.S. Appl. No. 17/455,821, dated Dec. 8, 2022, 24 pages.
Non-Final Office Action received for U.S. Appl. No. 17/455,843, dated Feb. 15, 2023, 28 pages.
Notice of Allowance received for U.S. Appl. No. 17/448,491, dated Jan. 18, 2023, 8 pages.
Notice of Allowance received for U.S. Appl. No. 17/503,246, dated Dec. 7, 2022, 10 pages.
Notice of Allowance received for U.S. Appl. No. 17/503,246, dated Jan. 25, 2023, 9 pages.
Notice of Allowance received for U.S. Appl. No. 17/594,742, dated Mar. 29, 2023, 9 pages.
Notice of Allowance received for U.S. Appl. No. 17/448,491, dated May 4, 2023, 7 pages.
Notice of Allowance received for U.S. Appl. No. 17/503,246, dated May 18, 2023, 9 pages.
Google Maps' Location Sharing Feature Can Show Your Friends' Battery Status, Available online at: <https://www.firstpost.com/tech/news-analysis/google-maps-location-sharing-feature-can-show-your-friends-battery-status-4885521.html>, [Retrieved Jan. 27, 2023], Aug. 3, 2018, 2 pages.
Hill, Spencer, "Does Airplane Mode Stop GPS Tracking?", Retrieved from the Internet: <https://web.archive.org/web/20200921071851/https://www.imyfone.com/change-location/does-airplane-mode-stop-tracking/>, [retrieved on Aug. 18, 2022], Part 1. Does Airplane Mode Stop GPS Tracking?, Sep. 21, 2020, pp. 1-2.
Roberts et al., "The Use of Augmented Reality, GPS and INS for Subsurface Data Visualisation", FIG XXII International Congress, Washington, D.C. USA, Apr. 19-26, 2002, 12 pages.
HowTechs, Motorola Moto G—How to reorganize app and widget, https://www.youtube.com/watch?v=0szKlr7xnqs, Dec. 22, 2013, 15 pages.
International Search Report received for PCT Application No. PCT/US2023/019402, mailed on Sep. 19, 2023, 6 pages.
Non-Final Office Action received for U.S. Appl. No. 17/663,816, mailed on Oct. 19, 2023, 35 pages.
Notice of Allowance received for U.S. Appl. No. 17/455,821, mailed on Sep. 20, 2023, 8 pages.
Notice of Allowance received for U.S. Appl. No. 17/455,843, mailed on Jul. 19, 2023, 9 pages.
Notice of Allowance received for U.S. Appl. No. 17/455,843, mailed on Nov. 1, 2023, 7 pages.
Notice of Allowance received for U.S. Appl. No. 17/594,742, mailed on Jul. 24, 2023, 8 pages.
Stolyar, Brenda, "Google Maps' Location Sharing Now Lets You Track Battery Status", https://www.digitaltrends.com/mobile/google-maps-lets-you-share-your-location-and-battery-level/, Aug. 3, 2018, pp. 1-4.
Search Report received for Chinese Patent Application No. 202210059059.2, mailed on Dec. 22, 2023, 5 pages (2 pages of English Translation and 3 pages of Official Copy).

\* cited by examiner

900

```
┌─────────────────────────────────────────────────────────────────────┐
│ While a first remote locator object is associated with a user, obtain information │
│ indicating that an amount of separation between a location associated with the user │
│ and a location associated with the first remote locator object has increased beyond a │
│ first separation threshold                                           │
└─────────────────────────────────────────────────────────────────────┘
                                                                      — 902
┌─────────────────────────────────────────────────────────────────────┐
│ In response to obtaining the information indicating that the amount of separation │
│ between the location associated with the user and the location associated with the first │
│ remote locator object has increased beyond the first separation threshold, generate, at │
│ the electronic device, a separation alert indicating that the first remote locator object │
│ has been separated from the user                                     │
└─────────────────────────────────────────────────────────────────────┘
                                                                      — 904
```

The separation alert includes a visual element that is displayed via the display device

— 906

While displaying the separation alert, detect a sequence of one or more inputs including an input directed to the separation alert

— 908

In response to detecting the sequence of one or more inputs, mark a location associated with the first remote locator object as a safe location for the remote locator object, wherein a safe zone for a respective remote locator object is a region at which the device will not generate separation alerts when the amount of separation between the location associated with the user and the location associated with the respective remote locator object is greater than the first separation threshold while the respective remote locator object remains within the safe zone

— 910

The sequence of one or more inputs includes a user input setting a size and/or shape of the safe zone

— 912

Fig. 9A

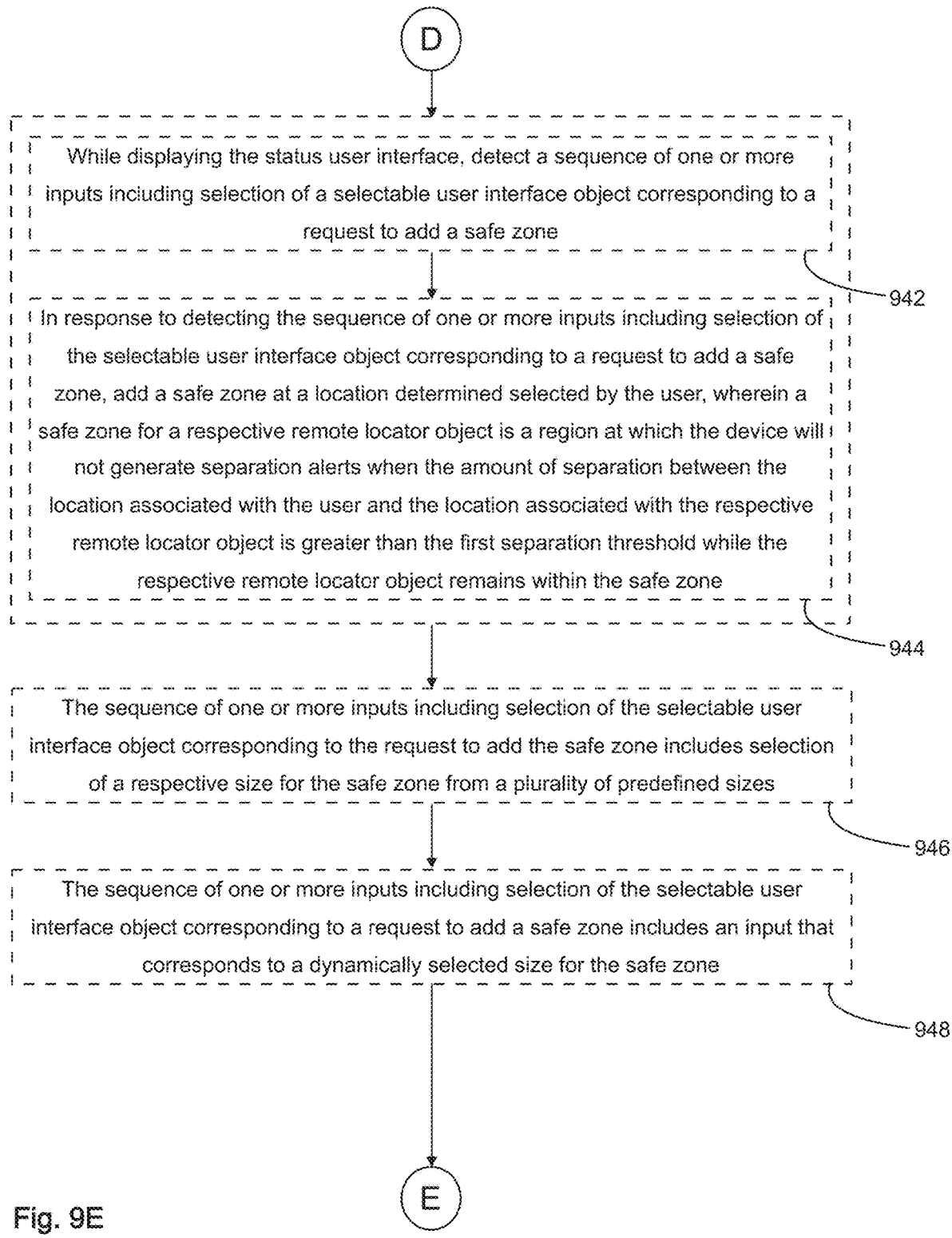

1100

While a remote locator object that is associated with a user other than the user of the electronic device the near the electronic device, in accordance with a determination that the remote locator object meets tracking criteria, automatically present, without user input, a tracking alert that indicates that the remote locator object that is not associated with the user meets the tracking criteria — 1102

The tracking criteria include one or more of: a requirement that a location associated with the remote locator object is within a predetermined threshold distance of a location associated with the user, a requirement that the location associated with the remote locator object has remained within a threshold distance of a location associated with the user for at least a threshold amount of time, a requirement that the remote locator object is not associated with the user, and a requirement that the remote locator object is reporting location to another user — 1104

The tracking alert includes a selectable option to ignore future alerts that the remote locator object meets the tracking criteria — 1106

The tracking alert includes a selectable option that includes information enabling the user to visually identify the remote locator object — 1108

Fig. 11A

USER INTERFACES FOR TRACKING AND FINDING ITEMS

CROSS-REFERENCE TO RELATED APPLICATIONS

This application is a continuation of U.S. application Ser. No. 17/503,246, filed Oct. 15, 2021, which is a continuation of International Application No. PCT/US2020/028595, filed Apr. 16, 2020, which claims the priority benefit of U.S. Provisional Application No. 62/856,004, filed Jun. 1, 2019, and U.S. Provisional Application No. 62/835,495, filed Apr. 17, 2019, the contents of which are hereby incorporated by reference in their entireties for all intended purposes.

FIELD OF THE DISCLOSURE

This relates generally to user interfaces that enable a user to track and find items on an electronic device.

BACKGROUND OF THE DISCLOSURE

User interaction with electronic devices has increased significantly in recent years. These devices can be devices such as televisions, multimedia devices, mobile devices, computers, tablet computers, and the like.

In some circumstances, users may wish to use such devices to track items. Enhancing the user's interactions with the device improves the user's experience with the device and decreases user interaction time, which is particularly important where input devices are battery-operated.

It is well understood that personally identifiable information data should be managed and handled so as to minimize risks of unintentional or unauthorized access or use, and the nature of authorized use should be clearly indicated to users. In particular, the use of personally identifiable information should follow privacy policies and practices that are generally recognized as meeting or exceeding industry or governmental requirements for maintaining the privacy of users.

SUMMARY OF THE DISCLOSURE

Some embodiments described in this disclosure are directed to one or more electronic devices that present user interfaces for initializing a remote locator object. Some embodiments described in this disclosure are directed to one or more electronic devices that present notifications when a remote locator object is separated from the user. Some embodiments described in this disclosure are directed to one or more electronic devices that present notifications when an unknown remote locator object is tracking the user. Some embodiments described in this disclosure are directed to a user interface for a short distance locator user interface for finding a remote locator object. Some embodiments described in this disclosure are directed to one or more electronic devices that present user interfaces for finding a remote locator object using a map user interface or using a short distance locator user interface. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 9A-9G are flow diagrams illustrating a method of displaying notifications of a separation with a remote locator object in accordance with some embodiments of the disclosure.

FIGS. 11A-11E are flow diagrams illustrating a method of displaying notifications of tracking by an unknown remote locator object in accordance with some embodiments of the disclosure.

DETAILED DESCRIPTION

Figure 1A:
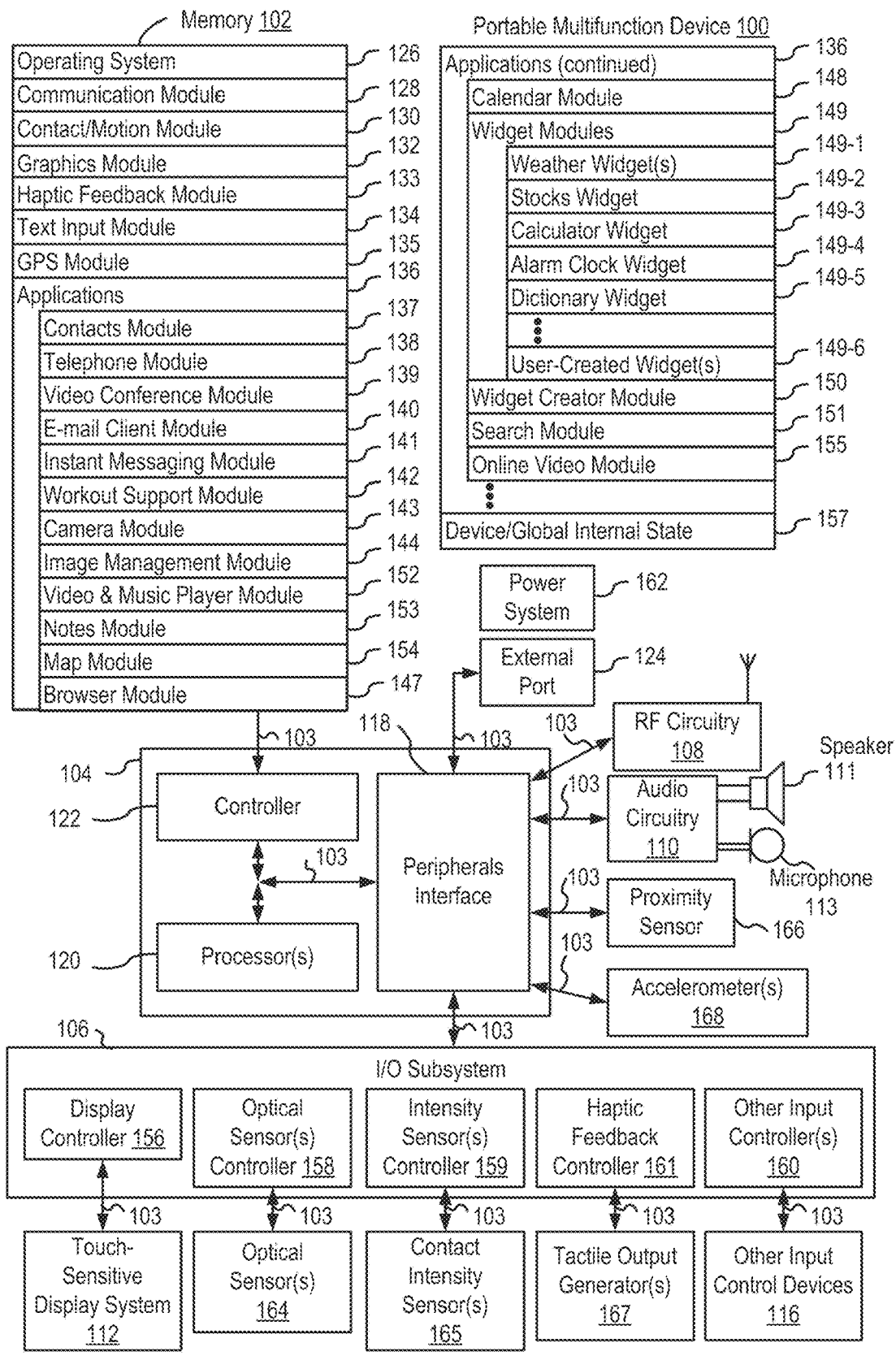
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices to track the location of remote locator objects and generate notifications associated with remote locator objects. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. For example, a first touch could be termed a second touch, and, similarly, a second touch could be termed a first touch, without departing from the scope of the various described embodiments. The first touch and the second touch are both touches, but they are not the same touch. These terms are only used to distinguish one element from another.

The terminology used in the description of the various described embodiments herein is for the purpose of describing particular embodiments only and is not intended to be limiting. It will be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used in the description of the various described embodiments and the appended claims, the singular forms "a," "an," and "the" are intended to include the plural forms as well, unless the context clearly indicates otherwise.

The phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. The term "if" is, optionally, construed to mean "when" or "upon" or "in response to determining" or "in response to detecting," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. It should also be understood that, in some embodiments, the device is not a portable communications device, but is a desktop computer with a touch-sensitive surface (e.g., a touch screen display and/or a touchpad). Other portable electronic devices, such as laptops or tablet computers with touch-sensitive surfaces (e.g., touch screen displays and/or touchpads), are, optionally, used.

It should be understood that the electronic device optionally includes one or more other physical user-interface devices, such as a physical keyboard, a mouse, and/or a joystick. In the discussion that follows, an electronic device that includes a display and a touch-sensitive surface is described.

The device typically supports a variety of applications, such as one or more of the following: a web browsing application, a website creation application, a word processing application, a disk authoring application, a spreadsheet application, a gaming application, a telephone application, a drawing application, a presentation application, a video conferencing application, a workout support application, a digital camera application, a digital video camera application, a photo management application, an e-mail application, an instant messaging application, a digital music player application, and/or a digital video player application.

One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user. The various applications that are executed on the device optionally use at least one common physical user-interface device, such as the touch-sensitive surface.

Attention is now directed toward embodiments of portable devices with touch-sensitive displays. FIG. 1A is a block diagram illustrating portable multifunction device 100 with touch-sensitive display system 112 in accordance with some embodiments. Device 100 includes memory 102 (which optionally includes one or more computer-readable storage mediums), memory controller 122, one or more processing units (CPUs) 120, audio circuitry 110, speaker 111, microphone 113, input/output (I/O) subsystem 106, peripherals interface 118, RF circuitry 108, other input control devices 116, and external port 124. Touch-sensitive display 112 is sometimes called a "touch screen" for convenience and is sometimes known as or called a "touch-sensitive display system." Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). Device 100 optionally includes one or more optical sensors 164. These components optionally communicate over one or more communication buses or signal lines 103.

Using the intensity of a contact as an attribute of a user input allows for user access to additional device functionality that may otherwise not be accessible by the user on a reduced-size device with limited real estate for receiving user input (e.g., via a touch-sensitive display, a touch-sensitive surface, or a physical/mechanical control such as a knob or a button) and/or displaying affordances (e.g., on a touch-sensitive display). As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. The intensity of a contact has a range of values that includes at least four distinct values and more typically includes hundreds of distinct values (e.g., at least 256). In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). In some implementations, the substitute measurements for contact force or pressure are used directly to determine whether an intensity threshold has been exceeded (e.g., the intensity threshold is described in units corresponding to the substitute measurements).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. In some cases, a user will feel a tactile sensation such as an "down click" or "up click" even when there is no movement of a physical actuator button associated with the touch-sensitive surface that is physically pressed (e.g., displaced) by the user's movements. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

The various components shown in FIG. 1A are implemented in hardware, software, or a combination of both hardware and software, including one or more signal processing and/or application-specific integrated circuits. It should be appreciated that device 100 is only one example of a portable multifunction device, and that device 100 optionally has more or fewer components than shown, optionally combines two or more components, or optionally has a different configuration or arrangement of the components.

Memory controller 122 optionally controls access to memory 102 by other components of device 100. Memory 102 optionally includes high-speed random access memory and optionally also includes non-volatile memory, such as one or more flash memory devices, magnetic disk storage devices, or other non-volatile solid-state memory devices.

The one or more processors 120 run or execute various software programs and/or sets of instructions stored in memory 102 to perform various functions for device 100 and to process data. Peripherals interface 118 can be used to couple input and output peripherals of the device to CPU 120 and memory 102. In some embodiments, peripherals interface 118, memory controller 122, and CPU 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 optionally includes well-known circuitry for detecting near field communication (NFC) fields, such as by a short-range communication radio. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols, and technologies, including but not limited to high-speed uplink packet access (HSUPA), Evolution, Data-Only (EV-DO), HSPA, HSPA+, Dual-Cell HSPA (DC-HSPDA), Global System for Mobile Communications (GSM), Enhanced Data GSM Environment (EDGE), high-speed downlink packet access (HSDPA), long term evolution (LTE), near field communication (NFC), wideband code division multiple access (W-CDMA), code division multiple access (CDMA), time division multiple access (TDMA), Wireless Fidelity (Wi-Fi) (e.g., IEEE 802.11a, IEEE 802.11b, IEEE 802.11g, IEEE 802.11n, and/or IEEE 802.11ac), Bluetooth, Bluetooth Low Energy (BTLE), voice over Internet Protocol (VoIP), Wi-MAX, a protocol for e-mail (e.g., Internet message access protocol (IMAP) and/or post office protocol (POP)), Session Initiation Protocol for Instant Messaging and Presence Leveraging Extensions (SIMPLE), Instant Messaging and Presence Service (IMPS)), Short Message Service (SMS), and/or instant messaging (e.g., extensible messaging and presence protocol (XMPP), or any other suitable communication protocol, including communication protocols not yet developed as of the filing date of this document.

Audio circuitry 110, speaker 111, and microphone 113 provide an audio interface between a user and device 100. Speaker 111 converts the electrical signal to human-audible sound waves. Audio circuitry 110 receives audio data from peripherals interface 118, converts the audio data to an electrical signal, and transmits the electrical signal to speaker 111. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). Other input control devices 116 optionally include physical buttons (e.g., push buttons, rocker buttons, etc.), dials, slider switches, joysticks, click wheels, and so forth.

A quick press of the push button optionally disengages a lock of touch screen 112 or optionally begins a process that uses gestures on the touch screen to unlock the device. A longer press of the push button (e.g., 206) optionally turns power to device 100 on or off. Touch screen 112 is used to implement virtual or soft buttons and one or more soft keyboards. The functionality of one or more of the buttons are, optionally, user-customizable.

Touch-sensitive display 112 provides an input interface and an output interface between the device and a user. Touch screen 112 displays visual output to the user. In some embodiments, some or all of the visual output optionally corresponds to user-interface objects. The visual output optionally includes graphics, text, icons, video, and any combination thereof (collectively termed "graphics"). Display controller 156 receives and/or sends electrical signals from/to touch screen 112.

Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. Touch screen 112 has a touch-sensitive surface, sensor, or set of sensors that accepts input from the user based on haptic and/or tactile contact. In an exemplary embodiment, a point of contact between touch screen 112 and the user corresponds to a finger of the user.

Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used. Touch screen 112 optionally uses LED (light emitting diode) technology LCD (liquid crystal display) technology, or LPD (light emitting polymer display) technology, although other display technologies are used in other embodiments.

A touch-sensitive display in some embodiments of touch screen 112 is, optionally, analogous to multi-touch sensitive touchpads. However, touch screen 112 displays visual output from device 100, whereas touch-sensitive touchpads do not provide visual output.

The user optionally makes contact with touch screen 112 using any suitable object or appendage, such as a stylus, a finger, and so forth. In some embodiments, the device translates the rough finger-based input into a precise pointer/cursor position or command for performing the actions desired by the user. In some embodiments, the user interface is designed to work primarily with finger-based contacts and gestures, which can be less precise than stylus-based input due to the larger area of contact of a finger on the touch screen. Touch screen 112 optionally has a video resolution in excess of 100 dpi. In some embodiments, the touch screen has a video resolution of approximately 160 dpi.

In some embodiments, in addition to the touch screen, device 100 optionally includes a touchpad (not shown) for activating or deactivating particular functions. The touchpad is, optionally, a touch-sensitive surface that is separate from touch screen 112 or an extension of the touch-sensitive surface formed by the touch screen. In some embodiments, the touchpad is a touch-sensitive area of the device that, unlike the touch screen, does not display visual output.

Device 100 also includes power system 162 for powering the various components. Power system 162 optionally includes a power management system, one or more power sources (e.g., battery, alternating current (AC)), a power converter or inverter, a power status indicator (e.g., a light-emitting diode (LED)), a recharging system, a power failure detection circuit, and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 receives light from the environment, projected through one or more lenses, and converts the light to data representing an image. Optical sensor 164 optionally includes charge-coupled device (CCD) or complementary metal-oxide semiconductor (CMOS) phototransistors. In conjunction with imaging module 143 (also called a camera module), optical sensor 164 optionally captures still images or video. In some embodiments, an optical sensor is located on the front of the device so that the user's image is, optionally, obtained for video conferencing while the user views the other video conference participants on the touch screen display. In some embodiments, an optical sensor is located on the back of device 100, opposite touch screen display 112 on the front of the device so that the touch screen display is enabled for use as a viewfinder for still and/or video image acquisition. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

FIG. 1A shows a contact intensity sensor coupled to intensity sensor controller 159 in I/O subsystem 106. Device 100 optionally also includes one or more contact intensity sensors 165. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is located on the back of device 100, opposite touch screen display 112, which is located on the front of device 100. In some embodiments, at least one contact intensity sensor is collocated with, or proximate to, a touch-sensitive surface (e.g., touch-sensitive display system 112).

Device 100 optionally also includes one or more proximity sensors 166. FIG. 1A shows proximity sensor 166 coupled to peripherals interface 118. In some embodiments, the proximity sensor turns off and disables touch screen 112 when the multifunction device is placed near the user's ear (e.g., when the user is making a phone call). Alternately, proximity sensor 166 is, optionally, coupled to input controller 160 in I/O subsystem 106.

FIG. 1A shows a tactile output generator coupled to haptic feedback controller 161 in I/O subsystem 106. Device 100 optionally also includes one or more tactile output generators 167. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator sensor is located on the back of device 100, opposite touch screen display 112, which is located on the front of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100).

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
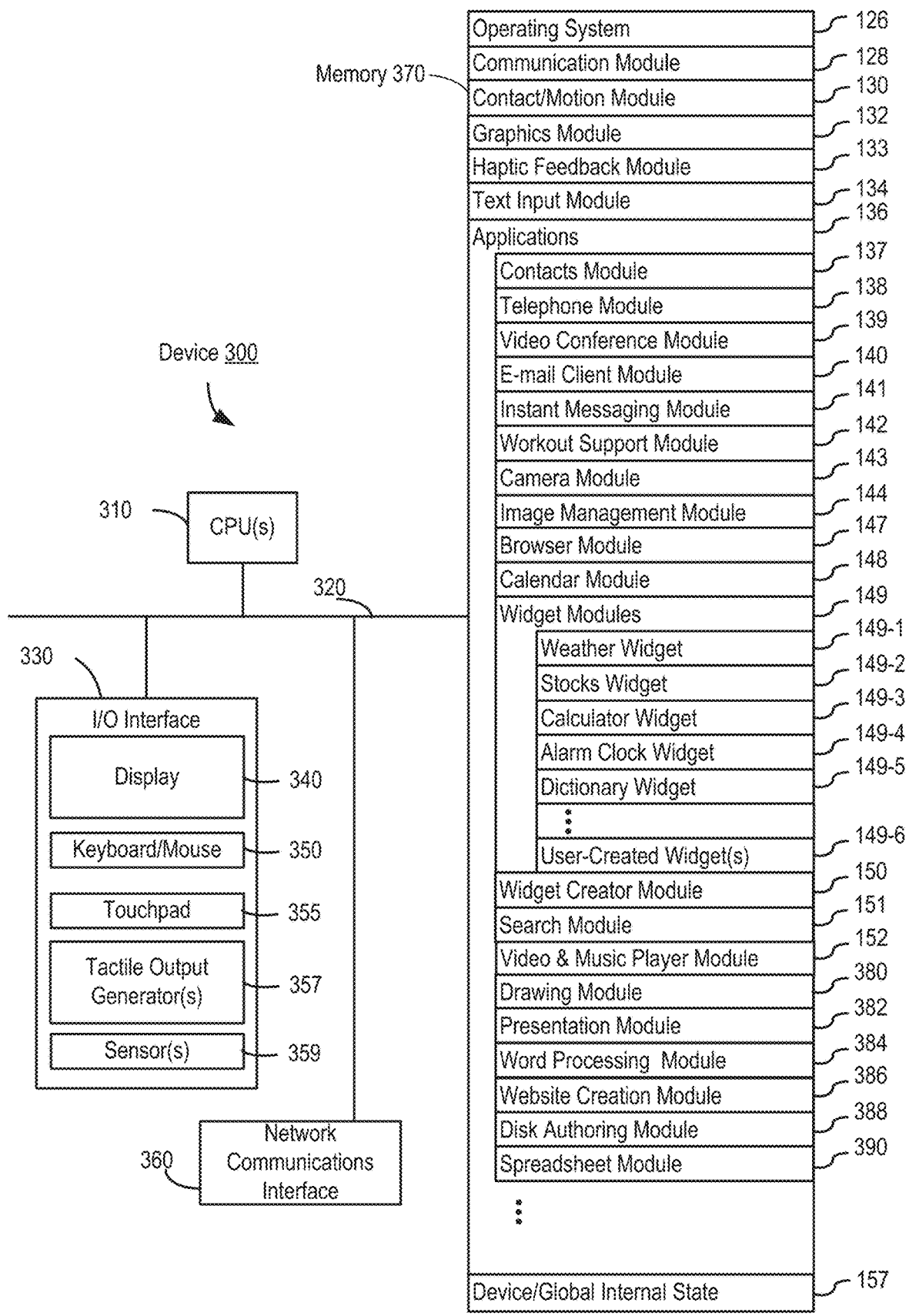
FIG. 3 is a block diagram of an exemplary multifunction device with a display and a touch-sensitive surface in accordance with some embodiments.

In some embodiments, the software components stored in memory 102 include operating system 126, applications (or sets of instructions) 136, communication module (or set of instructions) 128, contact/motion module (or set of instructions) 130, text input module (or set of instructions) 134, graphics module (or set of instructions) 132, and Global Positioning System (GPS) module (or set of instructions) 135. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., WINDOWS, Darwin, RTXC, LINUX, UNIX, OS X, iOS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. In some embodiments, the external port is a multi-pin (e.g., 30-pin) connector. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 optionally detects contact with touch screen 112 (in conjunction with display controller 156) and other touch-sensitive devices (e.g., a touchpad or physical click wheel). Contact/motion module 130 receives contact data from the touch-sensitive surface. Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). For example, a mouse "click" threshold of a trackpad or touch screen display can be set to any of a large range of predefined threshold values without changing the trackpad or touch screen display hardware. In some embodiments, at least a subset of the intensity thresholds are determined in accordance with software parameters (e.g., the intensity thresholds are not determined by the activation thresholds of particular physical actuators and can be adjusted without changing the physical hardware of device 100). Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). For example, detecting a finger tap gesture includes detecting a finger-down event followed by detecting a finger-up (liftoff) event at the same position (or substantially the same position) as the finger-down event (e.g., at the position of an icon). Thus, a gesture is, optionally, detected by detecting a particular contact pattern. As another example, detecting a finger swipe gesture on the touch-sensitive surface includes detecting a finger-down event followed by detecting one or more finger-dragging events, and subsequently followed by detecting a finger-up (liftoff) event.

As used herein, the term "graphics" includes any object that can be displayed to a user, including, without limitation, text, web pages, icons (such as user-interface objects including soft keys), digital images, videos, animations, and the like. Graphics module 132 includes various known software components for rendering and displaying graphics on touch screen 112 or other display, including components for changing the visual impact (e.g., brightness, transparency, saturation, contrast, or other visual property) of graphics that are displayed.

In some embodiments, graphics module 132 stores data representing graphics to be used. Graphics module 132 receives, from applications etc., one or more codes specifying graphics to be displayed along with, if necessary, coordinate data and other graphic property data, and then generates screen image data to output to display controller 156. Each graphic is, optionally, assigned a corresponding code.

Haptic feedback module 133 includes various software components for generating instructions used by tactile output generator(s) 167 to produce tactile outputs, in response to user interactions with device 100, at one or more locations on device 100.

Text input module 134, which is, optionally, a component of graphics module 132, provides soft keyboards for entering text in various applications (e.g., contacts 137, browser 147, IM 141, e-mail 140, and any other application that needs text input).

GPS module 135 determines the location of the device and provides this information for use in various applications (e.g., to camera 143 as picture/video metadata; to telephone 138 for use in location-based dialing; and to applications that provide location-based services such as local yellow page widgets, weather widgets, and map/navigation widgets).

Applications 136 optionally include the following modules (or sets of instructions), or a subset or superset thereof:
Video player module;
Music player module;
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Browser module 147;
Calendar module 148;
Widget modules 149, which optionally include one or more of: dictionary widget 149-5, weather widget 149-1, stocks widget 149-2, alarm clock widget 149-4, calculator widget 149-3, and other widgets obtained by the user, as well as user-created widgets 149-6;
Widget creator module 150 for making user-created widgets 149-6;
Search module 151;
Video and music player module 152, which merges music player module and video player module;
Notes module 153;
Map module 154; and/or
Online video module 155.

Examples of other applications 136 that are, optionally, stored in memory 102 include JAVA-enabled applications, other word processing applications, drawing applications, presentation applications, other image editing applications, encryption, digital rights management, voice recognition, and voice replication.

In conjunction with touch screen 112, contact/motion module 130, graphics module 132, text input module 134, and display controller 156, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), physical address(es), e-mail address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

As noted above, the wireless communication optionally uses any of a plurality of communications standards, protocols, and technologies. In conjunction with RF circuitry 108, audio circuitry 110, speaker 111, microphone 113, touch screen 112, contact/motion module 130, graphics module 132, text input module 134, and display controller 156, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed.

In conjunction with RF circuitry 108, audio circuitry 110, speaker 111, microphone 113, touch screen 112, contact/motion module 130, graphics module 132, text input module 134, contacts module 137, telephone module 138, display controller 156, optical sensor controller 158, and optical sensor 164, video conference module 139 includes executable instructions to initiate, conduct, and terminate a video conference between a user and one or more other participants in accordance with user instructions.

In conjunction with RF circuitry 108, touch screen 112, contact/motion module 130, graphics module 132, text input module 134, and display controller 156, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

As used herein, "instant messaging" refers to both telephony-based messages (e.g., messages sent using SMS or MMS) and Internet-based messages (e.g., messages sent using XMPP, SIMPLE, or IMPS). In conjunction with RF circuitry 108, touch screen 112, contact/motion module 130, graphics module 132, text input module 134, and display controller 156, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using SIMPLE, XMPP, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS).

In conjunction with RF circuitry 108, touch screen 112, contact/motion module 130, graphics module 132, text input module 134, GPS module 135, map module 154, display controller 156, and music player module, workout support module 142 includes executable instructions to create workouts (e.g., with time, distance, and/or calorie burning goals); select and play music for a workout; communicate with workout sensors (sports devices); receive workout sensor data; calibrate sensors used to monitor a workout; and display, store, and transmit workout data.

In conjunction with touch screen 112, contact/motion module 130, graphics module 132, image management module 144, display controller 156, optical sensor(s) 164, and optical sensor controller 158, camera module 143 includes executable instructions to capture still images or video (including a video stream) and store them into memory 102, modify characteristics of a still image or video, or delete a still image or video from memory 102.

In conjunction with touch screen 112, contact/motion module 130, graphics module 132, text input module 134, display controller 156, and camera module 143, image management module 144 includes executable instructions to arrange, label, delete, modify (e.g., edit), or otherwise manipulate, present (e.g., in a digital slide show or album), and store still and/or video images.

In conjunction with RF circuitry 108, touch screen 112, contact/motion module 130, graphics module 132, text input module 134, and display controller 156, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, contact/motion module 130, graphics module 132, text input module 134, e-mail client module 140, display controller 156, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an XML (Extensible Markup Language) file and a JavaScript file (e.g., Yahoo! Widgets). In some embodiments, a widget includes an HTML (Hypertext Markup Language) file, a CSS (Cascading Style Sheets) file, and a JavaScript file.

In conjunction with RF circuitry 108, touch screen 112, contact/motion module 130, graphics module 132, text input module 134, display controller 156, and browser module 147, the widget creator module 150 are, optionally, used by a user to create widgets (e.g., turning a user-specified portion of a web page into a widget).

In conjunction with touch screen 112, contact/motion module 130, graphics module 132, text input module 134, and display controller 156, search module 151 includes executable instructions to search for text, sound, music, image, video, and/or other files in memory 102 that match one or more search criteria (e.g., one or more user-specified search terms) in accordance with user instructions.

In some embodiments, device 100 optionally includes the functionality of an MP3 player. In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124).

In conjunction with touch screen 112, display controller 156, contact/motion module 130, graphics module 132, and text input module 134, notes module 153 includes executable instructions to create and manage to-do lists, notes, and the like in accordance with user instructions.

In conjunction with RF circuitry 108, touch screen 112, contact/motion module 130, graphics module 132, text input module 134, GPS module 135, browser module 147, and display controller 156, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, contact/motion module 130, graphics module 132, audio circuitry 110, speaker 111, RF circuitry 108, text input module 134, e-mail client module 140, browser module 147, and display controller 156, online video module 155 includes instructions that allow the user to receive, access, browse (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. In some embodiments, memory 102 optionally stores a subset of the modules and data structures identified above. For example, video player module is, optionally, combined with music player module into a single module (e.g., video and music player module 152, FIG. 1A). Furthermore, memory 102 optionally stores additional modules and data structures not described above.

By using a touch screen and/or a touchpad as the primary input control device for operation of device 100, the number of physical input control devices (such as push buttons, dials, and the like) on device 100 is, optionally, reduced. In some embodiments, device 100 is a device where operation of a predefined set of functions on the device is performed exclusively through a touch screen and/or a touchpad.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, the menu button is a physical push button or other physical input control device instead of a touchpad. In such other embodiments, a "menu button" is implemented using a touchpad.

Figure 1B:
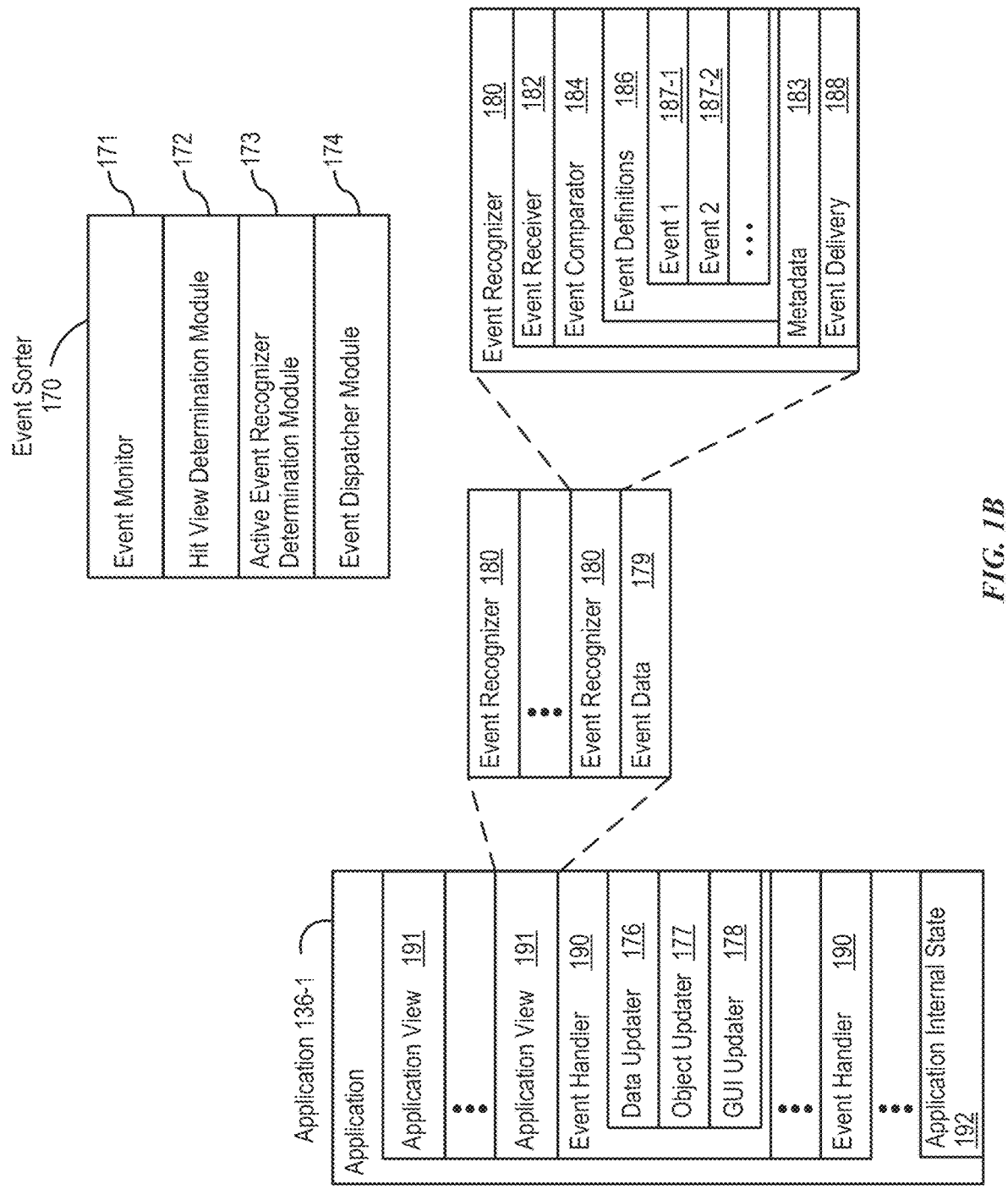
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes a respective application 136-1 (e.g., any of the aforementioned applications 137-151, 155, 380-390) and event sorter 170 (e.g., in operating system 126).

Event sorter 170 includes event monitor 171 and event dispatcher module 174. Event sorter 170 receives event information and determines the application 136-1 and application view 191 of application 136-1 to which to deliver the event information. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: user interface state information that indicates information being displayed or that is ready for display by application 136-1, resume information to be used when application 136-1 resumes execution, a state queue for enabling the user to go back to a prior state or view of application 136-1, and a redo/undo queue of previous actions taken by the user.

Event monitor 171 receives event information from peripherals interface 118. Peripherals interface 118 transmits information it receives from I/O subsystem 106 or a sensor, such as proximity sensor 166, accelerometer(s) 168, and/or microphone 113 (through audio circuitry 110). Event information includes information about a sub-event (e.g., a user touch on touch-sensitive display 112, as part of a multi-touch gesture). Information that peripherals interface 118 receives from I/O subsystem 106 includes information from touch-sensitive display 112 or a touch-sensitive surface.

In some embodiments, peripherals interface 118 transmits event information only when there is a significant event (e.g., receiving an input above a predetermined noise threshold and/or for more than a predetermined duration). In other embodiments, event monitor 171 sends requests to the peripherals interface 118 at predetermined intervals. In response, peripherals interface 118 transmits event information.

In some embodiments, event sorter 170 also includes an active event recognizer determination module 173 and/or a hit view determination module 172.

Views are made up of controls and other elements that a user can see on the display. Hit view determination module 172 provides software procedures for determining where a sub-event has taken place within one or more views when touch-sensitive display 112 displays more than one view.

Another aspect of the user interface associated with an application is a set of views, sometimes herein called application views or user interface windows, in which information is displayed and touch-based gestures occur. In some embodiments, the lowest level view in which a touch is detected is, optionally, called the hit view, and the set of events that are recognized as proper inputs are, optionally, determined based, at least in part, on the hit view of the initial touch that begins a touch-based gesture. Thus, the application views (of a respective application) in which a touch is detected optionally correspond to programmatic levels within a programmatic or view hierarchy of the application.

When an application has multiple views organized in a hierarchy, hit view determination module 172 identifies a hit view as the lowest view in the hierarchy which should handle the sub-event. Hit view determination module 172 receives information related to sub-events of a touch-based gesture. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that all views that include the physical location of a sub-event are actively involved views, and therefore determines that all actively involved views should receive a particular sequence of sub-events. In other embodiments, active event recognizer determination module 173 determines that only the hit view should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments, event dispatcher module 174 stores in an event queue the event information, which is retrieved by a respective event receiver 182. In embodiments including active event recognizer determination module 173, event dispatcher module 174 delivers the event information to an event recognizer determined by active event recognizer determination module 173.

In some embodiments, operating system 126 includes event sorter 170. Alternatively, application 136-1 includes event sorter 170. In yet other embodiments, event sorter 170 is a part of another module stored in memory 102, such as contact/motion module 130, or is a stand-alone module.

In some embodiments, application 136-1 includes a plurality of event handlers 190 and one or more application views 191, each of which includes instructions for handling touch events that occur within a respective view of the application's user interface. Typically, a respective application view 191 includes a plurality of event recognizers 180. Each application view 191 of the application 136-1 includes one or more event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Also, in some embodiments, one or more of data updater 176, object updater 177, and GUI updater 178 are included in a respective application view 191. Alternatively, one or more of the application views 191 include one or more respective event handlers 190.

A respective event recognizer 180 receives event information (e.g., event data 179) from event sorter 170 and identifies an event from the event information. In some embodiments, event recognizer 180 also includes at least a subset of: metadata 183, and event delivery instructions 188 (which optionally include sub-event delivery instructions). Event recognizer 180 includes event receiver 182 and event comparator 184.

Event receiver 182 receives event information from event sorter 170. The event information includes information about a sub-event, for example, a touch or a touch movement. When the sub-event concerns motion of a touch, the event information optionally also includes speed and direction of the sub-event. Depending on the sub-event, the event information also includes additional information, such as location of the sub-event. In some embodiments, events include rotation of the device from one orientation to another (e.g., from a portrait orientation to a landscape orientation, or vice versa), and the event information includes corresponding information about the current orientation (also called device attitude) of the device.

In some embodiments, event comparator 184 includes event definitions 186. Event comparator 184 compares the event information to predefined event or sub-event definitions and, based on the comparison, determines an event or sub-event, or determines or updates the state of an event or sub-event. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In another example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In some embodiments, the event also includes information for one or more associated event handlers 190.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test. In some embodiments, event definition 187 includes a definition of an event for a respective user-interface object.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event failed, event impossible, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate whether sub-events are delivered to varying levels in the view or programmatic hierarchy. In some embodiments, metadata 183 includes configurable properties, flags, and/or lists that indicate how event recognizers interact, or are enabled to interact, with one another.

In some embodiments, a respective event recognizer 180 activates event handler 190 associated with an event when one or more particular sub-events of an event are recognized. Activating an event handler 190 is distinct from sending (and deferred sending) sub-events to a respective hit view. In some embodiments, a respective event recognizer 180 delivers event information associated with the event to event handler 190. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with actively involved views or with the series of sub-events receive the event information and perform a predetermined process.

In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display. In some embodiments, data updater 176 creates and updates data used in application 136-1. For example, data updater 176 updates the telephone number used in contacts module 137, or stores a video file used in video player module.

In some embodiments, event handler(s) 190 includes or has access to data updater 176, object updater 177, and GUI updater 178. In other embodiments, they are included in two or more software modules. In some embodiments, data updater 176, object updater 177, and GUI updater 178 are included in a single module of a respective application 136-1 or application view 191.

It shall be understood that the foregoing discussion regarding event handling of user touches on touch-sensitive displays also applies to other forms of user inputs to operate multifunction devices 100 with input devices, not all of which are initiated on touch screens. For example, oral instructions; mouse movement and mouse button presses, optionally coordinated with single or multiple keyboard presses or holds; pen stylus inputs; contact movements such as taps, drags, scrolls, etc. on touchpads; movement of the device; detected eye movements; biometric inputs; and/or any combination thereof are optionally utilized as inputs corresponding to sub-events which define an event to be recognized.

Figure 2:
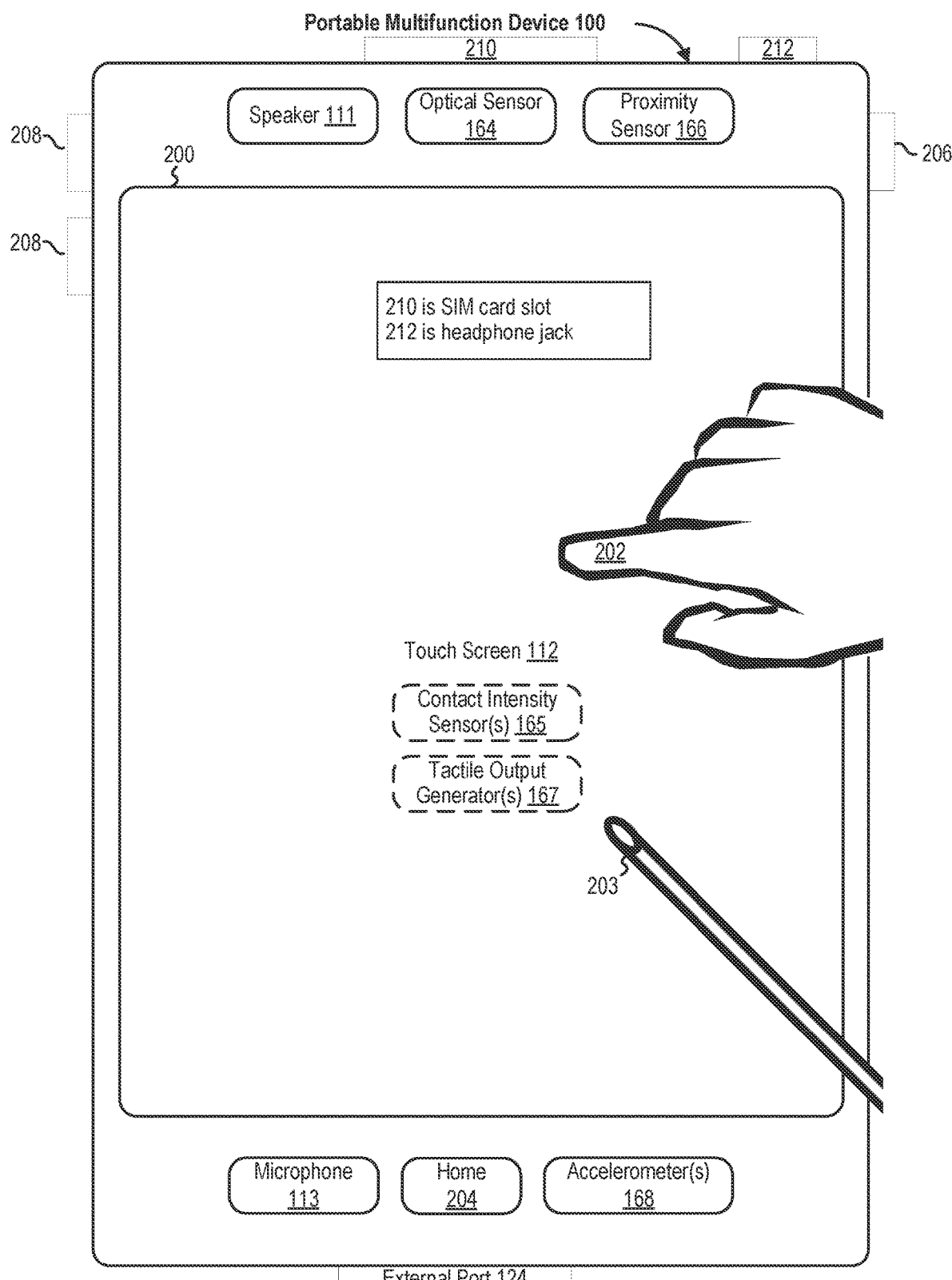
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, the gesture optionally includes one or more taps, one or more swipes (from left to right, right to left, upward and/or downward), and/or a rolling of a finger (from right to left, left to right, upward and/or downward) that has made contact with device 100. In some embodiments, selection of one or more graphics occurs when the user breaks contact with the one or more graphics. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. Alternatively, in some embodiments, the menu button is implemented as a soft key in a GUI displayed on touch screen 112. As described previously, menu button 204 is, optionally, used to navigate to any application 136 in a set of applications that are, optionally, executed on device 100.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Device 100 also, optionally, includes one or more contact intensity sensors 165 for detecting intensity of contacts on touch screen 112 and/or one or more tactile output generators 167 for generating tactile outputs for a user of device 100. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113.

FIG. 3 is a block diagram of an exemplary multifunction device with a display and a touch-sensitive surface in accordance with some embodiments. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 need not be portable. Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 optionally includes one or more storage devices remotely located from CPU(s) 310. Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. In some embodiments, memory 370 optionally stores a subset of the modules and data structures identified above. Furthermore, memory 370 optionally stores additional modules and data structures not described above. The above-identified modules or programs (e.g., sets of instructions) need not be implemented as separate software programs, procedures, or modules, and thus various subsets of these modules are, optionally, combined or otherwise rearranged in various embodiments.

Attention is now directed towards embodiments of user interfaces that are, optionally, implemented on, for example, portable multifunction device 100.

Figure 4A:
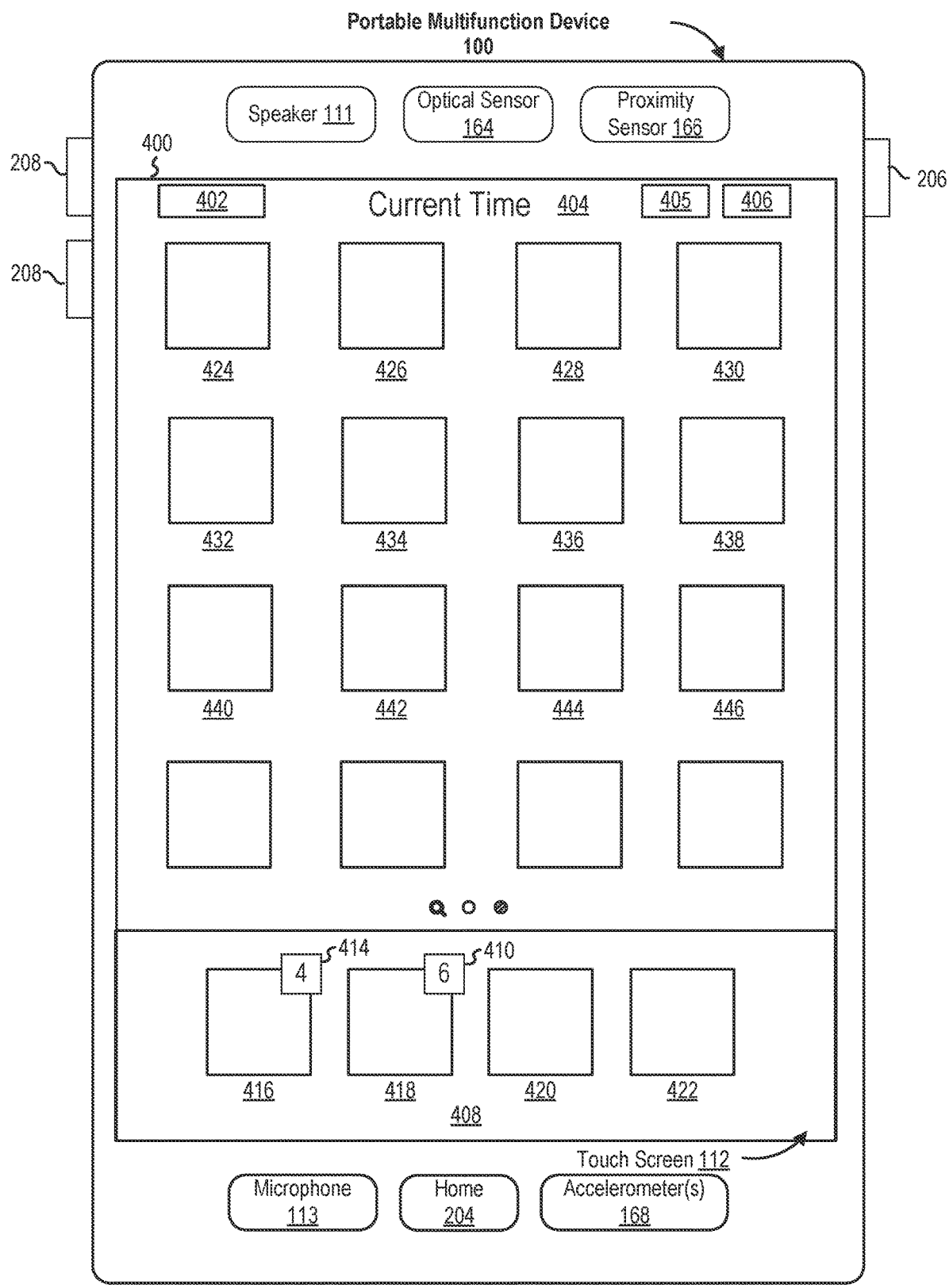
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, which optionally includes an indicator 414 of the number of missed calls or voicemail messages;
  Icon 418 for e-mail client module 140, which optionally includes an indicator 410 of the number of unread e-mails;
  Icon 422 for video and music player module 152; and
  Icon 420 for browser module 147; and
Icons for other applications, such as:
  Icon 424 for IM module 141;
  Icon 442 for workout support module 142;
  Icon 430 for camera module 143;
  Icon 428 for image management module 144;
  Icon 426 for calendar module 148;
  Icon 438 for weather widget 149-1;
  Icon 434 for stocks widget 149-2;
  Icon 440 for alarm clock widget 149-4;
  Icon 444 for notes module 153;
  Icon 436 for map module 154;
  Icon 432 for online video module 155; and
  Icon 446 for a settings application or module, which provides access to settings for device 100 and its various applications 136.

In some embodiments, a label for a respective application icon includes a name of an application corresponding to the respective application icon. In some embodiments, a label for a particular application icon is distinct from a name of an application corresponding to the particular application icon.

Figure 4B:
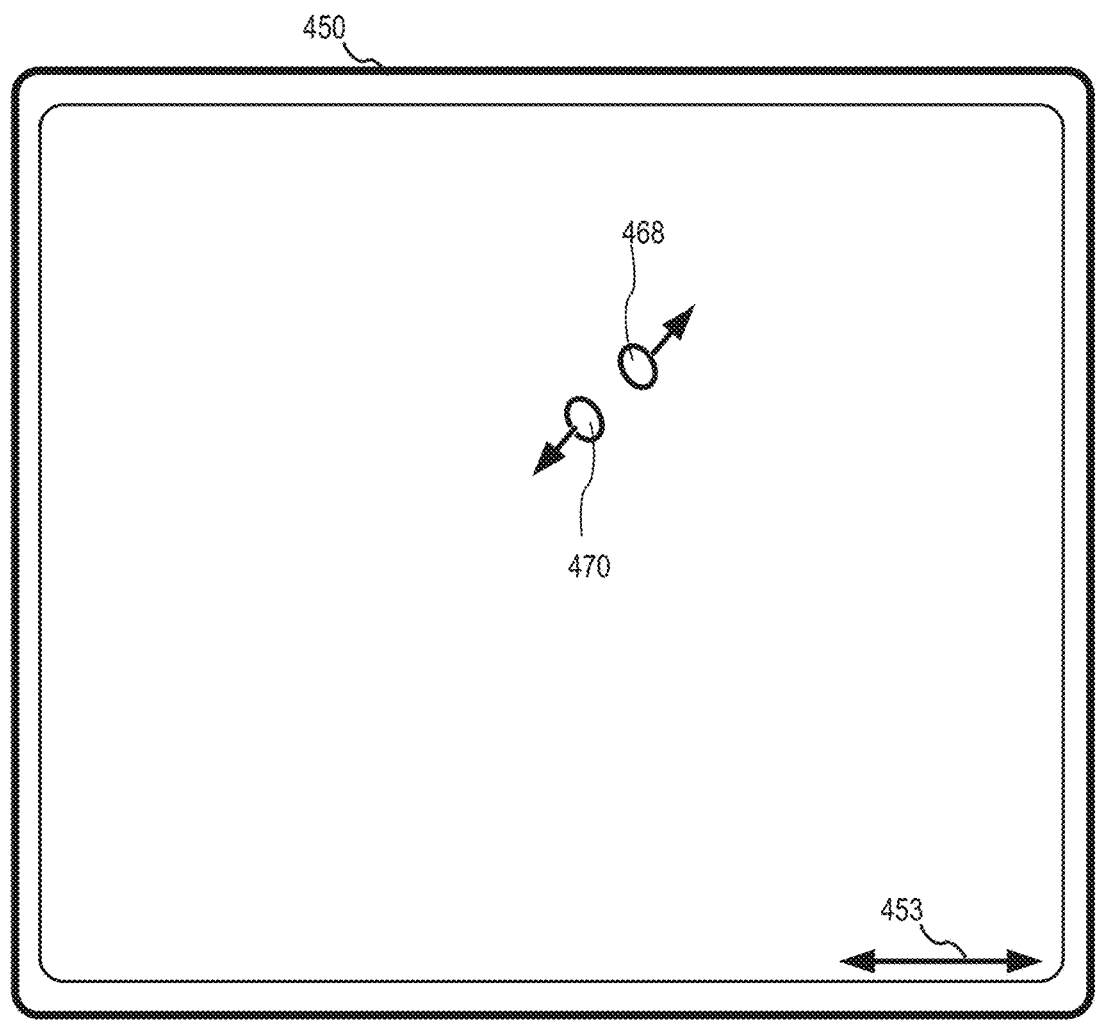
FIG. 4B illustrates an exemplary user interface for a multifunction device with a touch-sensitive surface that is separate from the display in accordance with some embodiments.
Figure 4B:
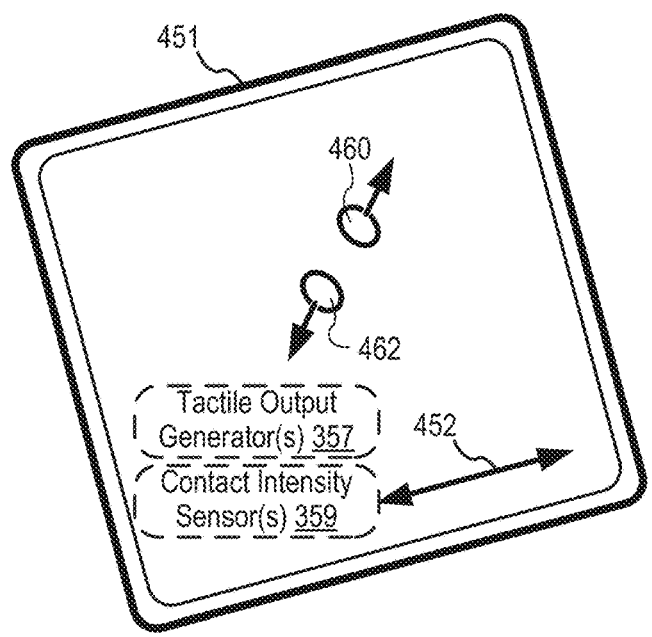

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more tactile output generators 357 for generating tactile outputs for a user of device 300 and/or one or more contact intensity sensors (e.g., one or more of sensors 359) for detecting intensity of contacts on touch-sensitive surface 451.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a tap gesture is, optionally, replaced with a mouse click while the cursor is located over the location of the tap gesture (e.g., instead of detection of the contact followed by ceasing to detect the contact). As another example, a swipe gesture is, optionally, replaced with a mouse click (e.g., instead of a contact) followed by movement of the cursor along the path of the swipe (e.g., instead of movement of the contact). Similarly, when multiple user inputs are simultaneously detected, it should be understood that multiple computer mice are, optionally, used simultaneously, or a mouse and finger contacts are, optionally, used simultaneously.

Figure 5A:
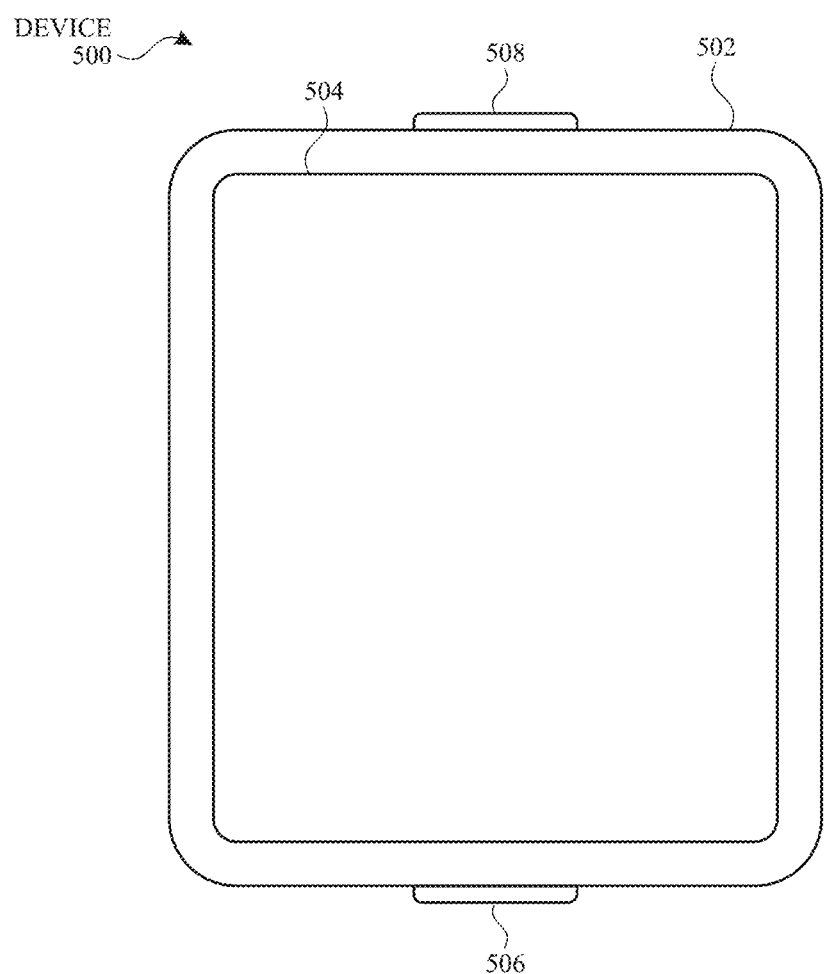
FIG. 5A illustrates a personal electronic device in accordance with some embodiments.

FIG. 5A illustrates exemplary personal electronic device 500. In some embodiments, device 500 can include some or all of the features described with respect to devices 100 and 300 (e.g., FIGS. 1A-4B). Device 500 includes body 502. In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

In some embodiments, device 500 has one or more input mechanisms 506 and 508. Examples of physical input mechanisms include push buttons and rotatable mechanisms. Input mechanisms 506 and 508, if included, can be physical. In some embodiments, device 500 has one or more attachment mechanisms. These attachment mechanisms permit device 500 to be worn by a user. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth.

Figure 5B:
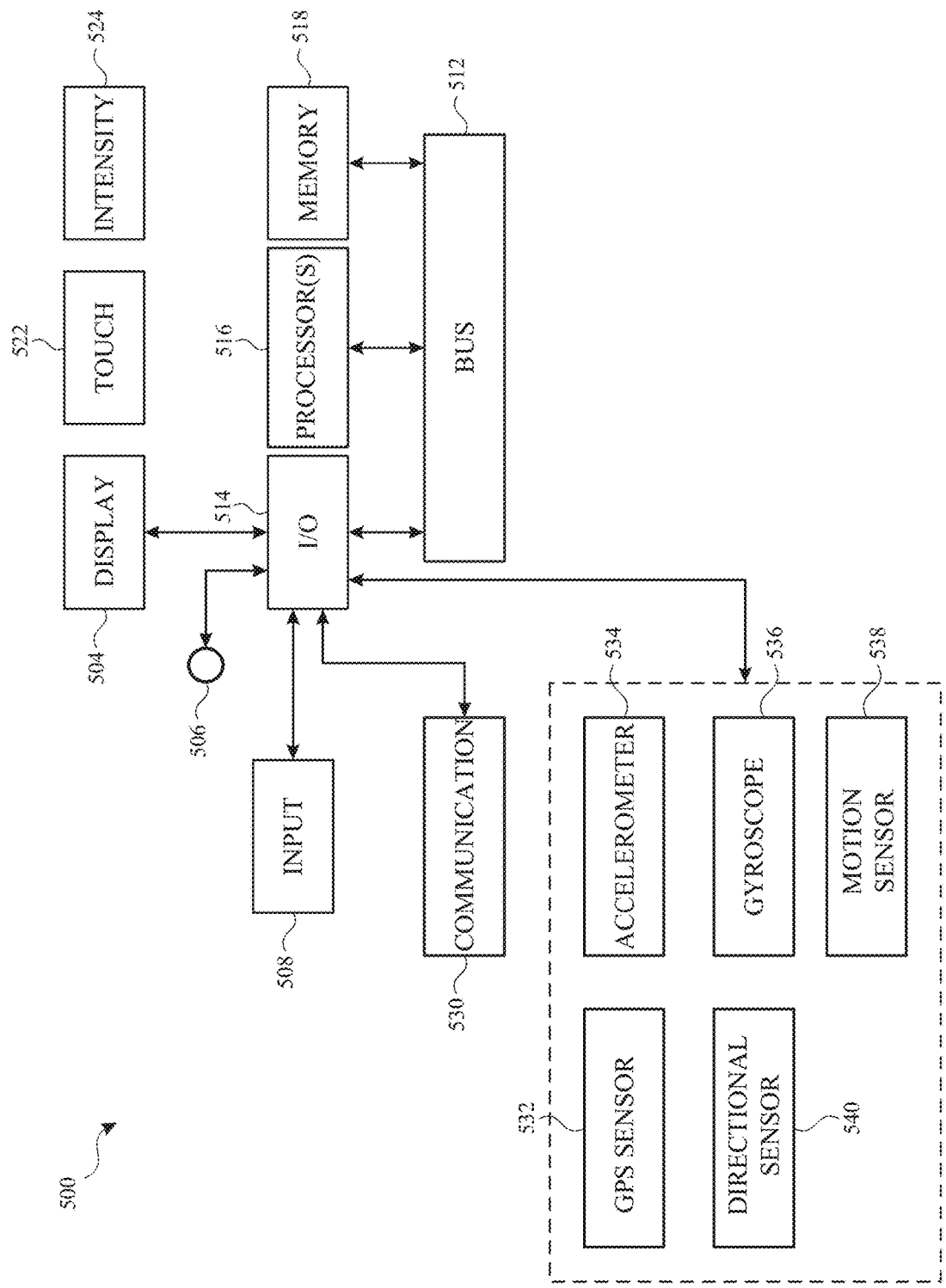
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 can include input mechanisms 506 and/or 508. Input mechanism 506 is, optionally, a rotatable input device or a depressible and rotatable input device, for example. Input mechanism 508 is, optionally, a button, in some examples. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques.

Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514. Input mechanism 508 is, optionally, a microphone, in some examples.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300 and 1400 (FIGS. 7, 9, 11, 13 and 14). In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. A computer-readable storage medium can be any medium that can tangibly contain or store computer-executable instructions for use by or in connection with the instruction execution system, apparatus, or device. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, a button, an image (e.g., icon), and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). In some embodiments, the characteristic intensity is based on multiple intensity samples. A characteristic intensity of a contact is, optionally, based on one or more of: a maximum value of the intensities of the contact, an average value of the intensities of the contact, a mean value of the intensities of the contact, a top 10 percentile value of the intensities of the contact, a value at the half maximum of the intensities of the contact, a value at the 90 percent maximum of the intensities of the contact, or the like. In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, the duration of the contact is used in determining the characteristic intensity (e.g., when the characteristic intensity is an average of the intensity of the contact over time). In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
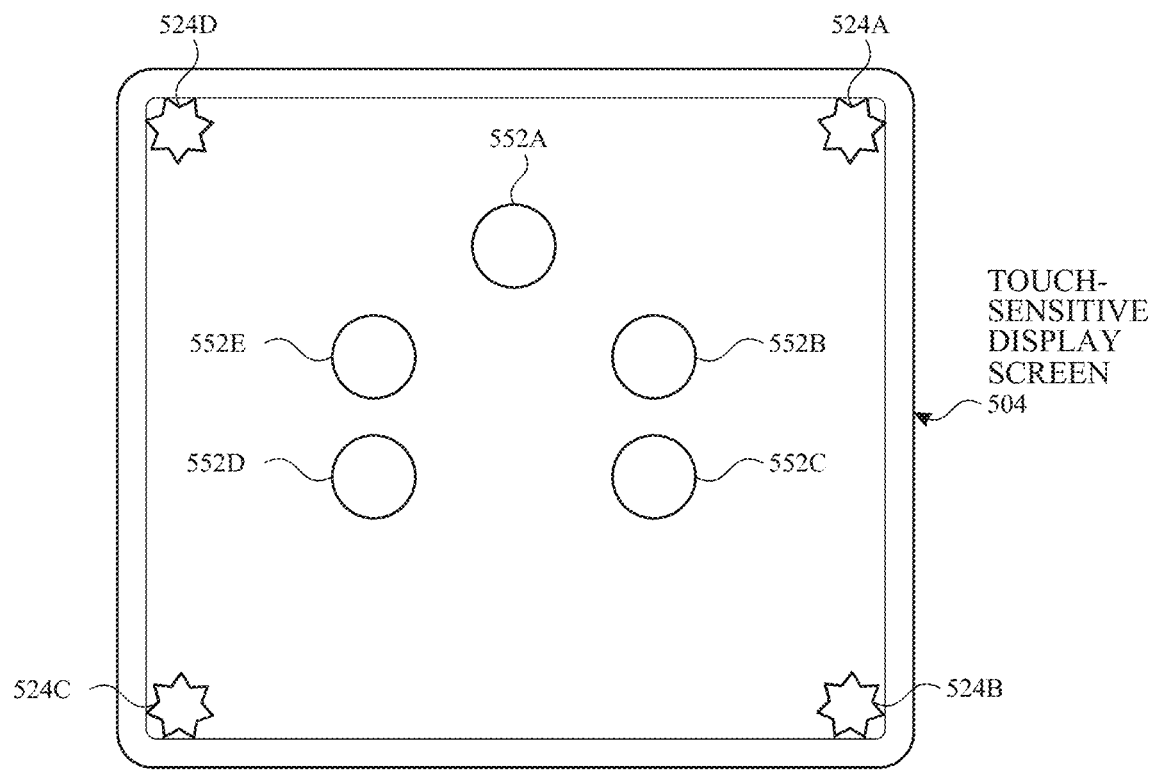
FIGS. 5C-5D illustrate exemplary components of a personal electronic device having a touch-sensitive display and intensity sensors in accordance with some embodiments.
Figure 5C:
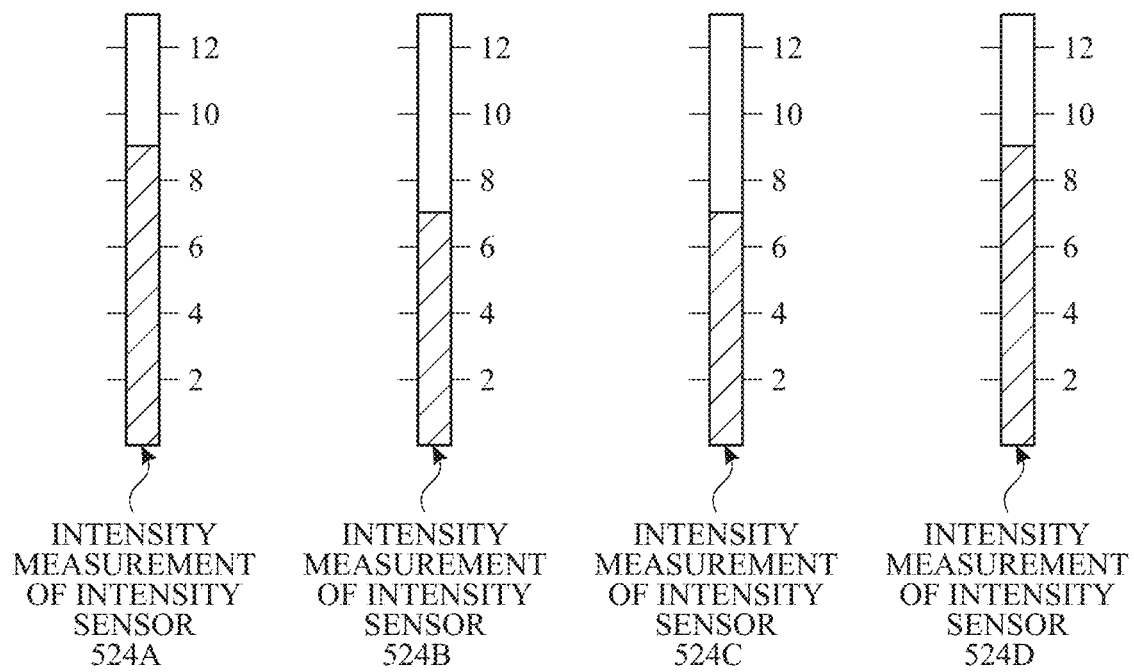
Figure 5D:
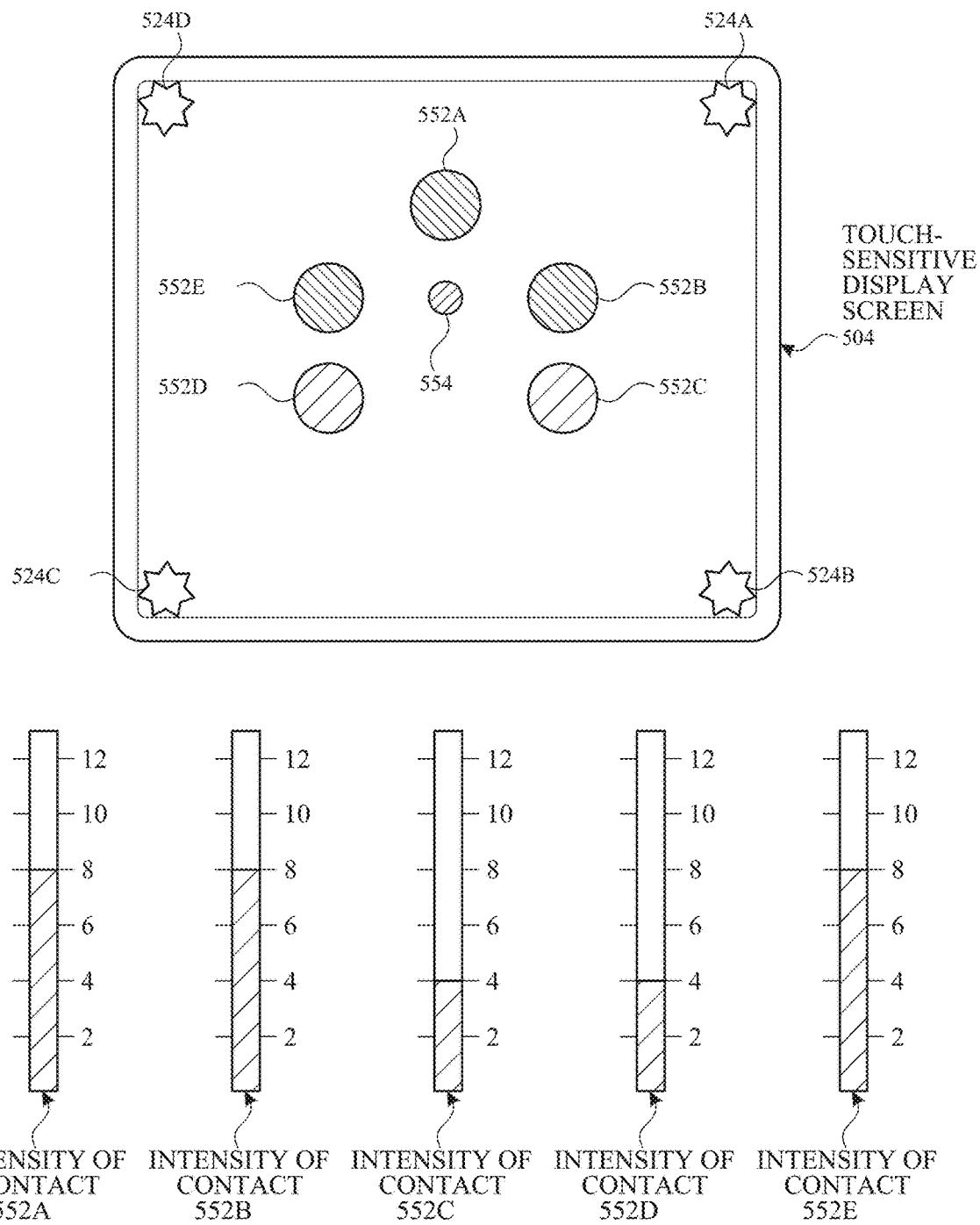

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. More generally, in some implementations, each contact j is assigned a respective intensity Ij that is a portion of the aggregate intensity, A, in accordance with a predefined mathematical function, $Ij = A \cdot (Dj/\Sigma Di)$, where Dj is the distance of the respective contact j to the center of force, and $\Sigma Di$ is the sum of the distances of all the respective contacts (e.g., i=1 to last) to the center of force. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. The operations described with reference to FIGS. 5C-5D can be performed using an electronic device similar or identical to device 100, 300, or 500. In some embodiments, the intensity sensors are used to determine a single characteristic intensity (e.g., a single characteristic intensity of a single contact). In some embodiments, a characteristic intensity of a contact is based on one or more intensities of the contact. It should be noted that the intensity diagrams are not part of a displayed user interface, but are included in FIGS. 5C-5D to aid the reader.

In some embodiments, a smoothing algorithm is, optionally, applied to the intensities of the swipe contact prior to determining the characteristic intensity of the contact. For example, the smoothing algorithm optionally includes one or more of: a triangular smoothing algorithm, an unweighted sliding-average smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity. In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location).

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the deep press intensity threshold corresponds to an intensity at which the device will perform operations that are different from operations typically associated with clicking a button of a physical mouse or a trackpad. In some embodiments, the light press intensity threshold corresponds to an intensity at which the device will perform operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the deep press intensity threshold to an intensity above the deep press intensity threshold is sometimes referred to as a "deep press" input. An increase of characteristic intensity of the contact from an intensity below the light press intensity threshold to an intensity between the light press intensity threshold and the deep press intensity threshold is sometimes referred to as a "light press" input. A decrease of characteristic intensity of the contact from an intensity above the contact-detection intensity threshold to an intensity below the contact-detection intensity threshold is sometimes referred to as detecting liftoff of the contact from the touch-surface. An increase of characteristic intensity of the contact from an intensity below the contact-detection intensity threshold to an intensity between the contact-detection intensity threshold and the light press intensity threshold is sometimes referred to as detecting the contact on the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input). In some embodiments, the respective operation is performed in response to detecting the increase in intensity of the respective contact above the press-input intensity threshold (e.g., a "down stroke" of the respective press input).

Figure 5E:
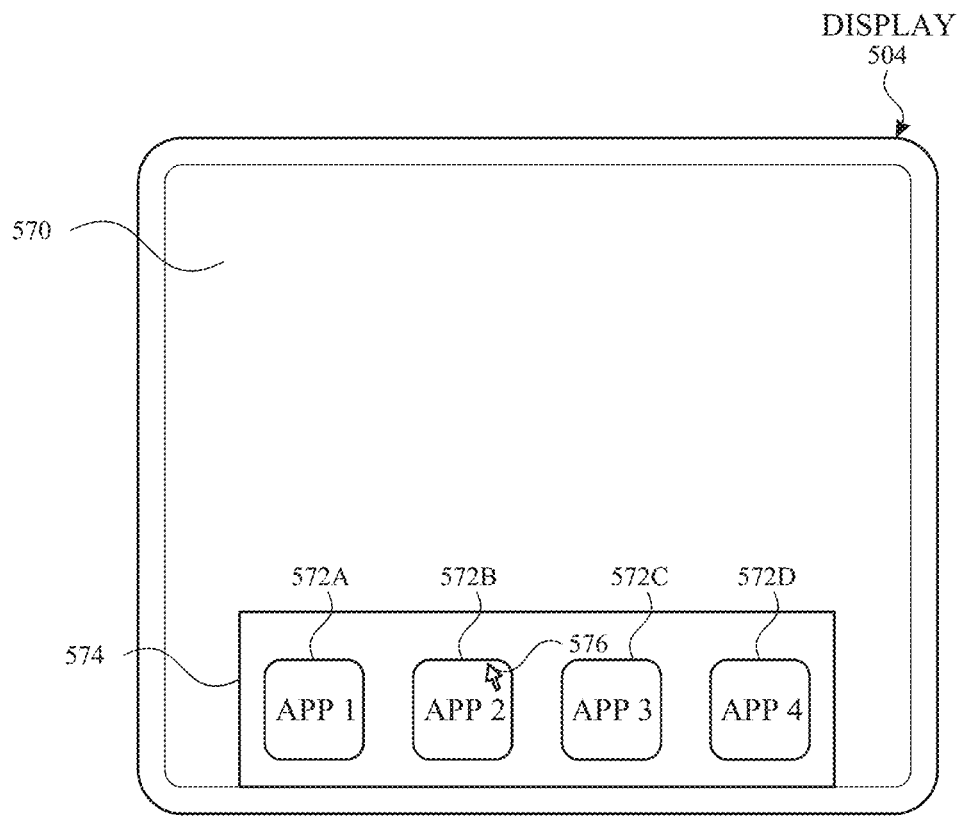
FIGS. 5E-5H illustrate exemplary components and user interfaces of a personal electronic device in accordance with some embodiments.
Figure 5E:
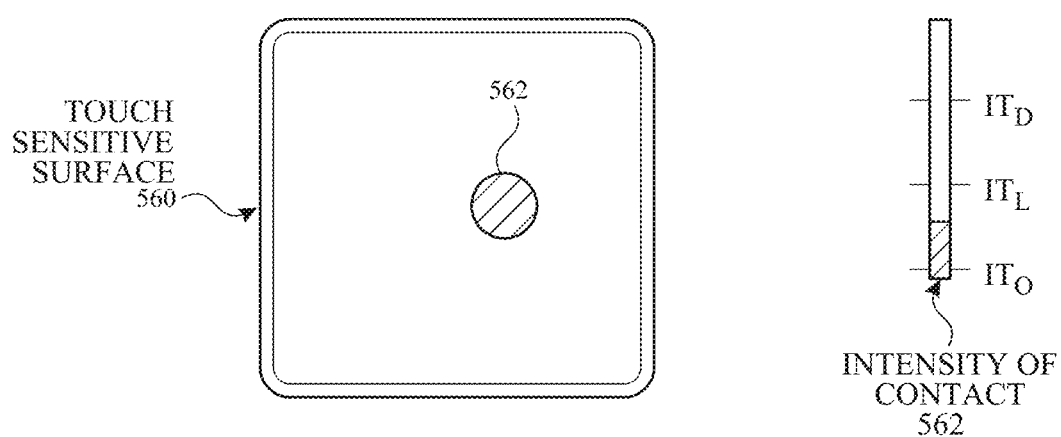
Figure 5F:
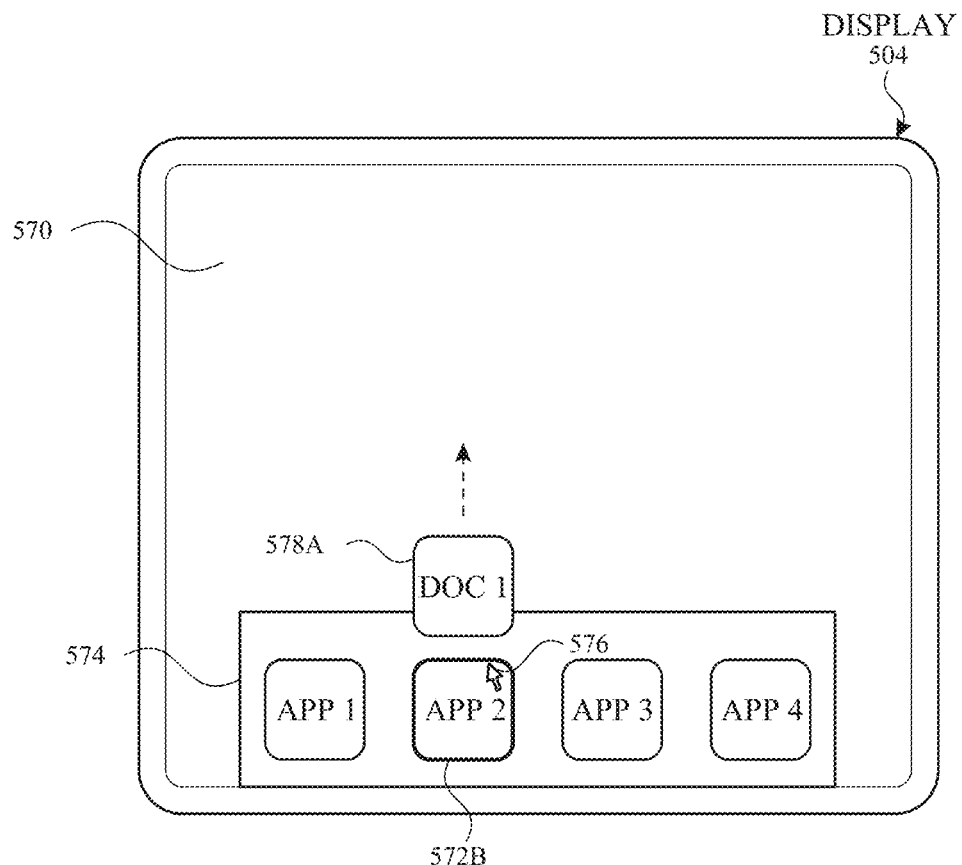
Figure 5F:
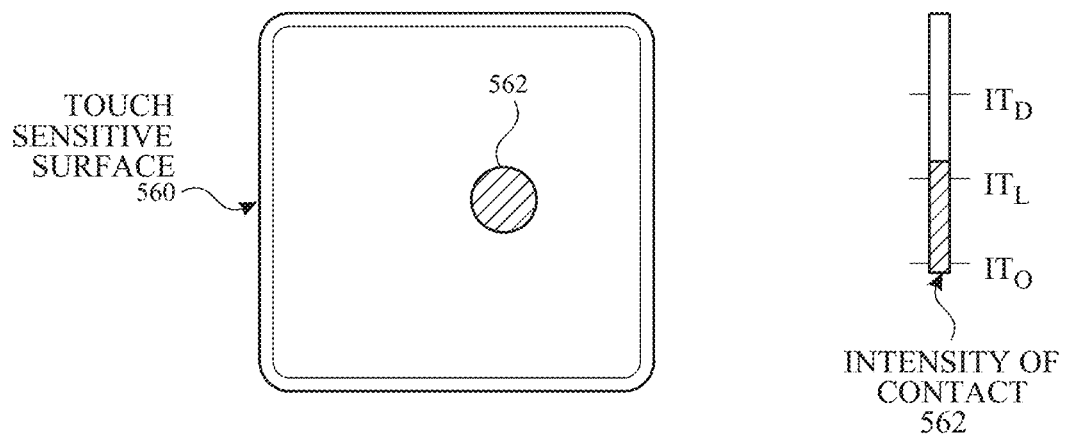
Figure 5G:
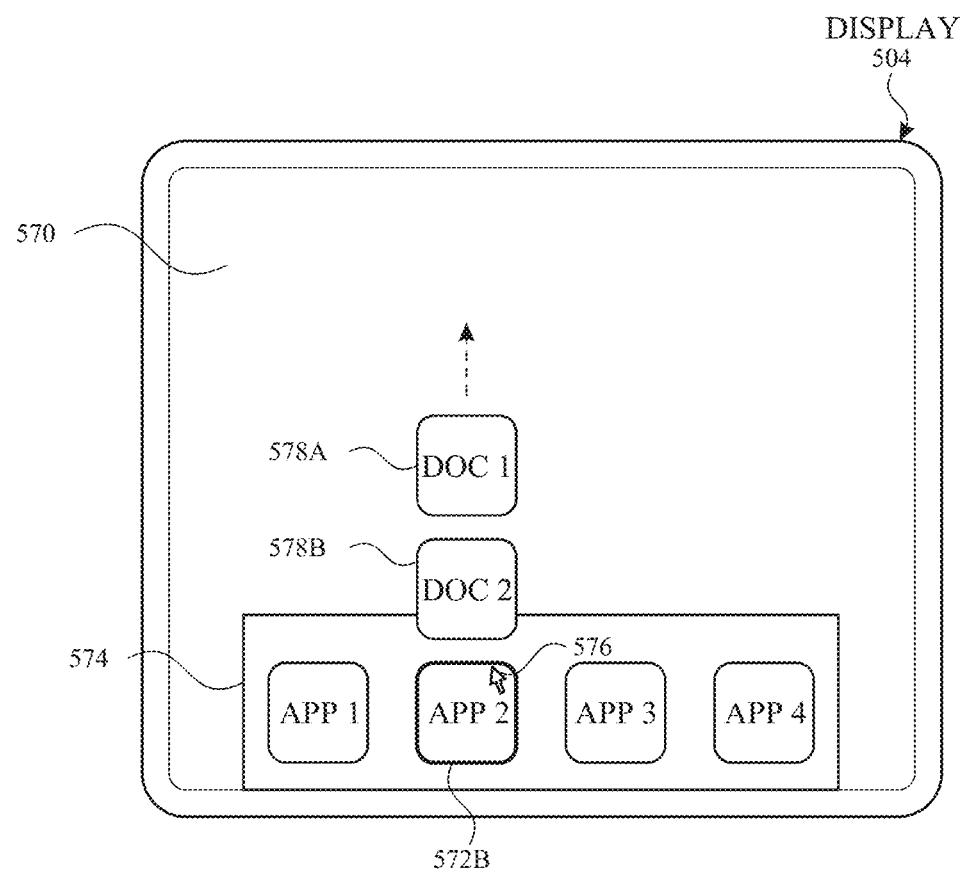
Figure 5G:
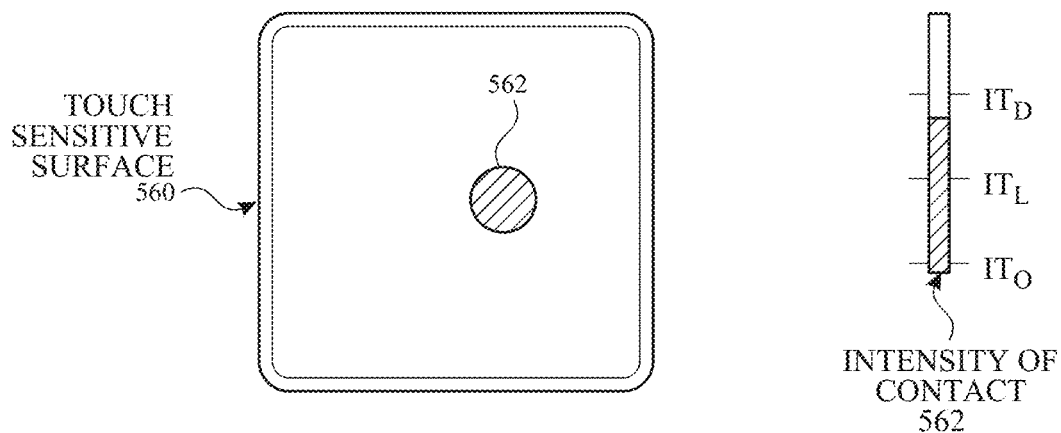
Figure 5H:
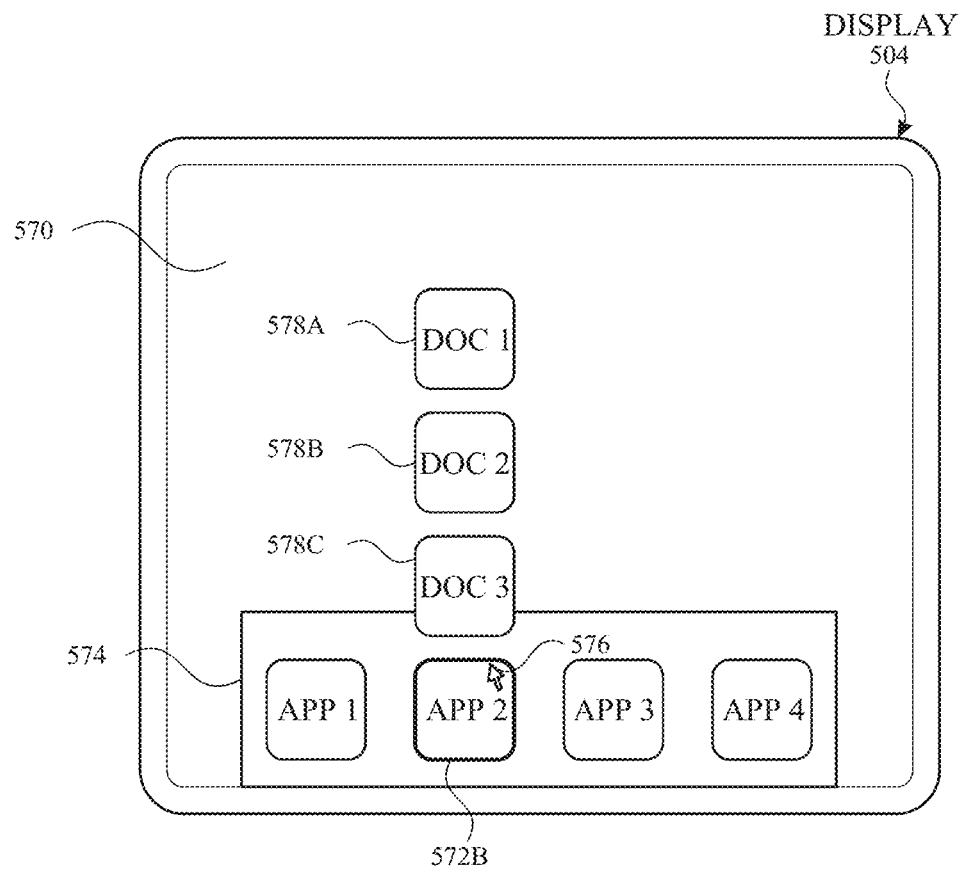
Figure 5H:
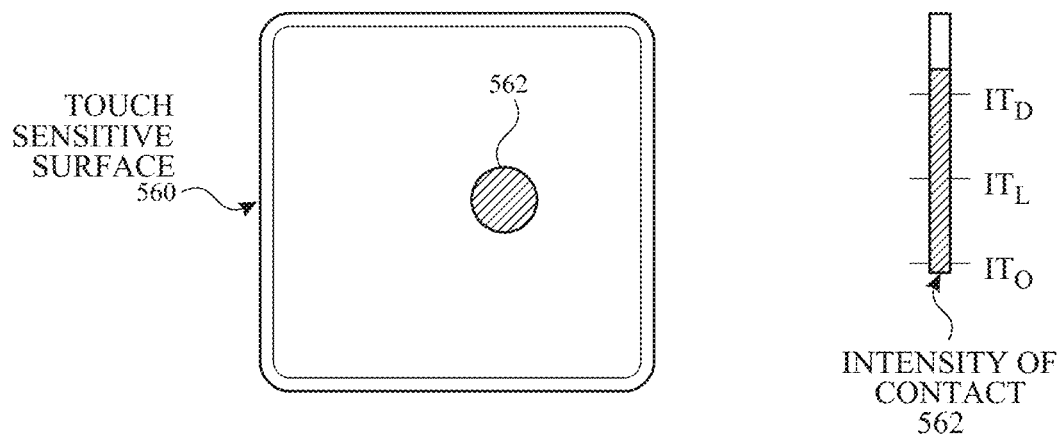

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. Contact 562 is maintained on touch-sensitive surface 560. The device determines that the intensity of contact 562 peaked above the deep press intensity threshold (e.g., "$IT_D$"). In some embodiments, the intensity, which is compared to the one or more intensity thresholds, is the characteristic intensity of a contact. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. Representations 578A-578C form an array above icon 572B. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). In some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances). In some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input).

For ease of explanation, the descriptions of operations performed in response to a press input associated with a press-input intensity threshold or in response to a gesture including the press input are, optionally, triggered in response to detecting either: an increase in intensity of a contact from an intensity below the hysteresis intensity threshold to an intensity above the press-input intensity threshold, an increase in intensity of a contact above the press-input intensity threshold, a decrease in intensity of the contact below the hysteresis intensity threshold corresponding to the press-input intensity threshold, and/or a decrease in intensity of the contact below the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. When tactile outputs with different tactile output patterns are generated by a device (e.g., via one or more tactile output generators that move a movable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output.

Figure 5I:
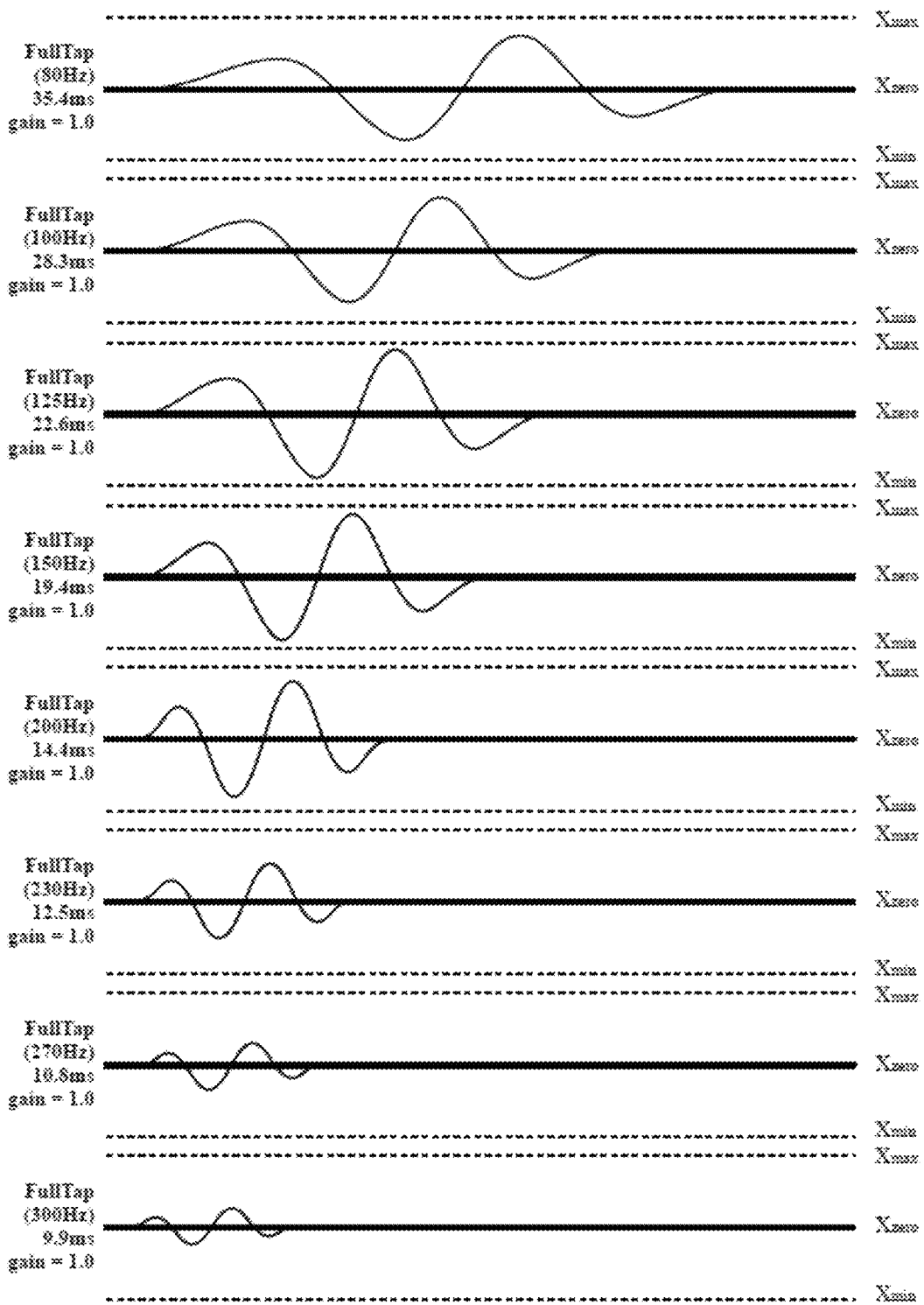
FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.
Figure 5J:
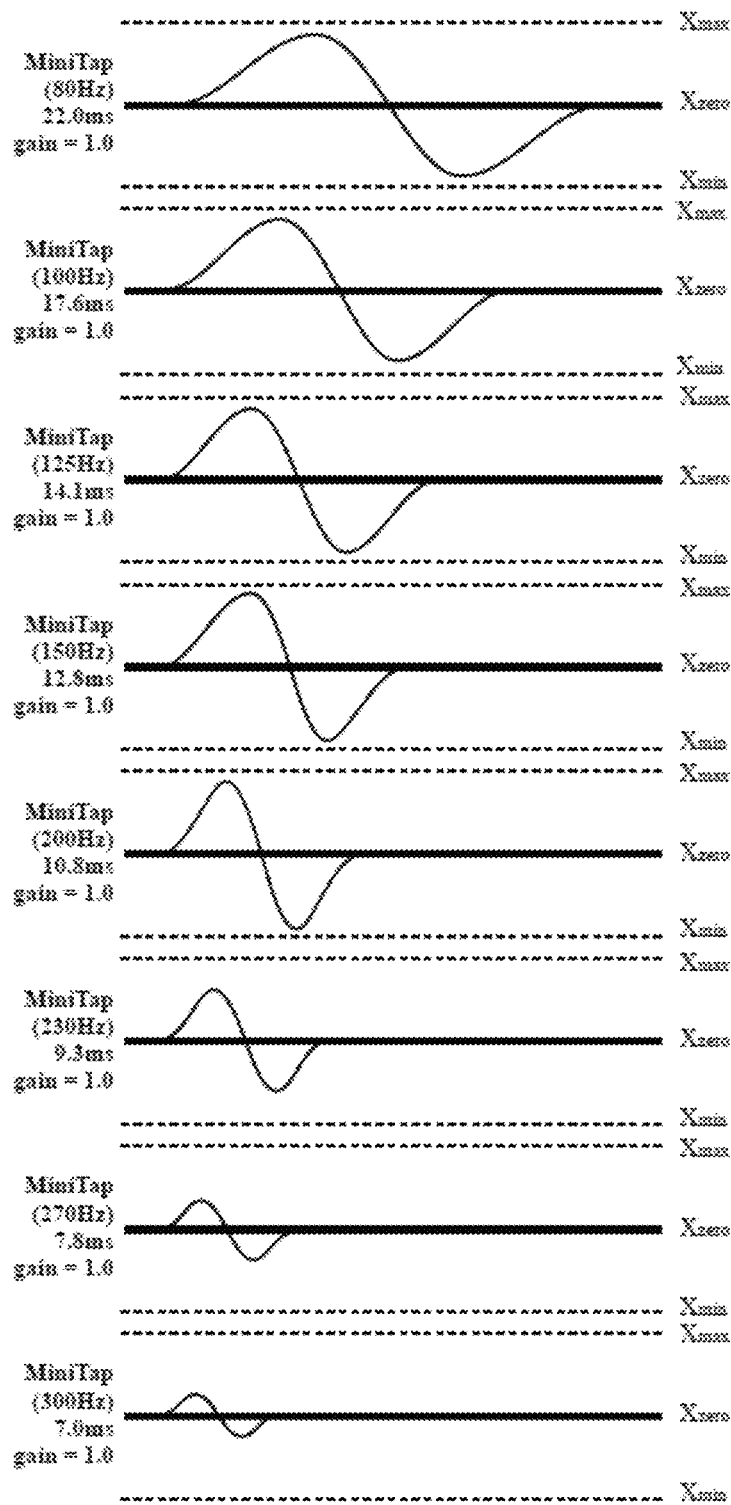
Figure 5K:
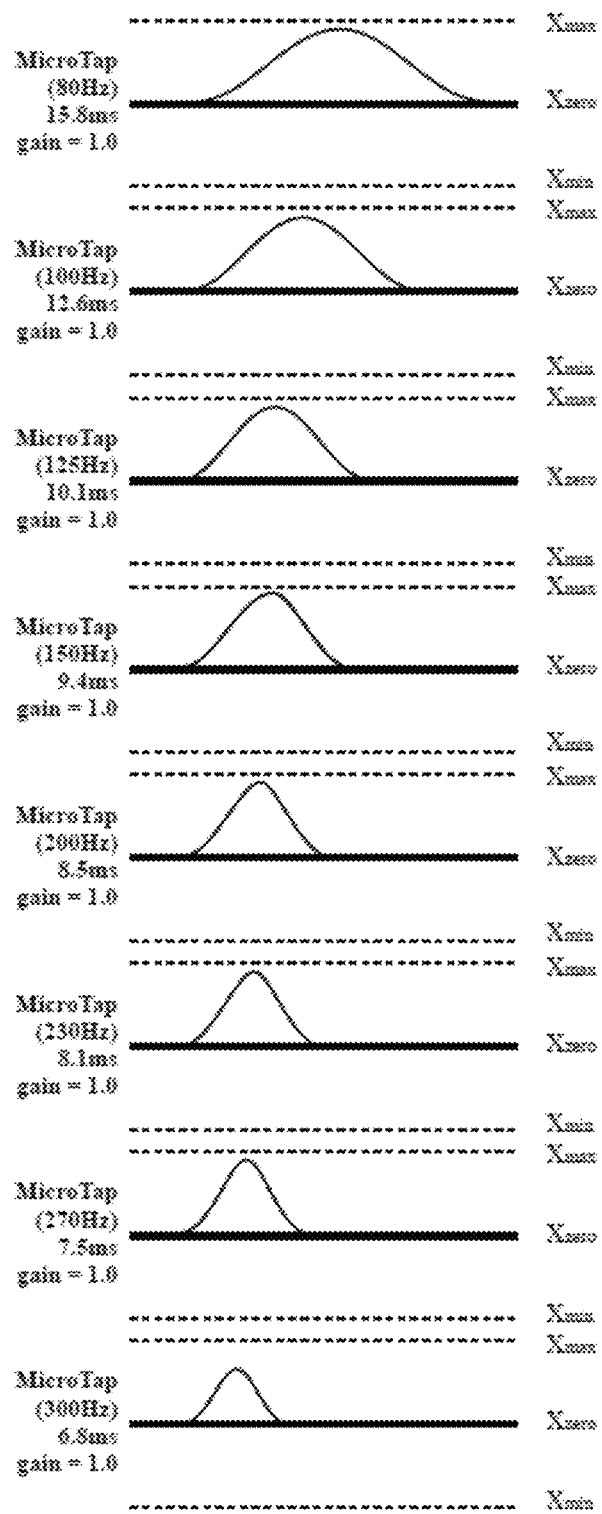
Figure 5L:
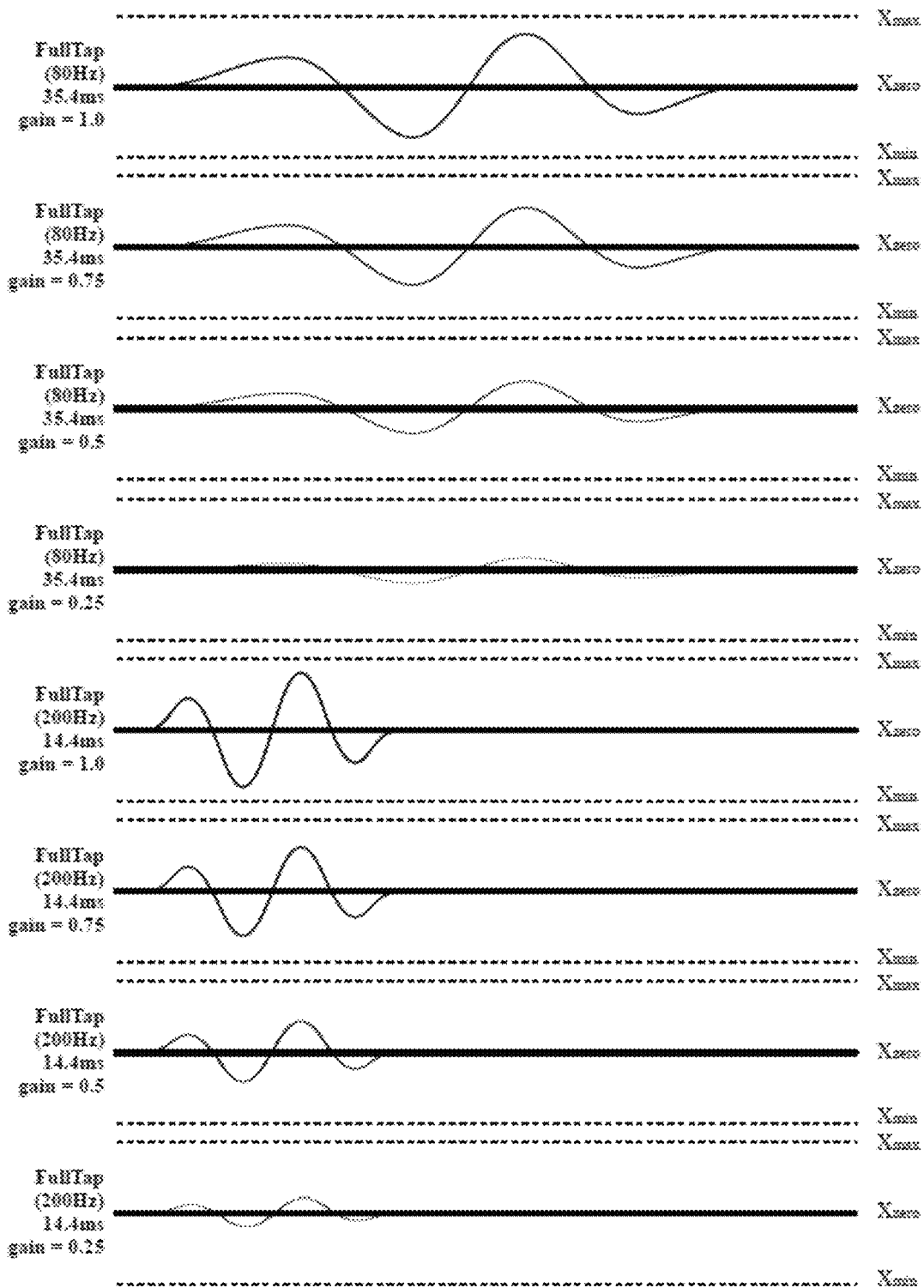
Figure 5M:
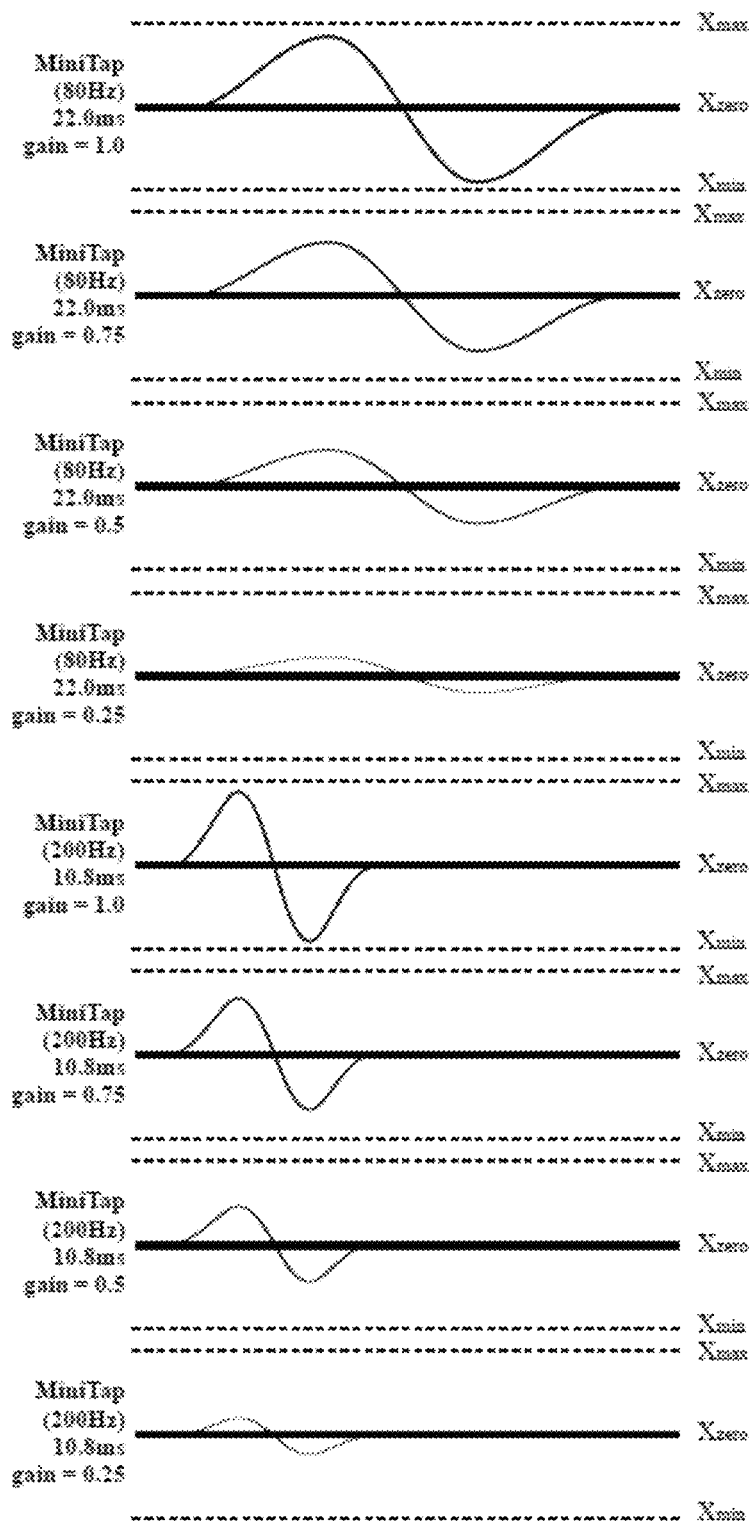
Figure 5N:
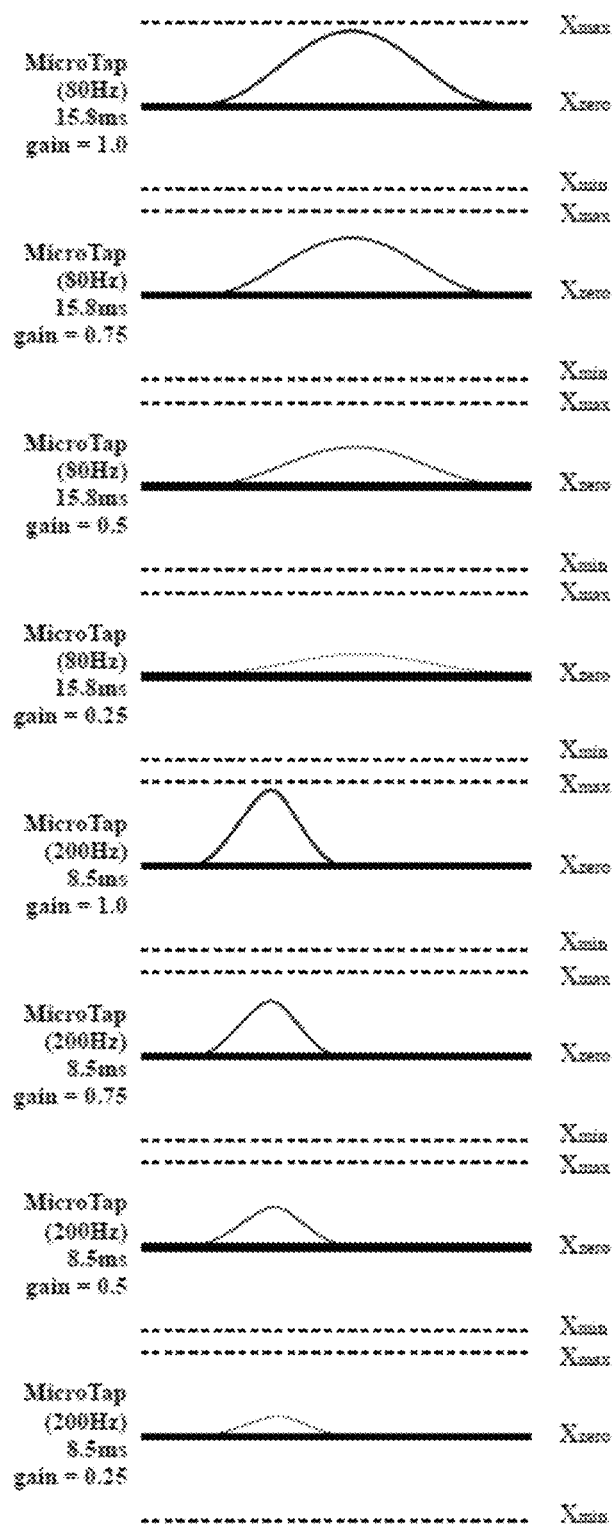

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. This example of a palette of tactile outputs shows how a set of three waveforms and eight frequencies can be used to produce an array of tactile output patterns. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the movable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Nz, and 200 Hz).

FIGS. 5I-5N show tactile output patterns that have a particular waveform. The waveform of a tactile output pattern represents the pattern of physical displacements relative to a neutral position (e.g., Xzero) versus time that a movable mass goes through to generate a tactile output with that tactile output pattern. The example waveforms shown in FIGS. 5I-5N include Xmin and Xmax values which represent the maximum and minimum extent of movement of the movable mass. For larger electronic devices with larger movable masses, there may be larger or smaller minimum and maximum extents of movement of the mass. The examples shown in FIGS. 5I-5N describe movement of a mass in one dimension, however similar principles would also apply to movement of a movable mass in two or three dimensions. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the movable mass at the start and at the end of the tactile output.

As shown in FIGS. 5I-5K, each tactile output pattern also has a corresponding characteristic frequency that affects the "pitch" of a haptic sensation that is felt by a user from a tactile output with that characteristic frequency. For a discrete tactile output, a discrete output signal (e.g., with 0.5, 1, or 2 cycles) is generated, and the characteristic frequency value specifies how fast the movable mass needs to move to generate a tactile output with that characteristic frequency. For a continuous tactile output, the characteristic frequency represents the number of cycles that are completed within a given period of time (e.g., cycles per second) by the movable mass of the tactile output generator. As shown in FIGS. 5I-5N, for each type of tactile output (e.g., as defined by a respective waveform, such as FullTap, MiniTap, or MicroTap), a higher frequency value corresponds to faster movement(s) by the movable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5I). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, the characteristic amplitude of a tactile output pattern refers to an absolute or normalized value that represents the maximum displacement of the movable mass from a neutral position when generating the tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific amplitudes, frequencies, and waveforms are represented in the sample tactile output patterns in FIGS. 5I-5K for illustrative purposes, tactile output patterns with other amplitudes, frequencies, and waveforms may be used for similar purposes. Other frequencies in the range of 60 Hz-400 Hz may be used as well. For example, waveforms that have between 0.5 to 4 cycles can be used. Table 1 below provides representative examples of tactile output/haptic feedback behaviors and configurations, and examples of their use with respect to the user interfaces for managing content-based tactile outputs that are illustrated and described herein.

TABLE 1

| Type of Tactile Output Sequence | Waveform | Textural (continuous) or Discrete |
|---|---|---|
| "Major" | MiniTap at 180 Hz | Discrete |
| "Minor" | MicroTap at 80 Hz | Textural |
| "Major-reduced" | MiniTap at 200 Hz | Discrete |
| "Minor-Reduced" | MicroTap at 200 Hz | Discrete |

In some embodiments, a downloaded application becomes an installed application by way of an installation program that extracts program portions from a downloaded package and integrates the extracted portions with the operating system of the computer system. As used herein, an "installed application" refers to a software application that has been downloaded onto an electronic device (e.g., devices 100, 300, and/or 500) and is ready to be launched (e.g., become opened) on the device.

As used herein, the terms "executing application" or "open application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a suspended or hibernated application, which is not running, but has state information that is stored in memory (volatile and non-volatile, respectively) and that can be used to resume execution of the application; and a background application (or background processes), which is not currently displayed, but one or more processes for the application are being processed by one or more processors.

Generally, opening a second application while in a first application does not close the first application. When the second application is displayed and the first application ceases to be displayed, the first application becomes a background application. As used herein, the term "closed application" refers to software applications without retained state information (e.g., state information for closed applications is not stored in a memory of the device). Accordingly, closing an application includes stopping and/or removing application processes for the application and removing state information for the application from the memory of the device.

Attention is now directed towards embodiments of user interfaces ("UI") and associated processes that are implemented on an electronic device, such as portable multifunction device 100, device 300, or device 500.

User Interfaces and Associated Processes

Initializing a Remote Locator Object

Users interact with electronic devices in many different manners. In some embodiments, an electronic device is able to track the location of an object such as a remote locator object. In some embodiments, the remote locator object, which supports location tracking functions, can be attached to items that do not support location tracking functions. The embodiments described below provide ways in which an electronic device initializes a remote locator object, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
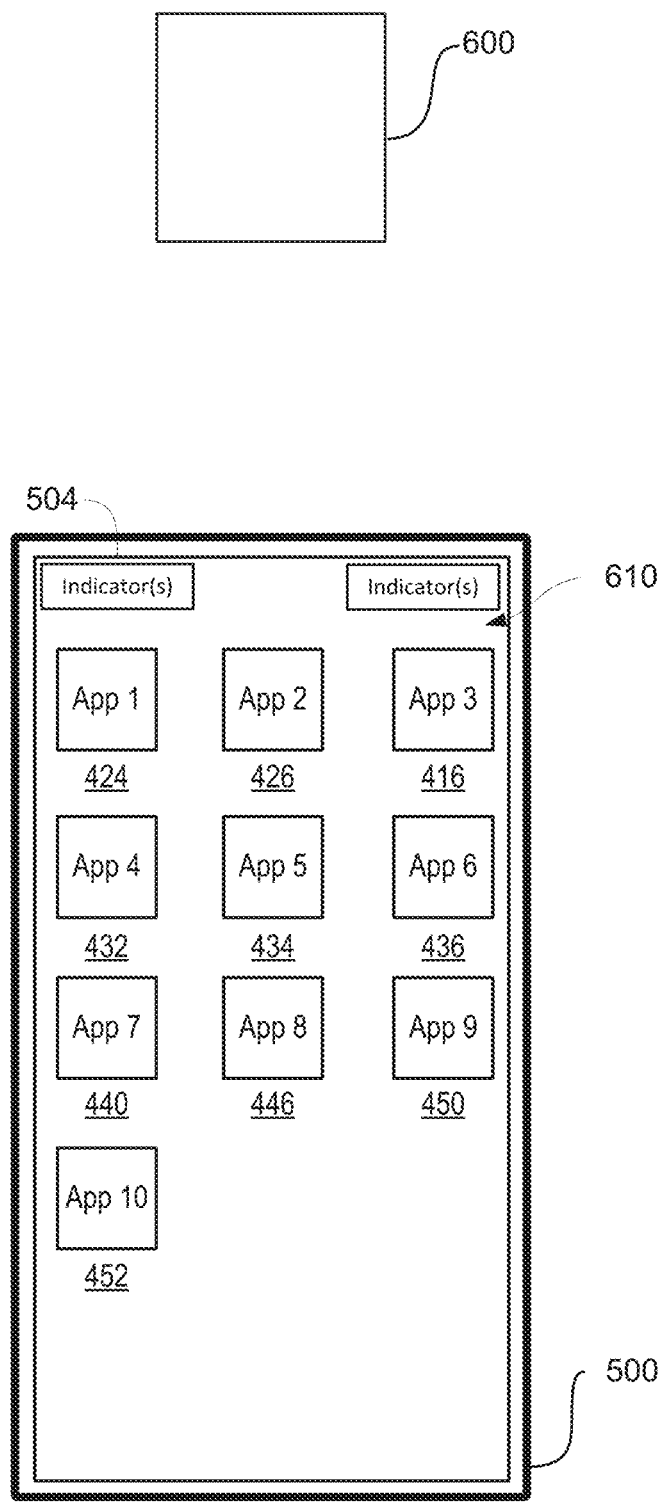
FIGS. 6A-6T illustrate exemplary ways in which an electronic device initializes a remote locator object in accordance with some embodiments of the disclosure.
Figure 6B:
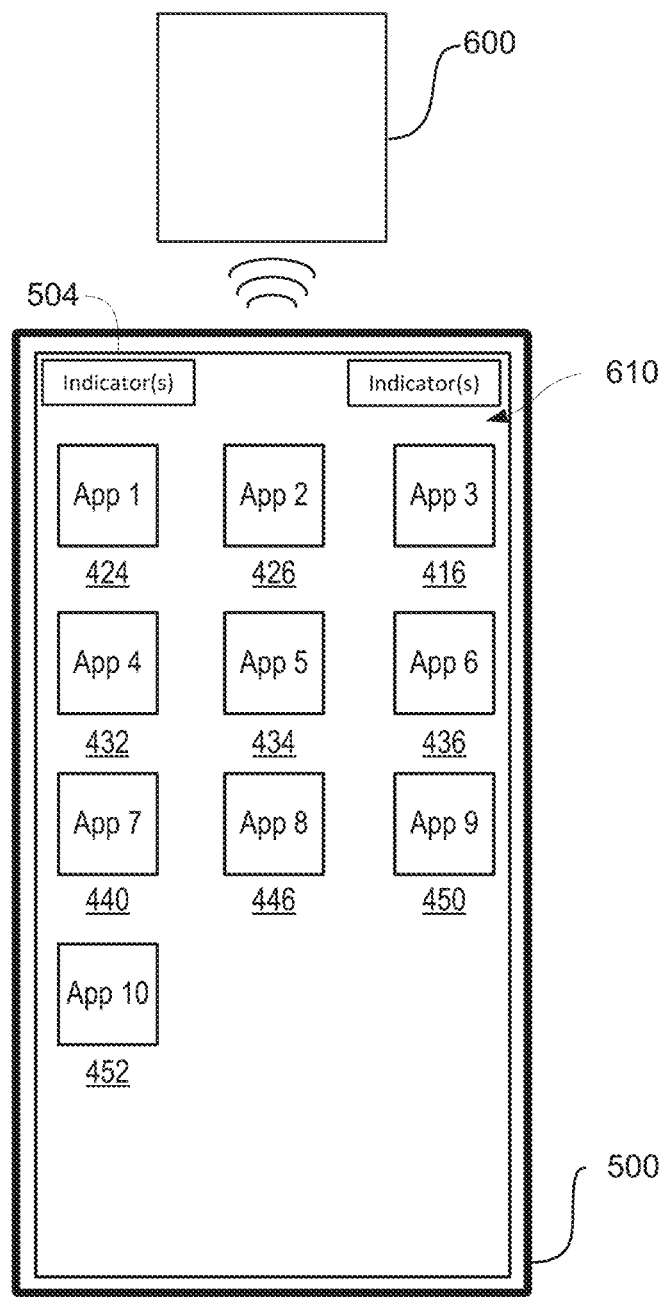
Figure 6C:
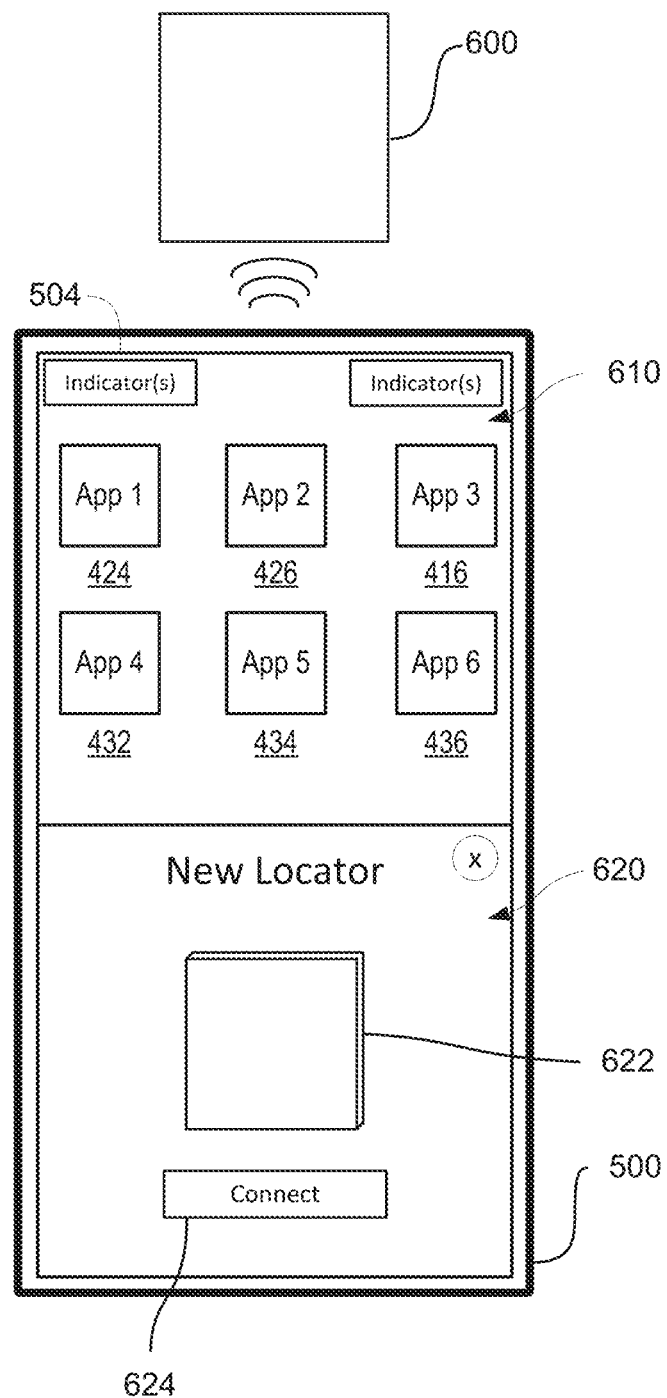
Figure 6D:
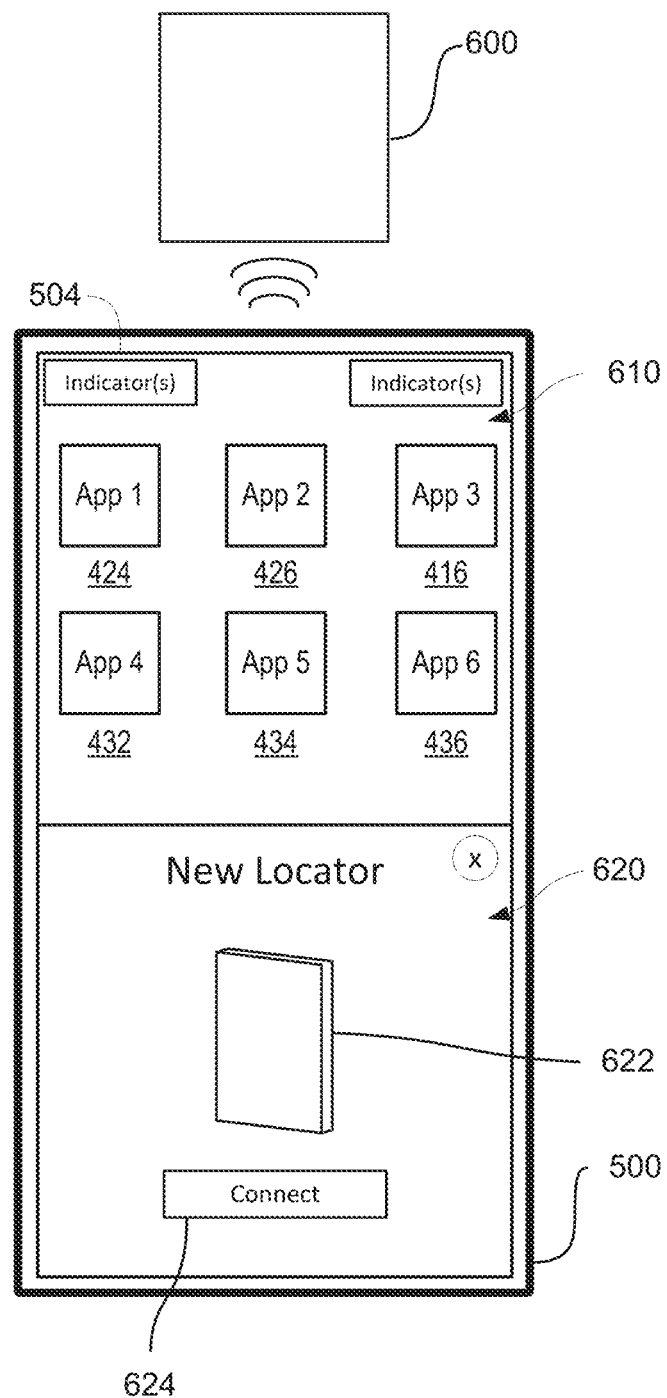
Figure 6E:
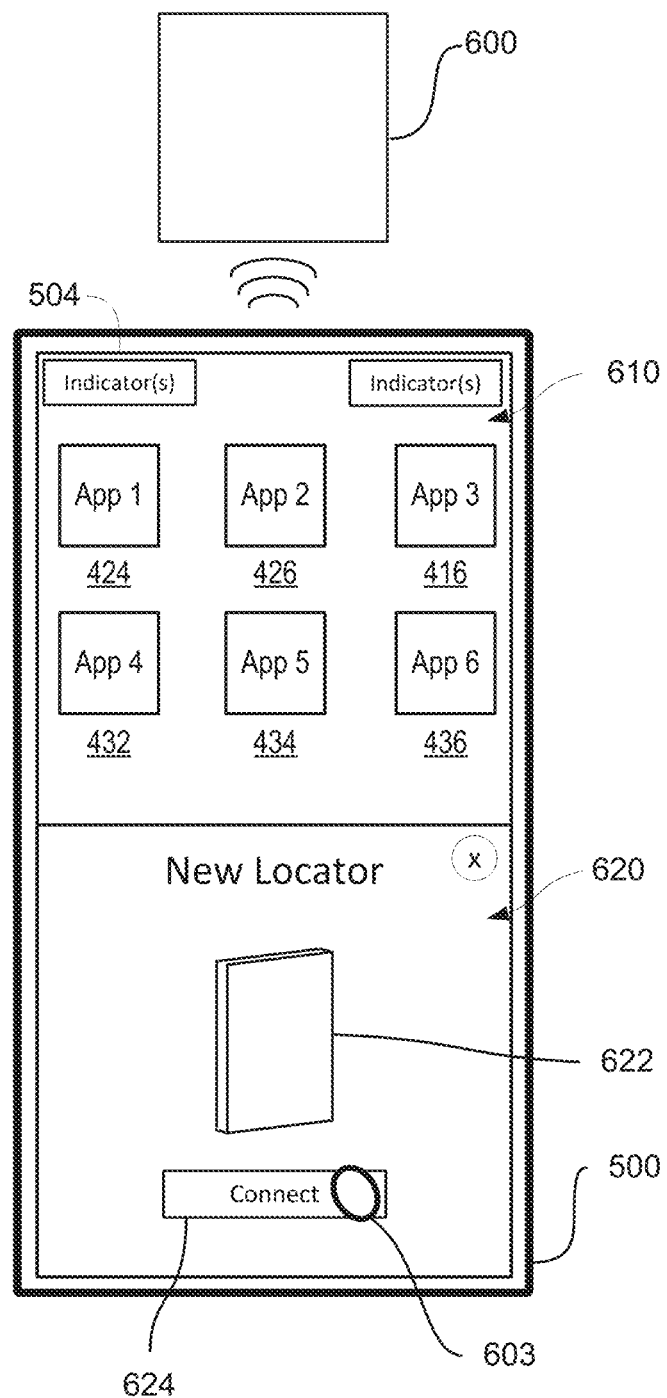
Figure 6F:
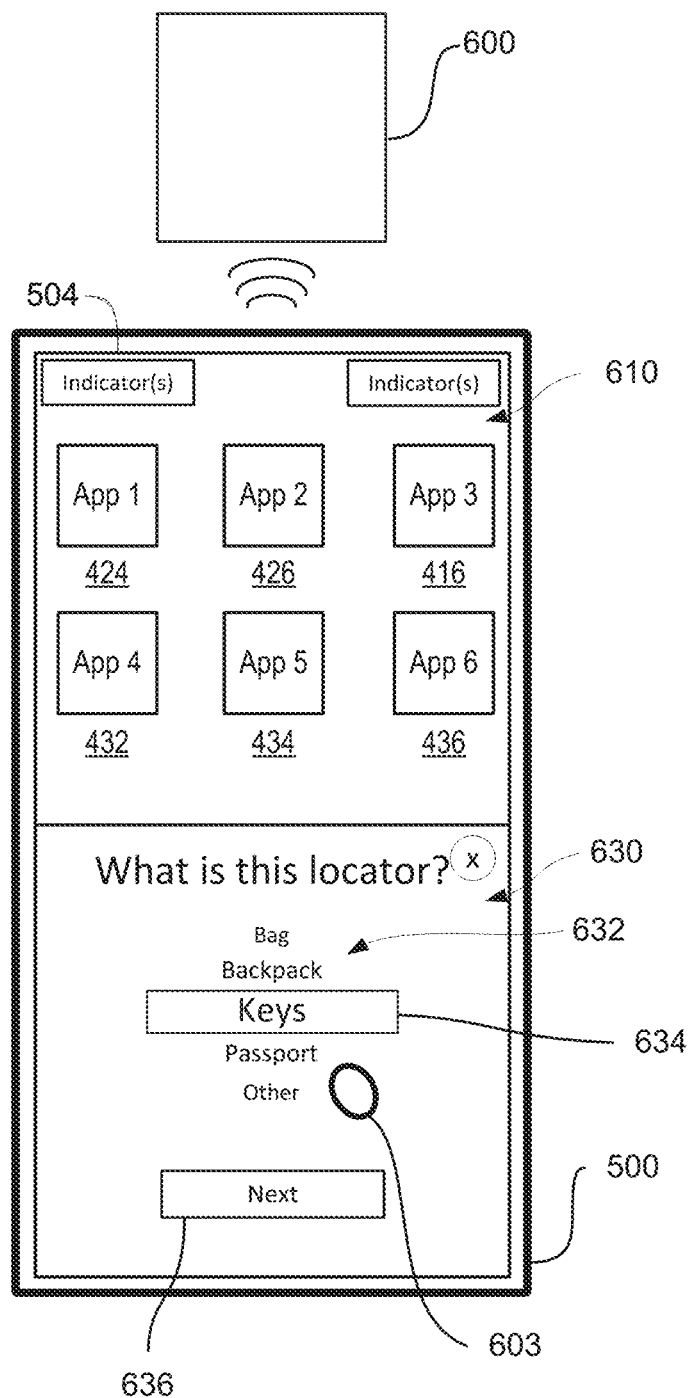
Figure 6G:
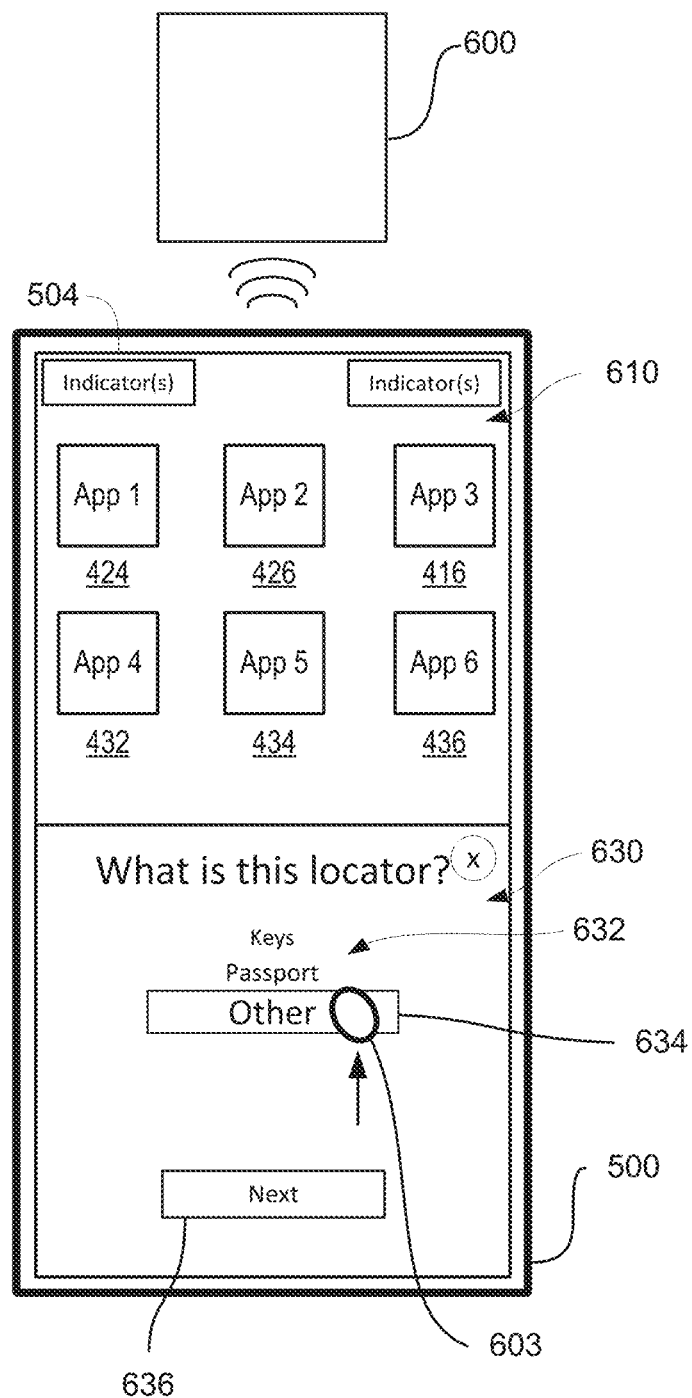
Figure 6H:
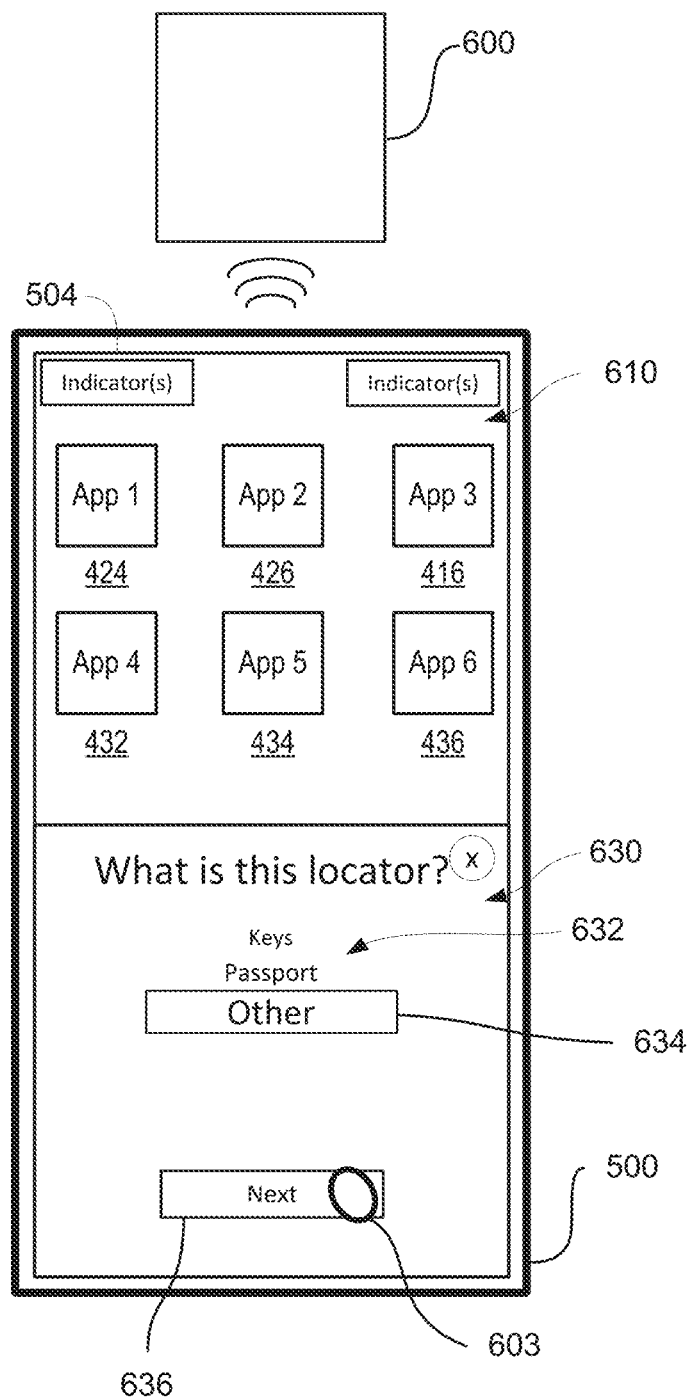
Figure 6I:
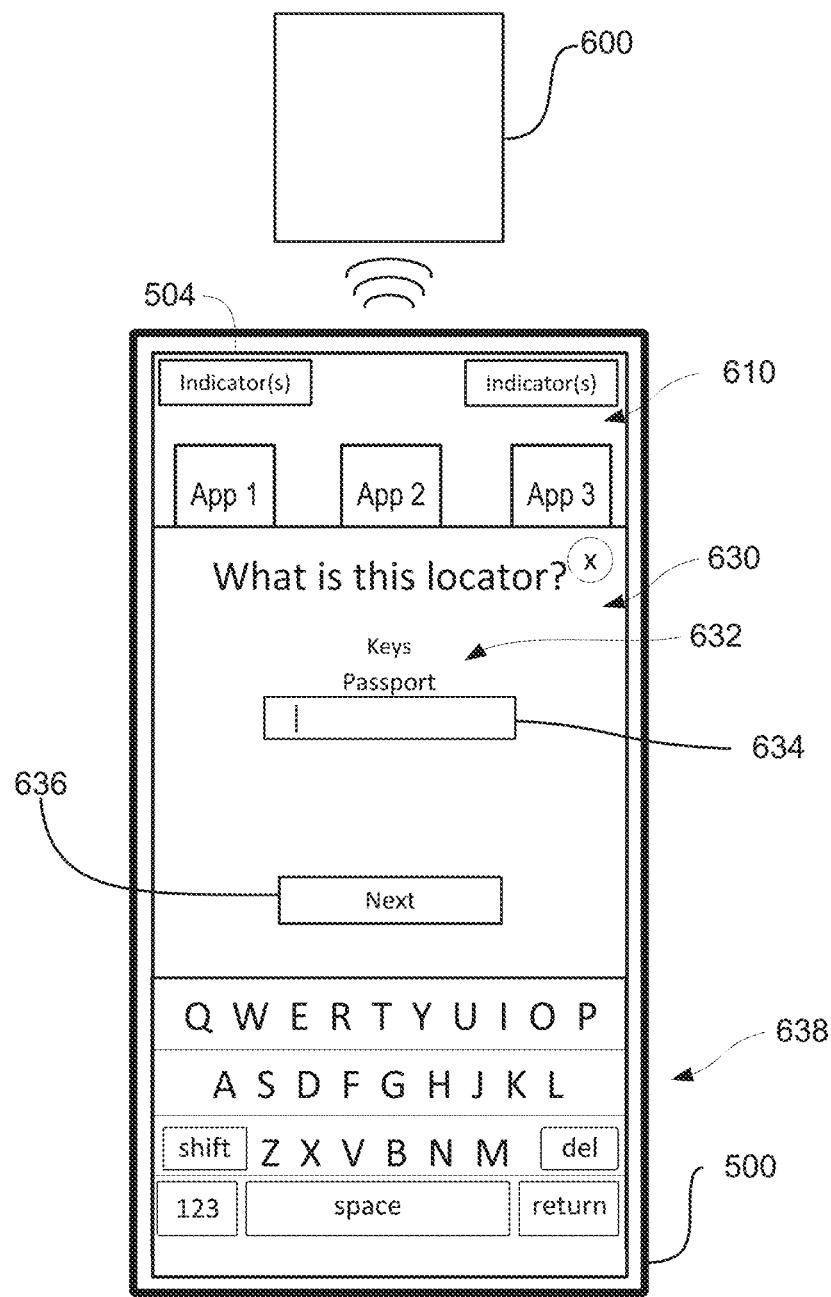
Figure 6J:
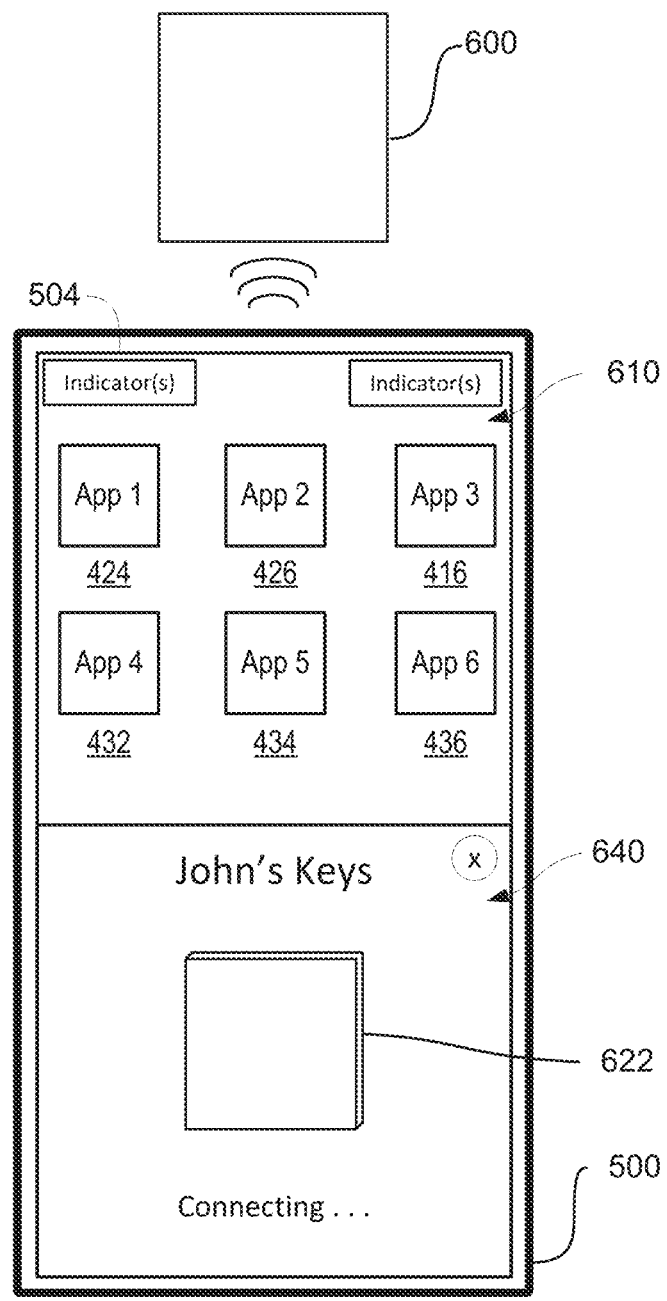
Figure 6K:
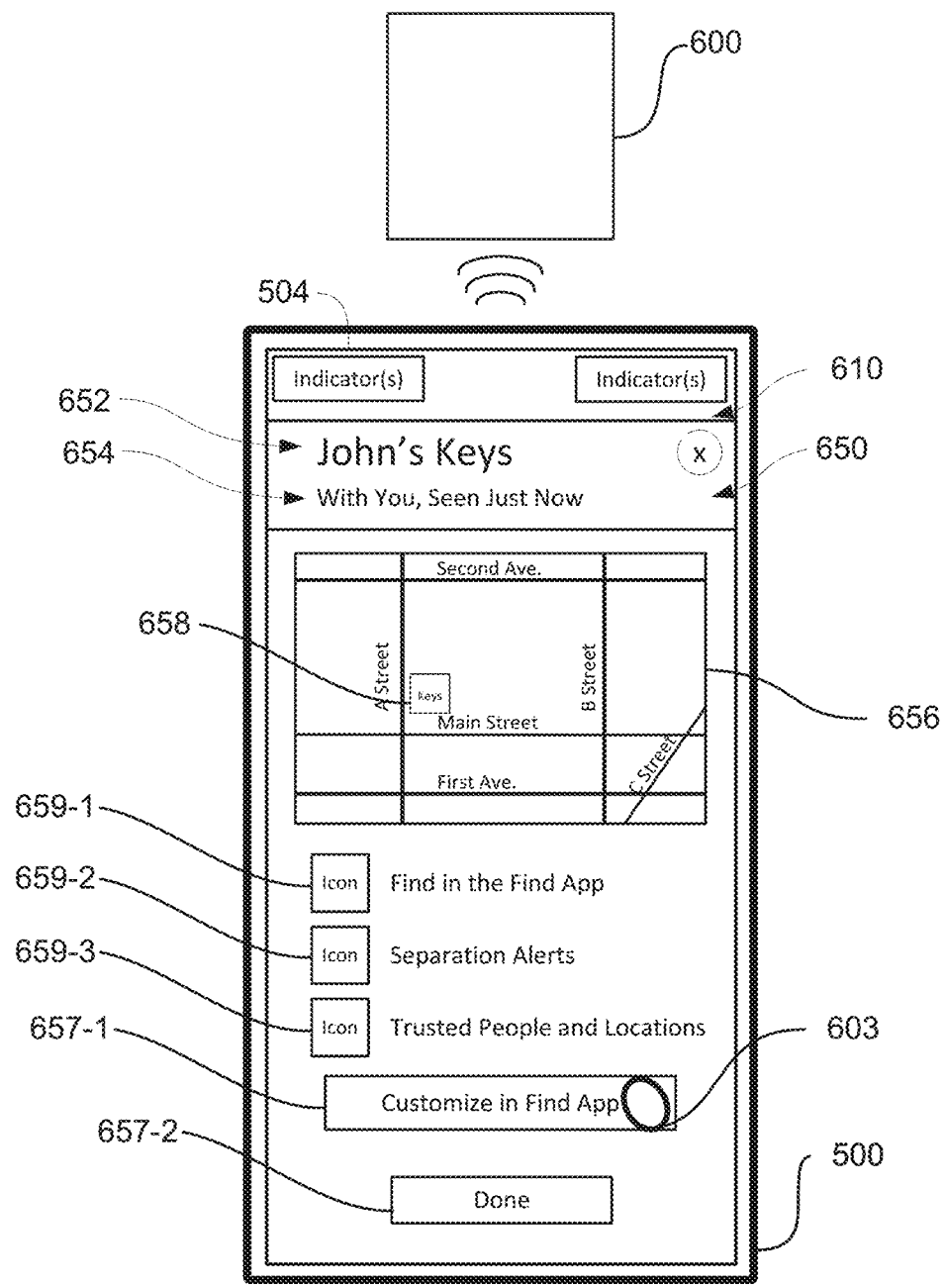
Figure 6L:
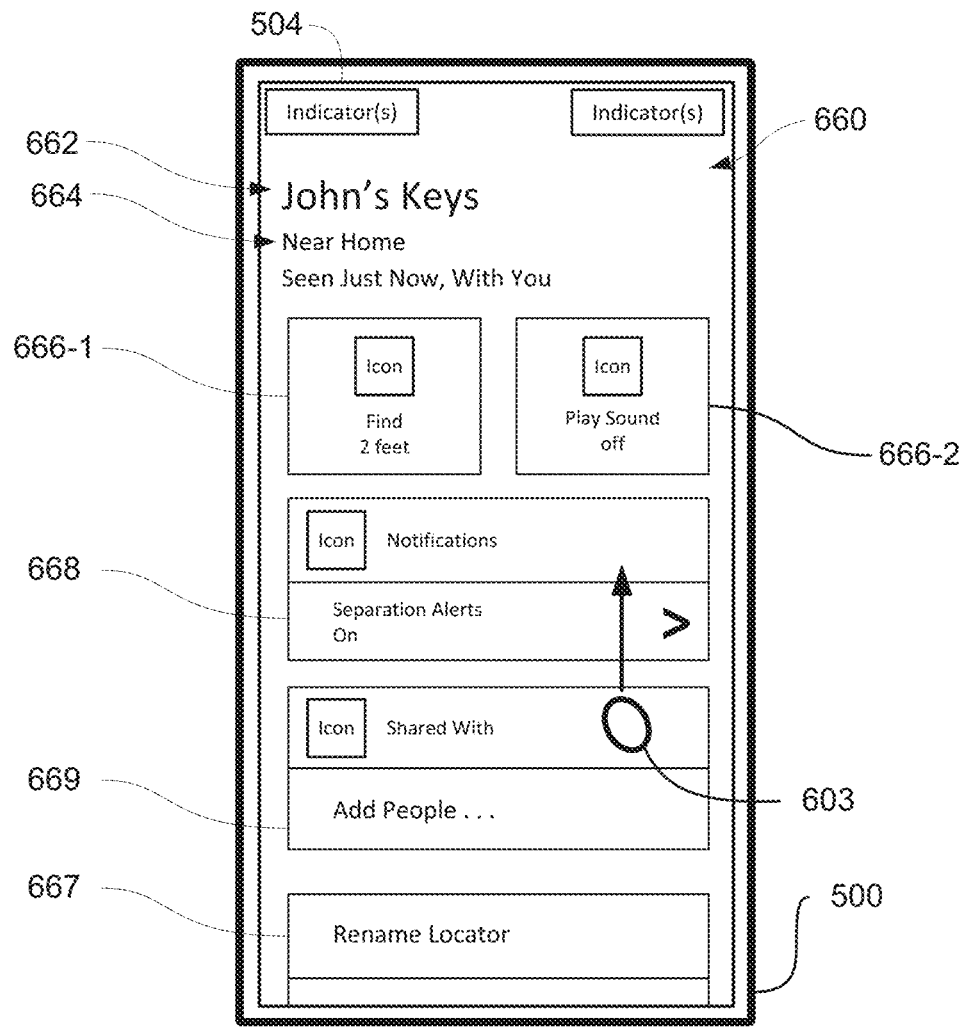
Figure 6M:
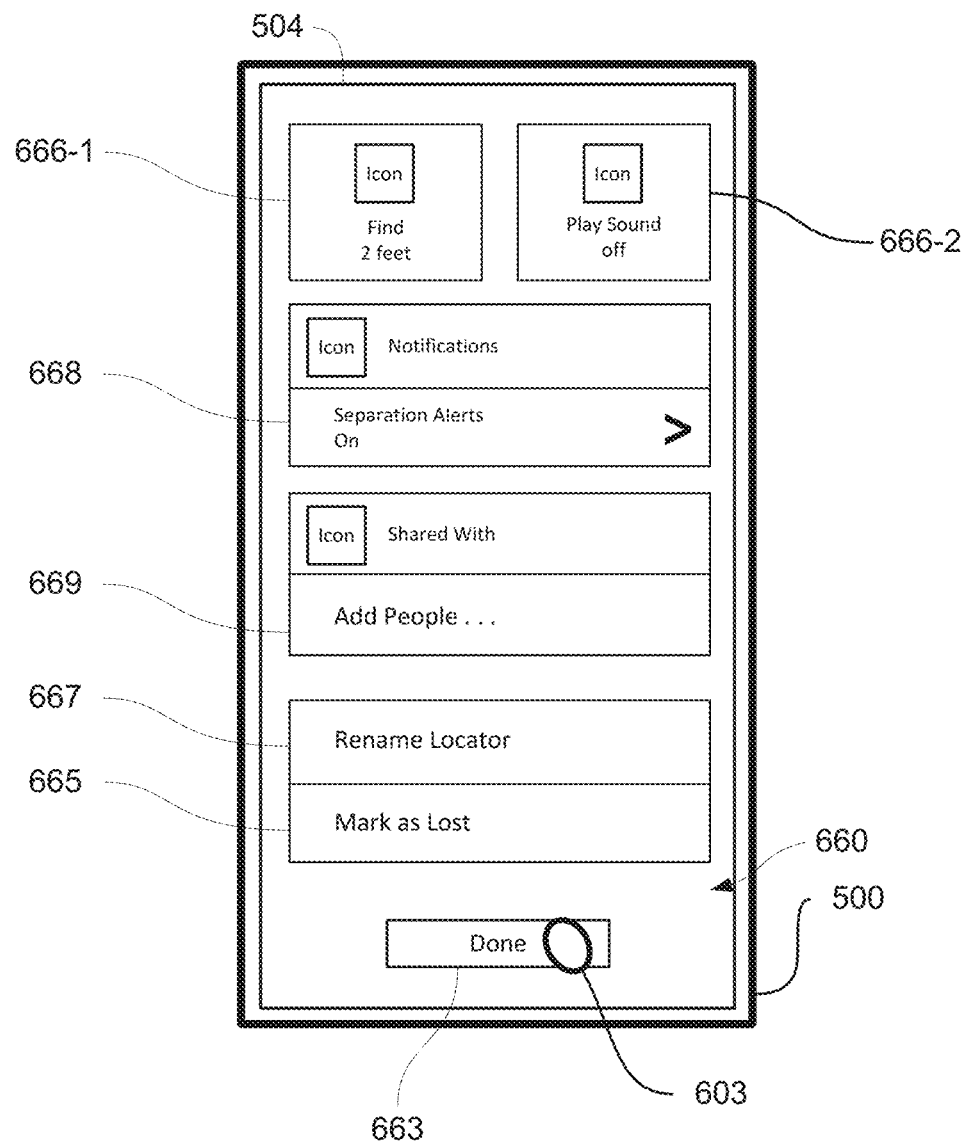
Figure 6N:
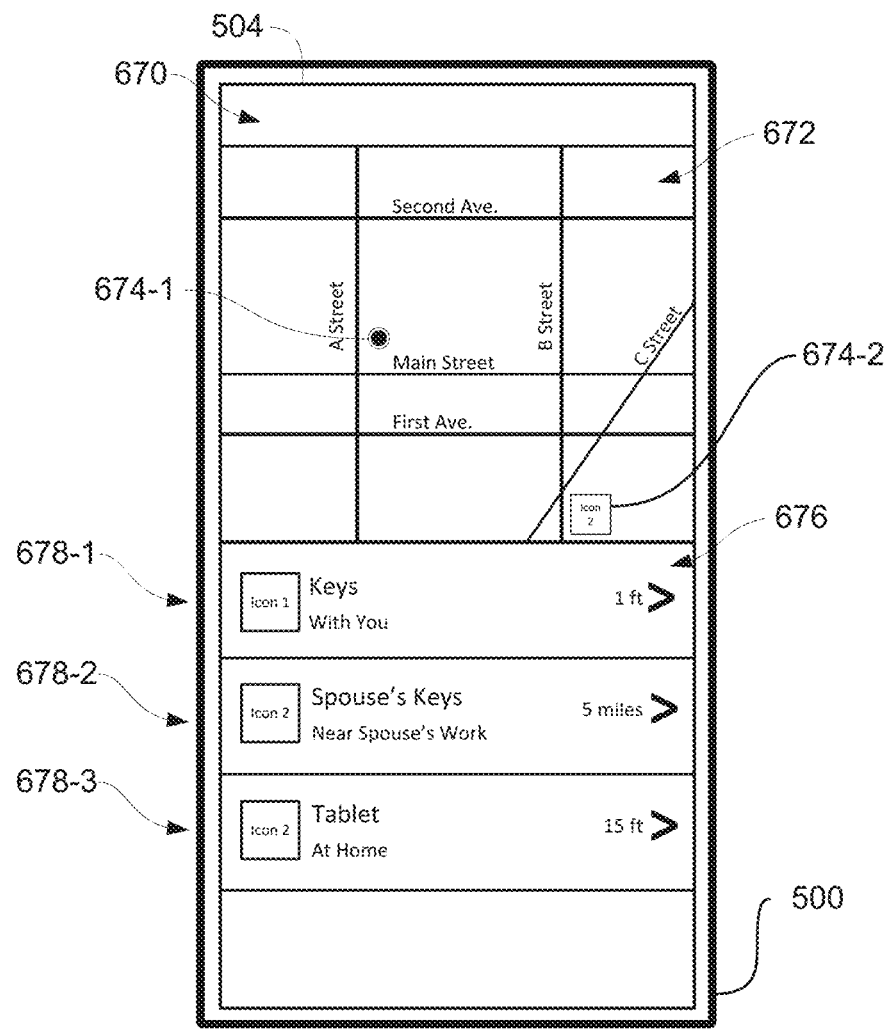
Figure 6O:
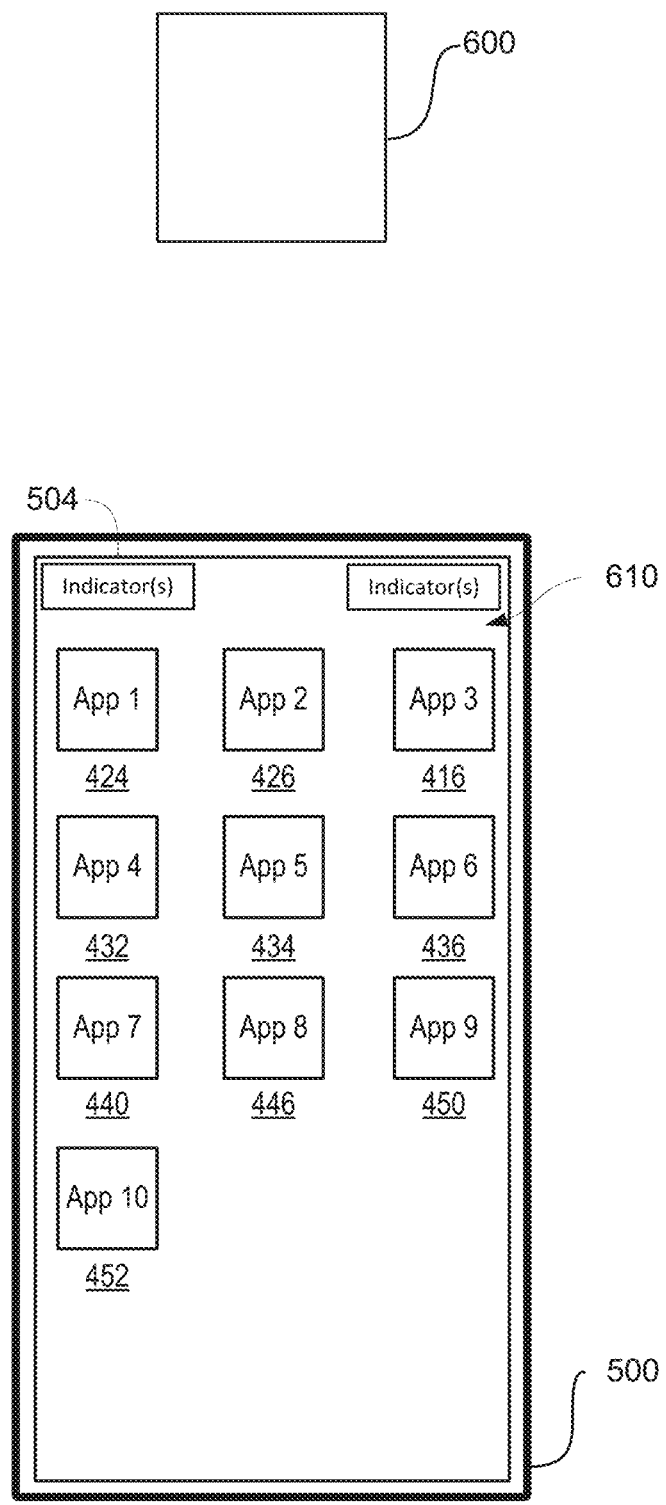
Figure 6P:
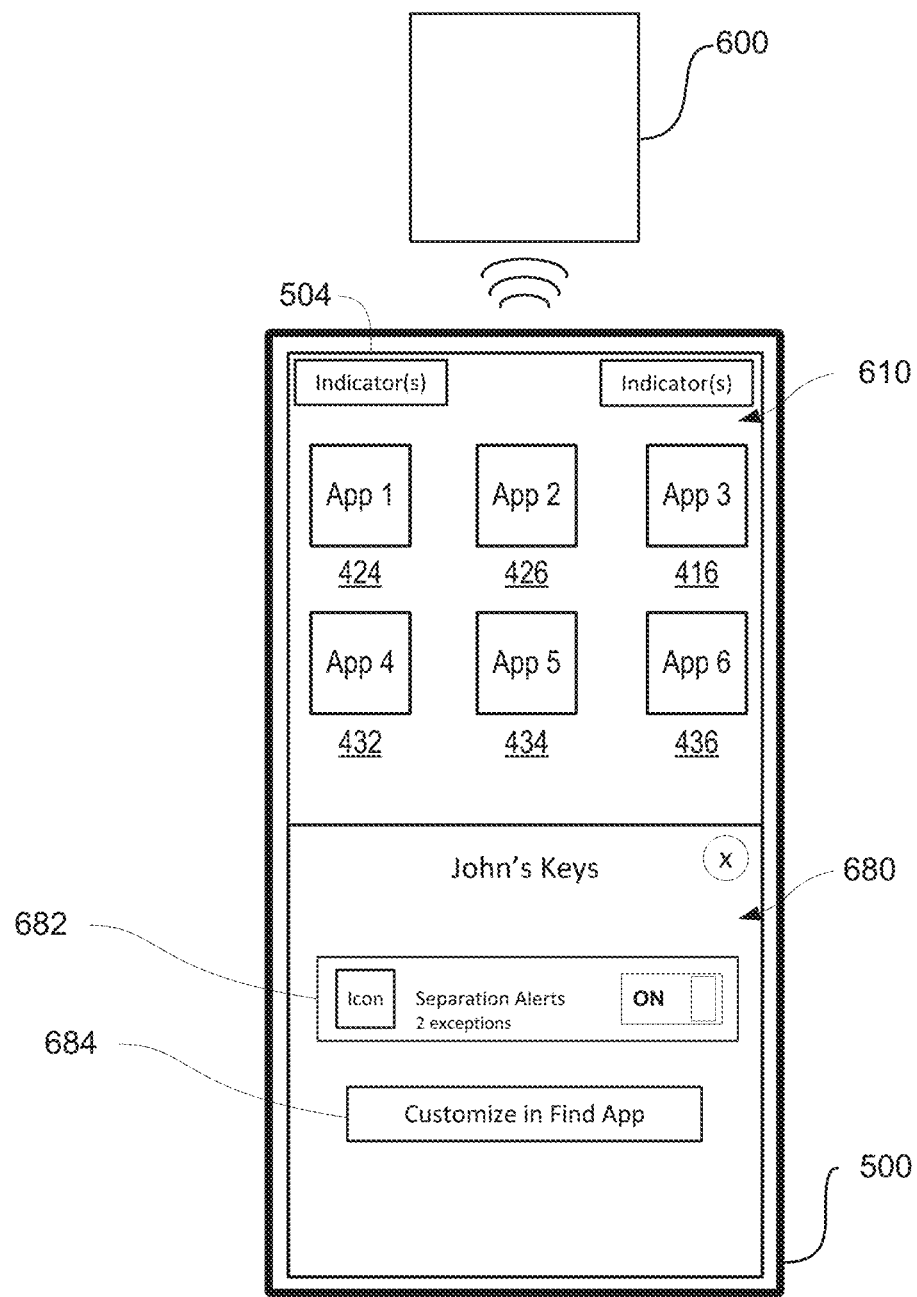
Figure 6Q:
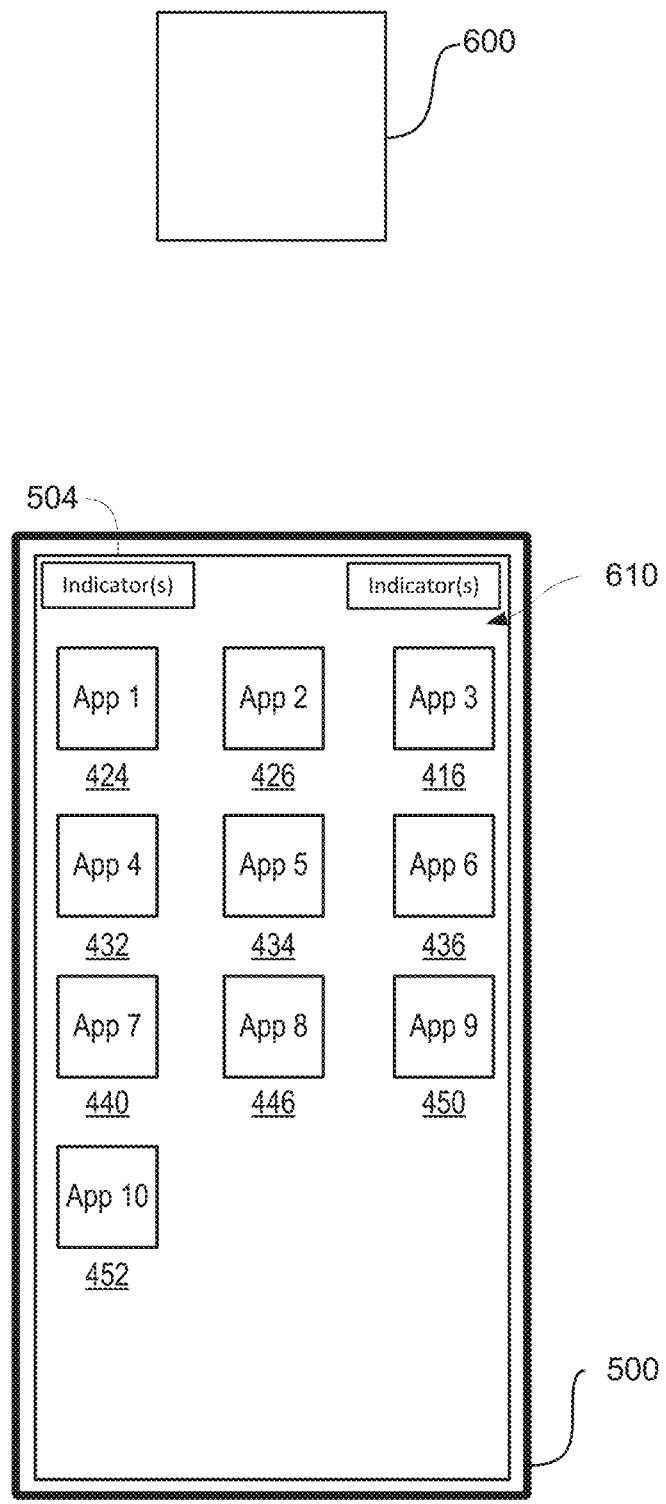
Figure 6R:
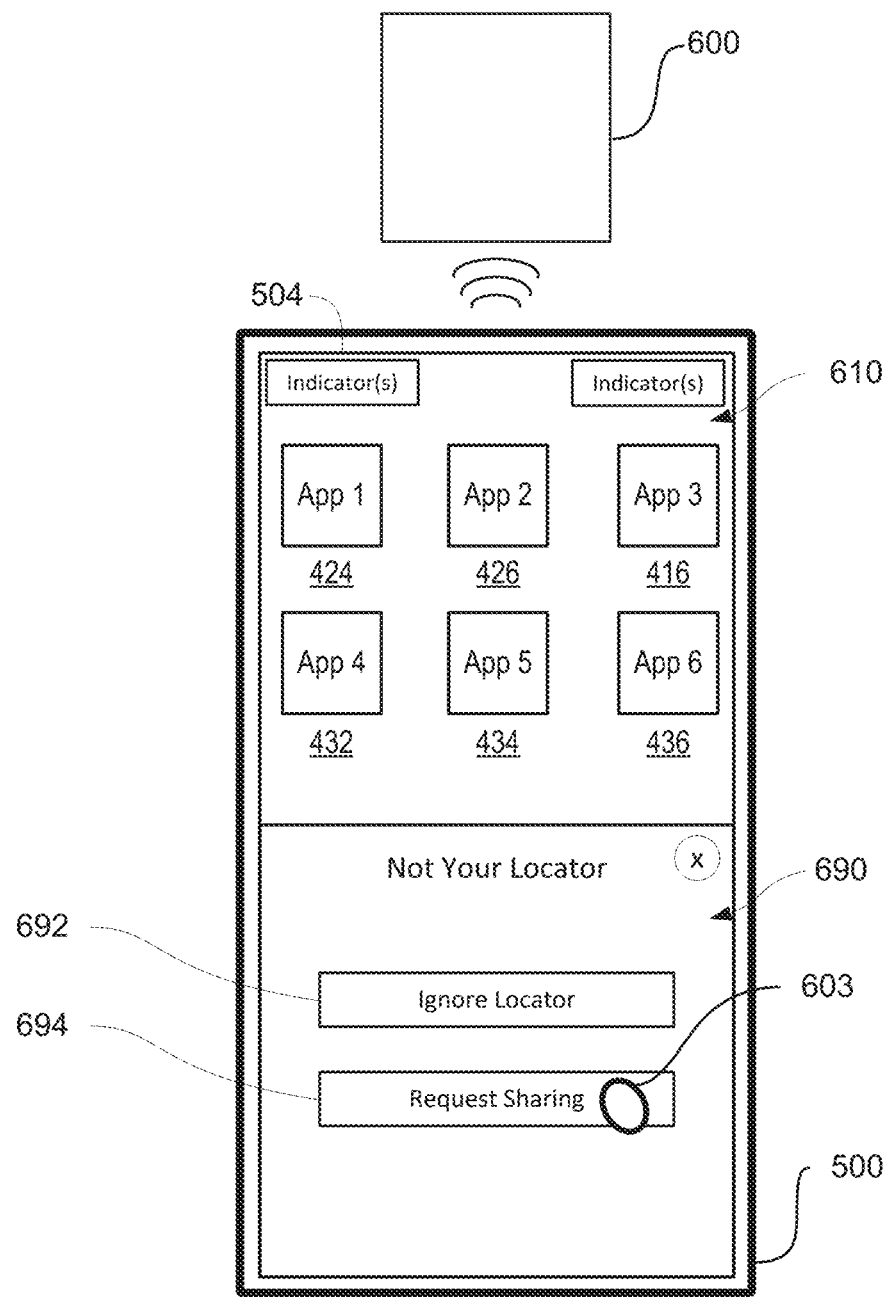
Figure 6S:
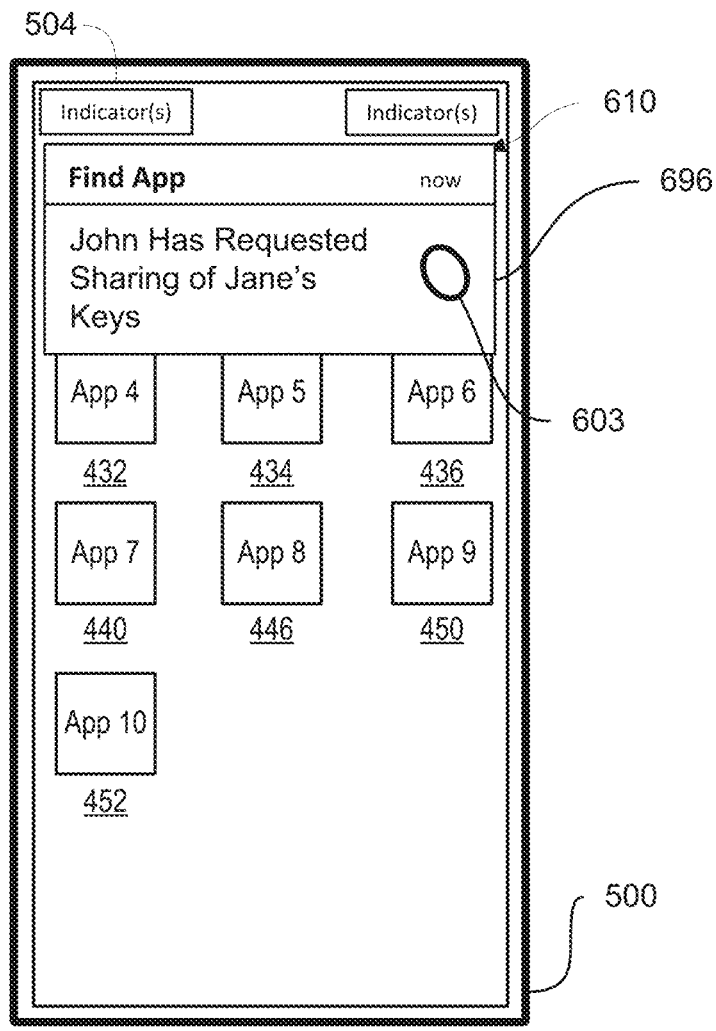
Figure 6T:
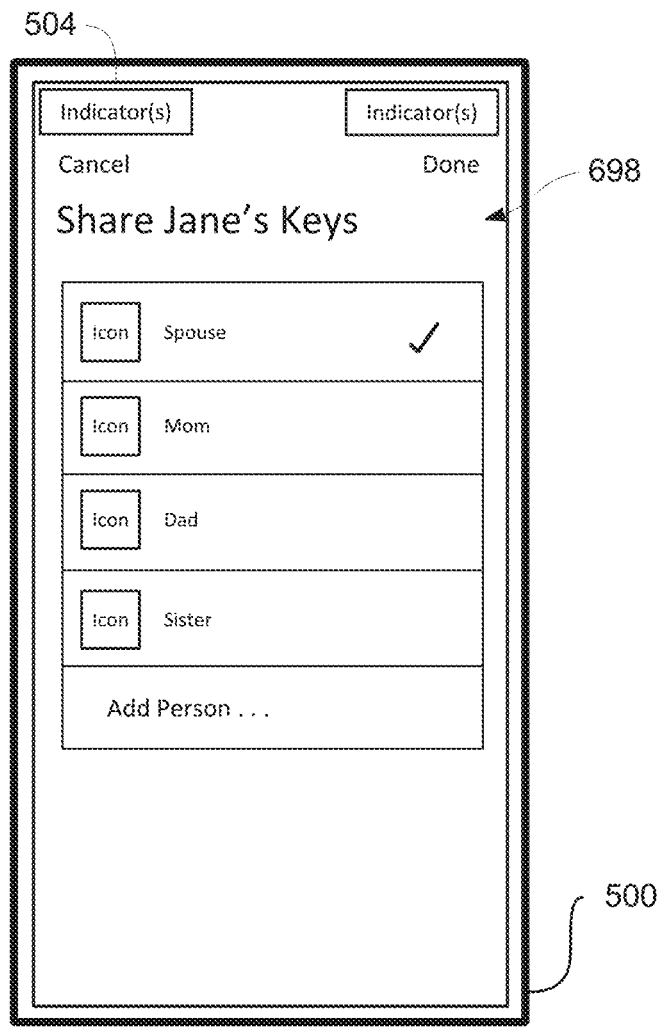

FIGS. 6A-6T illustrate exemplary ways in which an electronic device initializes a remote locator object in accordance with some embodiments of the disclosure. The embodiments in these figures are used to illustrate the processes described below, including the processes described with reference to FIGS. 7A-7D.

FIGS. 6A-6T illustrate an electronic device 500 initializing a remote locator object. FIG. 6A illustrates an exemplary device 500 that includes touch screen 504. As shown in FIG. 6A, the electronic device 500 presents a home screen user interface 610. In some embodiments, home screen user interface 610 is an application launching user interface. For example, home screen user interface 610 includes multiple selectable options that when selected causes the electronic device 500 to launch or otherwise present applications (e.g., icons 424, 426, 416, 432, 434, 436, 440, 446, 450, and 452). In some embodiments, home screen user interface 610 includes multiple pages or tabs and includes all launchable applications that have been installed onto electronic device 500. In some embodiments, home screen user interface 610 includes a subset of the applications that are installed and launchable on electronic device 500.

FIG. 6A also illustrates an exemplary remote locator object 600 that is in an uninitialized state. In some embodiments, the remote locator object is a device with a battery, one or more wireless antenna and a low power processor that enables the device to function as a special-purpose remote locator object when associated with another physical object (e.g., wallet, purse, backpack, suitcase, car, set of keys, or the like). In some embodiments, the remote locator object is a multi-purpose device with location tracking capabilities such as a smartphone, tablet, computer, or watch. In some embodiments, remote locator object 600 is capable of transmitting location data to an electronic device. For example, remote locator object 600 optionally includes a GPS locator. In some embodiments, remote locator object 600 does not include location tracking capability and relies on other electronic devices (e.g., such as device 500) to receive location data. In some embodiments, remote locator object 600 is able to wirelessly communicate with other electronic devices, such as electronic device 500 (e.g., over Bluetooth, RF, IR, NFC, etc.). In some embodiments, remote locator object has an uninitialized state and an initialize state. For example, when the remote locator object is first manufactured, the remote locator object is in an uninitialized state. In the uninitialized state, the remote locator object is not assigned a label or associated with any particular user or user account. In the initialized state, the remote locator object is assigned a label and/or associated with a respective user or user account. In some embodiments, initializing the remote locator object comprises transferring initialization data to and storing the data on the remote locator object. In some embodiments, the remote locator object does not store initialization data and instead, an electronic device (e.g., such as device 500) or a server stores the initialization data and associates the data with the unique identifier of the remote locator object (e.g., serial number, etc.).

In some embodiments, when remote locator object 600 is placed within a threshold distance (e.g., 1 inch, 2 inches, 5 inches, etc.) of device 500, remote locator object 600 pairs or more generally communicates with electronic device 500 as shown in FIG. 6B. In some embodiments, pairing remote locator object 600 with electronic device 500 includes establishing an NFC communication link between remote locator object 600 and electronic device 500. In some embodiments, electronic device 500 receives identifying information from remote locator object 600 (e.g., serial number of the remote locator object, etc.). In some embodiments, remote locator object 600 uses the location tracking capabilities of electronic device 500 to update remote locator object 600's internal location information. In some embodiments, remote locator object 600 is able to upload its location information to a server. In some embodiments, remote locator object 600 is able to upload its location data to a server over a wireless communication link (e.g., such as Bluetooth, WiFi, etc.). In some embodiments, remote locator object 600 is able to communicate with an electronic device (e.g., such as device 500) to upload location data even though remote locator object 600 has not previously paired with the electronic device (e.g., while remote locator object 600 is in an uninitialized state, or while remote locator object 600 is in an initialized state, but not paired with the respective electronic device).

In some embodiments, in response to placing remote locator object 600 nearby to electronic device 500, electronic device 500 displays user interface 620 to complete the pairing (e.g., initialization) process, as shown in FIG. 6C. In some embodiments, user interface 620 is an overlay that is overlaid over the user interface that was displayed on device 500 before pairing began (e.g., user interface 610). In some embodiments, user interface 620 includes representation 622 of remote locator object 600. In some embodiments, representation 622 is an icon of remote locator object 600. In some embodiments, representation 622 is a three dimensional and/or interactable model of remote locator object 600. For example, in some embodiments, a user input on representation 622 optionally causes representation 622 to spin or rotate in accordance with the user input. In some embodiments, representation 622 spins, rotates or otherwise animates on its own (e.g., without user involvement). For example, FIGS. 6D-6E illustrate representation 622 rotating without user input.

In some embodiments, user interface 620 includes selectable option 624 (e.g., button, affordance, etc.). In some embodiments, selection of selectable option 624 initiates the process for initializing (e.g., setting up, etc.) and pairing remote locator object 600 with electronic device 500 and/or the user account associated with device 500. In FIG. 6E, user input 603 is received selecting selectable option 624 indicating the user's request to initialize and connect (e.g., pair) remote locator object 600 to electronic device 500. In response to the user input, device 500 displays user interface 630, as shown in FIG. 6F.

In some embodiments, user interface 630 is a user interface for selecting a label (e.g., name or other identifier) for remote locator object 600. In some embodiments, user interface 630 includes one or more predefined labels (e.g., "Bag", "Backpack", "Keys") from which the user is able to choose as the label for object 600. In some embodiments, the one or more predefined labels are provided as a list 632 of options. In some embodiments, list 632 is scrollable to reveal more predefined labels. In some embodiments, list 632 is displayed in a rolodex-style such that the item in the center is largest and the size of the items decreases based on distance from the center. In some items, the item in the center is the item that is currently selected, as shown by box 634.

In some embodiments, list 632 includes a custom option (e.g., "Other") for providing a custom label. FIGS. 6F-6H illustrate a sequence of one or more user inputs navigating to and selecting the custom option. In some embodiments, in response to the user input, device displays virtual keyboard 638, such as in FIG. 6I. In some embodiments, the "other" option becomes a text entry field 634. In some embodiments, the user is able to use the virtual keyboard 638 to enter a custom identifier into text field 634.

In some embodiments, user interface 636 includes selectable option 636 for confirming the label to be used for remote locator object 600. In some embodiments, after the user has confirmed the label for remote locator object 600, device 500 displays user interface 640, as shown in FIG. 6J. In some embodiments, user interface 640 is a connection progress splash user interface that indicates that the pairing process is in progress. In some embodiments, user interface 640 includes representation 622 of remote locator object 600. In some embodiments, user interface 640 displays the selected identifier with the user's name (e.g., "John's Keys", such that remote locator object 600 is or will be attached to John's keys). In some embodiments, pairing to remote locator object 600 includes creating a profile on electronic device 500 (e.g., and/or on a cloud server) specific to remote locator object 600.

In some embodiments, after the pairing progress successfully completes and remote locator object 600 is initialized, device 500 displays user interface 650, as shown in FIG. 6K. In some embodiments, user interface 650 includes label 652 indicating the remote locator object that is being displayed on user interface 650 (e.g., remote locator object 600, "John's Keys"). In some embodiments, user interface 650 includes label 654 that indicates the location status of remote locator object 600. In some embodiments, the location status of remote locator object 600 is that it is within a threshold distance (e.g., 1 foot, 2 feet, 3 feet, etc.) from the user such that a "With You" label is displayed. In some embodiments, label 654 additionally or alternatively includes an indication of when the location of remote locator object 600 was most recently updated. For example, as shown in FIG. 6K, the location data of remote locator object 600 was updated "just now" (e.g., within 1 second, 30 seconds, 1 minute, 2 minutes, etc.).

In some embodiments, user interface 650 includes map 656. In some embodiments, map 656 displays a map of the location around remote locator object 600 (e.g., one mile radius, two mile radius, give mile radius, etc.). In some embodiments, map 656 includes icon 658 representing remote locator object 600. In some embodiments, icon 658 indicates the current location of remote locator object 600. In some embodiments, user interface 650 includes one or more functions available for remote locator object 600 that are selectable to view or activate the respective functions. For example, selectable option 659-1 corresponds to the location finding function for remote locator object 600. In some embodiments, selection of selectable option 659-1 causes the display of a user interface for finding remote locator object 600 in an application for tracking and finding items (e.g., similar to the processes described below with respect to methods 1300 and 1400). In some embodiments, selectable option 659-2 corresponds to the separation alert function for remote locator object 600. In some embodiments, selection of selectable option 659-2 toggles the separation alert function on or off. Separation alerts for remote locator objects will be described in further detail below with respect to method 900. In some embodiments, selectable option 659-3 causes display of a user interface for selecting and/or managing trusted locations and/or people for remote locator object 600. Trusted locations for remote locator objects will be described in further detail below (as will be described in further detail below with respect to method 900). In some embodiments, selectable options 659-1 to 659-3 are not selectable options, but rather, a non-interactive indicator indicating to the user the functions that are available.

In some embodiments, user interface 650 includes selectable option 657-1. In some embodiments, selection of selectable option 657-1 causes the display an application for tracking and finding items (e.g., the "Find" app) and navigation to a user interface in the application for managing the settings (e.g., viewing and editing) for remote locator object 600. In some embodiments, user interface 650 includes selectable option 657-2 that is selectable to dismiss user interface 650 and display the user interface that was displayed before initialization began (e.g., user interface 610).

In FIG. 6K, user input 603 is detected selecting selectable option 657-1 corresponding to a request to customize the settings of remote locator object 600. In some embodiments, in response to user input 603, electronic device 500 displays user interface 660, as shown in FIG. 6L. In some embodiments, user interface 660 is a user interface of an application for tracking and finding items (e.g., electronic device 500 launched the application in response to user input 603).

In FIG. 6L, user interface 660 includes label 662 indicating the remote locator object that is being displayed on user interface 660 (e.g., remote locator object 600, "John's Keys"). In some embodiments, user interface 660 includes label 664 that indicates the location status of remote locator object 600. In some embodiments, the location status of remote locator object 600 is that it is within a threshold distance (e.g., 1 foot, 2 feet, 3 feet, etc.) from the user such that a "With You" label is displayed. In some embodiments, label 664 additionally or alternatively includes an indication of when the location of remote locator object 600 was most recently updated. For example, as shown in FIG. 6L, the location data of remote locator object 600 was updated "just now" (e.g., within 1 second, 30 seconds, 1 minute, 2 minutes, etc.). In some embodiments, label 664 includes a description of the location nearest where remote locator object 600 is located. For example, as shown in FIG. 6L, remote locator object 600 is determined to be "Near Home".

In some embodiments, user interface 660 includes selectable option 666-1 and selectable option 666-2 corresponding to the functions available for remote locator object 600. In some embodiments, selection of selectable option 666-1 causes display of a user interface to find remote locator object 600 (e.g., similar to the processes described below with respect to methods 1300 and 1400). In some embodiments, selection of selectable option 666-2 causes remote locator object 600 to emit an audible tone. In some embodiments, selectable option 666-2 is a toggle button and remote locator object 600 will continuously emit the audible tone until electronic device 500 receives a second user input selecting selectable option 666-2 to disable the audible tone. In some embodiments, selectable option 666-2 is not a toggle button and remote locator object 600 emits an audible tone for as long as the user is selecting selectable option 666-2. Thus, in some embodiments, remote locator object 600 will only emit an audible tone while the user is selecting selectable option 666-2.

In some embodiments, user interface 660 includes options for setting the notification settings for remote locator object 600. In some embodiments, the notification settings include selectable option 668 that is selectable to edit the notification settings with respect to separation alerts. In some embodiments, user interface 660 includes options for adding and/or managing the people with whom remote locator object 600 is shared. In some embodiments, if remote locator object 600 is currently not shared with anyone, then selectable option 669 reads "Add People". The operation of separation alerts and sharing will be described in further detail below with respect to FIGS. 8A-8P. In some embodiments, user interface 660 includes selectable option 667 for changing the name (e.g., the label) of remote locator object 600. In some embodiments, as shown in FIG. 6M (after scrolling down the user interface), user interface 600 includes selectable option 665 for marking remote locator object 600 as lost. Further description of the features of a remote locator object that has been marked as lost will be described in further detail below, with respect to FIGS. 10N-10R.

In some embodiments, user interface 660 includes selectable option 663 for dismissing user interface 660 (e.g., completing setting the options for remote locator object 600). In FIG. 6M, user input 603 is received selecting selectable option 663. In some embodiments, in response to user input 603, electronic device 500 dismisses user interface 660 and displays user interface 670, as shown in FIG. 6N. In some embodiments, user interface 670 is the home screen for the application for tracking and finding items (e.g., "Find" app). In some embodiments, user interface 670 includes map 672 and a list of items 676 that are being tracked. In some embodiments, map 672 includes icon 674-1 indicating electronic device 500's current position. In some embodiments, map 672 includes icons indicating the locations of the items that are being tracked. For example, in some embodiments, map 672 includes icon 674-2 indicating the position of "Spouse's Keys". In some embodiments, map 672 does not display icons of items that are determined to be with the electronic device (e.g., with the user). In some embodiments, map 672 displays icons of items that are determined to be with the electronic device (e.g., with the user, such as Keys).

In some embodiments, list 676 includes one or more items whose locations are being tracked. For example, in FIG. 6N, list 676 includes items 678-1 to 678-3. In embodiments, each item includes an icon (e.g. or other representation) corresponding to the item, a label of the item (e.g., Keys, Spouse's Keys, Tablet, etc.), and location information of the item (e.g., With You, Near Spouse's Work, At Home). In some embodiments, the item includes information regarding whether notifications for the item are ignored and the amount of time left for ignoring notifications for the item (e.g., as will be described in more detail). In some embodiments, the item includes information regarding when the location information was last updated (e.g., as will be described in more detail). In some embodiments, the item includes information about how far the item is from the user (e.g., 1 foot away, 5 miles away, 15 feet away, etc.). In some embodiments, each of items 678-1 to 678-4 are selectable to display a user interface specific for the respective item (e.g., analogous to the user interface described with reference to FIGS. 6L-6M). In FIG. 6N, list 676 includes listing 678-1 corresponding to the user's keys, listing 678-2 corresponding to the user's spouse's keys, and listing 678-3 corresponding to the user's tablet. As shown in FIG. 6N, user interface 670 displays the location information for the user's remote locator objects (item 678-1), remote locator objects that have been shared with the user (e.g., item 678-2), electronic devices (e.g., item 678-3), and optionally other people (not shown). In some embodiments, list 676 is a scrollable list that is scrollable to display more items that are being tracked. In some embodiments, map 672 only displays items that are displayed in list 676 and scrolling through list 676 causes update of map 672 to display the location of the items that are currently being displayed in list 676. In some embodiments, map 672 displays all items that are tracked and not only the items that are currently displayed in list 676.

FIGS. 6O-6T illustrate embodiments in which device 500 is placed within a threshold distance of a remote locator object that is already in an initialized state. FIG. 6O illustrates device 500 and remote locator object 600. In FIG. 6O, remote locator object 600 is initialized and has previously been associated with the user and/or user account of device 500. Thus, in some embodiments, remote locator object 600 is paired with device 500. In FIG. 6P, device 500 is placed with a threshold distance of remote locator object 600 (e.g., within NFC communication range). In some embodiments, in response to placing device 500 within the threshold distance of remote locator object 600, device 500 communicates with remote locator object 600 and displays user interface 680 overlaid over the user interface that was previously displayed on device 500. In some embodiments, user interface 680 is a "quick" control sheet that displays one or more selectable options for performing a subset of the functions available with remote locator object 600. In FIG. 6P, user interface 680 includes toggle 682 that is selectable to toggle separation alerts on or off (e.g., which will be described in further detail below with respect to FIGS. 8A-8P). In some embodiments, toggle 682 includes a textual description of how many location exceptions apply to remote locator object 600 (e.g., which will be described in further detail below with respect to FIGS. 8A-8P). In some embodiments, user interface 680 includes selectable option 684 that is selectable to display an application for tracking and finding items (e.g., the "Find" app) and navigation to a user interface in the application for managing the settings (e.g., viewing and editing) for remote locator object 600 (e.g., similar to user interface 660 described above with respect to FIGS. 6L-6M).

FIG. 6Q illustrates device 500 and remote locator object 600. In FIG. 6Q, remote locator object 600 is initialized and is associated with another user (e.g., not the user or user account of device 500). In FIG. 6Q, remote locator object 600 is not associated with the user of the device and is also not currently sharing location information with the user of device 500. In FIG. 6R, device 500 is placed with a threshold distance of remote locator object 600 (e.g., within NFC communication range). In response to placing device 500 within the threshold distance of remote locator object 600, device 500 communicates with remote locator object 600 and displays user interface 690 overlaid over the user interface that was previously displayed on device 500. In some embodiments, user interface 690 is a "quick" control sheet that displays one or more selectable options for performing functions available with remote locator object 600. In FIG. 6R, because remote locator object 600 is not associated with the user and is not shared with the user, user interface 690 includes selectable option 692 and selectable option 694. In some embodiments, selectable option 692 is selectable to ignore the remote locator object 600 (e.g., suppress tracking alerts, as will be described in more detail below with respect to FIGS. 10A-10R). In some embodiments, selectable option 694 is selectable to request sharing of remote locator object 600 from the owner of remote locator object 600.

In FIG. 6R, user input 603 is received selecting selectable option 694. In some embodiments, in response to the user input, notification 696 is displayed on the device of the owner of (e.g., user account associated with) remote locator object 600 (e.g., device 500), as shown in FIG. 6S. In some embodiments, notification 696 indicates to the owner of remote locator object 600 that a person (e.g., John) has requested sharing of the remote locator object 600. In some embodiments, notification 696 is selectable to display options for sharing remote locator object 600. For example, in FIG. 6S, user input 603 is received selecting notification 696. In some embodiments, in response to the user input, device 500 displays user interface 698. In some embodiments, user interface 698 is a user interface for managing the users with whom a respective remote locator object is shared, as will be described in more detail below with respect to FIGS. 8K-8N. In some embodiments, user interface 698 is automatically displayed with the requester and the owner of the remote locator object is able to select the requester to initiate the process for sharing the remote locator object with the requester (e.g., without requiring the owner to search for or otherwise enter the requester's account information).

FIGS. 7A-7D are flow diagrams illustrating a method 700 of initializing a remote locator object in accordance with some embodiments, such as in FIGS. 6A-6T. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

As described below, the method 700 provides ways to initialize a remote locator object. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 6B, an electronic device with one or more wireless antenna, a display device, and one or more input devices (e.g., a mobile device (e.g., a tablet, a smartphone, a media player, or a wearable device) including a touch screen and wireless communication circuitry, or a computer including one or more of a keyboard, mouse, trackpad, and touch screen and wireless communication circuitry) detects (702), via the one or more wireless antenna, that a remote locator object (e.g., a device that is able to communicate wirelessly, such as via Bluetooth and/or WiFi with the electronic device—the device is optionally able to be attached to a user's items, such as the user's keys, the user's purse, etc.) is near the electronic device, such as in FIG. 6B.

In some embodiments, in response to detecting that the remote locator object is near (e.g., within a threshold distance, such as 5, 10 or 20 feet, within the effective distance of a wireless communication protocol such as NFC, Bluetooth, WiFi, or the like) the electronic device, the electronic device displays (704), via the display device, a setup user interface for setting up the remote locator object in a predefined region of the display, such as in FIG. 6C (e.g., displayed in an overlay over what was being displayed via the display device before the remote locator object was detected near the electronic device, such as an overlay over the bottom ½, ⅓ of the displayed content). In some embodiments, the setup user interface is not displayed if the remote locator object has previously been setup by this electronic device or another electronic device.

In some embodiments, after displaying, via the display device, the setup user interface, the electronic device displays (706) (e.g., in response to selection of a setup affordance for setting up the remote locator object), in the predefined region of the user interface displayed via the display device, an identifier user interface for selecting an identifier for the remote locator object, such as in FIG. 6F. In some embodiments, selection of a setup affordance causes the remote locator object and/or the electronic device to enter into a setup process, which includes initializing the remote locator object, pairing the remote locator object with the electronic device, otherwise identifying the remote locator object as being owned by the user of the electronic device, and/or setting the behavior of the remote locator object and/or the electronic device. In some embodiments, the identifier user interface is also displayed as an overlay over what was displayed before the remote locator object was detected near the electronic device. In some embodiments, the identifier user interface is a user interface of the setup user interface (e.g., a displayed page on the setup user interface overlay object). In some embodiments, the identifier user interface includes one or more predefined identifiers (e.g., "keys", "purse", "backpack", etc.). In some embodiments, a user is able to provide a custom identifier. In some embodiments, the identifiers are displayed in a scrollable list or scrollable rolodex.

In some embodiments, while displaying the identifier user interface, the electronic device detects (708), via the one or more input devices, one or more user inputs selecting a respective identifier for the remote locator object, such as in FIG. 6G (e.g., receiving user input selecting a name, such as "keys", "purse", etc. for the remote locator object that provides a description for the remote locator object.). In some embodiments, after the respective identifier for the remote locator object has been selected (e.g., in response to receiving an input to advance through the setup user interface or in response to selection of a predefined identifier for the remote locator object), the electronic device displays (710) a user interface with additional information about the functionality of the remote locator object, wherein the user interface with additional information includes a description of at least one function of the remote locator object, such as in FIG. 6K (e.g., display a setup confirmation page or setup summary page for the remote locator device). In some embodiments, the setup confirmation page provides the user with one or more selectable options for performing other setup processes or selecting other settings for the remote locator object. For example, the setup confirmation page includes a selectable option for launching an application dedicated to managing and locating remote locator objects and/or other electronic devices. In some embodiments, the setup confirmation page includes indicators of different functions that are available with the remote locator object. For example, the remote locator object is optionally able to be found wirelessly (e.g., provide relative or absolute location information to the electronic device such that the electronic device is able to triangulate a relative or absolute position of the remote locator object) and this is indicated in the additional information, the remote locator object is optionally able to cause alerts to be displayed on the electronic device when the remote locator object is separated from the electronic device, and this is indicated in the additional information, etc. In some embodiments, the electronic device also identifies the remote locator object with a combination of the respective identifier and a name of a user of the device (e.g., labels the remote locator object with the user's name and an indication that the remote locator object is associated with "keys" or "purse" or the like).

The above-described manner of setting up a remote locator object (e.g., by detecting the presence of the remote locator object and displaying a setup user interface to select an identifier and access functionalities of the remote indicator object) provides the user with the ability to set up a remote locator object (e.g., by displaying a setup user interface in which the user assigns a label to the remote locator object and is able to perform other setup functions), which simplifies the interaction between the user and the electronic device and enhances the operability of the electronic device and makes the user-device interface more efficient (e.g., by providing the user with a method of remotely setting up the remote locator object without requiring a specialized device to perform set up of the remote locator object), which additionally reduces power usage and improves battery life of the electronic device by enabling the user to use the electronic device more quickly and efficiency.

Figure 7A:
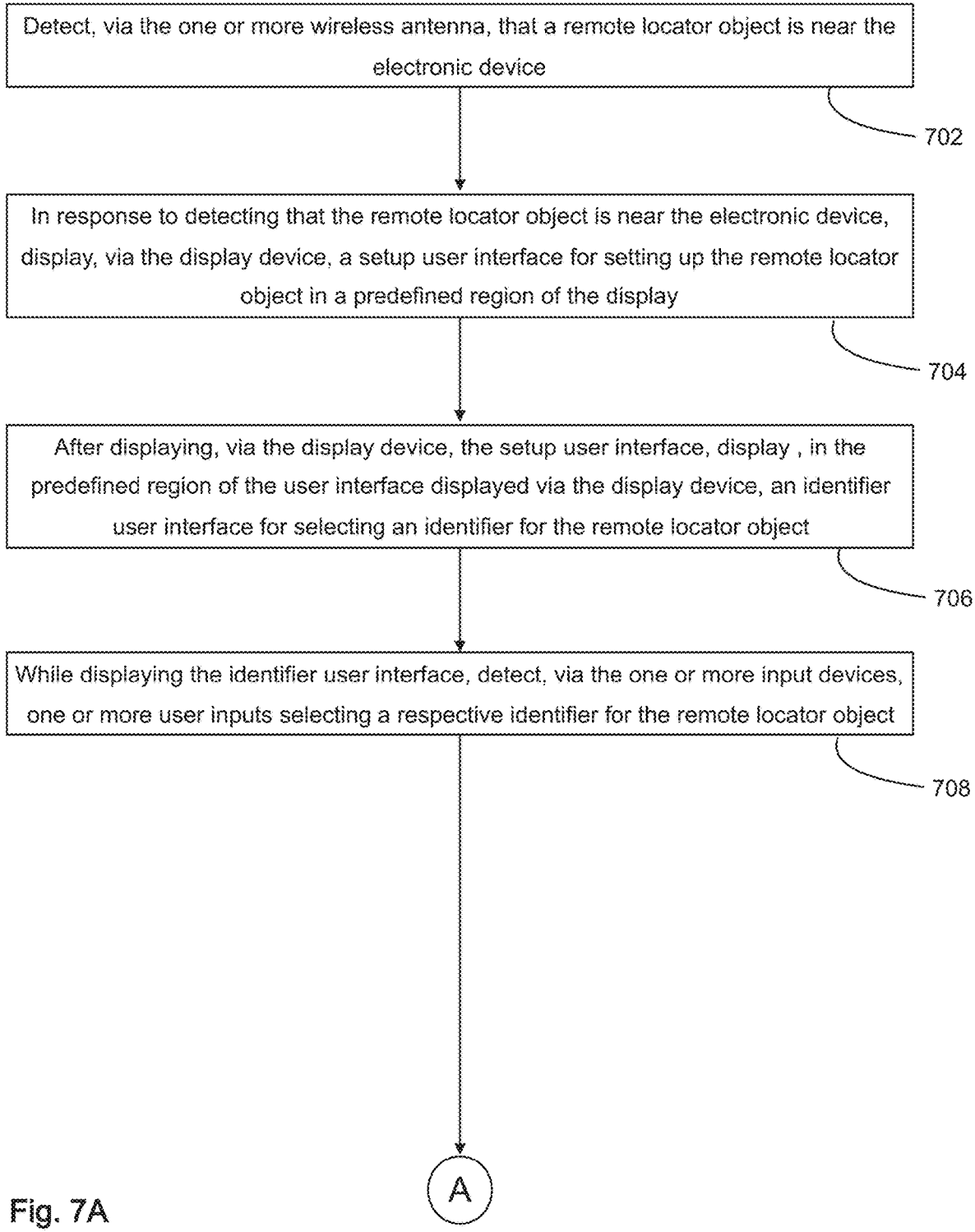
FIGS. 7A-7D are flow diagrams illustrating a method of initializing a remote locator object in accordance with some embodiments of the disclosure.
Figure 7B:
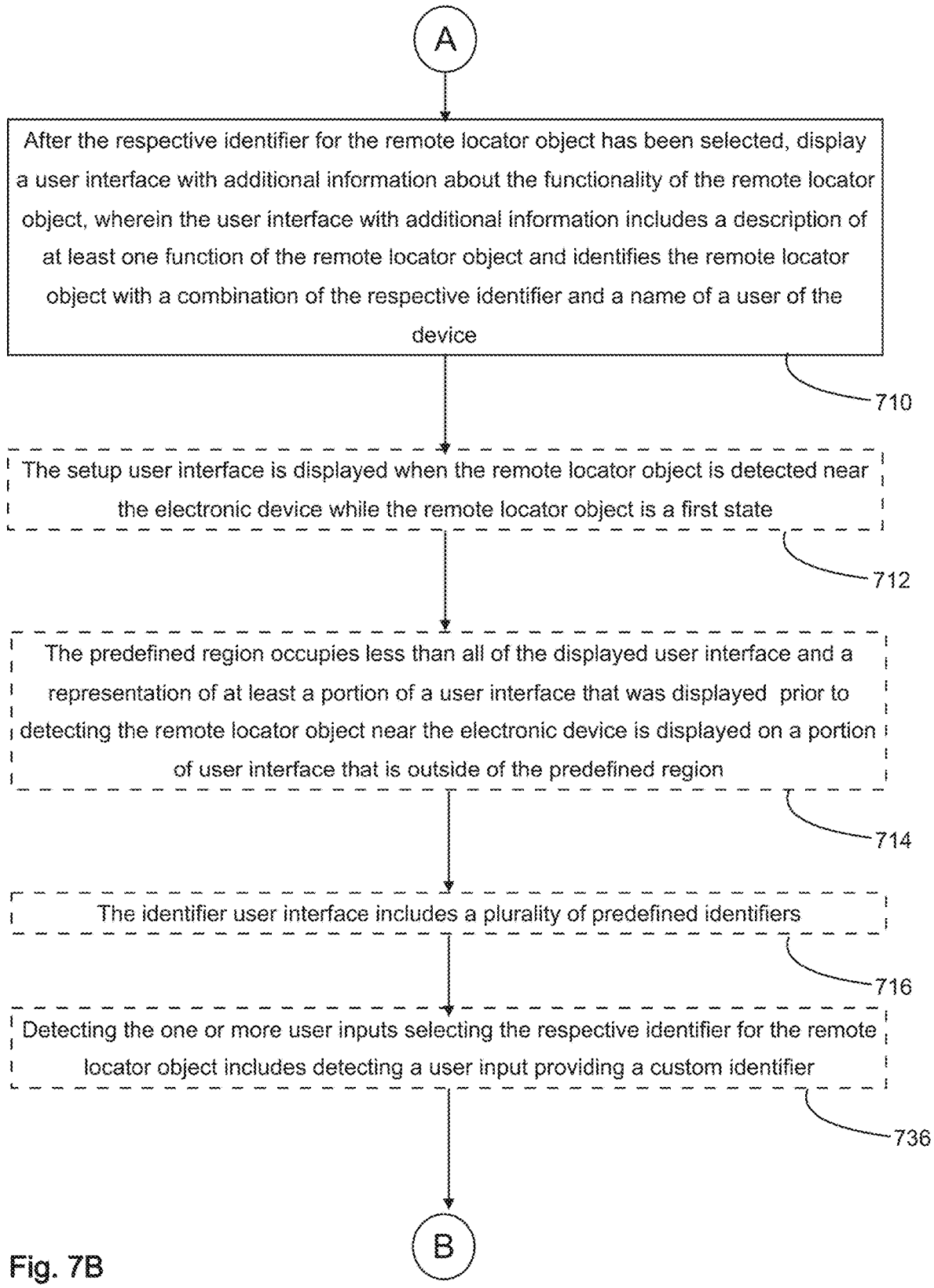
Figure 7C:
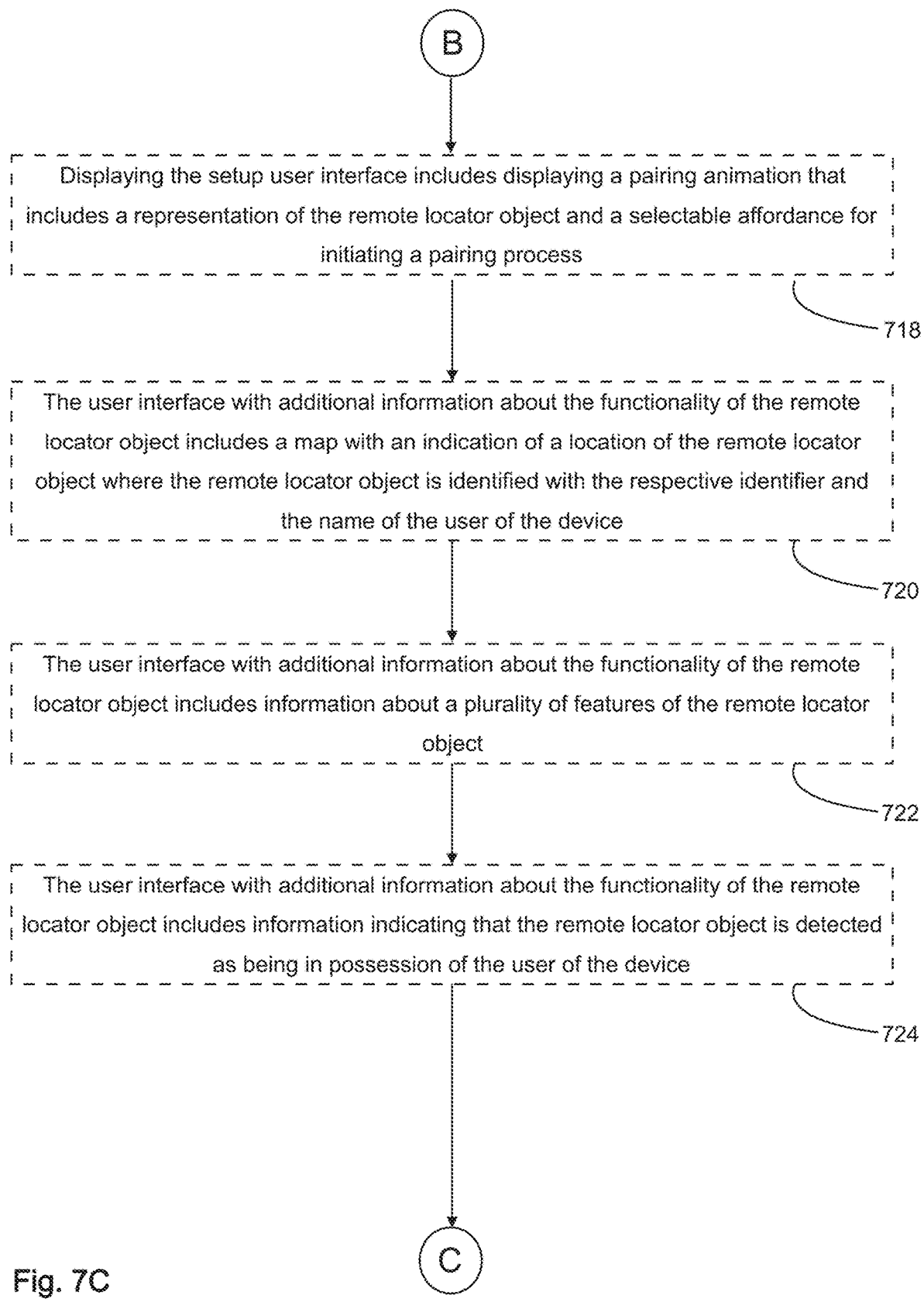
Figure 7D:
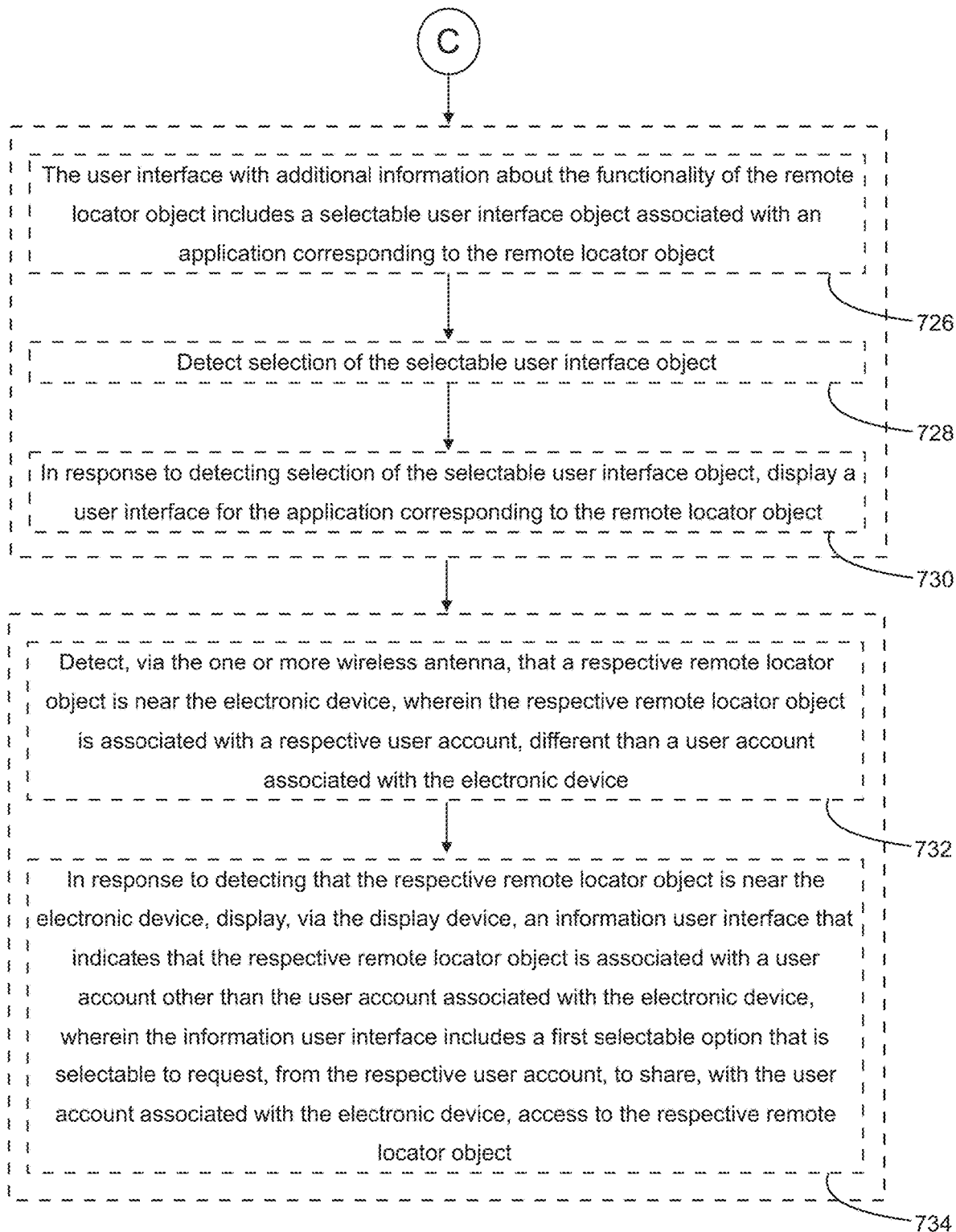

In some embodiments, the setup user interface is displayed when the remote locator object is detected near the electronic device while the remote locator object is in a first state (712), such as in FIG. 7C (e.g., an initial state in which it has not been set up (e.g., is not currently configured with a user account). In some embodiments, when the device is in an initial state in which it has not been set up, when the electronic device is placed near the remote locator object indicating a request to set up the remote locator object, then the electronic device displays the setup user interface. In some embodiments, placing the electronic device near the remote locator object creates a wireless communication connection between the electronic device and the remote locator object (e.g., via a wireless communication protocol such as NFC, Bluetooth, WiFi Direct, WiFi, etc.). In some embodiments, after establishing the wireless communication connection, the electronic device determines that the remote locator object is in the initial state (e.g., the remote locator object transmits a signal to the electronic device that the remote locator object is in the initial state). In some embodiments, the remote locator object is in the first state (e.g., initial state) if the remote indicator object has never been set up with any electronic device, has never been set up with this respective electronic device (e.g., optionally has been set up with another electronic device but not with this respective electronic device), or has been reset to factory defaults (e.g., factory reset). In some embodiments, if the remote locator object is not in the first state (e.g., initial state), then detecting the remote locator object near the electronic device does not cause display of the setup user interface. In some embodiments, instead of the setup user interface, a different user interface is displayed on the electronic device for performing other functions associated with the remote locator object other than setting up the remote locator object.

The above-described manner of setting up a remote locator object (e.g., by detecting the presence of the remote locator object when the remote locator object is in the first state) provides the user with the ability to set up a remote locator object when the remote locator object is in the proper state for setup, and not when it is not (e.g., by displaying a setup user interface when the remote locator object is not yet set), which simplifies the interaction between the user and the electronic device and enhances the operability of the electronic device and makes the user-device interface more efficient (e.g., by automatically determining that the remote locator object is not yet set up, that setup is required, and displaying the setup user interface when the remote locator object is placed near the electronic device), which additionally reduces power usage and improves battery life of the electronic device by enabling the user to use the electronic device more quickly and efficiency.

In some embodiments, the predefined region occupies less than all of the displayed user interface and a representation of at least a portion of a user interface that was displayed (immediately) prior to detecting the remote locator object near the electronic device is displayed on a portion of user interface that is outside of the predefined region (714), such as in FIG. 6C (e.g., the setup user interface is displayed overlaid over an application or home screen that is not associated with the remote locator object). For example, if the user was interacting with the electronic device such that the electronic device is displaying a respective user interface (e.g., of a particular application or system user interface) and then initiates the remote locator object setup process (e.g., by placing the remote locator object near the electronic device), then the setup user interface is displayed in an overlay over what was being displayed (the user interface of the particular application or system user interface). In some embodiments, the overlay is displayed overlaid over the bottom of the displayed content (e.g., bottom ½, bottom ⅓, bottom ¼, etc.).

The above-described manner of displaying a setup user interface (e.g., by displaying a user interface that occupies less than all of the user that is overlaid over the user interface that was previously displayed before entering into the setup process) provides the user with a minimally invasive user interface for setting up the remote locator object (e.g., by displaying a setup user interface that does not encompass the entire screen and that is overlaid over the previously displayed content), which simplifies the interaction between the user and the electronic device and enhances the operability of the electronic device and makes the user-device interface more efficient (e.g., by allowing the user to quickly return to the previous interface after completing the setup process or by allowing the user to maintain view of the previous user interface while performing setup of the remote locator object without requiring the user to navigate away from the user interface that was previously displayed and navigate back to that user interface after completing setup of the remote locator object), which additionally reduces power usage and improves battery life of the electronic device by enabling the user to use the electronic device more quickly and efficiency.

In some embodiments, the identifier user interface includes a plurality of predefined identifiers (716), such as in FIG. 6F (e.g., keys, car, purse, computer, backpack, etc.). In some embodiments, the predefined identifiers of the plurality of predefined identifiers are selectable to set the identifier for the remote locator object that is being set up. For example, if the user (e.g., John) selects the predefined identifier, "keys", then the remote locator object is referred to as "John's Keys" onwards. In some embodiments, the plurality of predefined identifiers is displayed in a scrollable list or rolodex-style list. In some embodiments, after selection of an identifier from the identifier user interface, the setup process performs an initialization of the remote locator object and displays a user interface indicating that the electronic device is connecting to the remote locator object.

The above-described manner of setting up a remote locator object (e.g., by displaying a plurality of predefined identifiers for the user to choose from) allows for quick selection of an identifier for the remote locator object, which simplifies the interaction between the user and the electronic device and enhances the operability of the electronic device and makes the user-device interface more efficient (e.g., by providing the user with commonly used identifiers to allow the user to quickly select the identifier that best applies to the remote locator object being set up), which additionally reduces power usage and improves battery life of the electronic device by enabling the user to use the electronic device more quickly and efficiency.

In some embodiments, detecting the one or more user inputs selecting the respective identifier for the remote locator object includes detecting a user input providing a custom identifier (736), such as in FIG. 6I (e.g. the identifier user interface includes an option for the user to provide a custom identifier). In some embodiments, the option for the user to provide a custom identifier is displayed with the list of the plurality of predefined identifiers (e.g., at the bottom of the scrollable list or rolodex-style list). For example, one of the identifier options of the list that includes the plurality of predefined identifiers is an option for providing a custom identifier (e.g., an "Other" option). In some embodiments, selection of the option for providing the custom identifier causes a virtual keyboard to be displayed for the user to provide the custom identifier. In some embodiments, the virtual keyboard (e.g., soft keyboard) is displayed at the bottom of the screen and displaces the identifier user interface upwards. In some embodiments, after the user enters the text for the custom identifier and dismisses the virtual keyboard, the identifier user interface returns to its original position before being displaced by the virtual keyboard.

The above-described manner of setting up a remote locator object (e.g., by receiving a custom identifier from the user) allows for more flexible/robust device setup (e.g., by receiving a user input providing a custom identifier for the remote locator object), which simplifies the interaction between the user and the electronic device and enhances the operability of the electronic device and makes the user-device interface more efficient (e.g., by providing the user with the ability to select from a plurality of predefined identifiers as well as the ability to provide a custom identifier), which additionally reduces power usage and improves battery life of the electronic device by enabling the user to use the electronic device more quickly and efficiency.

In some embodiments, displaying the setup user interface includes displaying a pairing animation that includes a representation of the remote locator object and a selectable affordance for initiating a pairing process (718), such as in FIG. 6J (e.g., displaying an image or animation of the remote locator object). In some embodiments, the animation of the remote locator object is a three-dimensional object (e.g., a 3D model) that automatically rotates. In some embodiments, the user is able to interact with the animation of the remote locator object to rotate the remote locator object according to the user's interaction. In some embodiments, the setup user interface includes a selectable option (e.g., affordance) for initiating a process for pairing the remote locator object with the electronic device (e.g., a "Connect" button). In some embodiments, after receiving the input from the user selecting the selectable option for initiating the pairing process (e.g., a user input corresponding to a request to pair the remote locator object with the electronic device), the setup user interface displays a user interface indicating that the pairing process is in progress (e.g., the setup user interface displays "Connecting"). In some embodiments, after selecting the selectable option for initiating the process for pairing the remote locator object, the setup user interface displays the identifier user interface for the user to select an identifier for the remote locator object.

The above-described manner of setting up a remote locator object (e.g., by displaying a pairing animation of the remote locator object and a selectable option to initiate setup of the remote locator object) provides the user with confirmation that the user is about to begin setup of the remote locator object (e.g., by displaying a representation of the remote locator object and beginning the setup process after the user selects the selectable option to confirm that the user wishes to begin setup of the remote locator object), which simplifies the interaction between the user and the electronic device and enhances the operability of the electronic device and makes the user-device interface more efficient (e.g., by providing the user with the ability to confirm setup of the remote locator object without beginning the setup process when the user unintentionally places the electronic device near a remote locator object without intending to set up the remote locator object), which additionally reduces power usage and improves battery life of the electronic device by enabling the user to use the electronic device more quickly and efficiency, while reducing errors in the usage of the device.

In some embodiments, the user interface with additional information about the functionality of the remote locator object includes a map with an indication of a location of the remote locator object in which the remote locator object is identified with the respective identifier and the name of the user of the device (720), such as in FIG. 6K (e.g., after completing the setup process for pairing the remote locator object with the electronic device, displaying a user interface with additional information about the functionality of the remote locator object). In some embodiments, the user interface with additional information includes an indication (e.g., title, label, etc.) that the user interface is referring to the just-paired remote locator object using the selected identifier (e.g., "John's Keys"). In some embodiments, the user interface with additional information includes a map of the current location of the remote locator object. In some embodiments, the map includes an indicator of the current location of the remote locator object and/or the current location of the electronic device. In some embodiments, the map includes the location of other objects that are being tracked by the electronic device (e.g., other remote locator objects, other devices, etc.). In some embodiments, the map only displays the current location of the remote locator object without displaying the location of other devices being tracked by the electronic device. In some embodiments, the indicator of the current location of the remote locator object is an icon representing the remote locator object (e.g., a key icon).

The above-described manner of completing setup of the remote locator object (e.g., by displaying a user interface with additional information for the remote locator object including a map of the current location of the remote locator object) provides the user with confirmation that the remote locator object has been successfully set up and its current location (e.g., by displaying the current location of the remote locator object, the selected identifier for the remote locator object, and information about associated functions that can be performed), which simplifies the interaction between the user and the electronic device and enhances the operability of the electronic device and makes the user-device interface more efficient (e.g., by displaying a confirmation page to the user where the user can visually confirm that set up is successful without requiring the user to navigate to a separate user interface to confirm that setup is successful), which additionally reduces power usage and improves battery life of the electronic device by enabling the user to use the electronic device more quickly and efficiency.

In some embodiments, the user interface with additional information about the functionality of the remote locator object includes information about a plurality of features of the remote locator object (722), such as in FIG. 6K (e.g., the user interface with additional information includes one or more indications of a plurality of features of the remote locator object). In some embodiments, the indications are selectable to perform an action corresponding to the respective feature of the remote locator object. In some embodiments, the plurality of features of the remote locator object include a feature for finding or otherwise locating the remote locator object using an application for tracking and finding devices. In some embodiments, the plurality of features of the remote locator object include a feature for managing notifications and/or alerts associated with the remote locator object including an alert that is displayed when the user is separated from the remote locator object. In some embodiments, the plurality of features of the remote locator object include a feature for managing trusted locations and/or people (e.g., such that the location of the remote locator object is shared with the trusted people and/or such that an alert is not generated if the remote locator object is separated from the user but is with the trusted people and/or trusted location).

The above-described manner of displaying features of the remote locator object (e.g., by displaying a user interface with information about the features of the remote locator object after the user completes setup of the remote locator object) allows the electronic device to inform the user of the major features that are available with the remote locator object in a single user interface after the user has completed setup (e.g., by displaying user interface with information about the plurality of features of the remote locator object), which simplifies the interaction between the user and the electronic device and enhances the operability of the electronic device and makes the user-device interface more efficient (e.g., by determining that the user likely wants information about the features of the remote locator object after the user successfully sets up and pairs the remote locator object), which additionally reduces power usage and improves battery life of the electronic device by enabling the user to use the electronic device more quickly and efficiency.

In some embodiments, the user interface with additional information about the functionality of the remote locator object includes information indicating that the remote locator object is detected as being in possession of the user of the device (724), such as in FIG. 6K (e.g., the user interface with additional information includes a text label of the current location of the remote locator object). In some embodiments, if the current location is within a threshold distance to the user (e.g., 3 feet, 5 feet, 10 feet), then the text label reads "With You" or any other suitable label that indicates that the object is in the possession of the user. In some embodiments, the text label of the current location of the remote locator object includes a text label that indicates the time at which the current location was updated and/or refreshed. For example, in some embodiments, the text label of the location refresh time reads "Seen Just Now" if the location was updated (e.g., refreshed) within a threshold time (e.g., 1 minute, 5 minutes, etc.). In some embodiments, if the refresh time was above a threshold time, then the location refresh time optionally indicates when the most recent refresh occurred (e.g., "Seen 5 Minutes Ago" or "Last Seen 5 Minutes Ago").

The above-described manner of displaying information about the functions of the remote locator object (e.g., by displaying that the remote locator object is in the possession of the user) allows the electronic device to indicate to the user that the remote locator object is properly tracking and/or reporting its location and the electronic device is properly receiving the remote locator object's location such that it is able to automatically determine that the remote locator object is with the user (e.g., by displaying an indication that the remote locator object is in the possession of the user), which simplifies the interaction between the user and the electronic device and enhances the operability of the electronic device and makes the user-device interface more efficient (e.g., by automatically determining and displaying that the remote locator object is with the user without requiring the user to separately determine that the location of the remote locator object is the same location as the user), which additionally reduces power usage and improves battery life of the electronic device by enabling the user to use the electronic device more quickly and efficiency.

In some embodiments, the user interface with additional information about the functionality of the remote locator object includes a selectable user interface object associated with an application corresponding to the remote locator object (726), such as in FIG. 6K (e.g., the user interface with additional information includes a selectable option that is selectable to launch or otherwise display an application for finding and tracking devices (e.g., including the remote locator object and optionally other electronic devices).). In some embodiments, the electronic device detects (728) selection of the selectable user interface object, and in response to detecting selection of the selectable user interface object, displays (730) a user interface for the application corresponding to the remote locator object, such as in FIG. 6K (e.g., replacing display of the additional information pane of the setup user interface and the background user interface such as the home screen or application that was running when the remote locator object was detected near the electronic device with the application corresponding to the remote locator object (e.g., the application for finding and tracking devices). In some embodiments, when the application for finding and tracking devices is displayed, the application is navigated to a user interface specific to the respective remote locator object (e.g., a user interface specific for viewing and/or managing the settings for the respective remote locator object).

The above-described manner of providing additional settings (e.g., by providing a selectable option for displaying an application corresponding to the remote locator object) provides the user with a quick setup process but also the option to adjust the more advanced settings for the remote locator object (e.g., by displaying the setup user interface to perform initial setup of the device, but provide a selectable option to display an application corresponding to the remote locator object in response to receiving a user's selection of a selectable option to display the user interface for the application corresponding to the remote locator object), which simplifies the interaction between the user and the electronic device and enhances the operability of the electronic device and makes the user-device interface more efficient (e.g., by providing the user with the ability to change additional settings after successfully setting up the remote locator device without requiring the user to manually navigate to the application corresponding to the remote locator object), which additionally reduces power usage and improves battery life of the electronic device by enabling the user to use the electronic device more quickly and efficiency.

In some embodiments, the electronic device detects (732), via the one or more wireless antenna, that a respective remote locator object is near (e.g., within 1 inch, 2 inches, 3 inches) the electronic device, wherein the respective remote locator object is associated with a respective user account, different than a user account associated with the electronic device, such as in FIG. 6R (e.g., the user performs an NFC tap gesture (using the electronic device) on a remote locator object that is owned/configured by another user or otherwise not associated with the user of the present electronic device). In some embodiments, in response to detecting that the respective remote locator object is near the electronic device, the electronic device displays (734), via the display device, an information user interface that indicates that the respective remote locator object is associated with a user account other than the user account associated with the electronic device, wherein the information user interface includes a first selectable option that is selectable to request, from the respective user account, to share, with the user account associated with the electronic device, access to the respective remote locator object, such as in FIG. 6R (e.g., displaying a user interface, different from the setup user interface, on the electronic device corresponding to the remote locator object). In some embodiments, the user interface includes a selectable option to request sharing of the remote locator object from the owner of the remote locator object (e.g., the user account with which the remote locator object is configured). In some embodiments, requesting sharing causes a notification to be displayed on the electronic device of the owner of the remote locator object. In some embodiments, the owner of the electronic device is able to accept the sharing request and set the amount of time to share the remote locator object with the user for a predetermined amount of time, similar to the method of sharing remote locator objects described above. In some embodiments, after sharing the remote locator object with the user, the user is able to view and/or track the location of the remote locator object (e.g., using the application for tracking and locating objects) via the electronic device.

The above-described manner of requesting sharing of a remote locator object (e.g., by displaying a user interface with a selectable option for requesting sharing of a remote locator object from the owner of the remote locator object) allows for a quick and efficient request for sharing of a remote locator object from the owner of the remote locator object, which simplifies the interaction between the user and the electronic device and enhances the operability of the electronic device and makes the user-device interface more efficient (e.g., by providing a quick method of sharing the remote locator object with the user without requiring the owner of the remote locator object to navigate to a separate user interface and manually share the remote locator object with the user), which additionally reduces power usage and improves battery life of the electronic device by enabling the user to use the electronic device more quickly and efficiency.

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300 and 1400) are also applicable in an analogous manner to method 700 described above with respect to FIGS. 7A-7D. For example, initializing the remote locator object described above with reference to method 700 optionally have one or more of the characteristics of presenting separation notifications, presenting tracking notifications, and finding a remote locator object, etc., described herein with reference to other methods described herein (e.g., methods 900, 1100, 1300 and 1400). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7D are, optionally, implemented by components depicted in FIGS. 1A-1B. For example, displaying operations 704, 706, 710, 730, and 734, detecting operations 702, 708, 728, and 732 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Notification of Separation from a Remote Locator Object

Users interact with electronic devices in many different manners. In some embodiments, an electronic device is able to track the location of an object such as a remote locator object. In some embodiments, the remote locator object, which supports location tracking functions, can be attached to items that do not support location tracking functions. The embodiments described below provide ways in which an electronic device provides an alert that a remote locator object that is associated with the user has become separated from the user, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
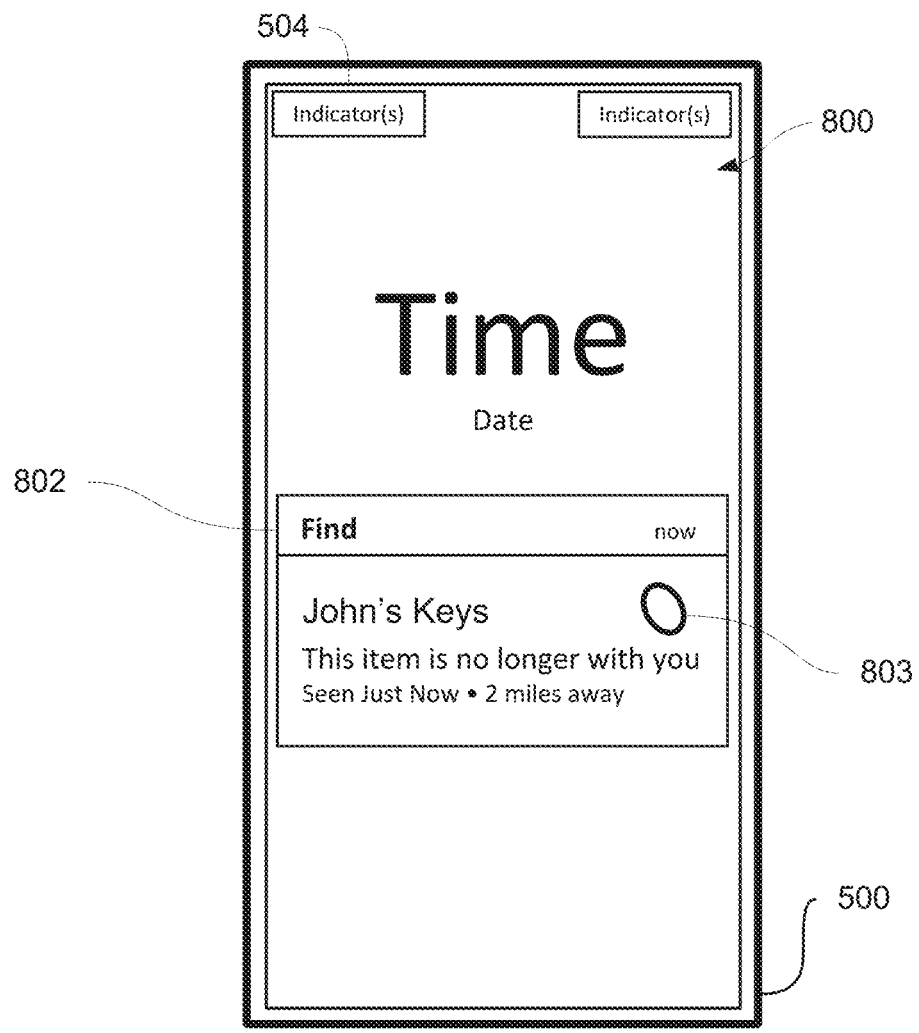
FIGS. 8A-8P illustrate exemplary ways in which an electronic device displays notifications of a separation with a remote locator object in accordance with some embodiments of the disclosure.
Figure 8B:
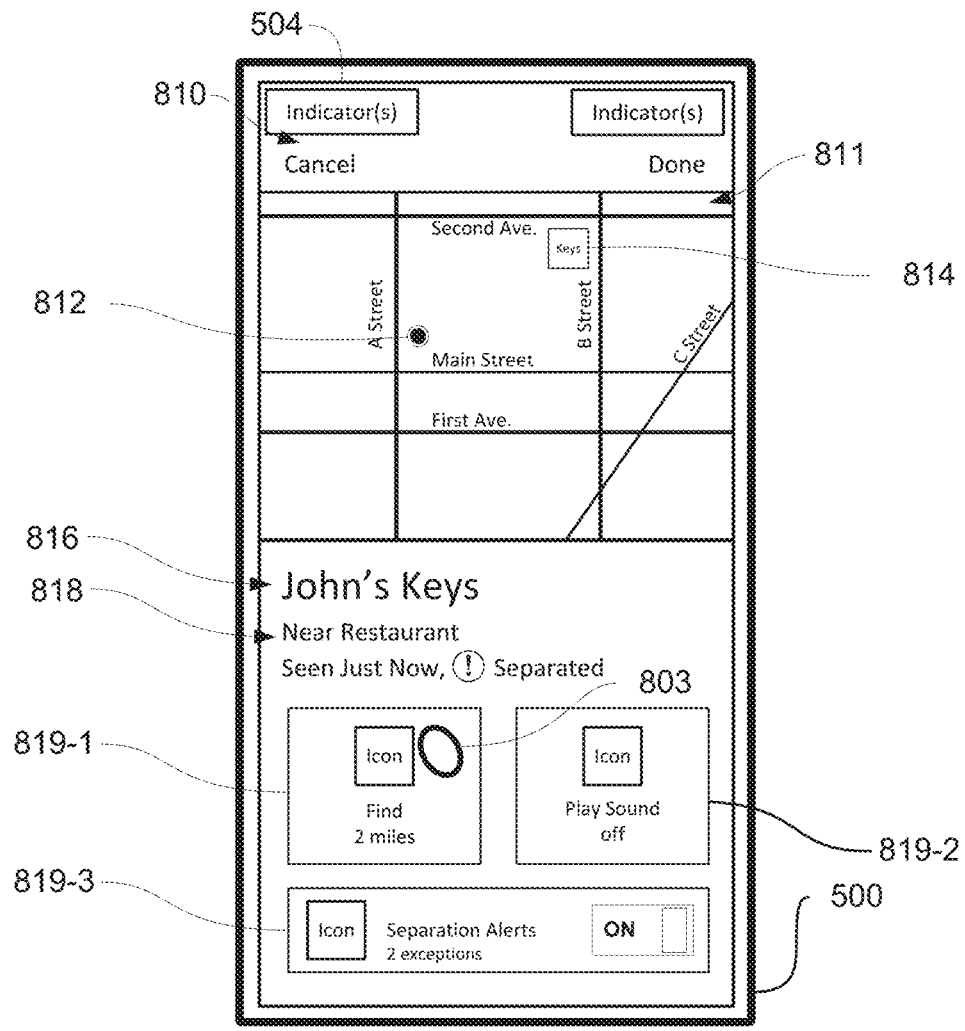
Figure 8C:
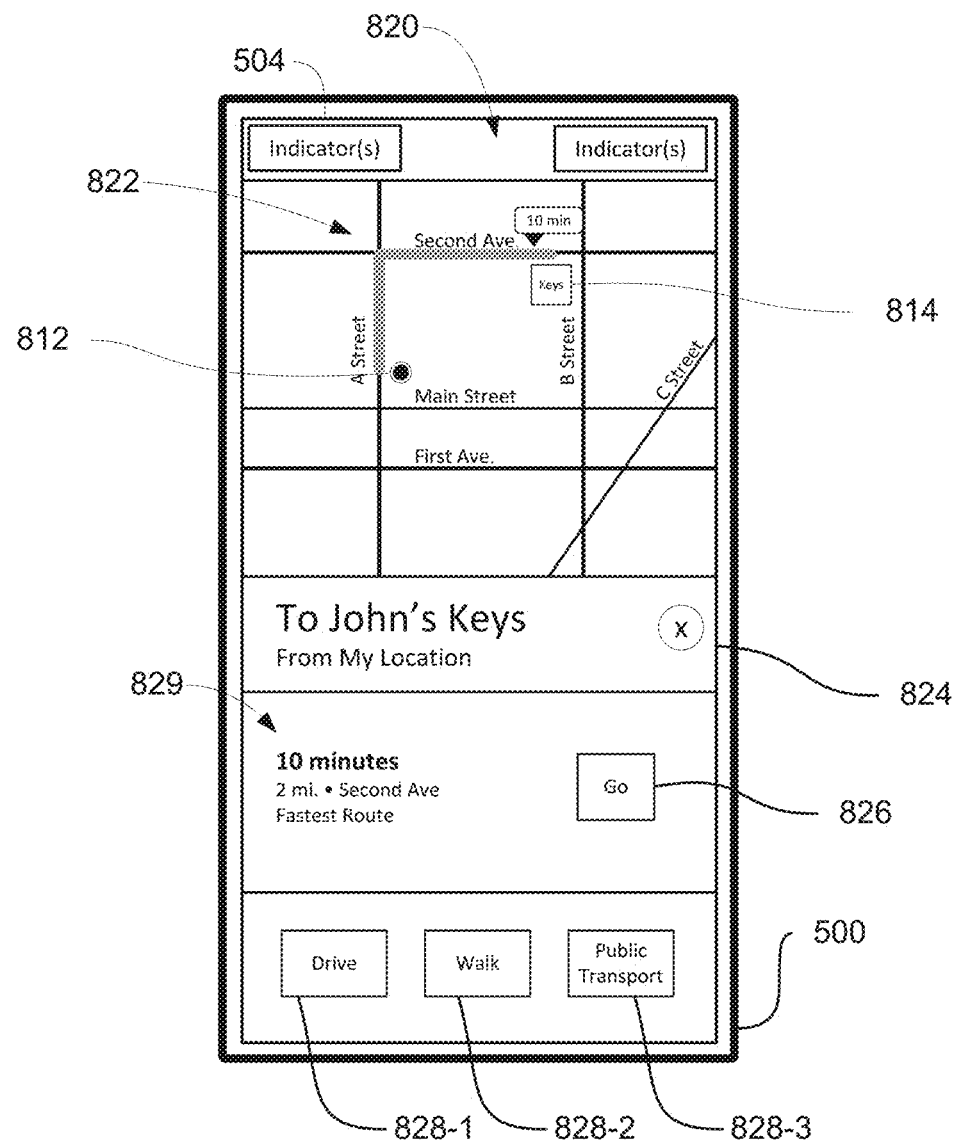
Figure 8D:
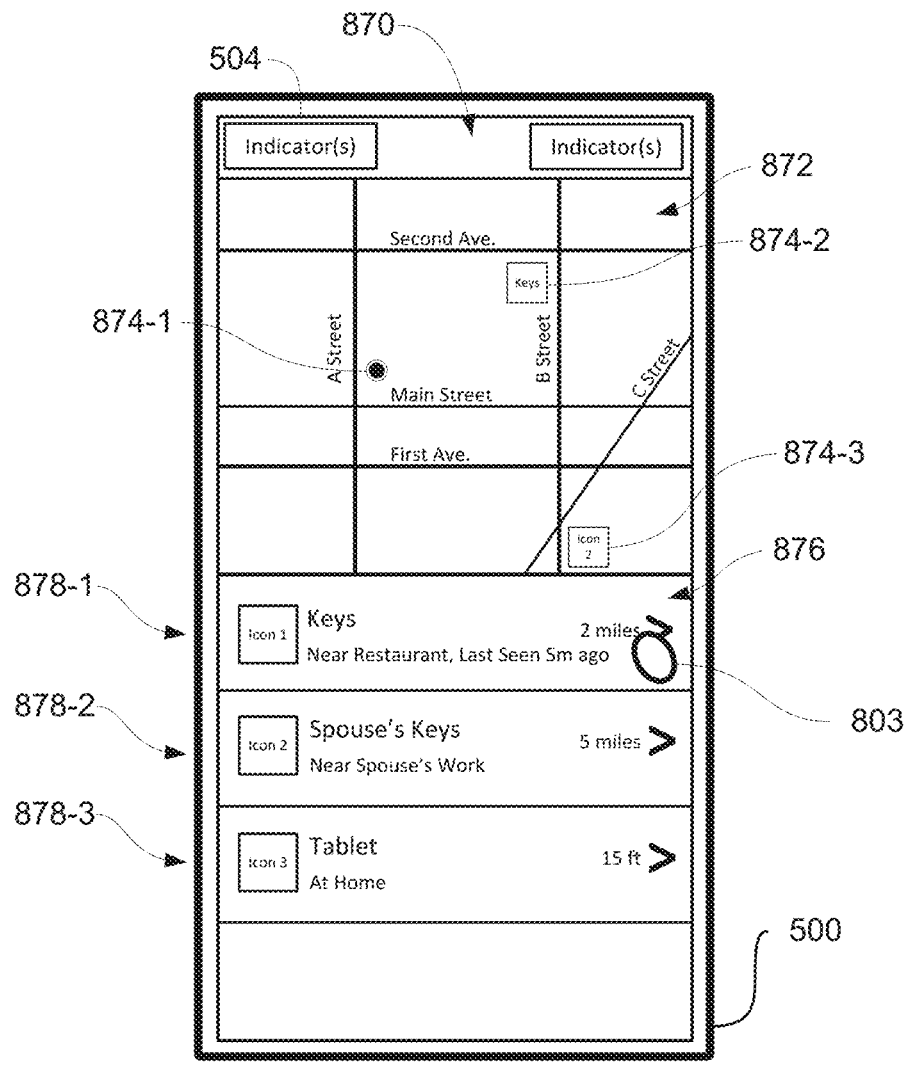
Figure 8E:
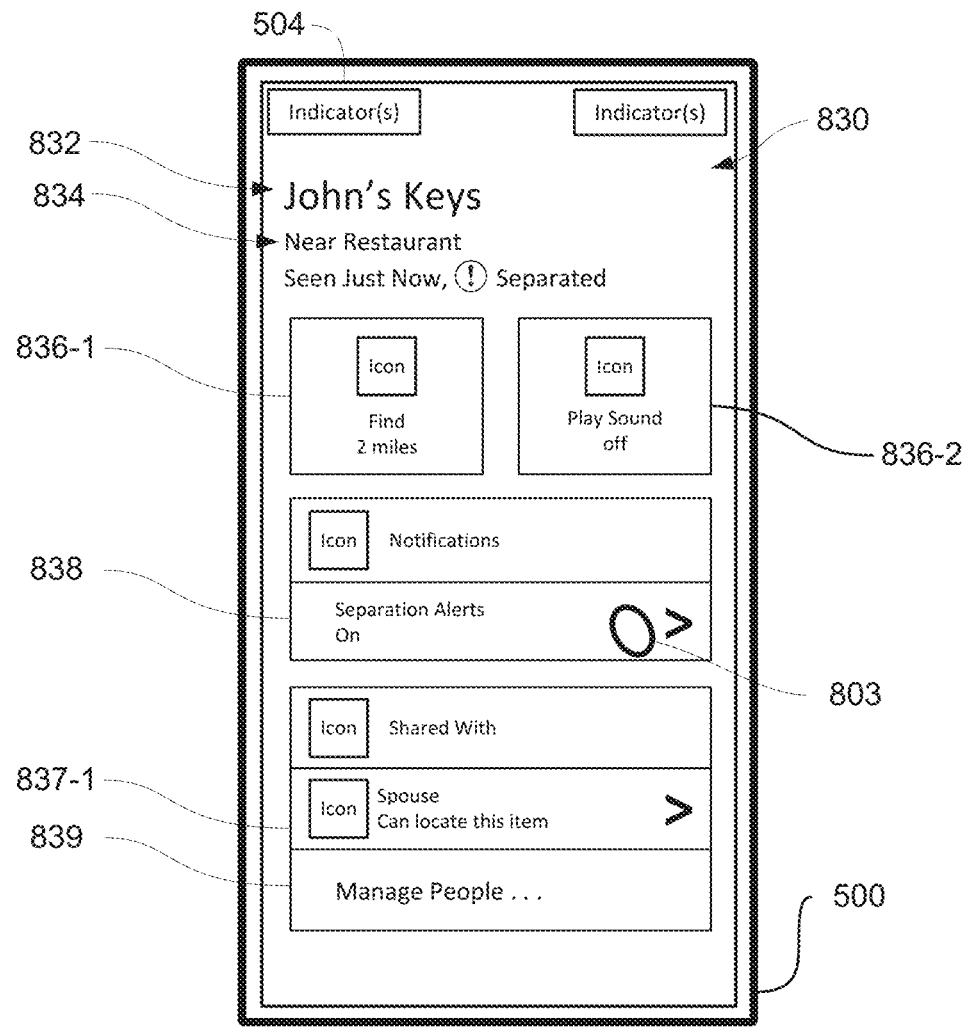
Figure 8F:
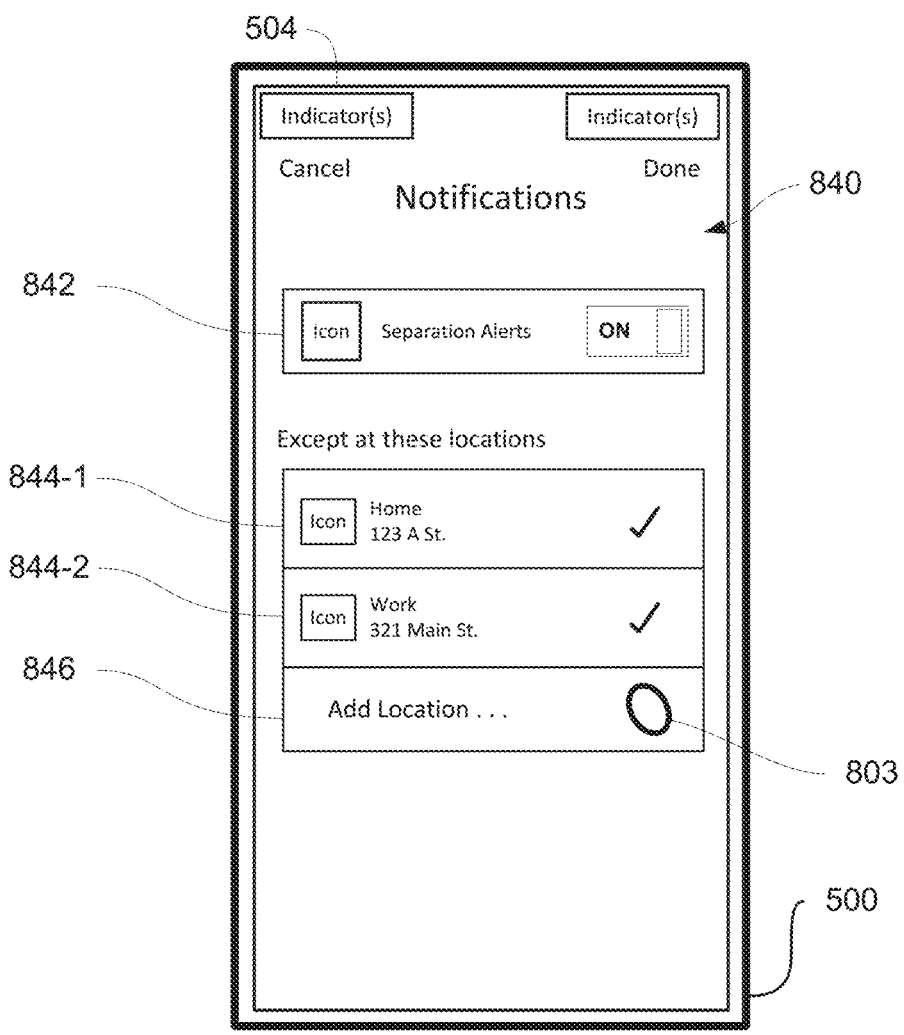
Figure 8G:
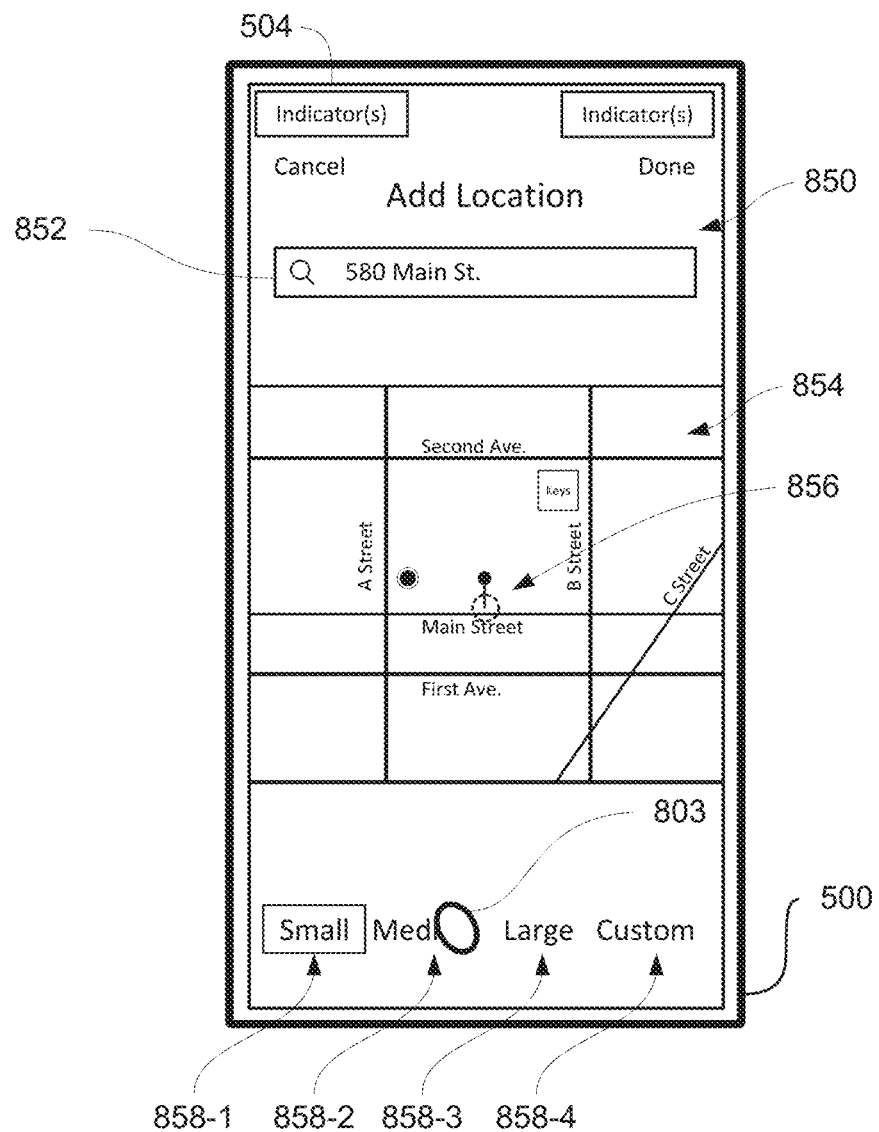
Figure 8H:
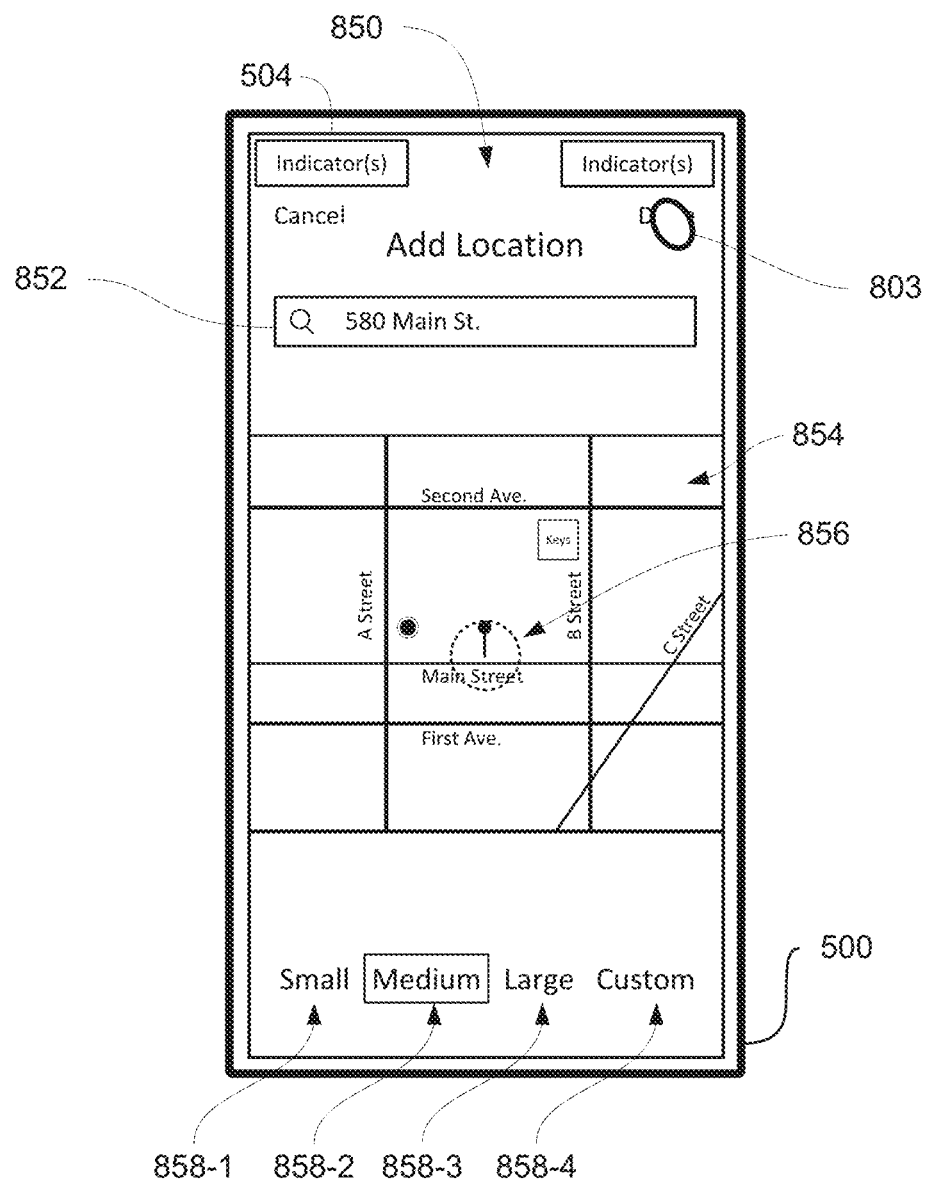
Figure 8I:
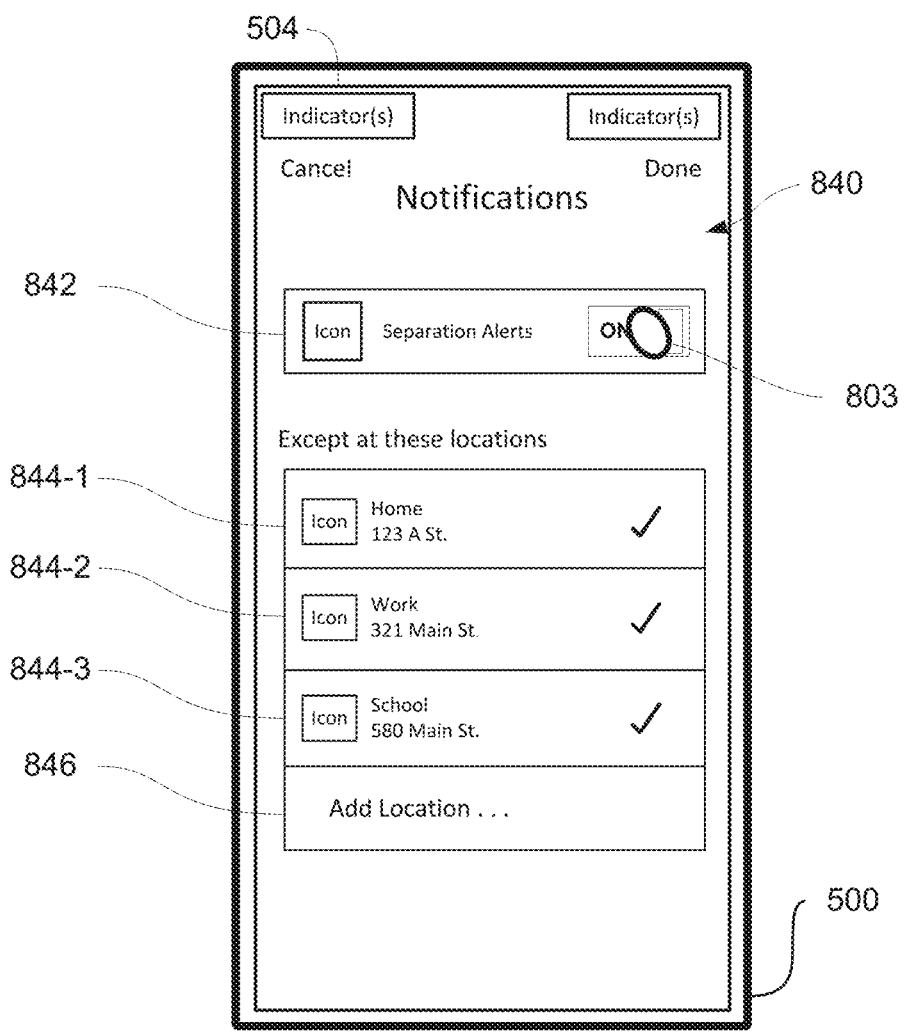
Figure 8J:
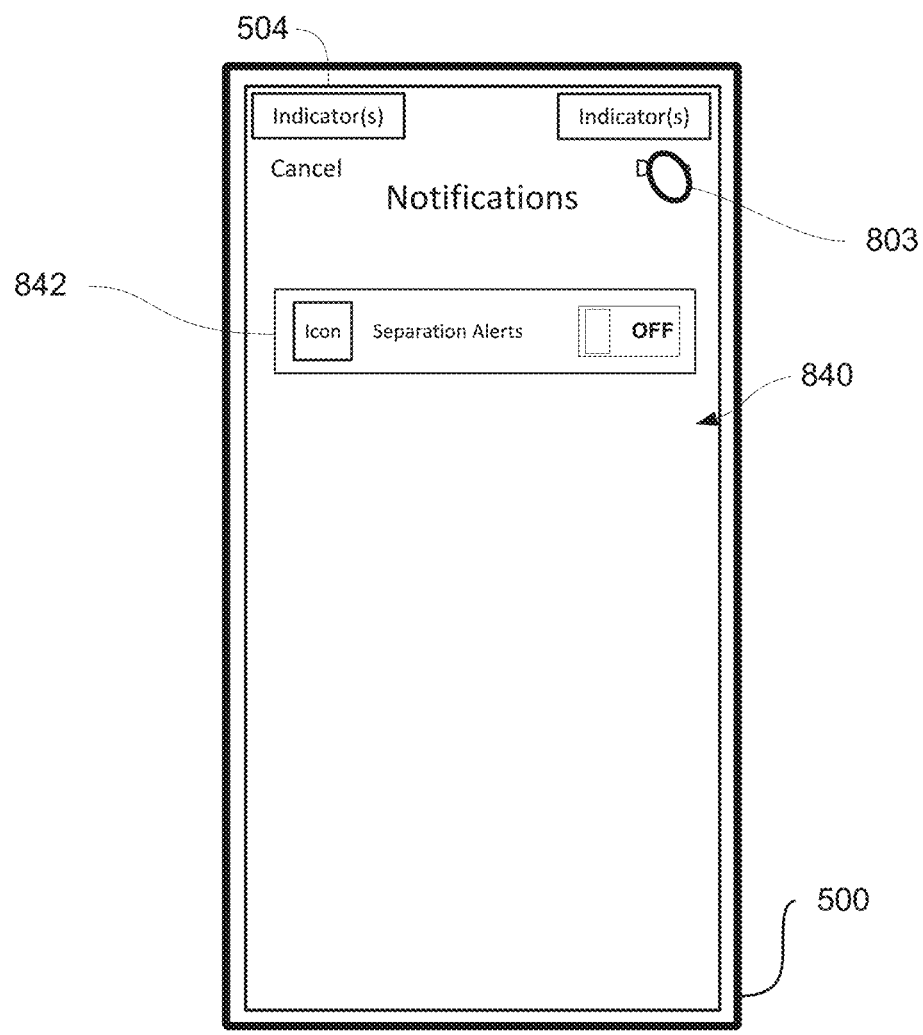
Figure 8K:
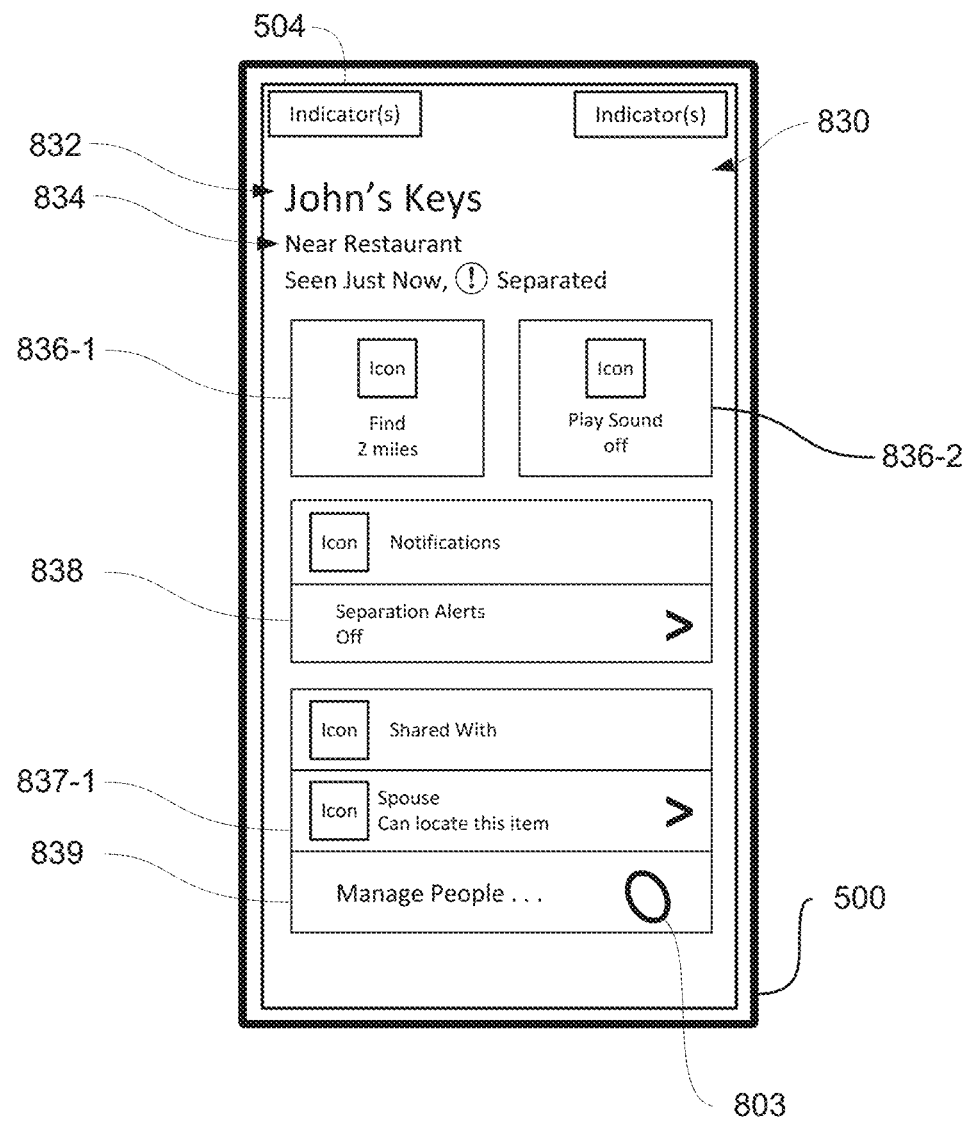
Figure 8L:
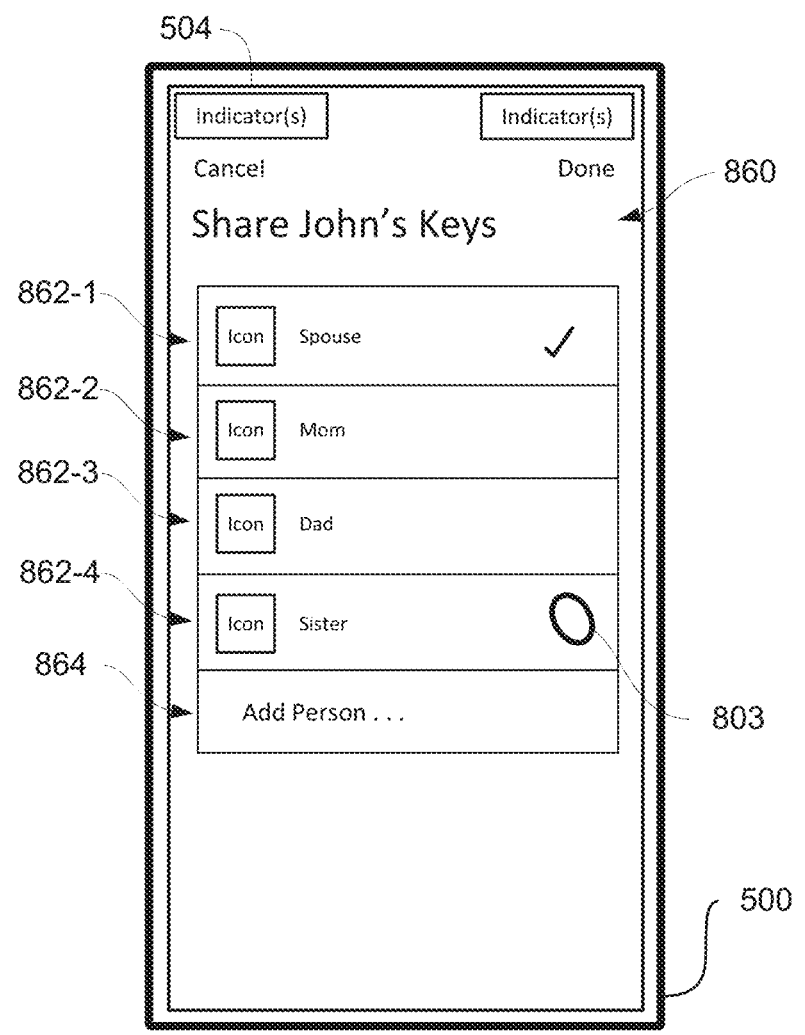
Figure 8M:
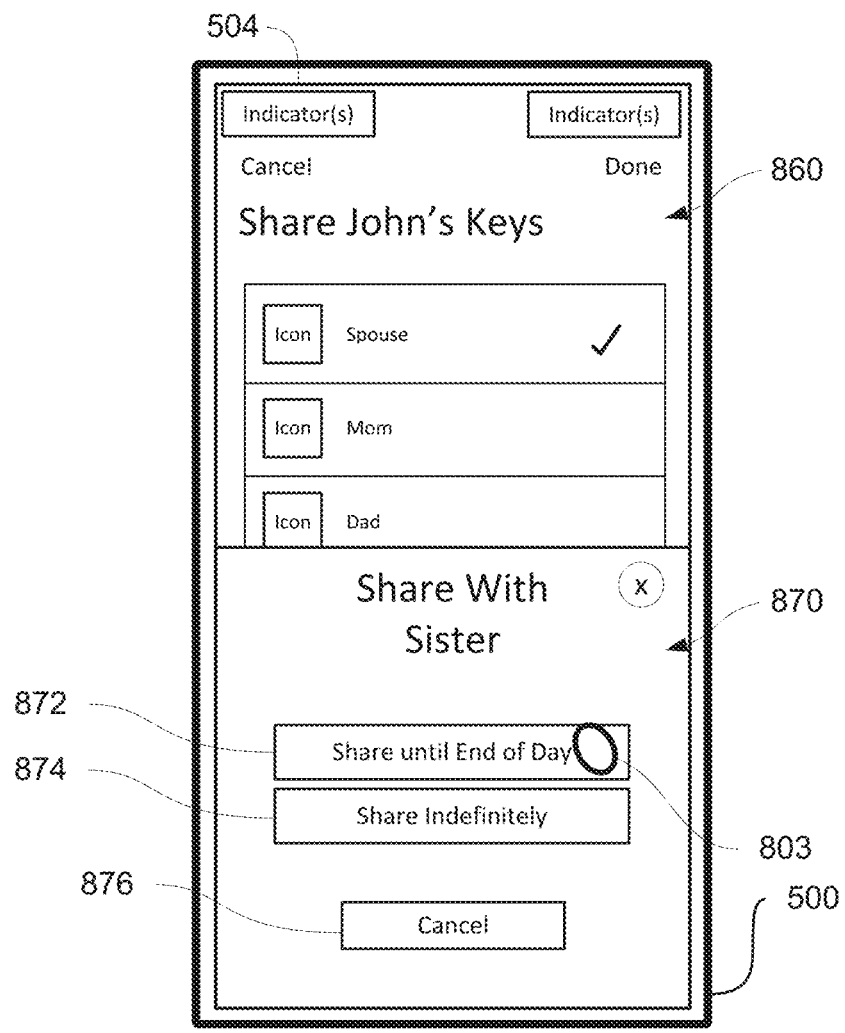
Figure 8N:
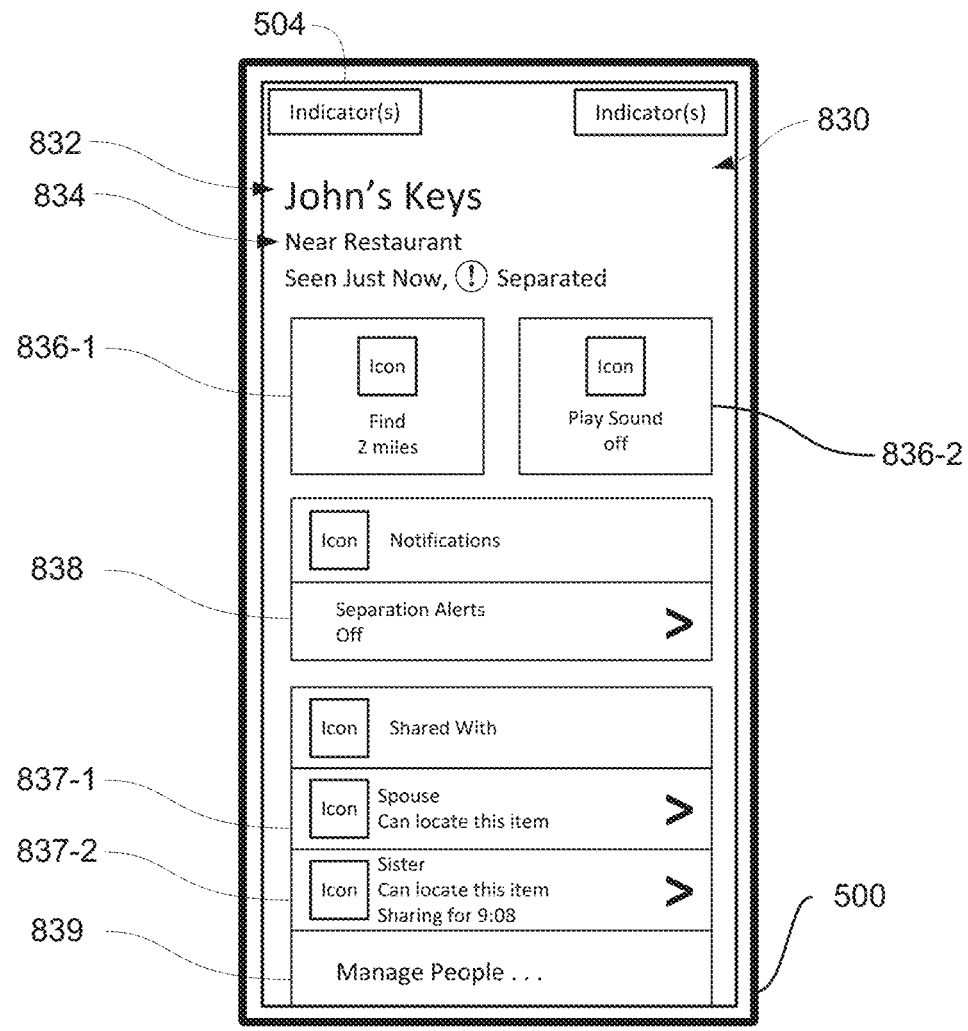
Figure 8O:
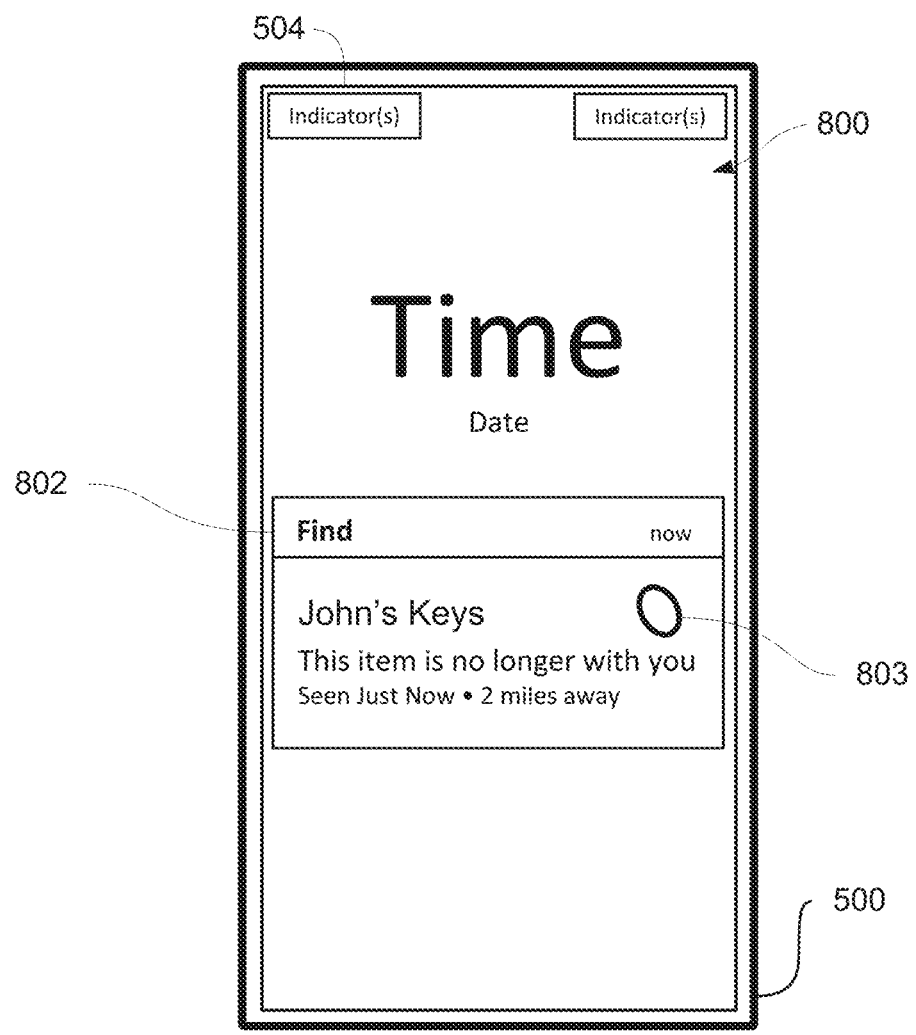
Figure 8P:
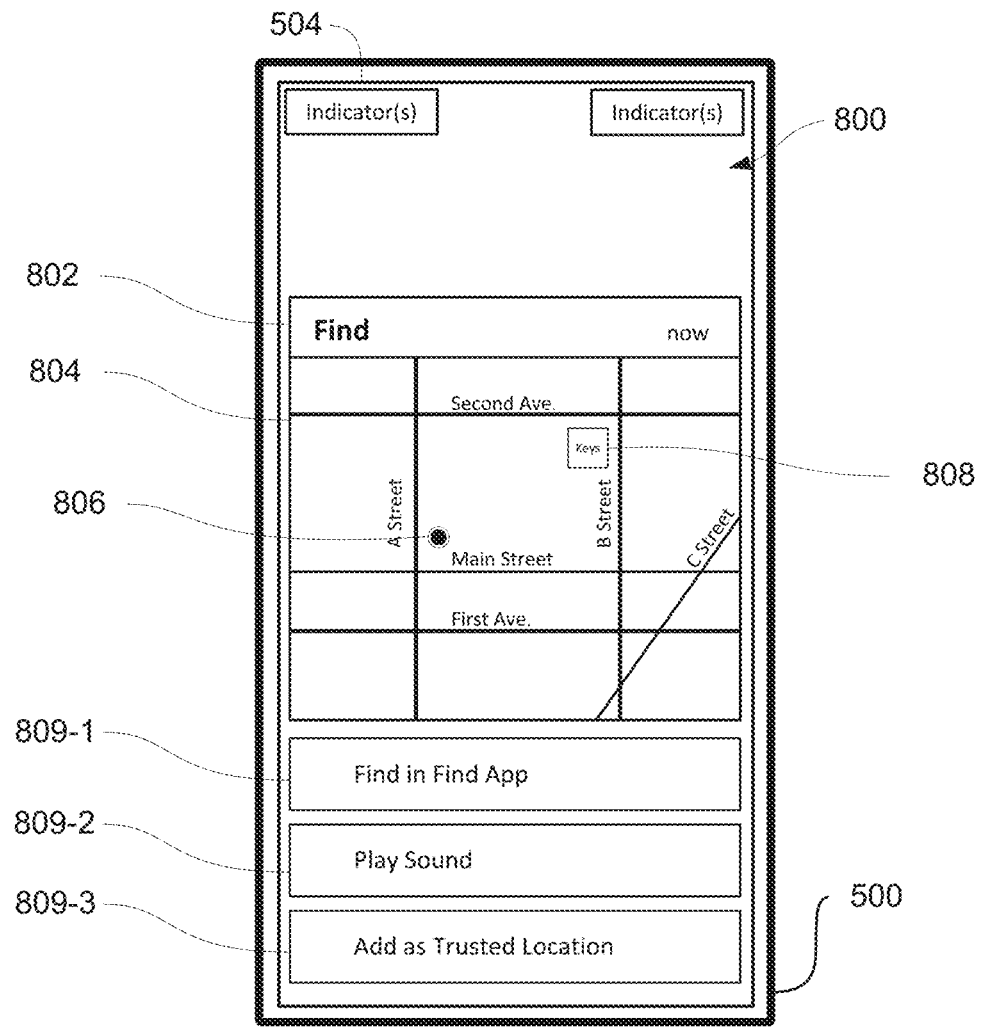
Figure 9B:
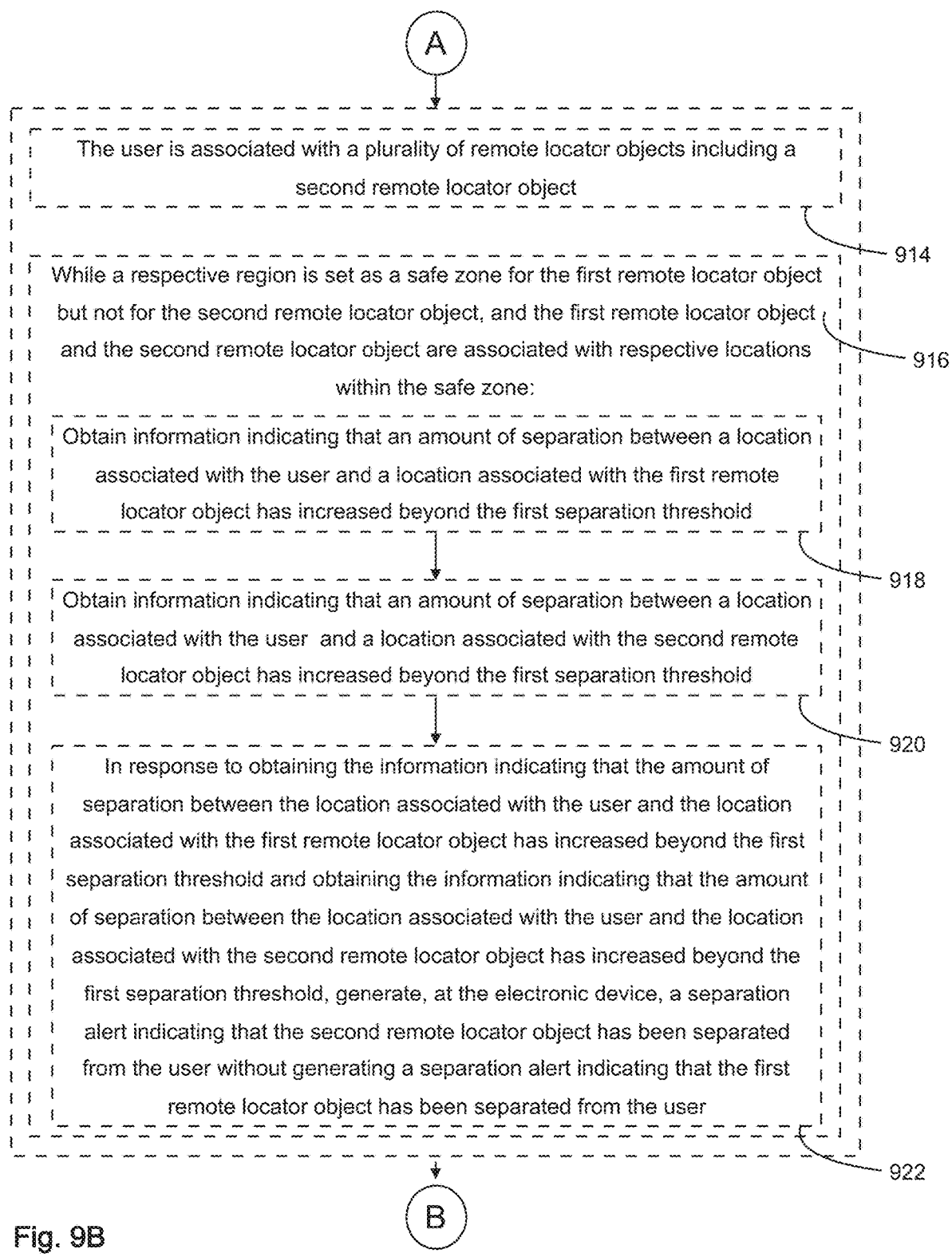
Figure 9C:
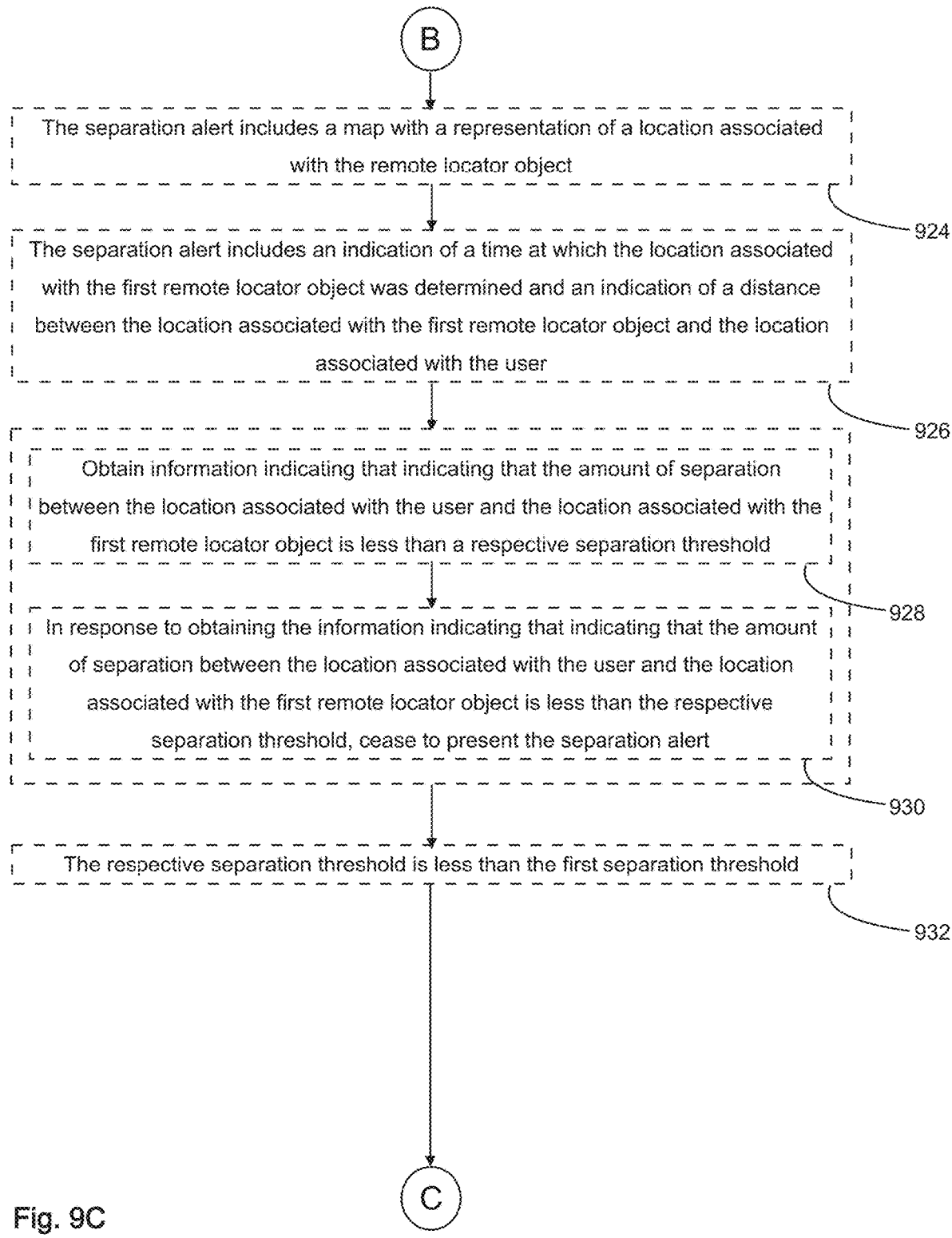
Figure 9D:
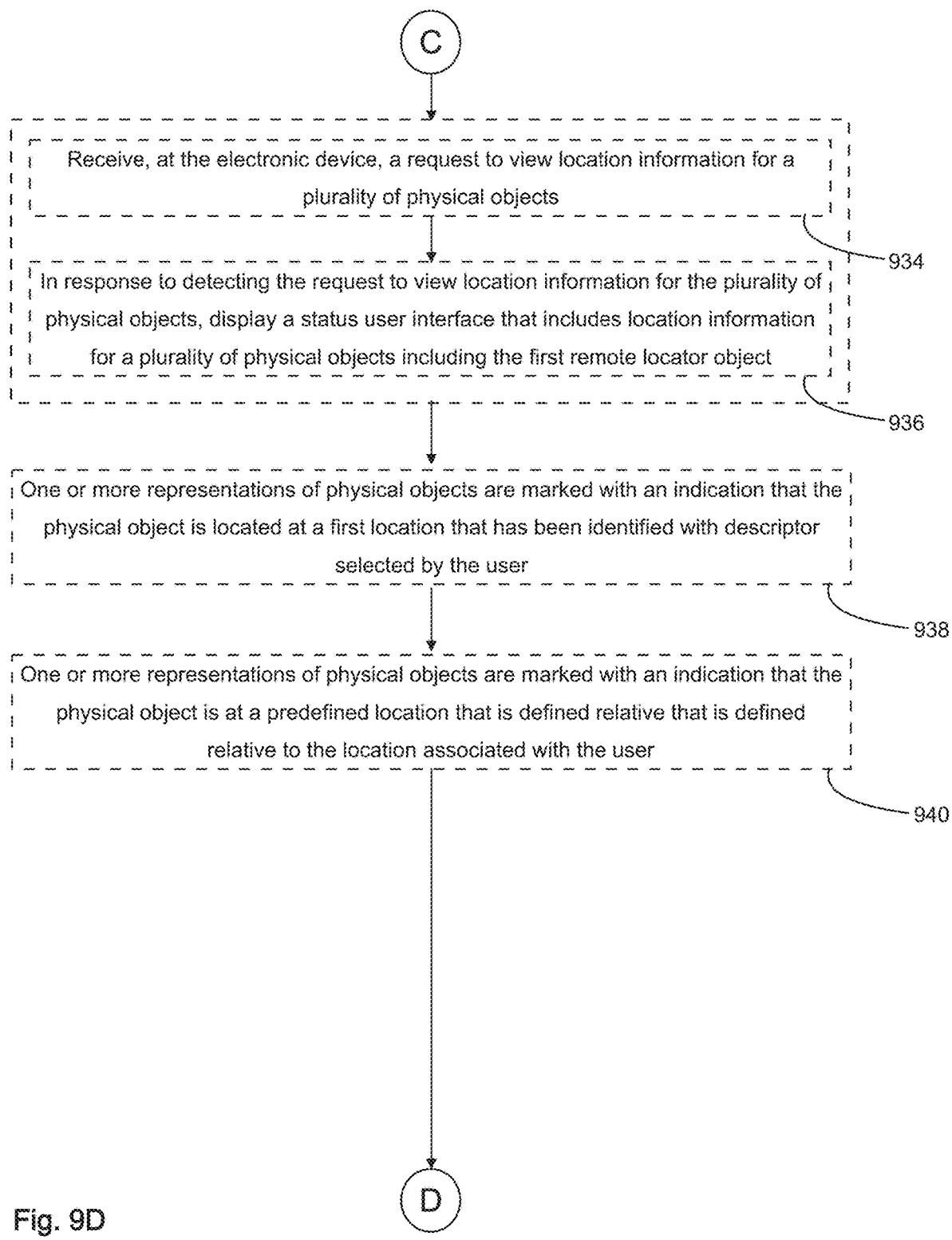
Figure 9F:
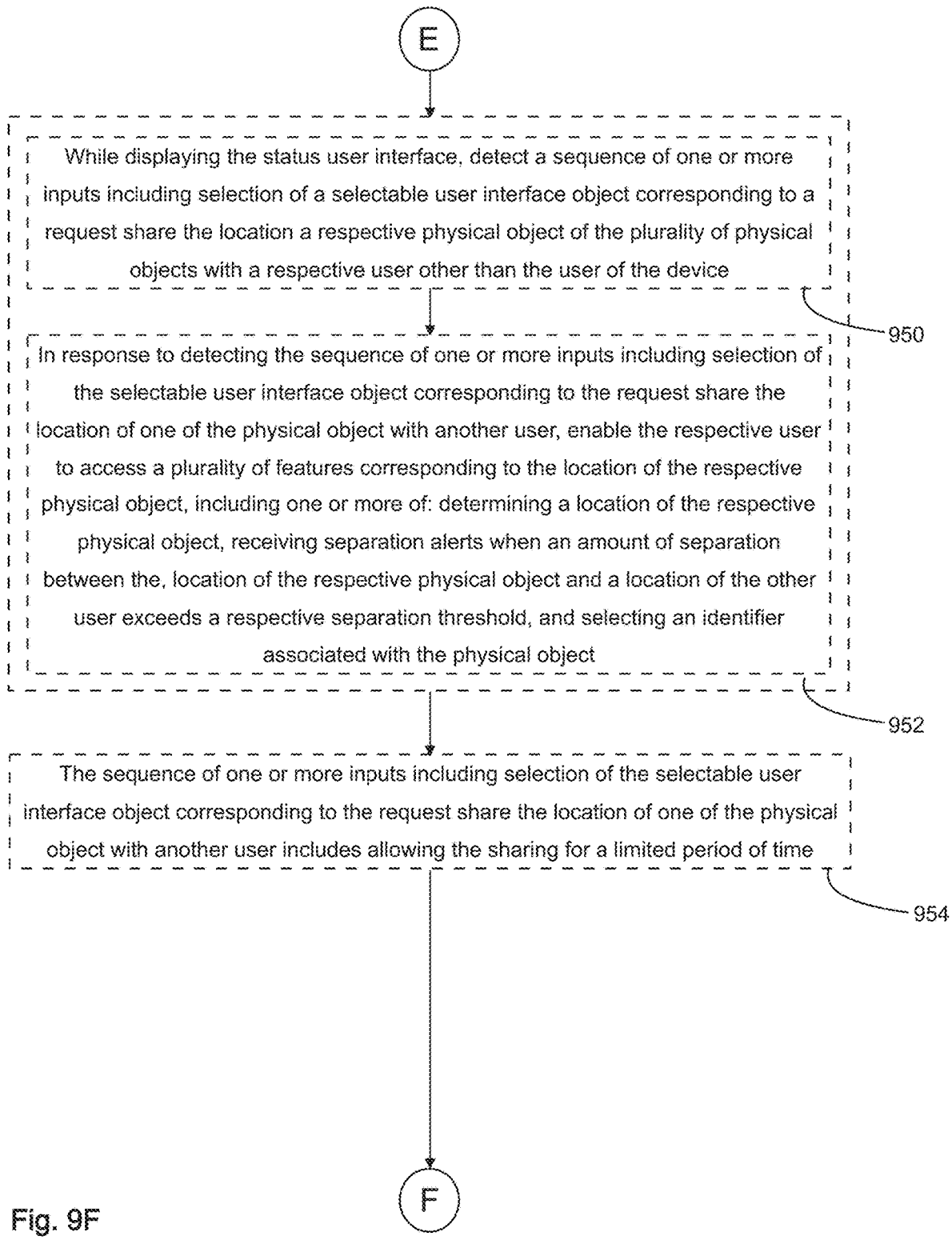
Figure 9G:
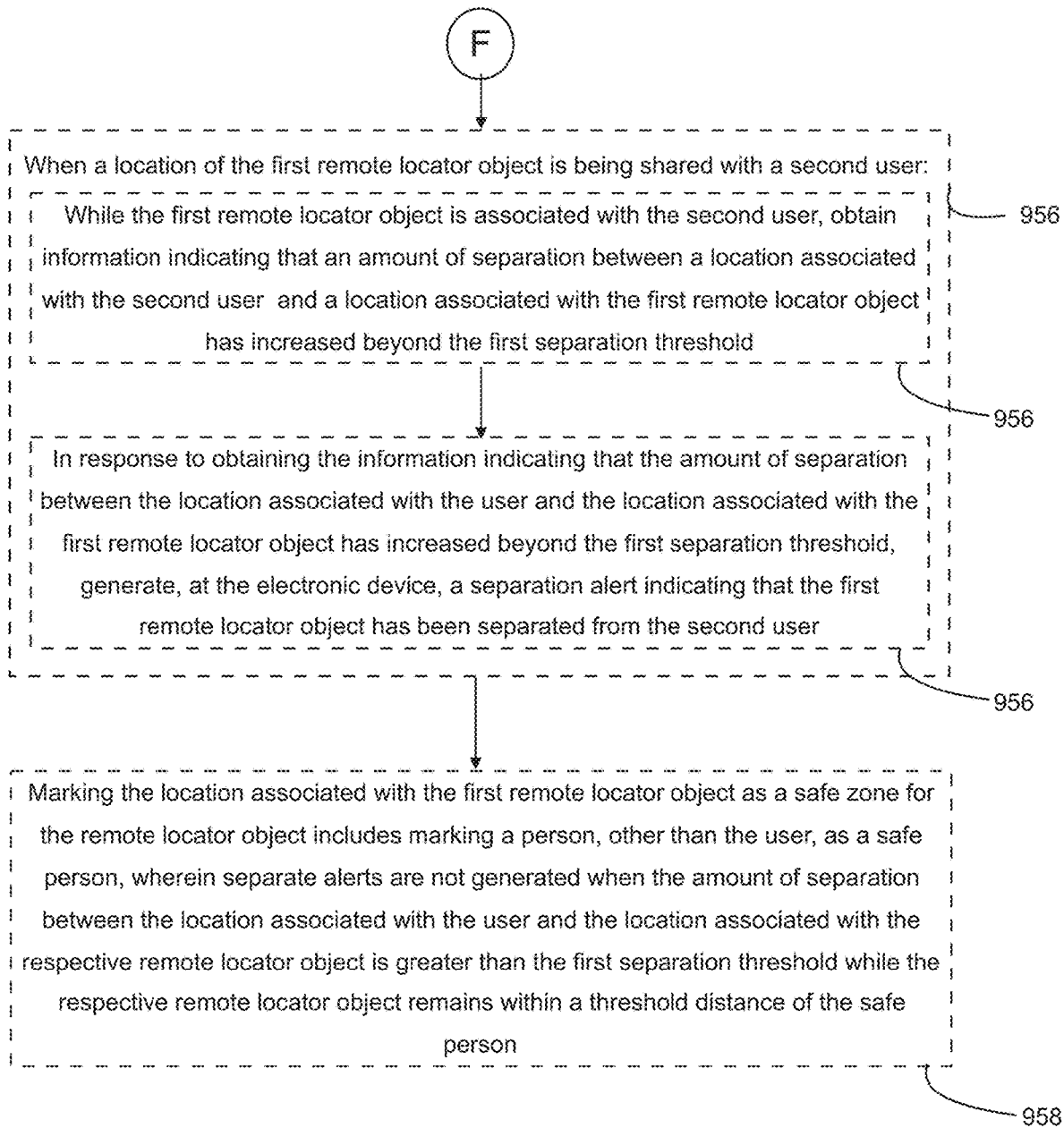

FIGS. 8A-8P illustrate exemplary ways in which an electronic device displays notifications of a separation with a remote locator object in accordance with some embodiments of the disclosure. The embodiments in these figures are used to illustrate the processes described below, including the processes described with reference to FIGS. 9A-9G.

FIGS. 8A-8P illustrate an electronic device 500 displaying notifications of a separation with a remote locator object. FIG. 8A illustrates an exemplary device 500 that includes touch screen 504. As shown in FIG. 8A, the electronic device 500 presents a lock screen user interface 800 (e.g., a wake screen user interface). In some embodiments, lock screen user interface 800 is the user interface that is displayed when electronic device 500 is awoken (e.g., from a sleep (low power) or locked state). In some embodiments, lock screen user interface 800 includes notification 802. In some embodiments, notification 802 notifies the user that a respective remote locator object (e.g., as described with reference to method 700) labeled as "Keys" has become separated from the user and is no longer with the user. In some embodiments, notification 802 includes the label of the remote locator object (e.g., "John's Keys"). In some embodiments, notification 802 displays location information such as the distance from the user to the determined location of the remote locator object (e.g., 2 miles) and when the most recent location update occurred (e.g., "Just Now").

In some embodiments, notification 802 is displayed when electronic device 500 (e.g., or a server) determines that the remote locator object is separated from the user. For example, in some embodiments, if remote locator object is a threshold distance away from the user (e.g., 10 feet, 50 feet, 100 feet, 1 mile, etc.), then electronic device 500 triggers notification 802 to notify the user that the user is separated from remote locator object.

As described above with reference to method 700, in some embodiments, the remote locator object is capable of updating, receiving, and/or transmitting location data to a server via an electronic device even though the remote locator object has not been paired with the respective electronic device (e.g., another user's mobile phone who passed by the remote locator object, etc.). Thus, it is possible for the remote locator object to update its location information even though the remote locator object is separated from electronic device 500. It is understood that although notification 802 is illustrated as displayed on lock screen user interface 800, notification 802 can be displayed on other user interfaces (e.g., in all situations in which other notifications can be displayed).

In some embodiments, if electronic device 500 moves within the threshold distance of the respective remote locator object, then notification 802 is dismissed or otherwise removed from display on electronic device 500. In some embodiments, the threshold distance that triggers display of notification 802 includes a hysteresis such that a certain threshold distance is required to trigger the notification while a second, smaller, threshold distance is required to automatically dismiss the notification.

In FIG. 8A, user input 803 selecting notification 802 is received (e.g., a tap on the touch screen directed to notification 802). In some embodiments, in response to the user input, device 500 displays user interface 810, as shown in FIG. 8B. In some embodiments, user interface 810 is a user interface for the application for tracking and finding items (e.g., "Find" app) that is specific to the respective remote locator object. In some embodiments, user interface 810 includes map 811 that displays the determined location of the respective remote locator object. In some embodiments, map 811 displays icon 812 corresponding to the current location of electronic device 500 (e.g., the current location of the user) and icon 814 corresponding to the current location of respective remote locator object.

In some embodiments, user interface 810 includes label 816 indicating the remote locator object that is being displayed on user interface 810 (e.g., the remote locator object, "John's Keys"). In some embodiments, user interface 810 includes label 818 that indicates the location status of the remote locator object. In some embodiments, the location status of the remote locator object is that it is farther than a threshold distance from the user such that a "Separated" label is displayed. In some embodiments, label 818 additionally or alternatively includes an indication of when the location of the remote locator object was most recently updated. For example, as shown in FIG. 8B, the location data of the remote locator object was updated "just now" (e.g., within 1 second, 30 seconds, 1 minute, 2 minutes, etc.). In some embodiments, label 818 includes a description of the location nearest where remote locator object is located. For example, as shown in FIG. 8B, the remote locator object is determined to be "Near Restaurant".

In some embodiments, user interface 810 includes selectable option 819-1 and selectable option 819-2 corresponding to the functions available for the remote locator object. In some embodiments, selection of selectable option 819-1 causes display of a user interface to find remote locator object (e.g., similar to the processes described below with respect to methods 1300 and 1400). In some embodiments, selection of selectable option 819-2 causes the remote locator object to emit an audible tone. In some embodiments, selectable option 819-2 is a toggle button and the remote locator object will continuously emit the audible tone until electronic device 500 receives a second user input selecting selectable option 819-2 to disable the audible tone. In some embodiments, selectable option 819-2 is not a toggle button and the remote locator object emits an audible tone for as long as the user is selecting selectable option 819-2. Thus, in some embodiments, the remote locator object will only emit an audible tone while the user is selecting selectable option 819-2.

In some embodiments, user interface 810 includes toggle 819-3 that is selectable to toggle separation alerts on or off.

For example, selection of selectable option 819-3 when separation alerts are enabled causes separation alerts to be disabled and selection of selectable option 819-3 when separation alerts are disabled causes separation alerts to be enabled. In some embodiments, selectable option 819-3 indicates the number of exceptions (e.g., trusted locations) that exist for triggering separation alerts (e.g., notification 802). In some embodiments, the trusted locations (e.g., exceptions) are specific to each remote locator object that is tracked such that a different set of trusted locations are maintained for each remote locator object. It is understood that a trusted person is also able to be added as an exception for triggering separation alerts. For example, a user is able to add another user (e.g., "trusted user") such that when the remote locator object is separated from the user but is with the trusted user, separation alerts are not generated for the user. The details of trusted locations are described below with respect to FIGS. 8E-8I.

In FIG. 8B, user input 803 is received selecting selectable option 819-1. In some embodiments, in response to the user input, device 500 enters into a finding mode and displays user interface 820, as shown in FIG. 8C. In some embodiments, based on the distance to the remote locator object, device 500 enters into a first finding mode (e.g., a map-based finding mode for long distances) or a second finding mode (for short distances) (e.g., similar to the processes described below with respect to methods 1300 and 1400). In FIG. 8C, device 500 enters into the first finding mode corresponding to finding the remote locator object using navigation with a map application. In FIG. 8C, user interface 820 is a user interface for a map that is displaying directions to the location of the remote locator object from device 500's current location. In some embodiments, the map displays icon 812 corresponding to the user's current location, icon 814 corresponding to the determined location of the remote locator object (e.g., "Keys"), and route 822 corresponding to the path to take to reach the remote locator object. In some embodiments, user interface 820 includes card 824 for configuring the navigation mode and initiating navigation. In some embodiments, card 824 includes description 829 and selectable option 826. In some embodiments, description 829 includes information on the route's distance, the length of time of travel, whether the route is the fastest route, etc. In some embodiments, selectable option 826 is selectable to begin navigation to the remote locator object. In some embodiments, card 824 includes selectable options 828-1, 828-2, and 828-3 to change the navigation mode. For example, selectable option 828-1 is selectable to set the navigation for driving directions, selectable option 828-2 is selectable to set the navigation for walking directions, and selectable option 828-3 is selectable to set the navigation for public transportation directions.

FIGS. 8D-8J illustrate an exemplary process of managing separation alerts for a remote locator object. FIG. 8D illustrates user interface 870 corresponding to a home screen for the application for tracking and finding items. In some embodiments user interface 870 is similar to user interface 670 described above with respect to FIG. 6N. In FIG. 8D, while displaying user interface 870, user input 803 is detected selecting item 878-1 corresponding to the remote locator objector labeled "Keys". In some embodiments, in response to user input 803, device 500 displays user interface 830, as shown in FIG. 8E. In some embodiments, user interface 830 is similar to user interface 660 described above with respect to FIG. 6L.

In some embodiments, user input 803 is detected selecting selectable option 838 for setting the separation alert settings of the respective remote locator object. In some embodiments, in response to user input 803, device 500 displays user interface 840, as shown in FIG. 8F.

In some embodiments, user interface 840 provides the user with options for modifying the notification settings for the respective remote locator object (e.g., John's Keys). For example, in some embodiments, user interface 840 includes toggle 842 for toggling on or off (e.g., enabled or disabled) separation alerts (e.g., such as notification 802). In some embodiments, user interface 840 displays a list of locations that have previously been set as trusted locations for the respective remote locator object (e.g., or optionally for other remote locator objects), such as location 844-1 and location 844-2.

In some embodiments, if no locations have been set as trusted locations, then user interface 840 includes only selectable option 846 for adding trusted locations. In some embodiments, as shown in FIG. 8F, user interface 840 displays trusted location 844-1 and trusted location 844-2. In some embodiments, the listing of the trusted locations includes an icon (e.g., a map icon) representing the trusted location, a label for the trusted location (e.g., "Home" or "Work") that is optionally selected by the user, and an indication that the trusted location is currently enabled (e.g., check mark). In some embodiments, trusted location 844-1 and trusted location 844-2 is selectable to enable or disable the trusted location. In some embodiments, when the trusted location is disabled, the check mark is removed from display to indicate that the trusted location is not currently enabled. As described above, a trusted location is one in which notifications are not triggered if the remote locator object is farther than a threshold distance from the user, but within a predetermined radius/distance of the trusted location. In some embodiments, if selectable option 842 is toggled off, then user interface 840 does not display the options for trusted locations (as will be described below with respect to FIG. 8J).

In FIG. 8F, user input 803 is detected selecting selectable option 846 for adding new trusted locations. In some embodiments, in response to user input 803, device 500 displays user interface 850 for adding a new trusted location, as shown in FIG. 8G. In some embodiments, user interface 850 displays text entry field 852 in which a user is able to enter in an address and add the trusted location via address entry. In some embodiments, user interface 850 includes map 854. In some embodiments, map 854 includes pin 856, which the user is able to interact with and move around the map. In some embodiments, the trusted location can be added by moving pin 856 to the desired location and setting the location as the trusted location (e.g., by clicking the "Done" affordance). In some embodiments, pin 856 is fixed to the center of map 854 and the user is able to set the trusted location by panning the map such that the pin is at the intended location.

In some embodiments, user interface 850 includes radius options 858-1 to 858-4. In some embodiments, the user can select the radius for the trusted location. For example, the user can select a small (e.g., selectable option 858-1 for 50 feet, 100 feet, 200 feet, etc.), medium (e.g., selectable option 858-2 for 100 feet, 200 feet, 500 feet, etc.), or large radius (e.g., selectable option 858-3, 400 feet, 600 feet, 1000 feet, etc.) around the trusted location in which separation notifications are not triggered. In some embodiments, the user can select selectable option 858-4 to provide a custom radius for the trusted location. In some embodiments, map 854 displays a visual indication of the radius selected by the user (e.g., shown as a dotted circle around pin 856). As shown in FIG. 8G, selectable option 858-1 corresponding to a small radius is currently selected. In FIG. 8G, user input 803 selecting selectable option 858-2 corresponding to the medium radius is received. In some embodiments, in response to the user input, as shown in FIG. 8H, map 854 is updated to reflect the selected radius size. As shown in FIG. 8H, the dotted circle around pin 856 is now a "medium" size. In some embodiments, the user is able to perform a pinch gesture on map 854 to enlarge or reduce the size of the dotted circle and provide a custom radius. In some embodiments, in response to the user's gesture enlarging or reducing the size of the dotted circle, device 500 automatically moves the radius selection to selectable option 858-4 corresponding to the custom radius option.

In FIG. 8I, after the user has successfully added a new trusted location, the new trusted location is displayed in user interface 840 (e.g., trusted location 844-3). It is understood that the set of trusted locations are specific to the respective remote locator object and each remote locator object maintains its own set of trusted locations. In FIG. 8I, a user input 803 is detected selecting toggle 842. In some embodiments, in response to the user input, separation alerts are disabled entirely for the respective remote locator object (e.g., but not for other remote locator objects for which separation alerts have not been disabled). In some embodiments, in response to the user input, device 500 updates user interface 840 to remove display of the listing of trusted locations, as shown in FIG. 8J. In some embodiments, in response to the user re-enabling separation alerts for the respective remote locator object, the listing of trusted locations is re-displayed (e.g., the set of trusted locations for the respective remote locator object is restored).

FIGS. 8K-8N illustrate an exemplary process of sharing a remote locator object with another user. In FIG. 8K device 500 is displaying user interface 830. In some embodiments, user interface 830 is similar to user interface 660 described above with respect to FIG. 6L. In some embodiments, if the respective remote locator object is currently shared with another user, then the users with which the respective remote locator object is shared is displayed on user interface 830 (e.g., user 837-1). In some embodiments, if the respective remote locator object is not shared with anyone, then selectable option 839 reads "Add People" and if the respective remote locator object is sharing with other users, then selectable option 839 reads "Manage People".

In some embodiments, user input 803 is detected selecting selectable option 839 for managing the people with whom the respective remote locator object is shared (e.g., managing the sharing settings of the respective remote locator object). In some embodiments, in response to user input 803, device 500 displays user interface 860, as shown in FIG. 8L. In some embodiments, user interface 870 is a user interface for selecting the people with which to share respective remote locator object. In some embodiments, sharing the remote locator object with another user provides the other user with the same functions that the owner of remote locator object has. For example, users with which the remote locator object is shared can set up and receive separation alerts, and can track the location of and locate the remote locator object (e.g., similarly to listing 678-2 illustrated in FIG. 6N corresponding to the user's spouse sharing the remote locator object for the spouse's keys with the user).

In some embodiments, as shown in FIG. 8L, user interface 860 includes one or more users with which the user is currently sharing the remote locator object, has previously shared the remote locator object, or is or has shared other remote locator objects with. In some embodiments, each user in the listing of users is selectable to toggle (e.g., enable or disable) sharing with the respective user (e.g., as shown by the check mark or lack of check mark, respectively). In some embodiments, the user is able to add or remove users from the list of possible users to share with. In some embodiments, user input 803 is received selecting the "Sister" user with which to share the respective remote locator object.

In some embodiments, in response to user input 803 selecting the "Sister" user with which to share the respective remote locator object, device 500 displays card 870 (e.g., user interface) overlaid over user interface 860, as shown in FIG. 8M. In some embodiments, card 870 provides the user with one or more options for how long to share the remote locator object with the "Sister" user. For example, in some embodiments, selectable option 872 corresponds to sharing (is selectable to share) the remote locator object until the end of the day and selectable option 874 corresponds to sharing (is selectable to share) the remote locator object indefinitely (e.g., until the user manually disables sharing with the "Sister" user). In some embodiments, other possible time periods are possible. In some embodiments, card 870 includes selectable option 876 that is selectable to cancel the process for sharing with the "Sister" user and dismiss card 870.

In FIG. 8M, user input 803 is received selecting selectable option 872 for sharing with the "Sister" user until the end of the day. In some embodiments, in response to the user input, device 500 initiates a process to share the respective remote locator object with the "Sister" user until the end of the day. In some embodiments, after sharing the respective remote locator object with the "Sister" user, user interface 830 displays user 837-2 in the list of users with which the respective remote locator object is shared, as shown in FIG. 8N. In some embodiments, user 837-2 is displayed with a description that the "Sister" user can locate the item and that sharing expires in 9 hrs and 8 mins. In some embodiments, each listing (e.g., user 837-1 and 837-2) is selectable to change the sharing options for the respective user (e.g., to remove sharing or to set or remove a time limit on sharing). It is understood that the set of users with which a respective remote locator object is shared is specific to the respective remote locator object and each remote locator object maintains its own set of shared users.

FIGS. 8O-8P illustrate an exemplary embodiment of an expanded separation notification. In FIG. 8O, device 500 is displaying lock screen user interface 800 with notification 802. In FIG. 8O, contact 803 is detected on the touch screen selecting notification 802. In some embodiments, contact 803 has an intensity above a certain intensity threshold (e.g., long press, force press, etc.). In some embodiments, in response to contact 803 above a certain intensity threshold (or longer than a threshold time), notification 802 expands to an expanded notification 802, as shown in FIG. 8P. In some embodiments, expanded notification 802 includes map 804. In some embodiments, map 804 includes icon 806 indicating the current location of electronic device 500. In some embodiments, map 804 includes icon 808 indicating the location of the respective remote locator object (e.g., John's Keys).

In some embodiments, expanded notification 802 includes selectable options 809-1, 809-2, and 809-3 for performing actions with respect to the remote locator object. In some embodiments, selectable option 809-1 is selectable to locate the remote locator object using the application for tracking and finding items, similar to the process described above with respect to FIGS. 8B-8C. In some embodiments, selectable option 809-2 is selectable to cause the respective remote locator object to emit an audible sound. In some embodiments, selectable option 809-3 is selectable to add respective remote locator object's current location to a list of trusted locations and display user interface 850, similar to user interface 850 described above with respect to FIG. 8G. For example, in response to a user selection of selectable option 809-3, user interface 850 is displayed with map 854 automatically (e.g., without user input) panned to a position such that pin 856 is placed at the determined location of the keys. In some embodiments, text entry field 852 is automatically populated with the address corresponding to the location of the keys (e.g., and thus, the location of pin 856). Thus, the user is able to quickly add the current location of the remote locator object without needing to manually enter the current address of the remote locator object or adjust the map such that pin 856 is placed at the location of the remote locator object.

FIGS. 9A-9G are flow diagrams illustrating a method 900 of displaying notifications of a separation with a remote locator object in accordance with some embodiments, such as in FIGS. 8A-8P. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

As described below, the method 900 provides ways to display notifications of a separation with a remote locator object. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 8A, an electronic device with one or more wireless antenna, a display device, and one or more input devices (e.g., a mobile device (e.g., a tablet, a smartphone, a media player, or a wearable device) including a touch screen and wireless communication circuitry, or a computer including one or more of a keyboard, mouse, trackpad, and touch screen and wireless communication circuitry), while a first remote locator object (e.g., remote locator object that is able to communicate wirelessly, such as via Bluetooth and/or WiFi with the electronic device. The device is optionally able to be attached to a user's items, such as the user's keys, the user's purse, etc. In some embodiments, the remote locator object is able to provide location information to one or more electronic devices.) is associated with a user (e.g., the remote locator object is set up to be associated with the user and/or the user account of the electronic device and/or the electronic device), obtains (902) information indicating that an amount of separation between a location associated with the user (e.g., as determined based on a device associated with the user such as a watch, mobile phone, or the electronic device) and a location associated with the first remote locator object has increased beyond a first separation threshold, such as in FIG. 8A (e.g., a distance threshold between the location associated with the user and the location associated with the remote locator object (e.g., 50 feet, 200 feet, 500 feet, ½ mile)). In some embodiments, the information is obtained from a server that is tracking a location of the user relative to the location of the first remote locator object. In some embodiments, the remote locator object has one or more sensors for determining a location of the remote locator object (e.g., GPS sensors).

In some embodiments, the remote locator object is able to transmit location information to one or more electronic devices (that are or are not associated with the associated user). In some embodiments, the location information is transmitted to the server that is tracking the location of the first remote locator object. In some embodiments, the remote locator object is able to transmit identifying information (e.g., serial number of the remote locator object, an identifier of the remote locator object's associated user, etc.) to electronic devices (that are or are not associated with the user) that have one or more sensors for determining location (e.g., GPS sensors). In some embodiments, using the identifying information and/or the one or more sensors in the electronic device that have received the identifying information from the remote locator object, the server is able to receive information on the location (or approximate location) of the remote locator object (e.g., the electronic device that received the identifying information transmits the identifying information and/or the electronic device's own location information to the server). In some embodiments, the information is obtained by the electronic device determining that the first remote locator object is more than a threshold distance away from the electronic device using direct wireless communication technology between the electronic device and the first remote locator object (e.g., rather than communication with or through a server).

In some embodiments, in response to obtaining the information indicating that the amount of separation between the location associated with the user and the location associated with the first remote locator object has increased beyond the first separation threshold, the electronic device generates (904), at the electronic device, a separation alert indicating that the first remote locator object has been separated from the user, such as in FIG. 8A (e.g., displaying a notification or other alert on the electronic device indicating that the remote locator object is no longer with the user). In some embodiments, the notification or other alert includes an identifier associated with the remote locator object, such as "keys" or "purse", and indicates that the user's "keys" or "purse" are no longer with the user.

The above-described manner of alerting the user of separation with a remote locator object (e.g., by providing a separation alert when the remote locator object is determined to be farther than a threshold distance from the electronic device) provides the user with a notification that the remote locator object is no longer with the user (e.g., by obtaining information that the distance between the electronic device and the remote locator object is farther than a threshold distance and providing a separation alert to the user), which simplifies the interaction between the user and the electronic device and enhances the operability of the electronic device and makes the user-device interface more efficient (e.g., by quickly providing the user with an alert that the user has separated from the remote locator object), which additionally reduces power usage and improves battery life of the electronic device by enabling the user to use the electronic device more quickly and efficiency.

In some embodiments, the separation alert includes a visual element that is displayed via the display device (906) (e.g., generating the separation alert includes displaying a visual alert, such as a notification on the electronic device.), and while displaying the separation alert, the electronic device detects (908) a sequence of one or more inputs including (starting with) an input directed to the separation alert, such as in FIG. 8A (e.g., receiving a contact for longer than a threshold amount of time (e.g., long press) or a contact with an intensity greater than a threshold intensity (e.g., a force press) on the separation alert causes display of an expanded separation alert (e.g., expanded notification)). In some embodiments, the expanded separation alert displays a map with the determined location of the remote locator object and one or more options associated with the remote locator object. In some embodiments, the one or more options includes an option to mark the current location of the remote locator object as a trusted location such that the separation alerts are not displayed when the remote locator object is separated from the user and is at the trusted location.

In some embodiments, in response to detecting the sequence of one or more inputs (e.g., including a user input selecting the selectable option to mark the current location of the remote locator object as a trusted location), the electronic device marks (910) a location associated with the first remote locator object as a safe zone for the remote locator object, wherein a safe zone for a respective remote locator object is a region at which the device will not generate separation alerts when the amount of separation between the location associated with the user and the location associated with the respective remote locator object is greater than (increases beyond) the first separation threshold while the respective remote locator object remains within the safe zone, such as in FIG. 8P (e.g., adding the current location of the remote locator object as a safe zone (e.g., trusted location)). In some embodiments, objects that are within the radius of a safe zone do not generate separation alerts when they are determined to be separated from the user. In some embodiments, the radius of the safe zone is adjustable and each trusted location has its own set radius. In some embodiments, each remote locator object and/or device that is being tracked has its own set of trusted locations and/or safe zones. In some embodiments, a safe zone is a trusted location or a trusted person. In some embodiments, when a remote locator object is determined to be with a trusted location (e.g., is following the trusted person's location or is within a certain threshold distance, such as 1 foot, 2 feet, 3 feet, of the trusted person), then a separation alert is not generated.

The above-described manner of setting safe zones for a remote locator object (e.g., by providing, on the separation alert, a selectable option to add the current location of the remote locator object as a safe zone) provides the user with an easy method of adding the current location of the remote locator object as a safe zone (e.g., by providing a selectable option that is selectable to cause the current location of the remote locator object that is triggering the separation alert to be added as a safe zone in which separation alerts are not triggered), which simplifies the interaction between the user and the electronic device and enhances the operability of the electronic device and makes the user-device interface more efficient (e.g., by providing the user with a shortcut method of adding a location as a safe zone without requiring the user to perform additional inputs or navigate to a separate user interface and/or input an address or manually set a location as a safe zone), which additionally reduces power usage and improves battery life of the electronic device by enabling the user to use the electronic device more quickly and efficiency.

In some embodiments, the sequence of one or more inputs includes a user input setting a size and/or shape of the safe zone (912), such as in FIGS. 8G-8H (e.g., selecting a radius, center point, and/or otherwise defining boundaries of the safe location). In some embodiments, the user is presented with one or more predefined radii. In some embodiments, the user is able to provide a custom radius or boundary for the safe location.

The above-described manner of setting safe zones for a remote locator object (e.g., by receiving a user input setting the size and/or shape of the safe zone) allows for quick and efficient setting of safe zone areas, which simplifies the interaction between the user and the electronic device and enhances the operability of the electronic device and makes the user-device interface more efficient (e.g., without requiring the user to potentially add multiple safe zones to cover the intended area or without generating excessive separation alerts when the remote locator object is at a location that the user considers to be safe but is unable to cover with fixed safe zone sizes and shapes), which additionally reduces power usage and improves battery life of the electronic device by enabling the user to use the electronic device more quickly and efficiency.

In some embodiments, marking the location associated with the first remote locator object as a safe zone for the remote locator object includes marking a person, other than the user, as a safe person, wherein separate alerts are not generated when the amount of separation between the location associated with the user and the location associated with the respective remote locator object is greater than the first separation threshold while the respective remote locator object remains within a threshold distance of the safe person (958), such as in FIG. 8H (e.g., a safe zone is able to be a trusted person). In some embodiments, when a remote locator object is determined to be with certain threshold distance (e.g., 1 foot, 2 feet, 3 feet) of the trusted person, then a separation alert is not generated. For example, a user is able to set a spouse as a trusted person for a remote locator object that is attached to the user's keys such that when the spouse takes the keys (and the remote locator object), then a separation alert is not generated, even though the remote locator object is greater than the threshold distance from the user.

The above-described manner of setting a safe zone for a remote locator object (e.g., by setting a trusted person as a safe zone for the remote locator object) avoids the needs to set multiple safe zones when the remote locator object is with a trusted person (e.g., by setting a person as a safe zone such that separation alerts are not generated when the remote locator object is with the person), which simplifies the interaction between the user and the electronic device and enhances the operability of the electronic device and makes the user-device interface more efficient (e.g., by providing a method of setting a portable safe zone without requiring the user to continually update the safe zones for the remote locator object or ignore separation alerts), which additionally reduces power usage and improves battery life of the electronic device by enabling the user to use the electronic device more quickly and efficiency.

In some embodiments, the user is associated with a plurality of remote locator objects including a second remote locator object (914), such as in FIG. 8D (e.g., the user has associated and/or paired a plurality of remote locator objects with the electronic device and/or a user account of the user, or otherwise is able to track a plurality of remote locator objects (e.g., another user has optionally shared the location of a remote locator object with the user)). In some embodiments, while a respective region is set as a safe zone for the first remote locator object but not for the second remote locator object, and the first remote locator object and the second remote locator object are associated with respective locations within the safe zone (916) (e.g., the first and second remote locator objects are located at a respective location. In some embodiments, the first remote locator object has the respective location marked as a safe zone (e.g., or the respective location is within the radius of a respective safe zone). In some embodiments, the second remote locator object does not have the respective location marked as a safe zone.), the electronic device obtains information indicating that an amount of separation between a location associated with the user (e.g., as determined based on a device associated with the user such as a watch or mobile phone) and a location associated with the first remote locator object has increased beyond the first separation threshold (918), such as in FIG. 8A (e.g., a distance threshold between the location associated with the user and the location associated with the remote locator object). In some embodiments, the information is obtained from a server that is tracking a location of the user relative to the location of the first remote locator object. In some embodiments, the information is obtained by the electronic device determining that the first remote locator object is more than a threshold distance away from the electronic device.

In some embodiments, the electronic device obtains information indicating that an amount of separation between a location associated with the user (e.g., as determined based on a device associated with the user such as a watch or mobile phone) and a location associated with the second remote locator object has increased beyond the first separation threshold (920), such as in FIG. 8A (e.g., a distance threshold between the location associated with the user and the location associated with the remote locator object). In some embodiments, the information is obtained from a server that is tracking a location of the user relative to the location of the first remote locator object. In some embodiments, the information is obtained by the electronic device determining that the first remote locator object is more than a threshold distance away from the electronic device.

In some embodiments, in response to obtaining the information indicating that the amount of separation between the location associated with the user and the location associated with the first remote locator object has increased beyond the first separation threshold and obtaining the information indicating that the amount of separation between the location associated with the user and the location associated with the second remote locator object has increased beyond the first separation threshold, the electronic device generates (922), at the electronic device, a separation alert indicating that the second remote locator object has been separated from the user without generating a separation alert indicating that the first remote locator object has been separated from the user, such as in FIG. 8A (e.g., setting the safe location for the first remote locator object does not set the safe location for the second remote locator object). In some embodiments, the set of safe locations for the first remote locator object is a different set of safe locations for the second remote locator object. In some embodiments, each remote locator object has its own dedicated set of safe locations. In some embodiments, the set of safe locations for each remote locator object is global such that every user that has access to a respective remote locator object (e.g., can view the location of the remote locator object due to association and/or sharing) has the same global set of safe locations. In some embodiments, each user has its own set of safe locations for each remote locator object (e.g., each user can set the safe locations for a respective remote locator object without affecting the safe locations for the other users).

The above-described manner of managing safe zones for remote locator objects (e.g., by maintaining different sets of safe zones for each remote locator object and generating separation alerts if the location of a remote locator object is not within a designated safe zone for that given remote locator object) provides the user with a method of setting different safe zones for different remote locator objects (e.g., by maintaining a set of safe zones for each remote locator object), which simplifies the interaction between the user and the electronic device and enhances the operability of the electronic device and makes the user-device interface more efficient (e.g., by allowing the user to set different safe zones for different remote locator objects such that separation alerts are not unnecessarily generated), which additionally reduces power usage and improves battery life of the electronic device by enabling the user to use the electronic device more quickly and efficiency.

In some embodiments, the separation alert includes a map with a representation of the location associated with the first remote locator object (924), such as in FIG. 8P (e.g., an expanded separation alert is displayed in response to receiving a user input directed at the separation alert that satisfies one or more criteria). In some embodiments, the one or more criteria is satisfied when the input is a contact for longer than a threshold time (e.g., 0.1 second, 0.3 seconds, 0.5 seconds) or a contact with an intensity greater than a certain threshold, or any combination thereof. In some embodiments, the expanded separation alert displays a map with the determined location of the remote locator object. In some embodiments, the expanded separation alert includes an option to mark the current location of the remote locator object as a trusted location.

The above-described manner of setting a safe zone for a remote locator object (e.g., by displaying a map that includes a representation of the current location of the remote locator object) provides the user with the ability to view and confirm the location to be set a safe zone, which simplifies the interaction between the user and the electronic device and enhances the operability of the electronic device and makes the user-device interface more efficient (e.g., by displaying a map with an indicator of the current position of the current location of the remove locator object without requiring the user to navigate to a separate user interface to confirm the current location of the remote locator object or to verify the location of the safe zone and/or the remote locator object after adding the safe zone), which additionally reduces power usage and improves battery life of the electronic device by enabling the user to use the electronic device more quickly and efficiency.

In some embodiments, the separation alert includes an indication of a time at which the location associated with the first remote locator object was determined and an indication of a distance between the location associated with the first remote locator object and the location associated with the user (926), such as in FIG. 8A (e.g., the separation alert displays a text indicator of the distance between the electronic device and the remote locator object (e.g., "2 miles away") and/or a text indicator of the most recent location update of the remote locator object (e.g., "Seen Just Now" or "Last Seen 5 Minutes Ago")). In some embodiments, the text indicators update as the distance changes.

The above-described manner of displaying a separation alert (e.g., by displaying the distance from the user to the remote locator object and the time in which the location was most recently determined) provides the user with a quick way of seeing how far the remote locator object is and when the object was last seen at that location, which simplifies the interaction between the user and the electronic device and enhances the operability of the electronic device and makes the user-device interface more efficient (e.g., by informing the user of how far the remote locator object is from the user and when the location was last determined), which additionally reduces power usage and improves battery life of the electronic device by enabling the user to use the electronic device more quickly and efficiency.

In some embodiments, the electronic device obtains information indicating that the amount of separation between the location associated with the user and the location associated with the first remote locator object is less than a respective separation threshold (928), such as described in FIG. 8A (e.g., the distance between the remote locator object and the user reduces below the separation threshold, such as a distance defined as an effective range limitation of direct communication between the electronic device and the first remote locator object (e.g., 10 feet, 20 feet, 40 feet)). In some embodiments, in response to obtaining the information indicating that the amount of separation between the location associated with the user and the location associated with the first remote locator object is less than the respective separation threshold, the electronic device ceases to present the separation alert (930), such as described in FIG. 8A (e.g., ceasing to display the separation alert, ceasing to output a tactile or audio output associated with the separation alert, or the like). In some embodiments, if the amount of separation between the location associated with the user and the location associated with the first remote locator object increases, the device would present the separation alert again.

The above-described manner of displaying a separation alert (e.g., by displaying a separation alert when the remote locator object is greater than a threshold distance away from the user and by removing the separation alert when the remote locator object is less than a respective separation threshold) ensures the separation alert is not displayed unless applicable (e.g., by ceasing display of the separation alert when the remote locator object is determined to be within a respective threshold distance from the user), which simplifies the interaction between the user and the electronic device and enhances the operability of the electronic device and makes the user-device interface more efficient (e.g., by ceasing display of the separation alert when the remote locator object is determined to now be within a certain threshold distance from the user without requiring the user to access the separation alert to determine whether the remote locator object is actually separated from the user), which additionally reduces power usage and improves battery life of the electronic device by enabling the user to use the electronic device more quickly and efficiency.

In some embodiments, the respective separation threshold is less than the first separation threshold (932), such as described in FIG. 8A (e.g., by 2 feet, 5 feet, 10 feet, etc. to avoid repeatedly presenting and ceasing to present the separation alert if the user is right at the first separation threshold).

The above-described manner of displaying a separation alert (e.g., by ceasing displaying of the separation alert when the remote locator object is less than a respective separation threshold that is less than the separation threshold for generating the separation alert) prevents the separation alert from being displayed and removed too frequently (e.g., by using a hysteresis for when to display a notification and when to remove the notification), which simplifies the interaction between the user and the electronic device and enhances the operability of the electronic device and makes the user-device interface more efficient (e.g., by preventing the separation alert from being continuously displayed and removed when the user is at or near the threshold distance for generating a separation alert), which additionally reduces power usage and improves battery life of the electronic device by enabling the user to use the electronic device more quickly and efficiency.

In some embodiments, the electronic device receives (934), at the electronic device, a request (e.g., selection of the separation alert, such as a tap gesture on the separation alert or a selectable affordance within the separation alert) to view location information for a plurality of physical objects, such as in FIG. 8D (e.g., one or more remote locator objects, one or more other devices such as watches, phones, computers, tablets, or the like). In some embodiments, in response to detecting the request to view location information for the plurality of physical objects, the electronic device displays (936) a status user interface that includes location information for a plurality of physical objects including the first remote locator object, such as in FIG. 8D (e.g., in response to the user input, display an application for finding and/or locating objects and/or electronic devices). In some embodiments, the application for finding and/or locating objects is set up to locate and/or track the location of the remote locator object. In some embodiments, the application for finding and/or locating objects is set up to locate and/or track a plurality of objects such as remote locator objects and/or other electronic devices. In some embodiments, in response to the user input, the electronic device displays a user interface of the application that includes a map and/or a list of objects that are being tracked. In some embodiments, the map and/or list of objects that are being tracked are displayed with an indication (e.g., text label and/or location on the map) of the location of the respective object, including whether the respective object is with the user or near a landmark (e.g., work, home, another user, etc.).

The above-described manner of displaying the location information of a plurality of objects (e.g., by displaying a user interface with location information for a plurality of objects that are being tracked by the device) provides the user with the ability to see, in a single user interface, multiple objects that are being tracked, which simplifies the interaction between the user and the electronic device and enhances the operability of the electronic device and makes the user-device interface more efficient (e.g., by providing a single user interface in which the user can see the location and status of all objects that are being tracked by the electronic device without requiring the user to navigate to separate user interfaces to see the location information for each object being tracked), which additionally reduces power usage and improves battery life of the electronic device by enabling the user to use the electronic device more quickly and efficiency.

In some embodiments, one or more representations of physical objects are marked with an indication that the physical object is located at a first location that has been identified with a descriptor selected by the user (938), such as in FIG. 8D (e.g., home or work). In some embodiments, the indication is a text indicator that indicates that the object is "Near Home" or "Near Work". In some embodiments, the indication is a respective icon on a map that shows that the respective object is near a particular landmark (e.g., the map displays an indicator of the location for "Home" or "Work").

The above-described manner of indicating the location of the tracked objects (e.g., by displaying a descriptive label of the location of the track objects) provides the user with a convenient label of the location of the tracked objects, which simplifies the interaction between the user and the electronic device and enhances the operability of the electronic device and makes the user-device interface more efficient (e.g., by automatically labeling the location of the tracked objects with a user-selected descriptor without requiring the user to separately determine whether the location of the object corresponds to a known location), which additionally reduces power usage and improves battery life of the electronic device by enabling the user to use the electronic device more quickly and efficiency.

In some embodiments, one or more representations of physical objects are marked with an indication that the physical object is at a predefined location that is defined relative to the location associated with the user (940), such as in FIG. 8D (e.g., displaying a "With Me" indicator if the remote locator object is determined to be within a certain distance of the user (e.g., 1 feet, 3 feet, 5 feet, etc.).).

The above-described manner of indicating the location of the tracked object (e.g., by displaying a descriptive label that the object is with the user if the location is within a threshold distance from the user) provides the user with a quick-glance description of whether the object is with the user (e.g., by displaying a label that the object is with the user), which simplifies the interaction between the user and the electronic device and enhances the operability of the electronic device and makes the user-device interface more efficient (e.g., by providing an easy descriptive label without requiring the user to separately determine whether the location of the object is the same location that the user is at), which additionally reduces power usage and improves battery life of the electronic device by enabling the user to use the electronic device more quickly and efficiency.

In some embodiments, while displaying the status user interface, the electronic device detects (942) a sequence of one or more inputs including selection of a selectable user interface object corresponding to a request to add a safe zone, such as in FIG. 8F (e.g., the user navigates to the area of the status user interface for managing trusted locations (e.g., safe zones) for the remote locator object and/or selects a selectable option for adding a trusted location). In some embodiments, in response to detecting the sequence of one or more inputs including selection of the selectable user interface object corresponding to a request to add a safe zone, the electronic device adds (944) a safe zone at a location selected by the user, wherein a safe zone for a respective remote locator object is a region at which the device will not generate separation alerts when the amount of separation between the location associated with the user and the location associated with the respective remote locator object is greater than (increases beyond) the first separation threshold while the respective remote locator object remains within the safe zone, such as in FIG. 8I (e.g., allow the user to add new safe zones or trusted locations).

In some embodiments, the electronic devices displays a user interface for managing safe zones in response to the user input to manage the safe zones of the remote locator object. In some embodiments, one or more previously set safe zones are presented to the user such that the user is able to toggle the previously set safe zones on (such that separation alerts will not be triggered) or off (such that separation alerts will be triggered). In some embodiments, the user interface for managing safe zones includes an option for selecting a new safe zone. In some embodiments, selecting the selectable option for adding a new safe zones displays a user interface for adding a new safe zone. In some embodiments, the user interface for adding a new safe zone includes a map and/or a text field. In some embodiments, the user is able to move the map around and select a location on the map (e.g., move a pin around, or drop a pin on the map) as the safe location. In some embodiments, the user is able to type an address into the text field to select the address as the safe location. In some embodiments, as the user moves the map around, the text field is updated with the current address of the pin. In some embodiments, as the user types an address into the text field, the map is updated to display the location of the address.

The above-described manner of setting a safe zone for a remote locator object (e.g., by adding a location as a safe zone where separation alerts are not generated) provides the user with the ability to set a particular location as where the remote locator object is expected to reside and prevent the unnecessary display of separation alerts (e.g., by disabling separation alerts when the remote locator object is determined to be within a safe zone), which simplifies the interaction between the user and the electronic device and enhances the operability of the electronic device and makes the user-device interface more efficient (e.g., by providing a method of suppressing separation alerts without requiring the user to receive a separation alert and interact with the alert to determine that the remote locator object is in a safe location), which additionally reduces power usage and improves battery life of the electronic device by enabling the user to use the electronic device more quickly and efficiency.

In some embodiments, the sequence of one or more inputs including selection of the selectable user interface object corresponding to the request to add the safe zone includes selection of a respective size for the safe zone from a plurality of predefined sizes (946), such as in FIG. 8G (e.g., small (e.g., 100 feet, 300 feet, 500 feet), medium (¼ mile, ½ mile), large (1 mile, 2 miles)). In some embodiments, the user is able to select a radius of the safe zone around the location that the user wants to add. In some embodiments, the map user interface for adding a new safe zone displays an indication of the radius or size of the safe zone (e.g., a circular zone around a center point).

The above-described manner of setting a safe zone for a remote locator object (e.g., by receiving a user selection of a size of the safe zone) allows for quick and efficient setting of safe zones, which simplifies the interaction between the user and the electronic device and enhances the operability of the electronic device and makes the user-device interface more efficient (e.g., by providing an easy method of setting the size of the safe zone without requiring the user to add multiple safe zones to cover the desired safe zone size or without requiring the user to perform additional user inputs to provide a custom size every time the user adds a new safe zone), which additionally reduces power usage and improves battery life of the electronic device by enabling the user to use the electronic device more quickly and efficiency.

In some embodiments, the sequence of one or more inputs including selection of the selectable user interface object corresponding to the request to add the safe zone includes an input that corresponds to a dynamically selected size for the safe zone (948), such as in FIG. 8G (e.g., a drag input to select a radius of the safe zone). In some embodiments, the user is able to resize the circular zone displayed on the map of the user interface for adding a new safe zone. In some embodiments, the user is able to provide a custom radius or area of the safe zone (e.g., by entering a particular radius rather than selecting a predefined size or manually resizing on the map).

The above-described manner of setting a safe zone for a remote locator object (e.g., by receiving a user input manually adjusting the size of the safe zone) provides the user with the fine control of the size of the safe zone, which simplifies the interaction between the user and the electronic device and enhances the operability of the electronic device and makes the user-device interface more efficient (e.g., by providing an easy method of modifying the size of the safe zone to reach a desired custom safe zone size), which additionally reduces power usage and improves battery life of the electronic device by enabling the user to use the electronic device more quickly and efficiency.

In some embodiments, while displaying the status user interface, the electronic device detects (950) a sequence of one or more inputs including selection of a selectable user interface object corresponding to a request share the location a respective physical object of the plurality of physical objects with a respective user other than the user of the device, such as in FIGS. 8K-8L (e.g., the user navigates to the area of the status user interface for managing users with which the remote locator object is shared and/or selects a selectable option for adding a shared user). In some embodiments, in response to detecting the sequence of one or more inputs including selection of the selectable user interface object corresponding to the request share the location of one of the physical object with another user, the electronic device enables (952) the respective user to access a plurality of features corresponding to the location of the respective physical object, including one or more of: determining a location of the respective physical object, receiving separation alerts when an amount of separation between the location of the respective physical object and a location of the other user exceeds a respective separation threshold, and selecting an identifier associated with the physical object, such as in FIGS. 8M-8N (e.g., sharing the remote locator object with another user).

In some embodiments, one or more previously shared users are presented to the user such that the user is able to toggle the previously shared users on or off In some embodiments, the user interface for managing shared users includes an option for selecting a new shared user. In some embodiments, sharing the remote locator object with another user provides the other user with the ability to track and/or view the location of the remote locator object. In some embodiments, the other user is able to access all or a subset of the features of the remote locator object that are available to the user (e.g., the owner) of the remote locator object). For example, in some embodiments, a shared user is able to receive separation alerts for the remote locator object and/or manage safe zones for the remote locator object.

The above-described manner of sharing a remote locator object with another user (e.g., by sharing the remote locator object with another user including the ability to track the location of the remote locator object) provides the user with the ability to share the features of the respective remote locator object with other users (e.g., by automatically providing the user that receives the sharing with a plurality of features that are also available to the owner of the remote locator object such that multiple users are able to track the remote locator object), which simplifies the interaction between the user and the electronic device and enhances the operability of the electronic device and makes the user-device interface more efficient (e.g., by providing a method to share a remote locator object with other users without requiring the use of multiple remote locator objects, each associated with a different user, to achieve the same function), which additionally reduces power usage and improves battery life of the electronic device by enabling the user to use the electronic device more quickly and efficiency.

In some embodiments, the sequence of one or more inputs including selection of the selectable user interface object corresponding to the request share the location of one of the physical object with another user includes allowing the sharing for a limited period of time (954), such as in FIG. 8M (e.g., a limited amount of time selected by the user such as 1 hour, the rest of the day). In some embodiments, when the user selects a user with which to share the remote locator object, the user is presented with an option for selecting for how long to share the remote locator object. In some embodiments, the user is provided with predetermined duration, such as for the rest of the day, or indefinitely. In some embodiments, the user is able to provide a custom duration.

The above-described manner of sharing a remote locator object with another user (e.g., by sharing the remote locator object with another user for a user-specified duration of time) avoids the need for the device to require additional input to turn off the sharing, which simplifies the interaction between the user and the electronic device and enhances the operability of the electronic device and makes the user-device interface more efficient (e.g., by providing a method to set a duration for sharing a remote locator object with other users without requiring the user to navigate to a separate user interface and/or remember to remove sharing with other users after a desired amount of time), which additionally reduces power usage and improves battery life of the electronic device by enabling the user to use the electronic device more quickly and efficiency.

In some embodiments, when a location of the first remote locator object is being shared with a second user (956), while the first remote locator object is associated with the second user, the electronic device obtains (956) information indicating that an amount of separation between a location associated with the second user (e.g., as determined based on a device associated with the user such as a watch or mobile phone) and a location associated with the first remote locator object has increased beyond the first separation threshold, such as in FIG. 8A (e.g., a distance threshold between the location associated with the second user and the location associated with the remote locator object). In some embodiments, the information is obtained from a server that is tracking a location of the second user relative to the location of the first remote locator object. In some embodiments, the information is obtained by the electronic device (e.g., the electronic device of the second user) determining that the first remote locator object is more than a threshold distance away from the electronic device.

In some embodiments, in response to obtaining the information indicating that the amount of separation between the location associated with the user and the location associated with the first remote locator object has increased beyond the first separation threshold, the electronic device generates (956), at the electronic device, a separation alert indicating that the first remote locator object has been separated from the second user, such as in FIG. 8A (e.g., this separation alert is generated at a device associated with the second user instead of or in addition to generating the separation alert at the device associated with the first user). In some embodiments, this separation alert is not generated when a remote locator object is associated with multiple users as long as the remote locator object is within the first separation threshold of at least one of the multiple users. For example, the separation alert received by each respective user is specific to the occurrence of a separation between the remote locator object and the respective user. In some embodiments, each shared user receives a separation alert whenever the first user (e.g., the owner) is separated from the remote locator object.

The above-described manner of sharing a remote locator object with another user (e.g., by generating separation alerts for shared users) provides the shared user with an alert that the shared user has been separated from the remote locator object (e.g., by determining whether a respective shared user is separated from the remote locator object and displaying a separation alert to the respective shared user), which simplifies the interaction between the user and the electronic device and enhances the operability of the electronic device and makes the user-device interface more efficient (e.g., by providing a method in which the shared user can receive separation alerts without requiring the owner of the device to separately notify the shared user of a separation or to track the location of the remote locator object to determine whether it is still with the shared user), which additionally reduces power usage and improves battery life of the electronic device by enabling the user to use the electronic device more quickly and efficiency.

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300 and 1400) are also applicable in an analogous manner to method 900 described above with respect to FIGS. 9A-9G. For example, presenting separation notifications described above with reference to method 900 optionally have one or more of the characteristics of initializing the remote locator object, presenting tracking notifications, and finding a remote locator object, etc., described herein with reference to other methods described herein (e.g., methods 700, 1100, 1300 and 1400). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9G are, optionally, implemented by components depicted in FIGS. 1A-1B. For example, displaying operations 936, and detecting operations 908, 942, 950 are optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Notification of Tracking by a Remote Locator Object

Users interact with electronic devices in many different manners. In some embodiments, a remote locator object is able to report its location to an electronic device. The embodiments described below provide ways in which an electronic device provides an alert that an unknown remote locator object is tracking the user's location, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
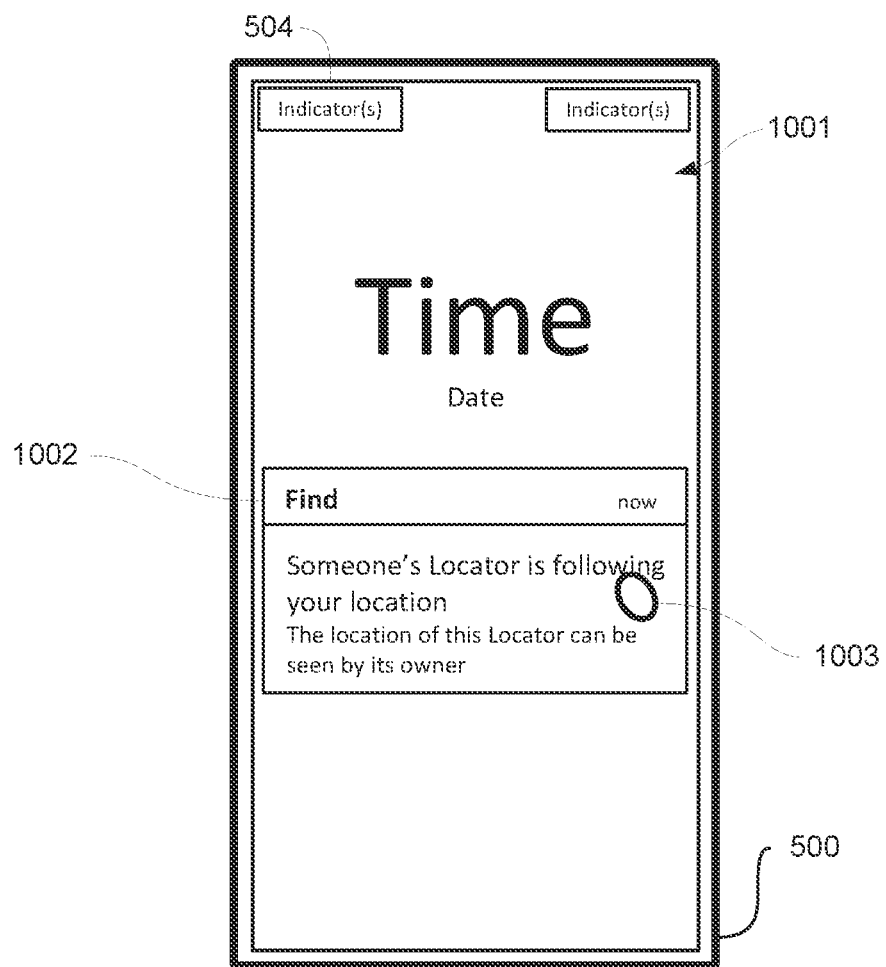
FIGS. 10A-10R illustrate exemplary ways in which an electronic device displays notifications of tracking by an unknown remote locator object in accordance with some embodiments of the disclosure.
Figure 10B:
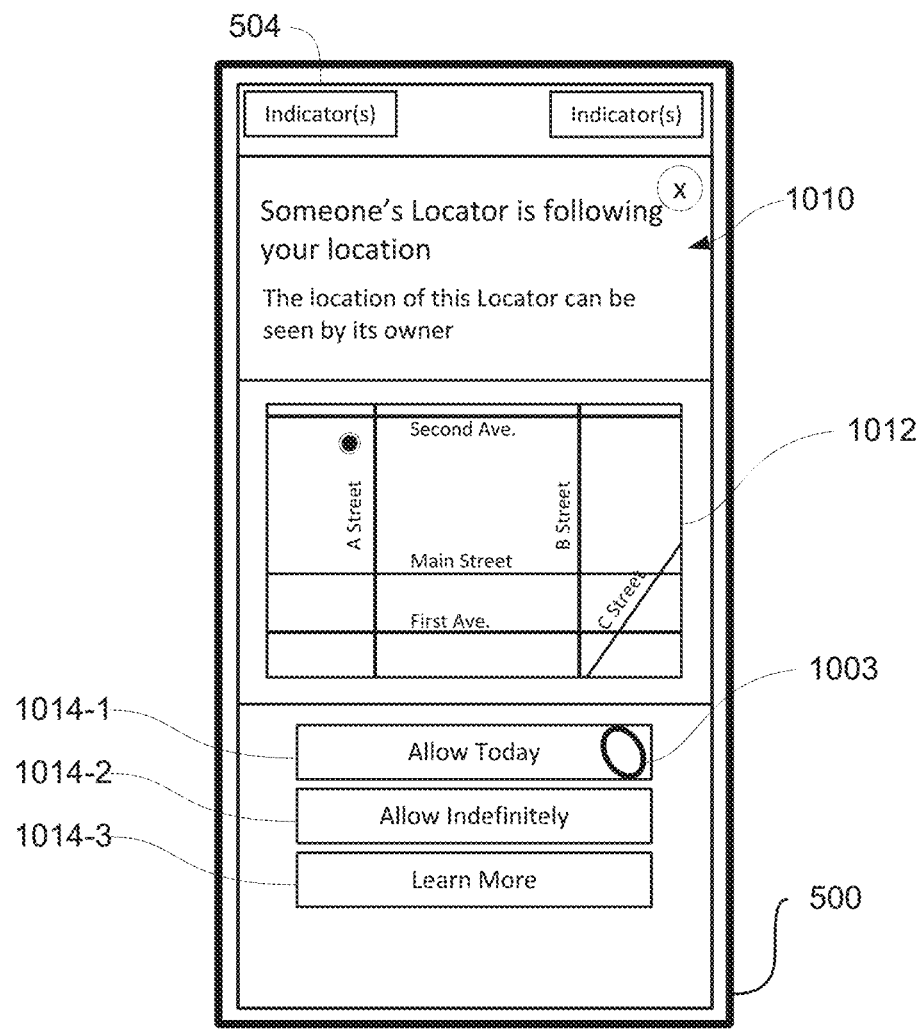
Figure 10C:
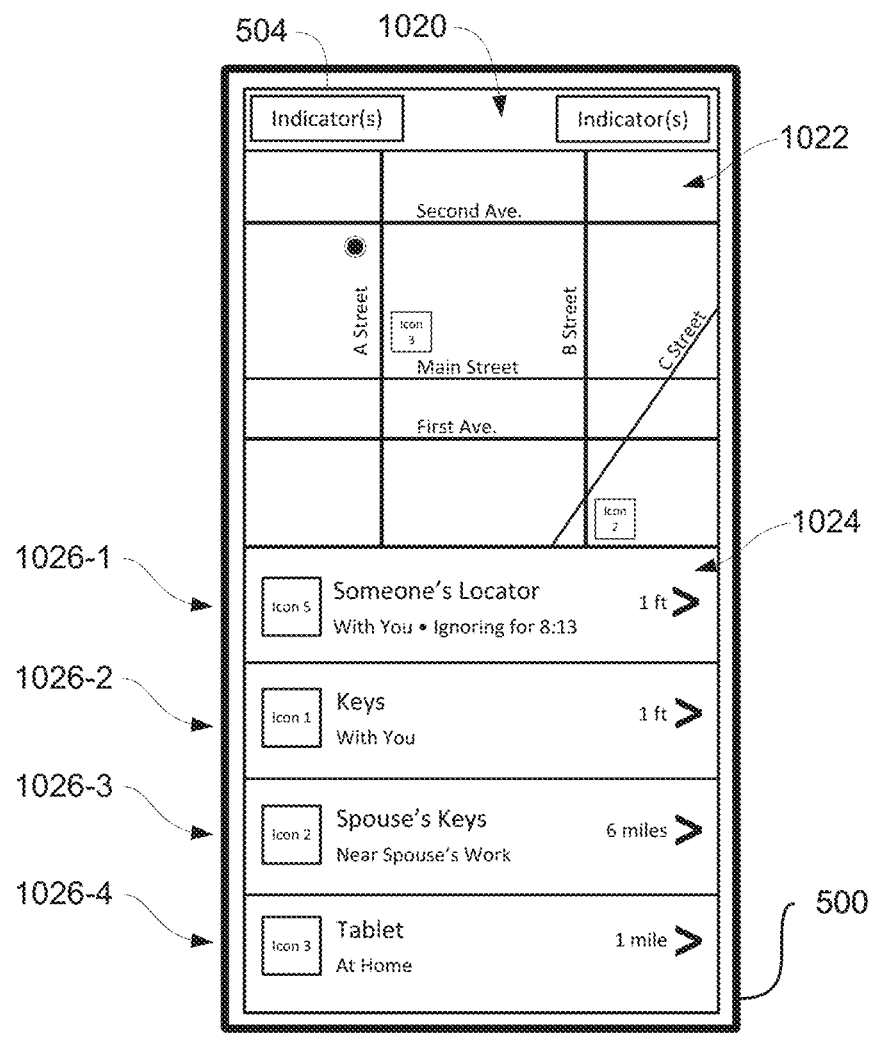
Figure 10D:
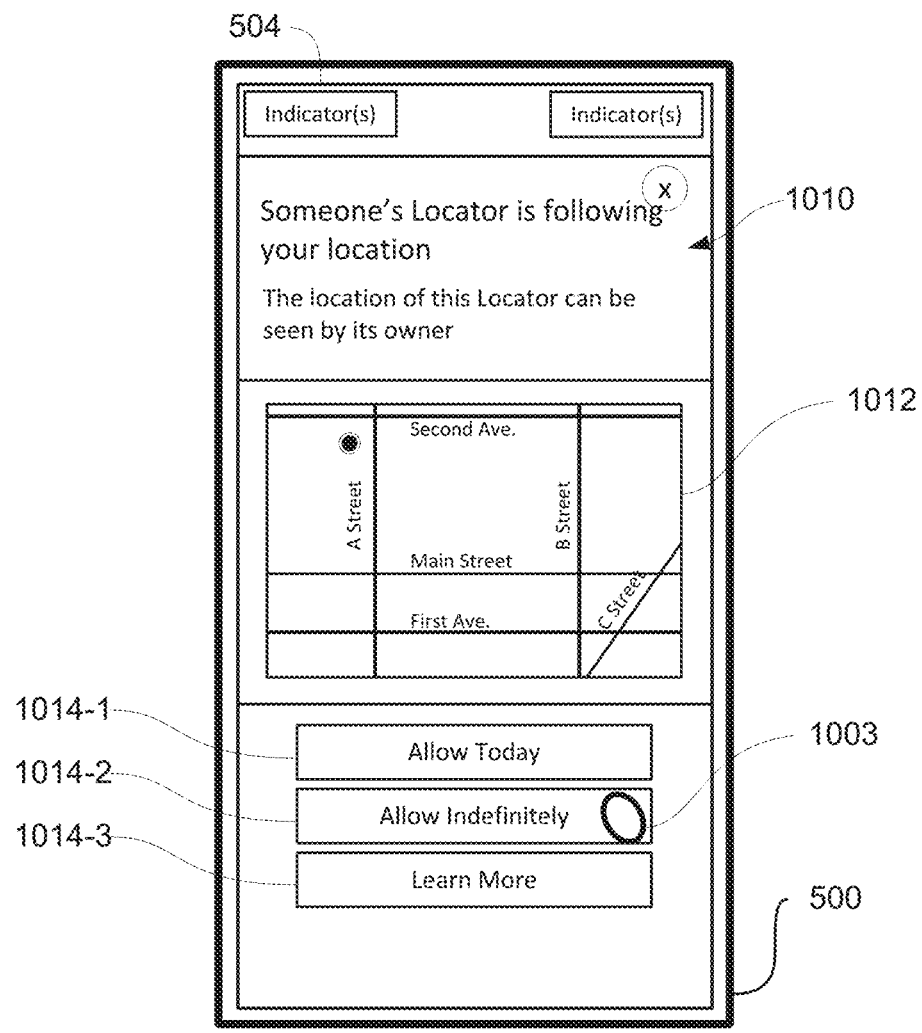
Figure 10E:
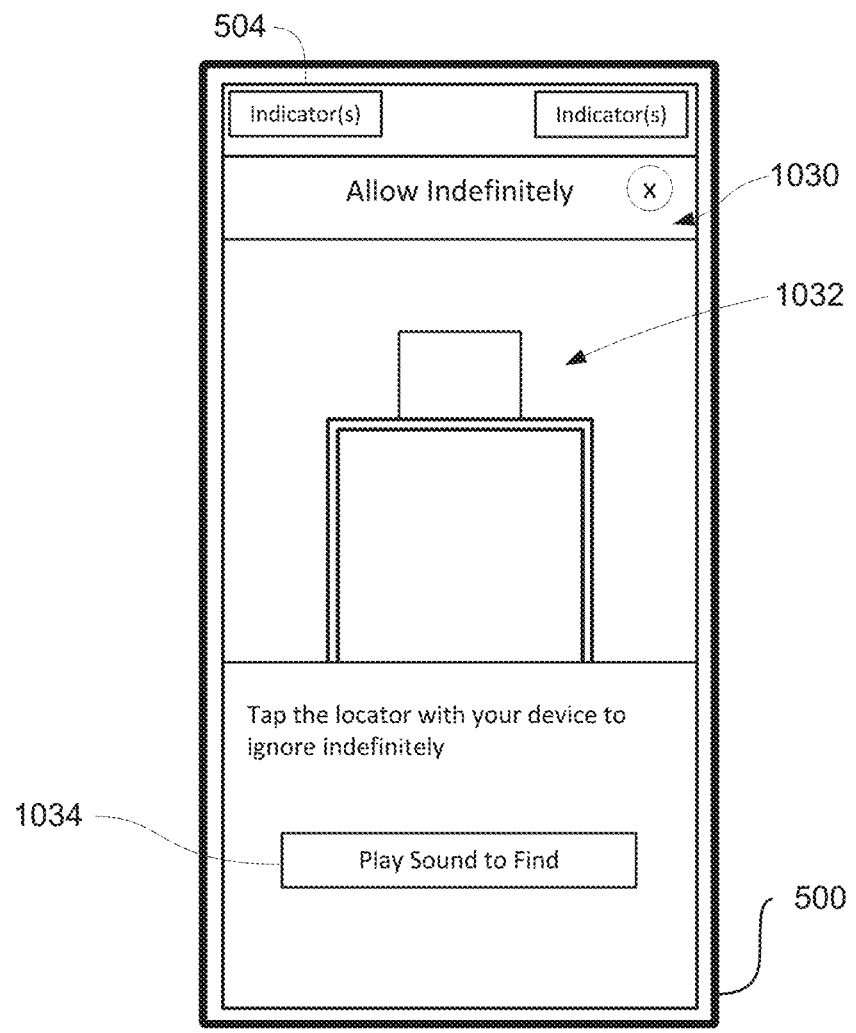
Figure 10F:
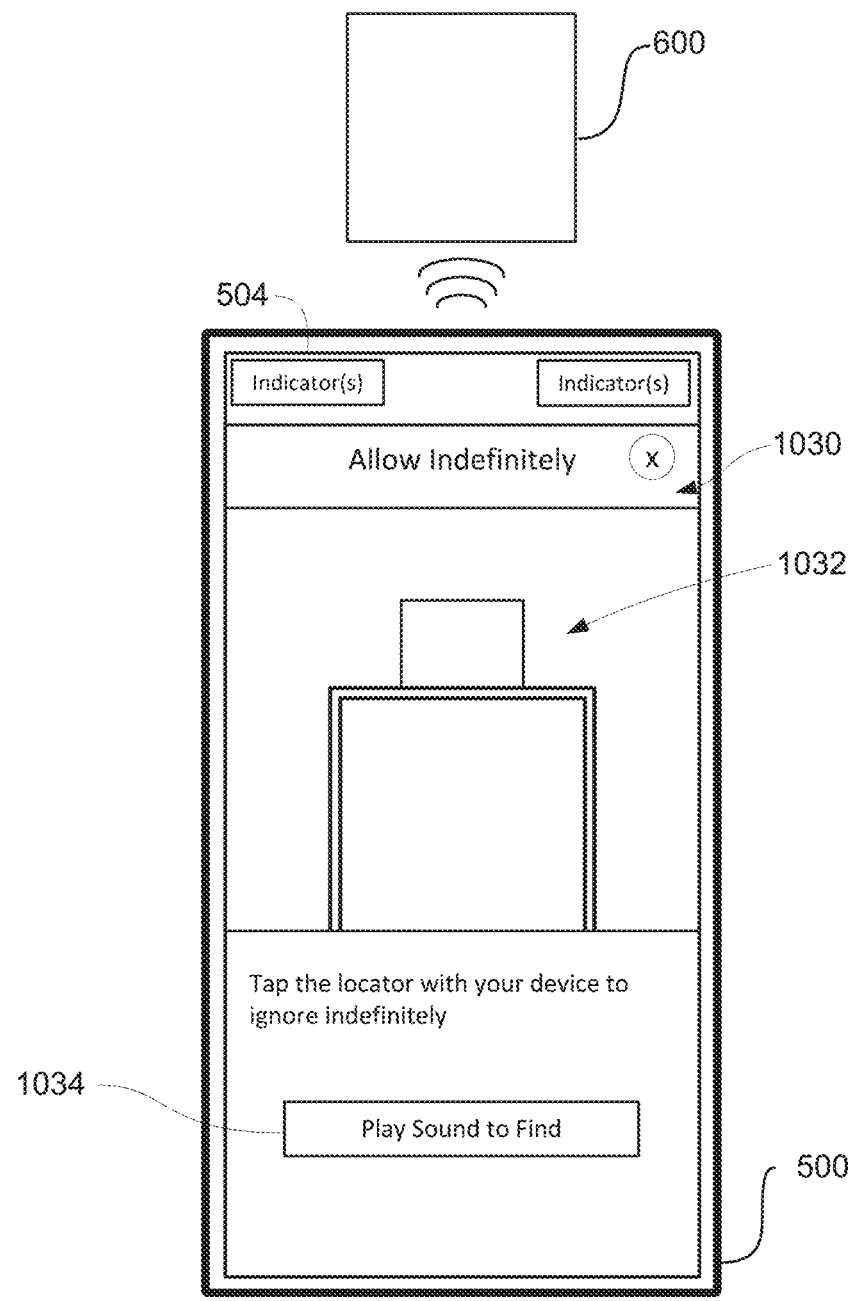
Figure 10G:
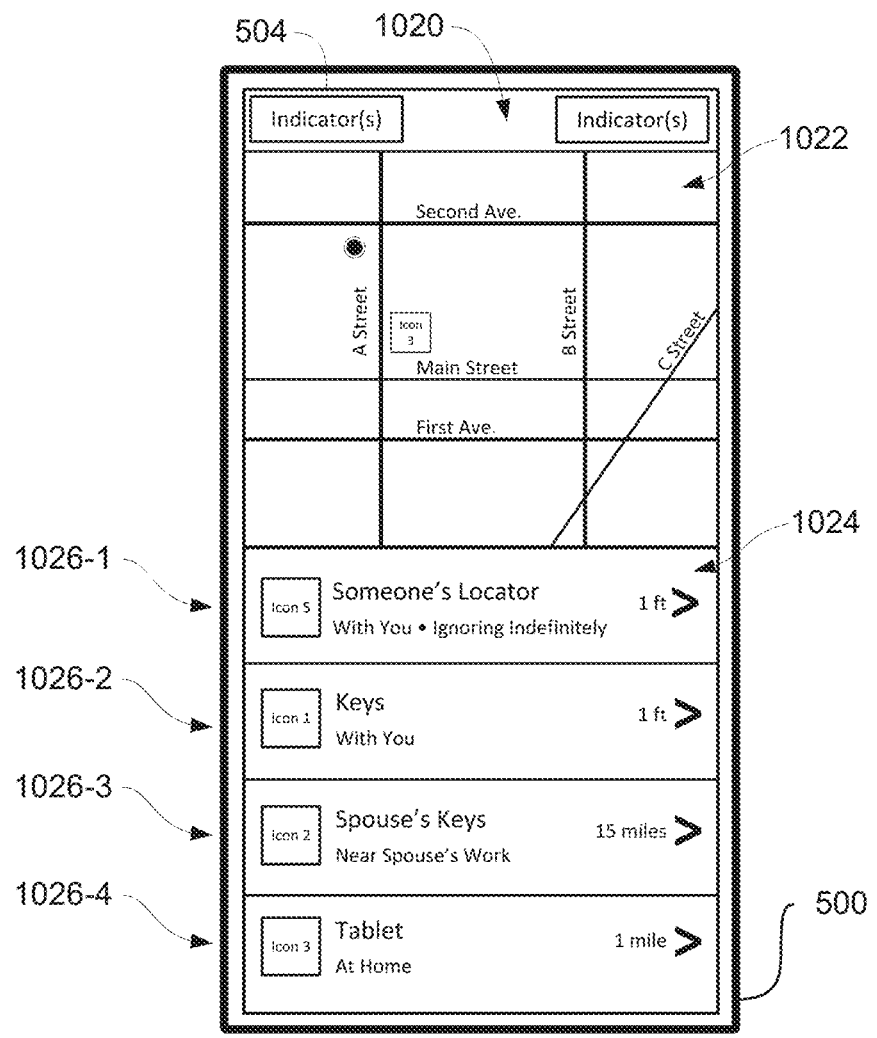
Figure 10H:
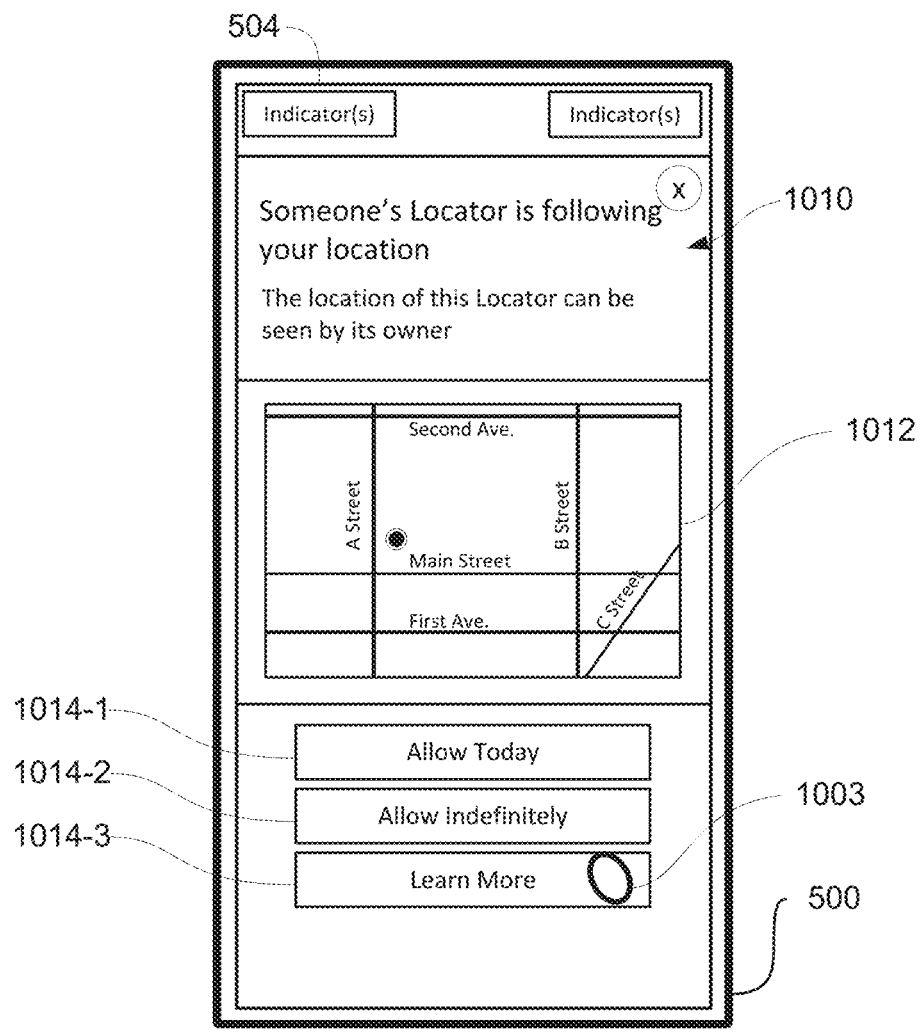
Figure 10I:
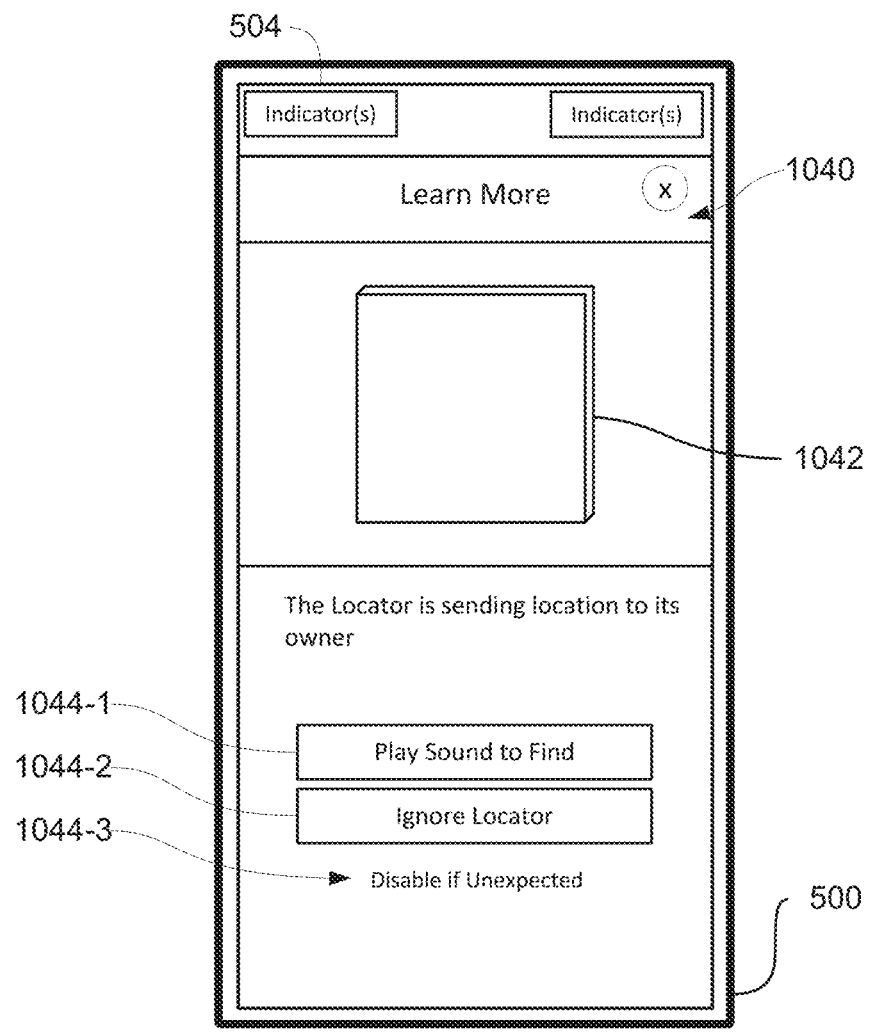
Figure 10J:
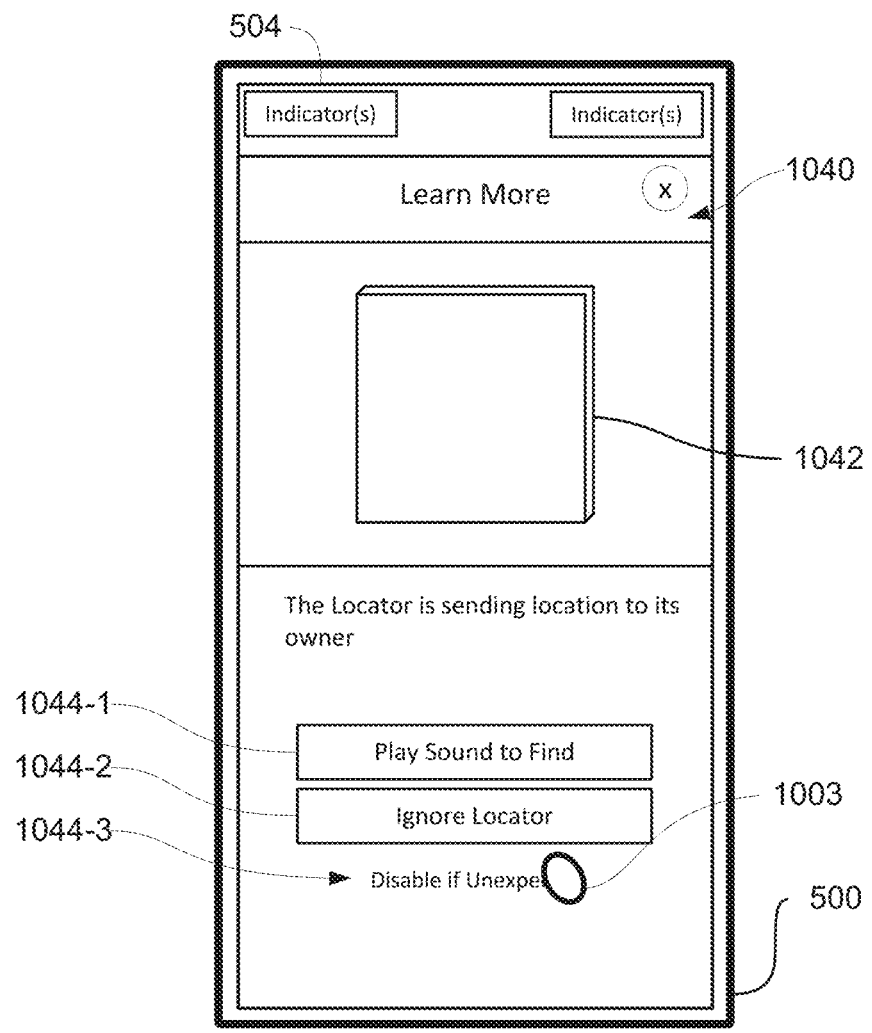
Figure 10K:
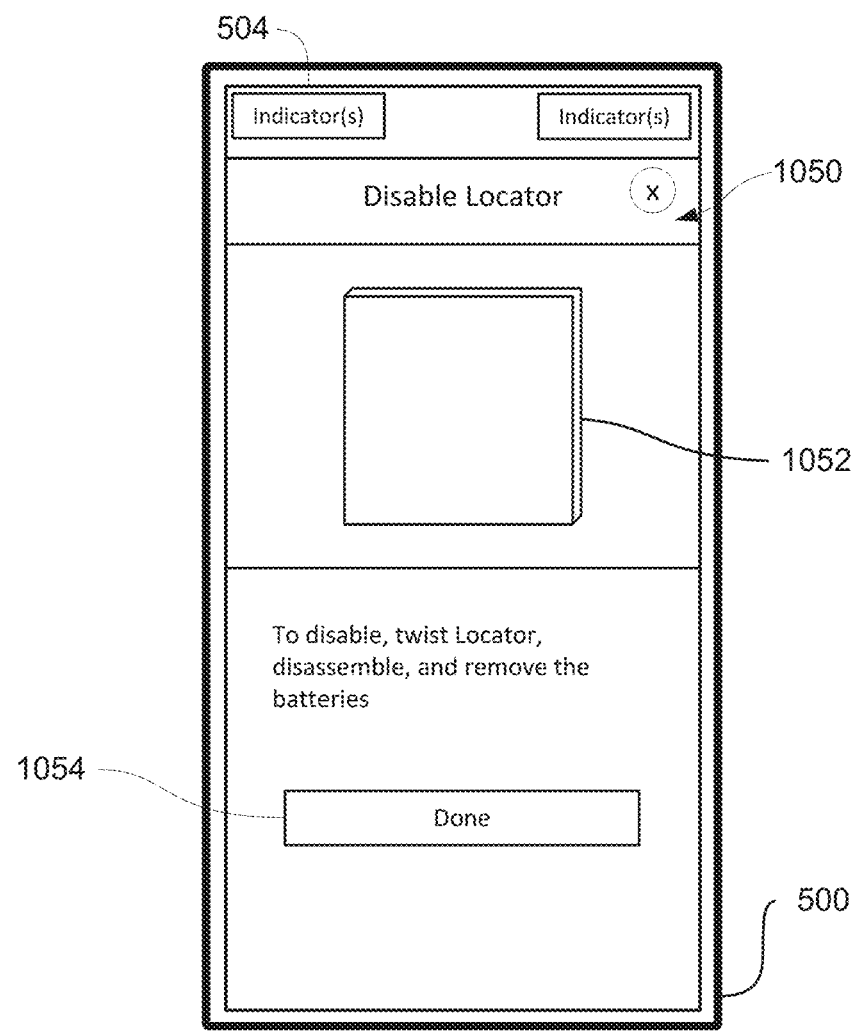
Figure 10L:
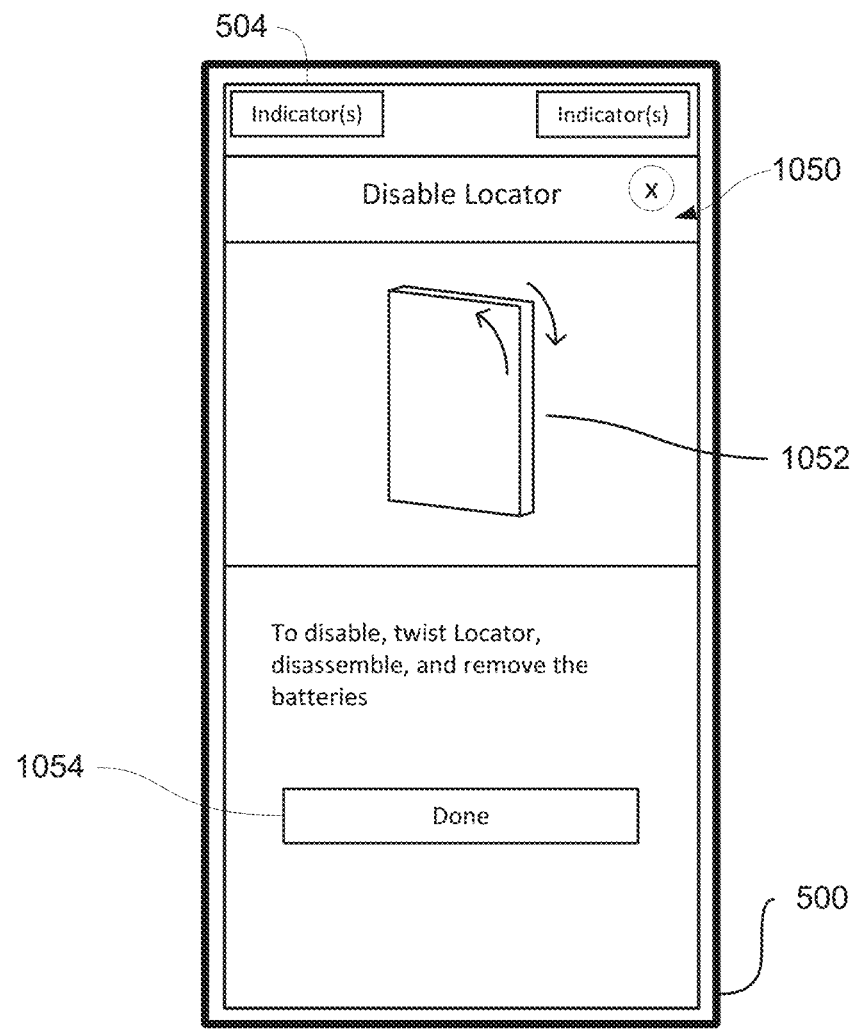
Figure 10M:
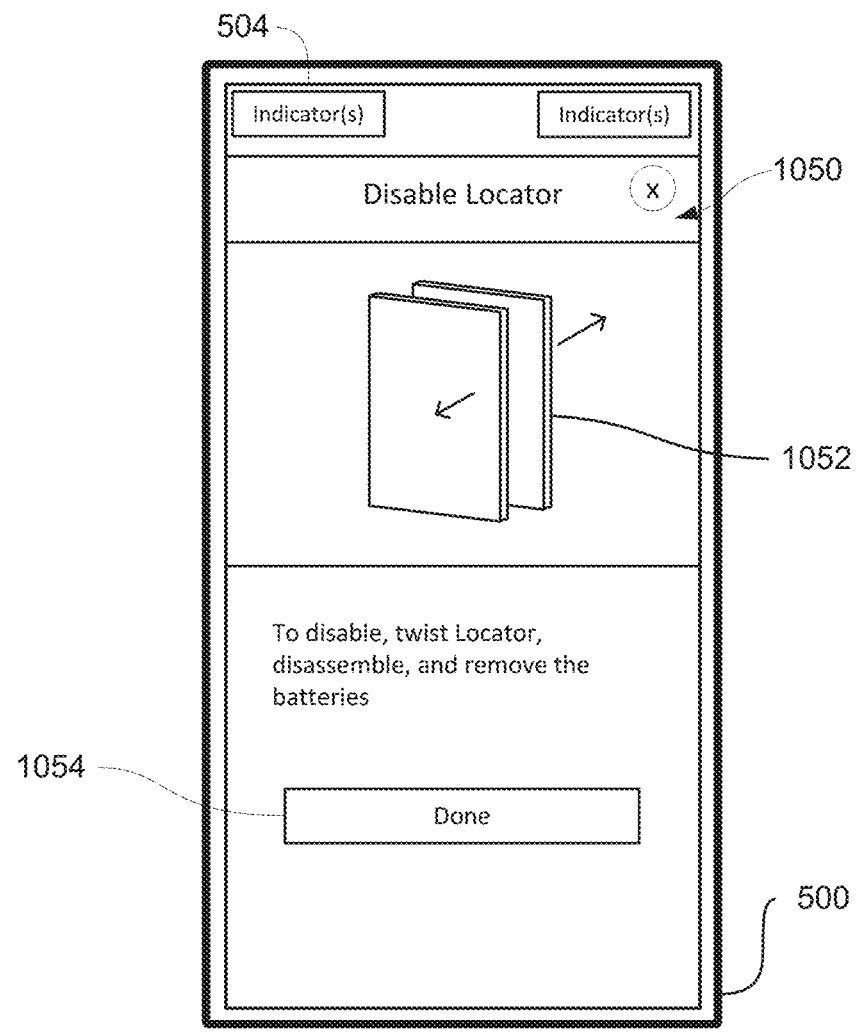
Figure 10N:
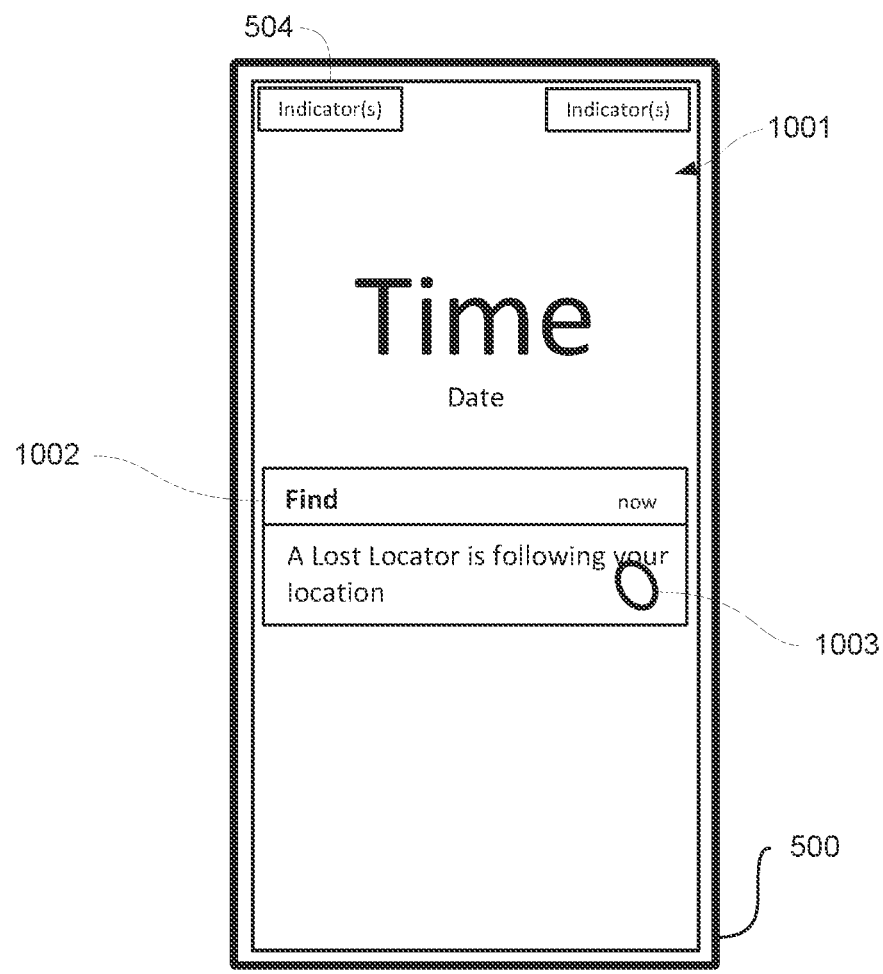
Figure 10O:
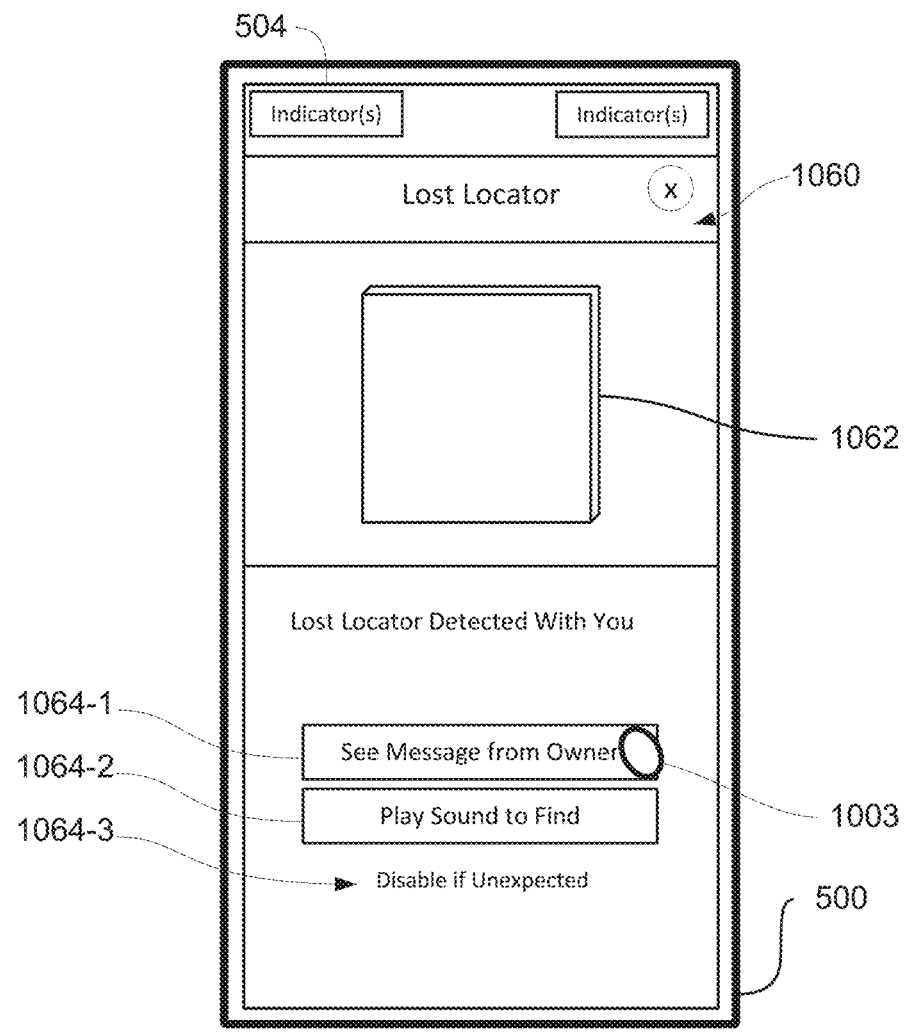
Figure 10P:
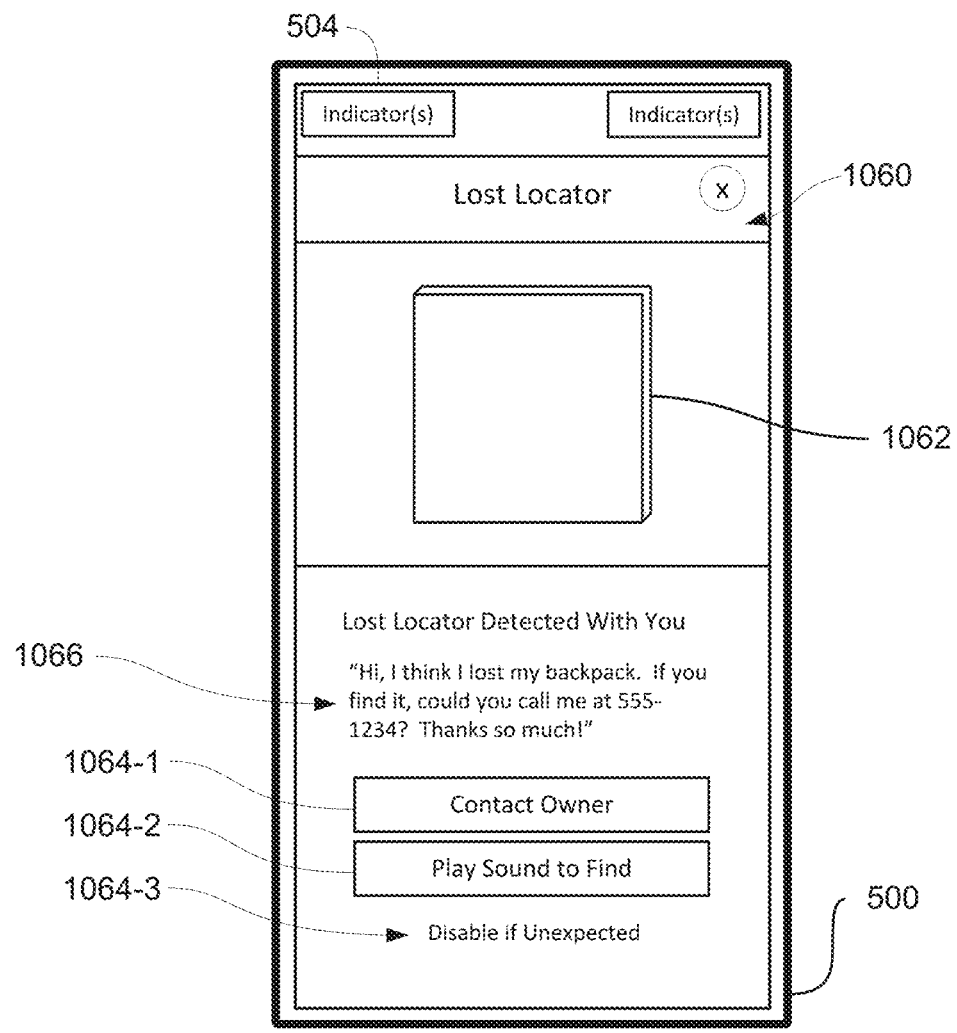
Figure 10Q:
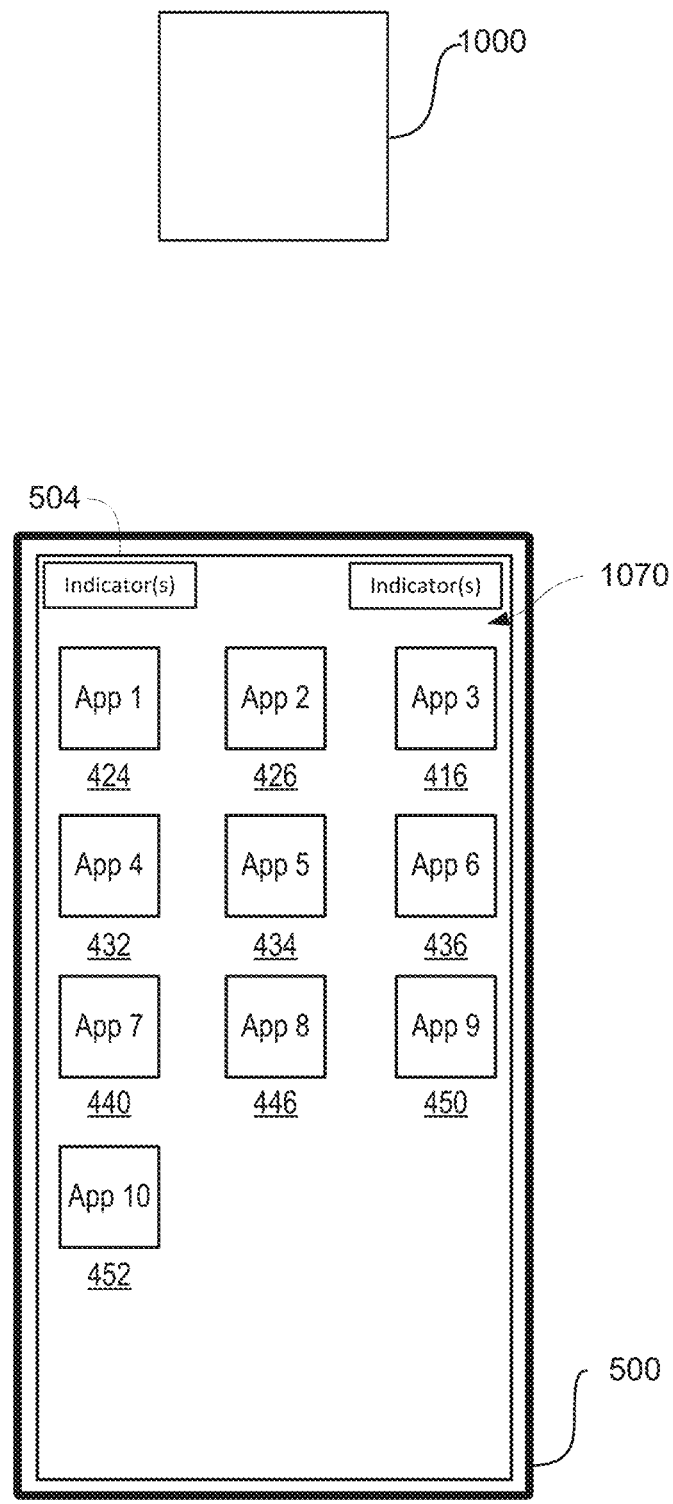
Figure 10R:
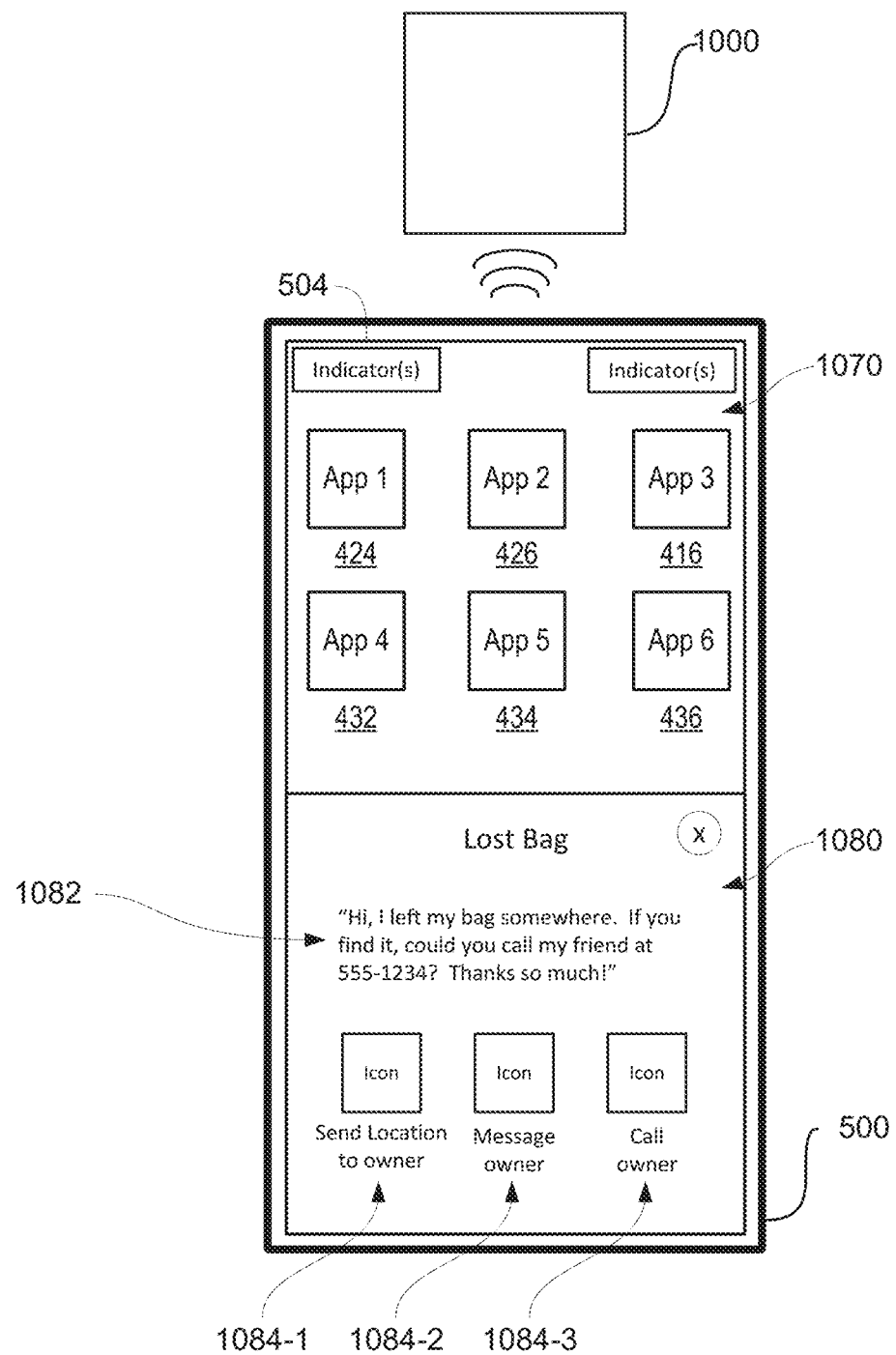
Figure 11B:
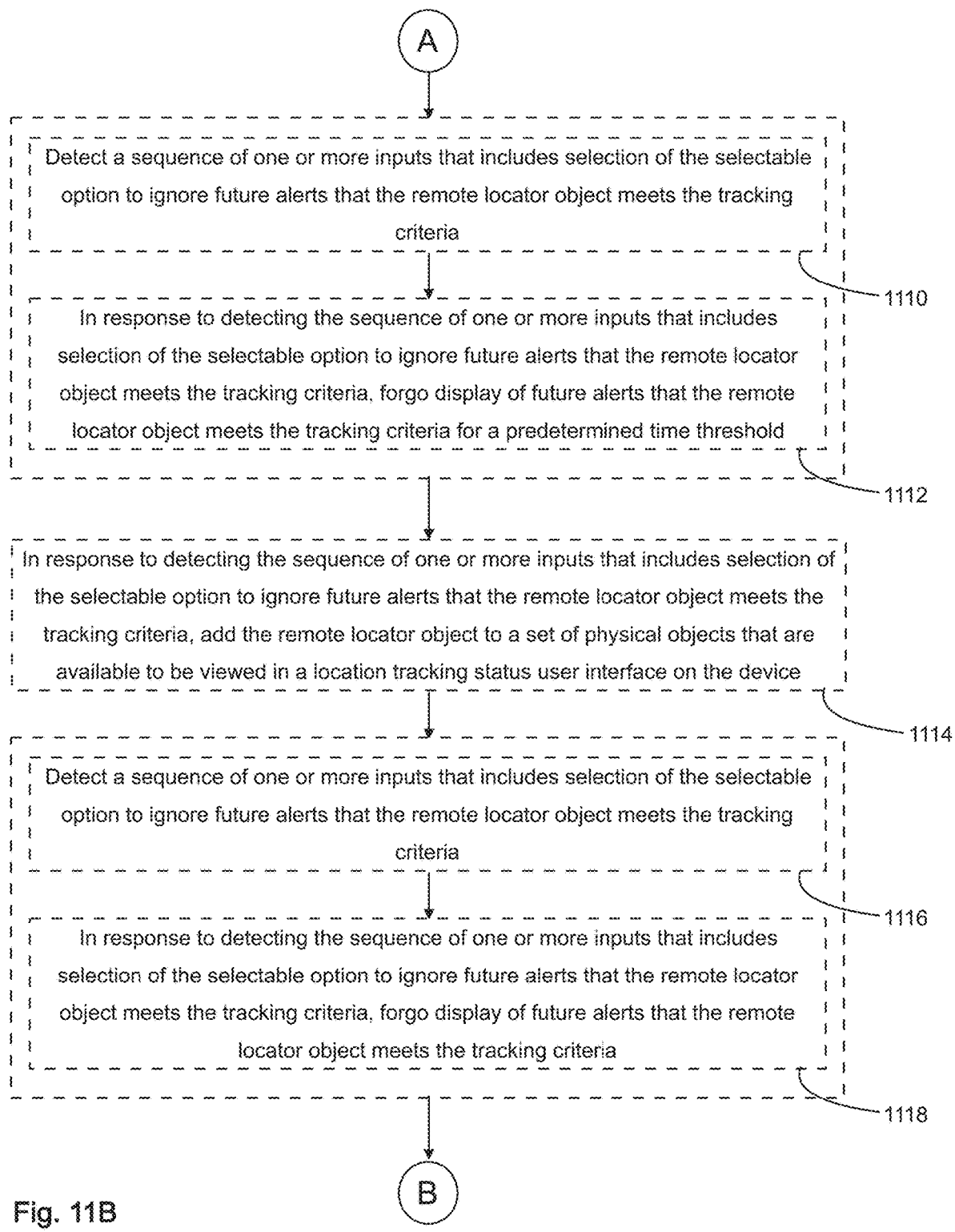
Figure 11C:
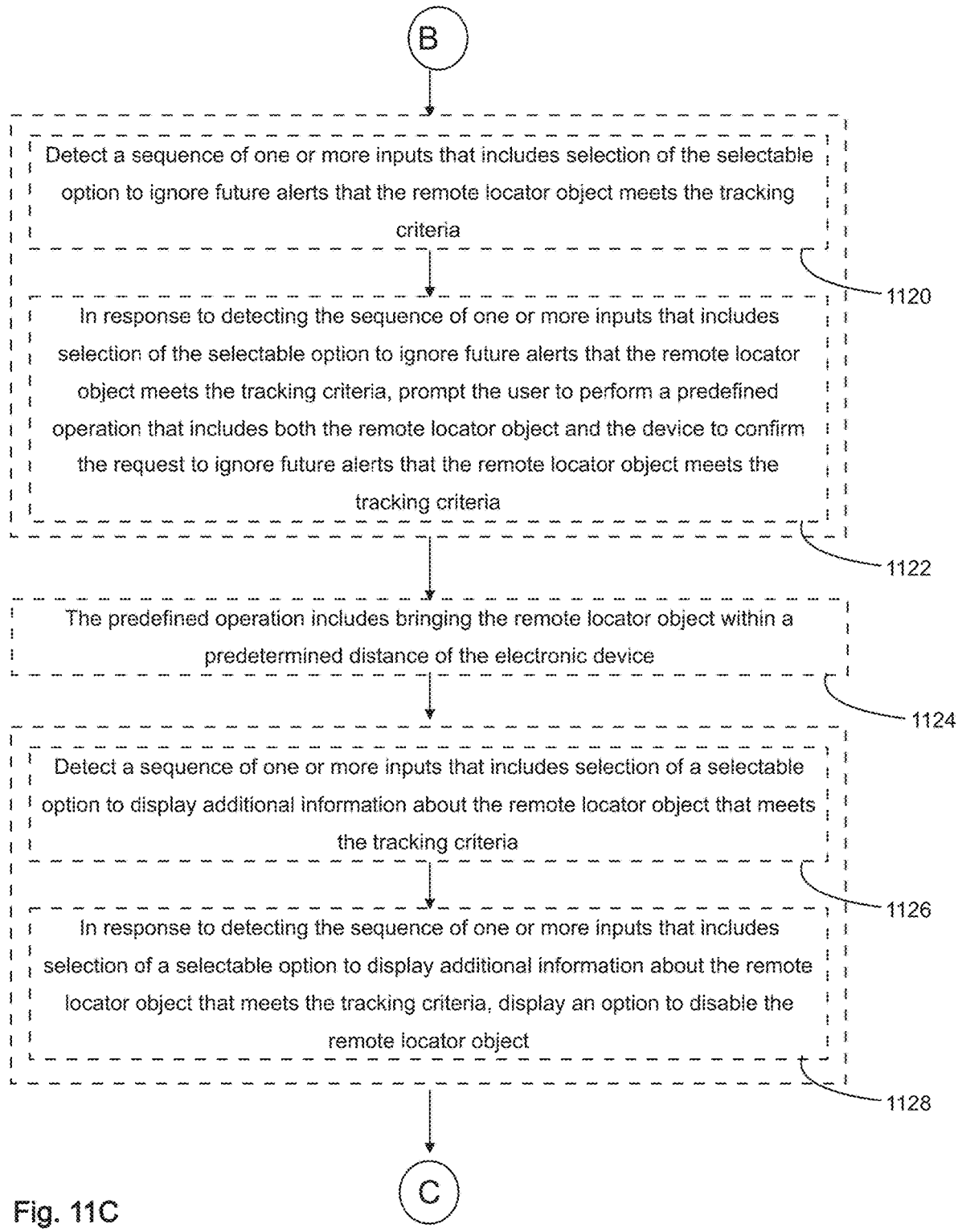
Figure 11D:
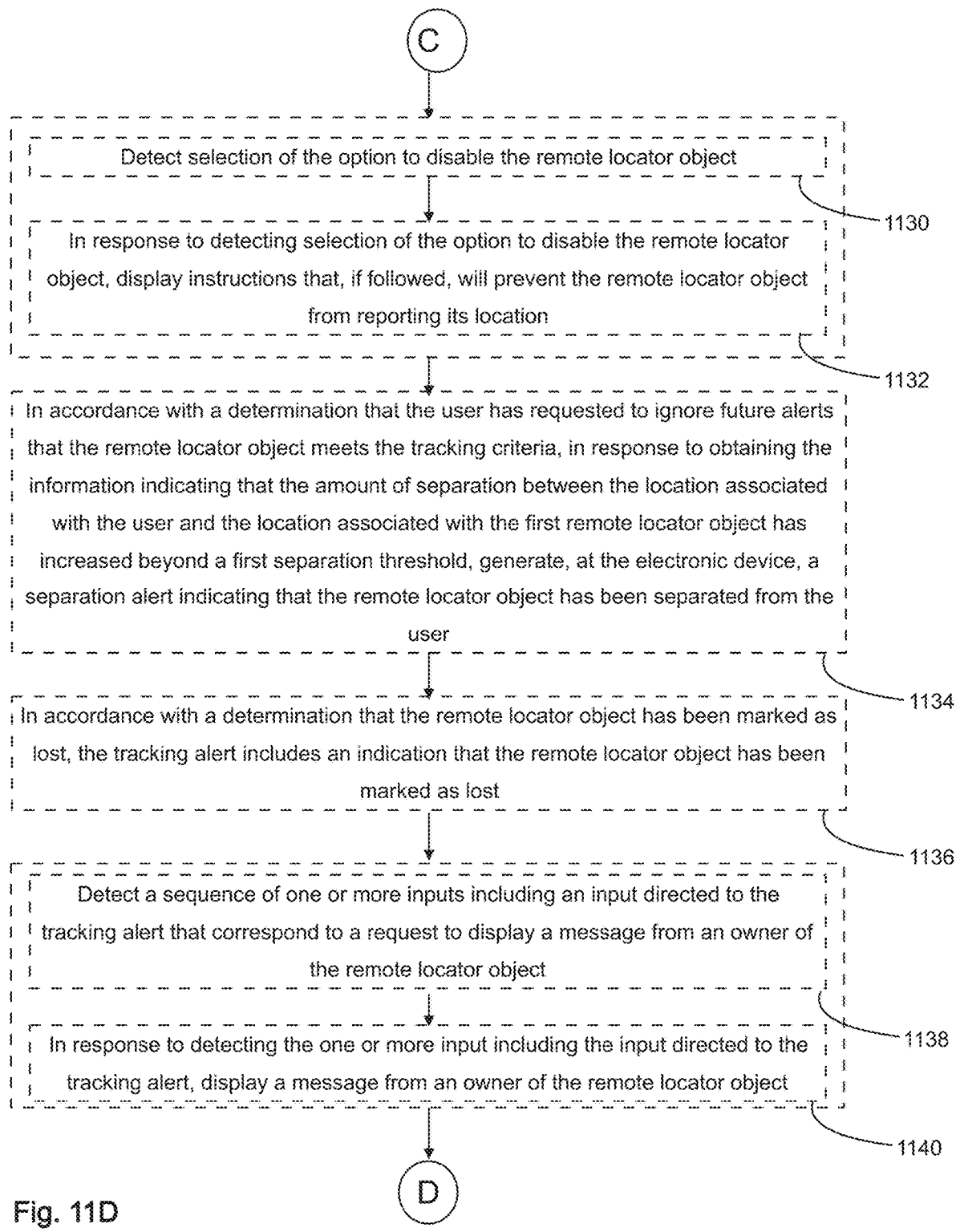
Figure 11E:
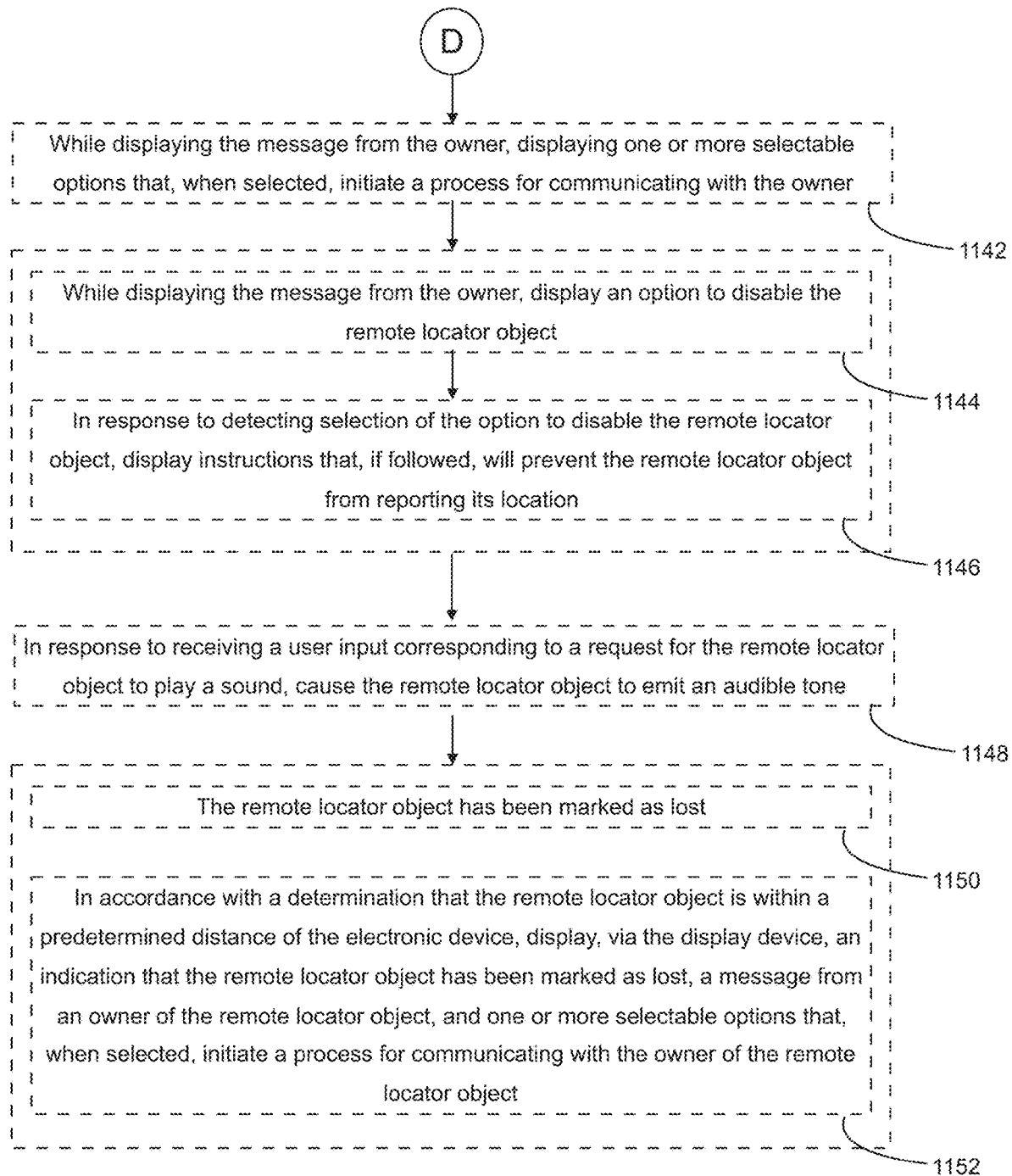

FIGS. 10A-10R illustrate exemplary ways in which an electronic device displays notifications of tracking by an unknown remote locator object in accordance with some embodiments of the disclosure. The embodiments in these figures are used to illustrate the processes described below, including the processes described with reference to FIGS. 11A-11E FIGS. 10A-10R illustrate an electronic device 500 displaying notifications of tracking by an unknown remote locator object. FIG. 10A illustrates an exemplary device 500 that includes touch screen 504. As shown in FIG. 10A, the electronic device 500 presents a lock screen user interface 1001 (e.g., a wake screen user interface). In some embodiments, lock screen user interface 1001 is the user interface that is displayed when electronic device 500 is awoken (e.g., from a sleep or locked state). In some embodiments, lock screen user interface 1001 includes notification 1002. In some embodiments, notification 1002 notifies the user that an unknown remote locator object (e.g., optionally a "locator") is tracking (e.g., following) the user's location. In some embodiments, notification 1002 hides the owner of the remote locator object's personal information, such as the label of the object and the owner's name. In some embodiments, notification 1002 indicates to the user that the owner of the unknown remote locator object is able to see the location of the remote locator object.

In some embodiments, notification 1002 is displayed when electronic device 500 (e.g., or a server) determines that the remote locator object's location has been following the user's location. In some embodiments, the remote locator object is determined to be following the user's location if the position of the remote locator object is the same as (or within a threshold distance of, such as 5 feet, 10 feet, 20 feet) the user's location for a threshold amount of time (e.g., 30 minutes, 1 hour, 2 hours). In some embodiments, the remote locator object is determined to be following the user's location if the position of the remote locator object is the same as the user's position after moving for a threshold distance (e.g., 1 mile, 2 miles, 3 miles). In some embodiments, the remote locator object is determined to be following the user's location if the position of the remote locator object is within a threshold distance from the user (e.g., 2 feet, 3 feet, 4 feet, 10 feet). In some embodiments, a respective remote locator object is determined to be unknown if the respective remote locator object is not associated with the user/user account of device 500 and is not being shared with the user/user account of device 500 (e.g., is associated with another user account). In some embodiments, a remote locator object that has previously been shared with the user but is not currently shared with the user is also considered to be an unknown remote locator object that would trigger tracking alerts. In some embodiments, any combination of the above can be factors or requirements for determining whether the remote locator object is following the user.

It is understood that although notification 1002 is illustrated as displayed on lock screen user interface 1001, notification 1002 can be displayed on other user interfaces (e.g., in all situations in which other notifications can be displayed).

In FIG. 10A, user input 1003 is received selecting notification 1002. In some embodiments, in response to the user input, electronic device 500 displays user interface 1010, as shown in FIG. 10B. In some embodiments, user interface 1010 is a card user interface that is overlaid over another user interface (e.g., such as a home screen user interface). In some embodiments, user interface 1010 includes map 1012 that indicates the current location of the user (e.g., and thus, of the remote locator object that is tracking the user). In some embodiments, user interface 1010 includes selectable options 1014-1 to 1014-3 for performing functions with respect to the remote locator object that is tracking the user. In some embodiments, selectable option 1014-1 is selectable to allow the unknown remote locator object to track the user for the rest of the day (e.g., and thus suppress future tracking alerts for the respective unknown remote locator object for the rest of the day). In some embodiments, selectable option 1014-2 is selectable to allow the unknown remote locator object to track the user indefinitely (e.g., and thus suppress all future tracking alerts for the respective unknown remote locator object). In some embodiments, selectable option 1014-3 is selectable to provide more information regarding the remote locator object.

In FIG. 10B, user input 1003 is received selecting selectable option 1014-1. In some embodiments, in response to the user input, device 500 initiates a process for allowing the unknown remote locator to track the user's location for the rest of the day. In some embodiments, when the unknown remote locator is allowed to track the user's location, tracking alerts (e.g., such as notification 1002) are no longer displayed on device 500 for the remainder of the current day. In some embodiments, after tracking by the unknown remote locator object is allowed, the unknown remote locator object is added to the user's application for tracking and finding items and is optionally displayed on user interface 1020 as an item that device 500 is tracking, such as in FIG. 10C. In some embodiments, user interface 1020 is similar to user interface 670. In some embodiments, user interface 1020 lists item 1026-1 corresponding to the unknown remote locator object. In some embodiments, item 1026-1 indicates the length of time for which tracking alerts are suppressed (e.g., for another 8 hours and 13 minutes). In some embodiments, item 1026-1 does not reveal the name of the owner or the label of the remote locator object to preserve the privacy of the owner of (e.g., user account associated with) the remote locator object. In some embodiments, while tracking by the unknown remote locator object is allowed, the user is able to receive separation alerts if the unknown remote locator object separates from the user's location by more than a threshold distance (e.g., 10 feet, 30 feet, 100 feet), similar to separation alert 802 described above with respect to FIGS. 8A-8P.

In FIG. 10D, user input 1003 is received selecting selectable option 1014-2 in user interface 1010. In some embodiments, in response to the user input, device 500 displays user interface 1030, as shown in FIG. 10E. In some embodiments, to allow tracking indefinitely, device 500 requires the user to bring device 500 within a threshold distance (e.g., 1 inch, 3 inches, 5 inches) from the unknown remote locator object. In some embodiments, this ensures that the user has found the unknown remote locator object and/or that the user knows exactly what item is tracking the user's location (e.g., and to not mistakenly approve the incorrect object). In some embodiments, user interface 1030 instructs the user to tap the unknown remote locator object using device 500 (e.g., bring device 500 within the threshold distance to the unknown remote locator object). In some embodiments, user interface 1030 includes an illustration 1032 of tapping the remote locator object with device 500 (e.g., a still image, a short video, an animation, etc.). In some embodiments, user interface 1030 includes selectable option 1034 that is selectable to cause the unknown remote locator object to emit an audible sound.

In FIG. 10F, the user brings device 500 within the above threshold distance to unknown remote locator object 1000. In some embodiments, in response to bringing device 500 within the threshold distance to unknown remote locator object 1000, communication is established between device 500 and unknown remote locator object 1000. In some embodiments, device 500 confirms that unknown remote locator object 1000 is the unknown remote locator object that is tracking the user's location. In some embodiments, in response to bringing device 500 within the threshold distance to unknown remote locator object 1000, device 500 initiates a process for allowing the unknown remote locator object to track the user's location for the rest of the day (e.g., or optionally until the user removes the authorization). In some embodiments, after the unknown remote locator object is allowed, the unknown remote locator object is added to user interface 1020, as shown in FIG. 10G (e.g., similarly to described above with respect to FIG. 10C). In some embodiments, item 1026-1 is displayed with an indicator that the remote locator object is ignored indefinitely. In some embodiments, item 1026-1 is selectable to change the user's permission settings (e.g., such as to set a time limit on ignoring the object or to remove the authorization).

In FIG. 10H, user input 1003 is received selecting selectable option 1014-3 in user interface 1010. In some embodiments, in response to the user input, device 500 displays user interface 1040, as shown in FIG. 10I. In some embodiments, user interface 1040 displays a representation 1042 of the remote locator object that is tracking the user. In some embodiments, representation 1042 is an icon of the remote locator object. In some embodiments, representation 1042 is an interactable model of the remote locator object. For example, in some embodiments, a user input on representation 1042 optionally causes representation 1042 to spin or rotate in accordance with the user input. In some embodiments, representation 1042 spins, rotates or otherwise animates on its own (e.g., without user involvement).

In some embodiments, user interface 1040 includes selectable options 1044-1, 1044-2 and 1044-3. In some embodiments, selectable option 1044-1 is selectable to cause the remote locator object to emit an audible sound to enable the user to find the remote locator object. In some embodiments, selectable option 1044-2 is selectable to allow the user to ignore the remote locator object (e.g., in a similar process as described above with respect to FIGS. 10B-10G). In some embodiments, selectable option 1044-3 is selectable to display instructions for disabling the remote locator object. For example, in FIG. 10J, a user input 1003 is received selecting selectable option 1044-3. In some embodiments, in response to the user input, device 500 displays user interface 1050. In some embodiments, user interface 1050 displays a representation 1052 of the remote locator object. In some embodiments, representation 1052 is an animation that illustrates steps for disassembling and disabling the remote locator object (e.g., optionally removing the batteries in remote locator object), as shown in FIGS. 10K-10M. Selection of selectable option 1054 causes device 500 to cease displaying user interface 1050 without allowing the remote locator object to track the location of the user.

FIGS. 10N-10P illustrates an exemplary embodiment of displaying a tracking notification of an unknown remote locator object that has been marked as lost by the owner of the unknown remote locator object. In FIG. 10N, notification 1002 is displayed on lock screen user interface 1001. In some embodiments, notification 1002 indicates that a lost locator is following the user's location. In some embodiments, notification 1002 is displayed on device 500 in response to a determination the lost remote locator object's location has been following the user's location. Thus, in some embodiments, notification 1002 for a lost remote locator object is triggered based on the same factors and/or requirements that triggered notification 1002 discussed above with respect to FIG. 10A (e.g., except that notification 1002 indicates that the remote locator object is lost).

In FIG. 10N, user input 1003 is received selecting notification 1002. In some embodiments, in response to the user input, device 500 displays user interface 1060, as shown in FIG. 10O. In some embodiments, user interface 1060 displays a representation 1062 of the remote locator object (e.g., similar to representation 1042). In some embodiments, user interface 1060 includes selectable options 1064-1, 1064-2 and 1064-3. In some embodiments, selectable option 1064-1 is selectable to display a message from the owner of the lost remote locator object. In some embodiments, selectable option 1064-2 is selectable to cause the lost remote locator object to emit an audible sound. In some embodiments, selectable option 1064-3 is selectable to display instructions for disabling the remote locator object (e.g., similar to user interface 1050 described above with respect to FIGS. 10K-10M).

In FIG. 10O, user input 1003 is received selecting selectable option 1064-1. In some embodiments, in response to the user input, device 500 updates user interface 1060 to reveal the message 1066 provided by the owner of the object. In some embodiments, selectable option 1064-1 is updated from being selectable to reveal a message from the owner to being selectable to initiate a process for contacting the owner of the lost remote locator object. In some embodiments, the process for contacting the owner of the lost remote locator object includes displaying one or more selectable options for contacting the owner using one or more communication mediums (e.g., call, text, email, etc.). In some embodiments, the privacy of the owner of the remote locator object is maintained (e.g., the owner's name, contact details are not revealed to the user), unless the owner chooses to reveal personal details (e.g., such as by including personal information in message 1066).

FIGS. 10Q-10R illustrate an exemplary embodiment in which device 500 is placed within a threshold distance (e.g., NFC communication distance, such as 1, 3, 5 inches) of a remote locator object 1000 that has been marked as lost (but has not been tracking the location of the user). FIG. 10Q illustrates device 500 and remote locator object 1000. In FIG. 10Q, remote locator object 1000 has been marked as lost by the owner of remote locator object 1000. In FIG. 10R, the user brings device 500 within a threshold distance of the remote locator object 1000. In some embodiments, in response to placing device 500 within the threshold distance of remote locator object 1000, device 500 communicates with remote locator object 1000 and displays user interface 1080 overlaid over the user interface that was previously displayed on device 500 (e.g., user interface 1070). In some embodiments, user interface 1080 is a "quick" control sheet that displays information about the remote locator object 1000 and one or more selectable options for contacting the owner of (or user account associated with) remote locator object 1000. In some embodiments, user interface 1080 displays message 1082 from the owner of remote locator object 1000. In some embodiments, user interface 1080 includes selectable options 1084-1, 1084-2, and 1084-3. In some embodiments, selectable option 1084-1 is selectable to send the location of remote locator object 1000 to the owner. In some embodiments, selectable option 1084-2 is selectable to send a text message to the owner. In some embodiments, selectable option 1084-3 is selectable to call the owner. In some embodiments, similarly to as discussed above, the privacy of the owner of the remote locator object is maintained (e.g., the owner's name, contact details are not revealed to the user), unless the owner chooses to reveal personal details (e.g., such as by including personal information in message 1082).

FIGS. 11A-11E are flow diagrams illustrating a method 700 of displaying notifications of tracking by an unknown remote locator object in accordance with some embodiments, such as in FIGS. 10A-10R. The method 1100 is optionally performed at an electronic device such as device 100, device 300, device 500 as described above with reference to FIGS. 1A-1B, 2-3, 4A-4B and 5A-5H. Some operations in method 1100 are, optionally combined and/or order of some operations is, optionally, changed.

As described below, the method 1100 provides ways to display notifications of tracking by an unknown remote locator object. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 10A, an electronic device with one or more wireless antenna, a display device, and one or more input devices (e.g., a mobile device (e.g., a tablet, a smartphone, a media player, or a wearable device) including a touch screen and wireless communication circuitry, or a computer including one or more of a keyboard, mouse, trackpad, and touch screen and wireless communication circuitry), while a remote locator object that is associated with a user other than a user of the electronic device is near the electronic device (e.g., within 3 feet, 10 feet, 20 feet of the user), in accordance with a determination that the remote locator object meets tracking criteria (e.g., the remote locator object is tracking or otherwise following the location of the user and/or the electronic device), automatically presents (1102), without user input, a tracking alert that indicates that the remote locator object that is not associated with the user meets the tracking criteria, such as in FIG. 10A (e.g., display a notification or other alert on the electronic device that indicates that an unknown remote locator object (e.g., a remote locator object that is not associated with the user and/or not shared with the user) is tracking the user and/or the electronic device). In some embodiments, the tracking criteria is satisfied if the location of the remote locator object is following or tracking the electronic device for longer than a threshold amount of time/distance (e.g., time and/or distance, for example, for the last 20 feet, 50 feet, 100 feet, for the last 5 minutes, 10 minutes, 15 minutes, etc.).

In some embodiments, the remote locator object is considered to be following or tracking the electronic device if the location of the remote locator object is within 1, 2, 3 feet of the electronic device for the threshold amount of time and/or distance. In some embodiments, the remote locator object is considered to be following or tracking the electronic device if the distance between the remote locator object and the electronic device does not substantially change (e.g., within 5%, 10%, 15%) for a threshold amount (of time and/or distance). In some embodiments, any combination of these criterion are contemplated. In some embodiments, a detailed tracking alert is displayed in response to selection of the tracking alert (e.g., selection of a tracking notification such as a tap input on a tracking notification). In some embodiments, the tracking alert is not displayed if the remote locator object that is not associated with the user does not meet the tracking criteria. In some embodiments, a remote locator object that is not associated with the user but is shared with the user does not cause a tracking alert, because it does not meet the tracking criteria. In some embodiments, the tracking criteria are not met when one or more of the above-described criteria are not satisfied.

The above-described manner of alerting the user that an unknown remote locator object meets a tracking criteria (e.g., by automatically displaying a tracking alert to the user when an unknown remote locator object is tracking the user) provides the user with an alert if a remote locator object is following the user (e.g., by automatically displaying a tracking alert without the user's input if a remote locator object is determined to be tracking the user), which simplifies the interaction between the user and the electronic device and enhances the operability of the electronic device and makes the user-device interface more efficient (e.g., by providing the user with a warning that a potentially unauthorized remote locator object is following the user's location), which additionally reduces power usage and improves battery life of the electronic device by enabling the user to use the electronic device more quickly and efficiency.

In some embodiments, the tracking criteria include one or more of: a requirement that a location associated with the remote locator object is within a predetermined threshold distance of a location associated with the user (e.g., the unidentified remote locator object is within a threshold distance from the user (e.g., 1 feet, 2 feet, 3 feet)), a requirement that the location associated with the remote locator object has remained within a threshold distance of a location associated with the user for at least a threshold amount of time (e.g., the remote locator object has stayed within the threshold distance from the user for a threshold amount of time (e.g., 5 minutes, 15 minutes, 30 minutes)), a requirement that the remote locator object is not associated with the user (e.g., the unidentified remote locator object is not owned by the user or otherwise shared with the user—in some embodiments, the unidentified remote locator object is owned or otherwise associated with another user), and a requirement that the remote locator object is reporting location to another user (1104), such as in FIG. 10A (e.g., the unidentified remote locator object is set up and paired or otherwise associated with another user/user account such that the other user is able to track the location of the remote locator object and thus track the location of the user). In some embodiments, the tracking criteria includes a requirement that the remote locator object has remained within a threshold distance from the user even when the user has moved or otherwise changed locations. In some embodiments, the tracking criteria includes a requirement that the remote locator object has remained within the threshold distance from the user for a threshold amount of distance traveled by the user (e.g., 50 feet, 100 feet, 200 feet, etc.). In some embodiments, the tracking criteria includes any combination of these requirements.

The above-described manner of alerting the user that an unknown remote locator object meets a tracking criteria (e.g., by determining that one or more tracking criteria is satisfied) allows the electronic device to determine that the remote locator object is truly following the user and avoid unnecessarily displaying tracking alerts (e.g., by requiring satisfaction of certain conditions when determining that the remote locator object is following the user), which simplifies the interaction between the user and the electronic device and enhances the operability of the electronic device and makes the user-device interface more efficient (e.g., by providing the user with a warning that a unauthorized remote locator object is following the user's location when it is likely that the remote locator object is actually following the user's location), which additionally reduces power usage and improves battery life of the electronic device by enabling the user to use the electronic device more quickly and efficiency, while reducing errors in the usage of the device.

In some embodiments, the tracking alert includes a selectable option that includes information enabling the user to visually identify the remote locator object (1108), such as in FIG. 10I (e.g., a visual or text description of the remote locator object, such as a virtual three dimensional model of the remote locator object).

The above-described manner of alerting the user that an unknown remote locator object meets a tracking criteria (e.g., by displaying information such as a visual illustration of the remote locator object to enable the user to identify the remote locator object) provides the user with the ability to find and identify the remote locator object that is following the user (e.g., by displaying an illustration of the remote locator object), which simplifies the interaction between the user and the electronic device and enhances the operability of the electronic device and makes the user-device interface more efficient (e.g., by providing the user with the ability to find and identify the remote locator object without requiring the user to perform separate research to determine what a remote locator object could look like), which additionally reduces power usage and improves battery life of the electronic device by enabling the user to use the electronic device more quickly and efficiency.

In some embodiments, the tracking alert includes a selectable option to ignore future alerts that the remote locator object meets the tracking criteria (1106), such as in FIG. 10B (e.g., the tracking alert includes a selectable option that is selectable to ignore the tracking of the remote locator object such that tracking alerts for the unidentified remote locator object are suppressed or otherwise not displayed). In some embodiments, the user is able to set the duration of time for ignoring the remote locator object.

The above-described manner of ignoring a tracking alert (e.g., by providing a selectable option to ignore future tracking alerts associated with the remote locator object) provides the user with the option to disable alerts for the remote locator object if the remote locator object is known to the user and prevent the further display of tracking alerts which the user would have to perform additional inputs to dismiss, which simplifies the interaction between the user and the electronic device and enhances the operability of the electronic device and makes the user-device interface more efficient (e.g., by giving the user the option to automatically dismiss future alerts without unnecessary providing alerts to the user and requiring the user to verify that the tracking alert should be ignored each time), which additionally reduces power usage and improves battery life of the electronic device by enabling the user to use the electronic device more quickly and efficiency.

In some embodiments, the electronic device detects (1110) a sequence of one or more inputs that includes selection of the selectable option to ignore future alerts that the remote locator object meets the tracking criteria, such as in FIG. 10B (e.g., selection of a "silence alert" affordance, followed by selection of an "until the end of the day" affordance). In some embodiments, in response to receiving a user input selecting the "silence alert" affordance, the device displays a user interface including selectable options for selecting a duration for how long to ignore the alert. In some embodiments, predetermined duration options are displayed, such as a "until the end of the day" affordance, which is selectable to silence tracking alerts until the end of the day, and/or a "indefinitely" affordance, which is selectable to initiate a process for silencing tracking alerts indefinitely. In some embodiments, in response to detecting the sequence of one or more inputs that includes selection of the selectable option to ignore future alerts that the remote locator object meets the tracking criteria, the electronic device forgoes (1112) display of future alerts that the remote locator object meets the tracking criteria for a predetermined time threshold, such as in FIG. 10C (e.g., 1 hour, 2 hours, until the end of the day, until the end of the week). In some embodiments, the user is able to provide a custom duration. In some embodiments, even while the device is forgoing display of future alerts that the remote locator object meets the tracking criteria, the device continues to generate alerts that other remote locator objects meet the tracking criteria if other remote locator objects meet the tracking criteria (e.g., ignore tracking applies only to the particular remote locator object for which tracking was detected).

The above-described manner of silencing tracking alerts (e.g., by forgoing display of future alerts for a predetermined amount of time in response to detecting a selection of an option to ignore the alert for the predetermined amount of time) provides the user with the ability to disable tracking alerts for a predetermined amount of time when the user expects the remote locator object to be following the user for the predetermined amount of time, which simplifies the interaction between the user and the electronic device and enhances the operability of the electronic device and makes the user-device interface more efficient (e.g., by providing the user with the ability to suppress tracking alerts for predetermined amounts of time without requiring the user to dismiss future tracking alerts and later re-enable tracking alerts after the predetermined amount of time or without requiring the user to continue dismissing tracking alerts during the predetermined amount of time), which additionally reduces power usage and improves battery life of the electronic device by enabling the user to use the electronic device more quickly and efficiency.

In some embodiments, in response to detecting the sequence of one or more inputs that includes selection of the selectable option to ignore future alerts that the remote locator object meets the tracking criteria, the electronic device adds (1114) the remote locator object to a set of physical objects that are available to be viewed in a location tracking status user interface on the device, such as in FIG. 10C (e.g., after receiving the user input to ignore future tracking alerts, adding the unidentified remote locator object to a status user interface that includes physical objects associated with the user). In some embodiments, when the remote locator object is added to the tracking status user interface it is displayed with an indication of its location relative to a location associated with the user and/or an indication of how long the user has been ignoring the location of the remote locator object. In some embodiments, when the remote locator object is added to the tracking status user interface, the name of the owner of the remote locator object is not shown. For example, the remote locator object is identified as "Someone's Locator", "Unknown Locator", or the like.

The above-described manner of ignoring the alert that an unknown remote locator object meets a tracking criteria (e.g., by adding the remote locator object to the set of objects that are being tracked by the electronic device when the user chooses to ignore tracking alerts associated with the remote locator object) provides the user with a reminder that the remote locator object is still tracking the user, even after the user has dismissed tracking alerts (e.g., by displaying the remote locator object that is tracking the user with the set of objects that are being tracked by the user), which simplifies the interaction between the user and the electronic device and enhances the operability of the electronic device and makes the user-device interface more efficient (e.g., by providing the user with the ability to track the location of the remote locator object after silencing tracking alerts without requiring the user to physically confirm the location of the remote locator object to determine whether the remote locator object is still tracking the user), which additionally reduces power usage and improves battery life of the electronic device by enabling the user to use the electronic device more quickly and efficiency.

In some embodiments, the electronic device detects (1116) a sequence of one or more inputs that includes selection of the selectable option to ignore future alerts that the remote locator object meets the tracking criteria, such as in FIG. 10D (e.g., selection of a "silence alert" affordance, followed by selection of an "forever" or "indefinitely" affordance). In some embodiments, in response to detecting the sequence of one or more inputs that includes selection of the selectable option to ignore future alerts that the remote locator object meets the tracking criteria, the electronic device forgoes (1118) display of future alerts that the remote locator object meets the tracking criteria, such as in FIG. 10G (e.g., ignore or otherwise suppress tracking alerts for the given remote locator object permanently). In some embodiments, even while the device is forgoing display of future alerts that the remote locator object meets the tracking criteria, the device continues to generate alerts that other remote locator objects meet the tracking criteria if other remote locator objects meet the tracking criteria (e.g., ignore tracking applies only to the particular remote locator object for which tracking was detected).

The above-described manner of silencing tracking alerts (e.g., by suppressing future tracking alerts indefinitely) provides the user with the ability to disable the display of unnecessary future tracking alerts that the user would have to perform additional inputs to dismiss, which simplifies the interaction between the user and the electronic device and enhances the operability of the electronic device and makes the user-device interface more efficient (e.g., by providing the user with the ability to ignore tracking alerts without requiring the user to request sharing of the remote locator object or constantly ignore tracking alerts to suppress all future alerts), which additionally reduces power usage and improves battery life of the electronic device by enabling the user to use the electronic device more quickly and efficiency.

In some embodiments, the electronic device detects (1120) a sequence of one or more inputs that includes selection of the selectable option to ignore future alerts that the remote locator object meets the tracking criteria, such as in FIG. 10D (e.g., selection of a "silence alert" affordance, followed by selection of an "forever" or "indefinitely" affordance). In some embodiments, in response to detecting the sequence of one or more inputs that includes selection of the selectable option to ignore future alerts that the remote locator object meets the tracking criteria, the electronic device prompts (1122) the user to perform a predefined operation that includes both the remote locator object and the device to confirm the request to ignore future alerts that the remote locator object meets the tracking criteria, such as in FIG. 10E (e.g., require an active confirmation from the user to ignore tracking alerts associated with the remote locator object indefinitely before causing tracking alerts to be ignored indefinitely). In some embodiments, the active confirmation includes performing an NFC tap gesture on the remote locator object with the electronic device. In some embodiments, the active confirmation includes selecting a selectable option.

The above-described manner of silencing tracking alerts (e.g., by requiring confirmation that the user is requesting to ignore tracking alerts indefinitely) avoids accidental dismissal of a tracking notification when the remote locator object has not actually been found, which simplifies the interaction between the user and the electronic device and enhances the operability of the electronic device and makes the user-device interface more efficient (e.g., by requiring confirmation from the user by physically interacting with both the remote locator object and the electronic device), which additionally reduces power usage and improves battery life of the electronic device by enabling the user to use the electronic device more quickly and efficiency, while reducing errors in the usage of the device.

In some embodiments, the predefined operation includes bringing the remote locator object within a predetermined distance of the electronic device (1124), such as in FIG. 10F (e.g., bring the remote locator object within near field communication distance of the electronic device (e.g., 1 inch, 2 inches, 3 inches,) such that NFC communication is established between the electronic device and the remote locator object). In some embodiments, performing the NFC tap gesture serves as a confirmation (e.g., to the electronic device), that the user knows which remote locator object is being ignored indefinitely. In some embodiments, the prompt is displayed in a user interface that includes an affordance that, when selected, causes the remote locator object to play a sound.

The above-described manner of silencing tracking alerts (e.g., by requiring confirmation that the user is requesting to ignore tracking alerts indefinitely by placing the remote locator object within a predetermined distance of the electronic device) allows the electronic device to confirm that the remote locator object that the user has found is the same remote locator object that is tracking the user (e.g., by establishing an NFC communication link with the remote locator object to confirm the identity of the remote locator object), which simplifies the interaction between the user and the electronic device and enhances the operability of the electronic device and makes the user-device interface more efficient (e.g., by requiring confirmation from the user by physically moving the electronic device within the proximity of the remote locator object), which additionally reduces power usage and improves battery life of the electronic device by enabling the user to use the electronic device more quickly and efficiency, while reducing errors in the usage of the device.

In some embodiments, the electronic device detects (1126) a sequence of one or more inputs that includes selection of a selectable option to display additional information about the remote locator object that meets the tracking criteria, such as in FIG. 10H (e.g., detecting a selection of a "learn more" affordance). In some embodiments, in response to detecting the sequence of one or more inputs that includes selection of the selectable option to display additional information about that the remote locator object that meets the tracking criteria, the electronic device displays (1128) an option to disable the remote locator object, such as in FIG. 10I (e.g., the option to disable the remote locator object is selectable to initiate a process for displaying instructions on how to disable the remote locator object such that the remote locator object will no longer transmit location information to another user). In some embodiments, the user interface that includes the option to disable the remote locator object includes a selectable option to play a sound at the remote locator object, a selectable option to ignore the remote locator object, and/or information that enables a user to visually identify the remote locator object (e.g., a visual representation of the remote locator object).

The above-described manner of displaying information about the remote locator object (e.g., by displaying additional information about the remote locator object that is tracking the user along with an option for disabling the remote locator object) provides the user with the ability to quickly view information about the electronic device and provide the user with the option to disable the remote locator object after the user determines that the remote locator object is unknown to the user, which simplifies the interaction between the user and the electronic device and enhances the operability of the electronic device and makes the user-device interface more efficient (e.g., by providing further information to the user and provide the user with information to disable the remote locator object without requiring the user to navigate to a separate interface or perform separate research to receive information about the remote locator object and/or disable the remote locator object), which additionally reduces power usage and improves battery life of the electronic device by enabling the user to use the electronic device more quickly and efficiency.

In some embodiments, the electronic device detects selection of the option to disable the remote locator object (1130), such as in FIG. 10J. In some embodiments, in response to detecting selection of the option to disable the remote locator object, the electronic device displays (1132) instructions that, if followed, will prevent the remote locator object from reporting its location, such as in FIGS. 10K-10M (e.g., instructions for dismantling the remote locator object and removing a power source such as a battery, such as text, audio, video or image based instructions). In some embodiments, the instructions for preventing the remote locator object from reporting its location are displayed along with a selectable user interface object that if selected, will cause the remote locator object to generate a sound (e.g., to enable the user to locate the remote locator object). In some embodiments, the instructions for dismantling the remote locator object include an animation and/or a step-by-step illustration of the steps to perform to dismantle the remote locator object and/or remove its power source.

The above-described manner of providing information for how to disable the remote locator object (e.g., by displaying instructions for disabling the remote locator object) provides the user with easily accessible on-screen step-by-step illustrative instructions on how to disable the remote locator object, which simplifies the interaction between the user and the electronic device and enhances the operability of the electronic device and makes the user-device interface more efficient (e.g., by providing the user with instructions on how to disable a remote locator object that the user does not recognize and does not want to be tracking the user's location without requiring the user to perform separate research to determine how to disable the remote locator object), which additionally reduces power usage and improves battery life of the electronic device by enabling the user to use the electronic device more quickly and efficiency.

In some embodiments, in accordance with a determination that the user has requested to ignore future alerts that the remote locator object meets the tracking criteria, in response to obtaining the information indicating that the amount of separation between the location associated with the user and the location associated with the first remote locator object has increased beyond a first separation threshold, the electronic device generates (1134), at the electronic device, a separation alert indicating that the remote locator object has been separated from the user, such as described in FIG. 10C (e.g., after receiving the user input to ignore future tracking alerts and/or adding the unidentified remote locator object to a status user interface that includes physical objects associated with the user, the electronic device displays a separation alert if the distance between the remote locator object and the user is beyond a threshold distance (e.g., 50 feet, 200 feet, 500 feet, ½ mile), similar to the separation alerts described with respect to method 900). In some embodiments, the name of the owner of the remote locator object is not shown on the separation alert. For example, the remote locator object is identified as "Someone's Locator", "Unknown Locator", or the like.

The above-described manner of receiving separation alerts for the remote locator object (e.g., by providing separation alerts when the user has indicated that the user recognizes the remote locator object and requests to ignore tracking alerts) allows the electronic device to automatically inform the user when the remote locator object is no longer tracking the user, which simplifies the interaction between the user and the electronic device and enhances the operability of the electronic device and makes the user-device interface more efficient (e.g., by providing an alert when the remote locator object is no longer tracking the user and is separated from the user without requiring the user to continue confirming to see whether the remote locator object is still tracking the user), which additionally reduces power usage and improves battery life of the electronic device by enabling the user to use the electronic device more quickly and efficiency.

In some embodiments, in accordance with a determination that the remote locator object has been marked as lost, the tracking alert includes an indication that the remote locator object has been marked as lost (1136), such as in FIG. 10N (e.g., if the remote locator object has been marked as lost (e.g., by the owner of the object and/or user account associated with the remote locator object), then the tracking alert indicates that the remote locator object is lost (e.g., "a lost locator is tracking your location").).

The above-described manner of displaying a tracking alert for a lost remote locator object (e.g., by displaying an indication that the remote locator object has been marked as lost) allows the electronic device to quickly and efficiently inform the user that the remote locator object that is tracking the user has been marked as lost (e.g., such that it is not necessarily maliciously tracking the user), which simplifies the interaction between the user and the electronic device and enhances the operability of the electronic device and makes the user-device interface more efficient (e.g., by conveniently providing the user with information that the remote locator object is lost and likely is not maliciously tracking the user), which additionally reduces power usage and improves battery life of the electronic device by enabling the user to use the electronic device more quickly and efficiency.

In some embodiments, the electronic device detects (1138) a sequence of one or more inputs including an input directed to the tracking alert that corresponds to a request to display a message from an owner of the remote locator object, such as in FIG. 10O (e.g., in response to receiving a user input selecting a notification indicating that a lost remote locator object is following the user's location, display a user interface that includes a selectable option that is selectable to display a message from the owner). In some embodiments, the message from the owner is provided when the owner marks the remote locator object as lost. In some embodiments, the user interface includes a selectable option to cause the remote locator object to play a sound and/or a selectable option to display instructions for dismantling and/or disabling the remote locator object.

In some embodiments, in response to detecting the one or more inputs including the input directed to the tracking alert, the electronic device displays (1140) a message from the owner of the remote locator object, such as in FIG. 10P (e.g., displaying on the user interface a message from the owner). In some embodiments, the selectable option for displaying the message from the owner is removed from the user interface when the message from the owner is displayed. In some embodiments, the name of the owner of the remote locator object is not shown or otherwise hidden. For example, the message is displayed as from the "Owner" or the like.

The above-described manner of displaying information about a lost remote locator object (e.g., displaying a message from the owner of the lost remote locator object) provides the user with the ability to quickly and efficiently view a message from the owner of the remote locator object, which simplifies the interaction between the user and the electronic device and enhances the operability of the electronic device and makes the user-device interface more efficient (e.g., by providing the user with a custom message from the owner of the lost remote locator object and thus providing the user with more information about the lost remote locator object), which additionally reduces power usage and improves battery life of the electronic device by enabling the user to use the electronic device more quickly and efficiency.

In some embodiments, while displaying the message from the owner, the electronic device displays (1142) one or more selectable options that, when selected, initiate a process for communicating with the owner, such as in FIG. 10P (e.g., after displaying the message from the owner, displaying a selectable option to initiate a process for contacting the owner of the remote locator object (e.g., via a phone call, text message, or email)). In some embodiments, the selectable option to initiate a process for contacting the owner replaces the selectable option for displaying the message from the owner. In some embodiments, selection of the selectable option to initiate a process for communicating with the owner causes display of one or more options corresponding to one or more methods of contacting the owner. In some embodiments, the identity of the owner and/or contact information of the owner is not shown or otherwise hidden. For example, the owner is identified as "Unknown Locator's Owner" or "Lost Locator's Owner" or the like, and the phone number, email address, etc. are never shown to the user (e.g., to preserve the privacy of the owner). In some embodiments, the owner of the remote locator object is able to decide to share his or her information (e.g., by providing his or her information in the message itself).

The above-described manner of contacting the owner of the lost remote locator object (e.g., by providing one or more options for initiating a process of communicating or contacting the owner of the lost remote locator object) provides for a quick and efficient manner of contacting the owner, which simplifies the interaction between the user and the electronic device and enhances the operability of the electronic device and makes the user-device interface more efficient (e.g., by providing the user with a convenient method to contact the owner without requiring the user to navigate to a separate user interface or perform separate research to determine how to contact the owner), which additionally reduces power usage and improves battery life of the electronic device by enabling the user to use the electronic device more quickly and efficiency.

In some embodiments, while displaying the message from the owner, the electronic device displays (1144) an option to disable the remote locator object, such as in FIG. 10P. In some embodiments, in response to detecting selection of the option to disable the remote locator object, the electronic device displays (1146) instructions that, if followed, will prevent the remote locator object from reporting its location, such as in FIGS. 10K-10M (e.g., instructions for dismantling the remote locator object and removing a power source such as a battery, such as text, audio, video or image based instructions). In some embodiments, the instructions for preventing the remote locator object from reporting its location are displayed along with a selectable user interface object that if selected, will cause the remote locator object to generate a sound (e.g., to enable the user to locate the remote locator object). In some embodiments, the instructions for dismantling the remote locator object are the same instructions displayed to the user in response to the user's selection of an option to disable a remote locator object that is tracking the user that is not marked as lost.

The above-described manner of providing the option to disable the lost remote locator object (e.g., by displaying instructions on how to disable the remote locator object) provides for quickly accessible instructions on how to disable the lost remote locator object, even if the remote locator object has been marked as lost, which simplifies the interaction between the user and the electronic device and enhances the operability of the electronic device and makes the user-device interface more efficient (e.g., by providing the user with the option to and instructions for disabling the remote locator object without requiring the user to perform separate research to determine how to disable the remote locator object), which additionally reduces power usage and improves battery life of the electronic device by enabling the user to use the electronic device more quickly and efficiency.

Figure 12A:
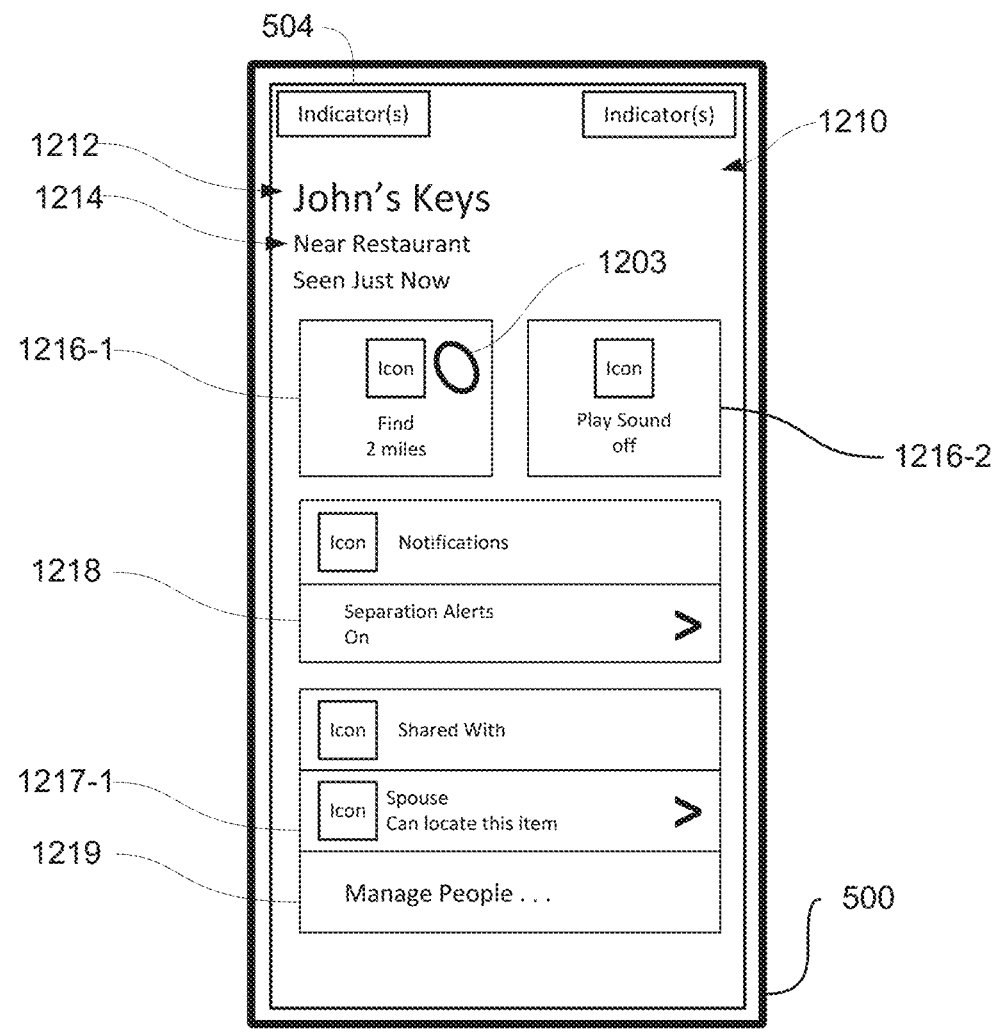
FIGS. 12A-12FF illustrate exemplary ways in which an electronic device presents user interfaces for tracking and finding remote locator objects in accordance with some embodiments of the disclosure.
Figure 12B:
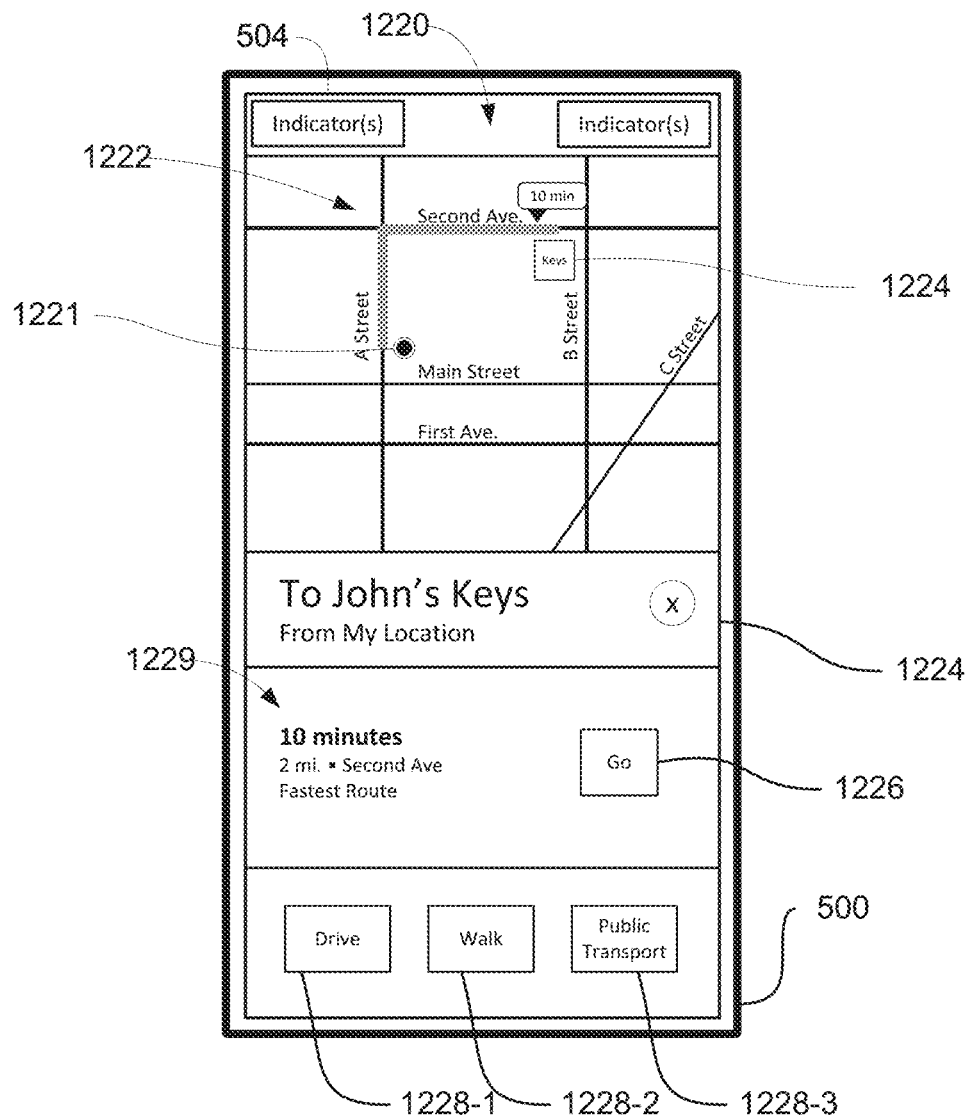
Figure 12C:
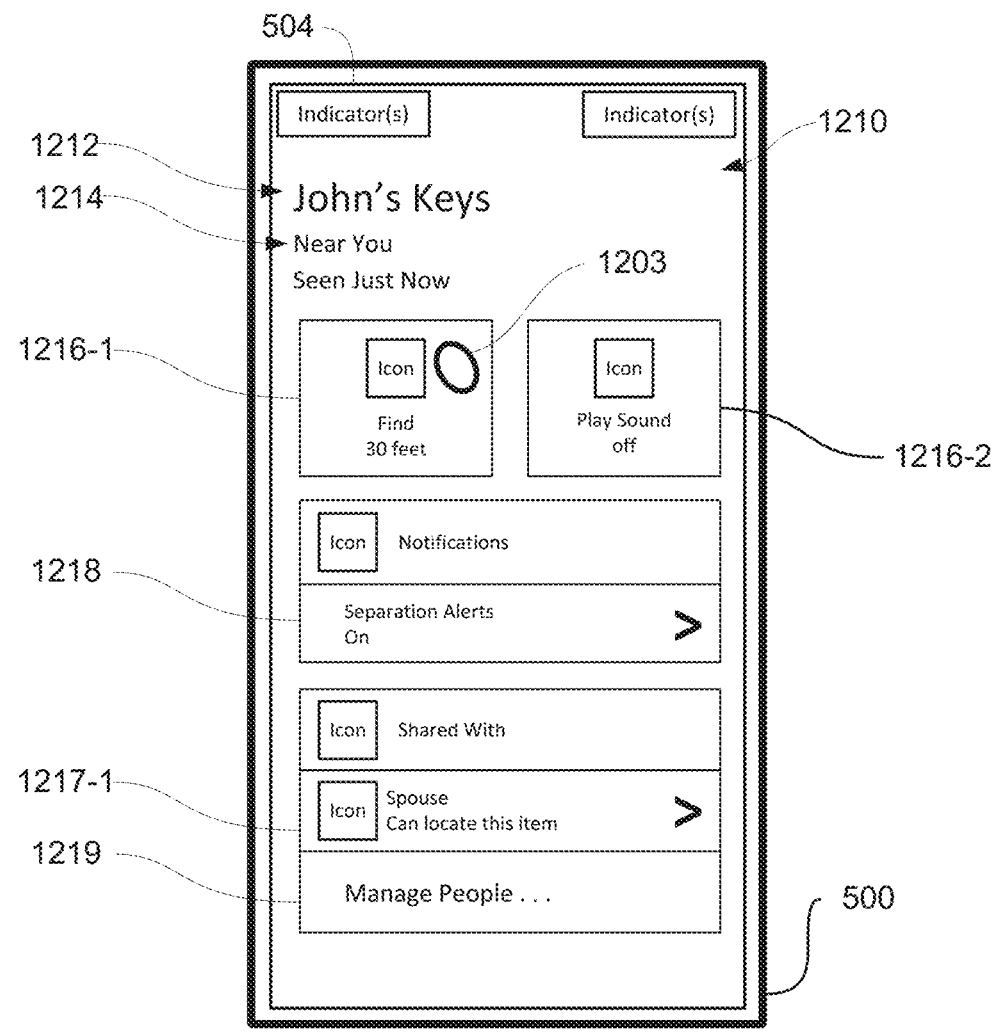
Figure 12D:
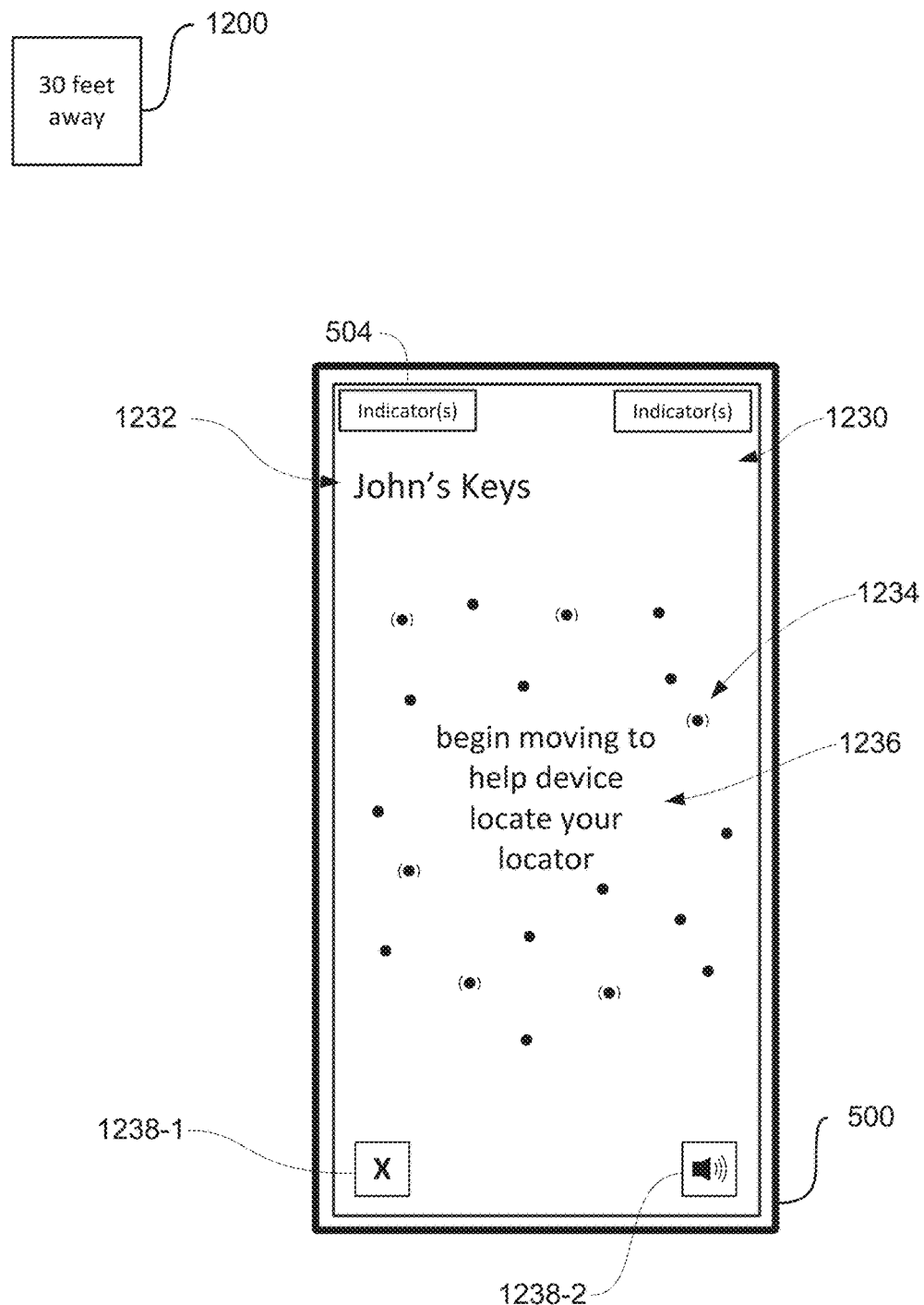
Figure 12E:
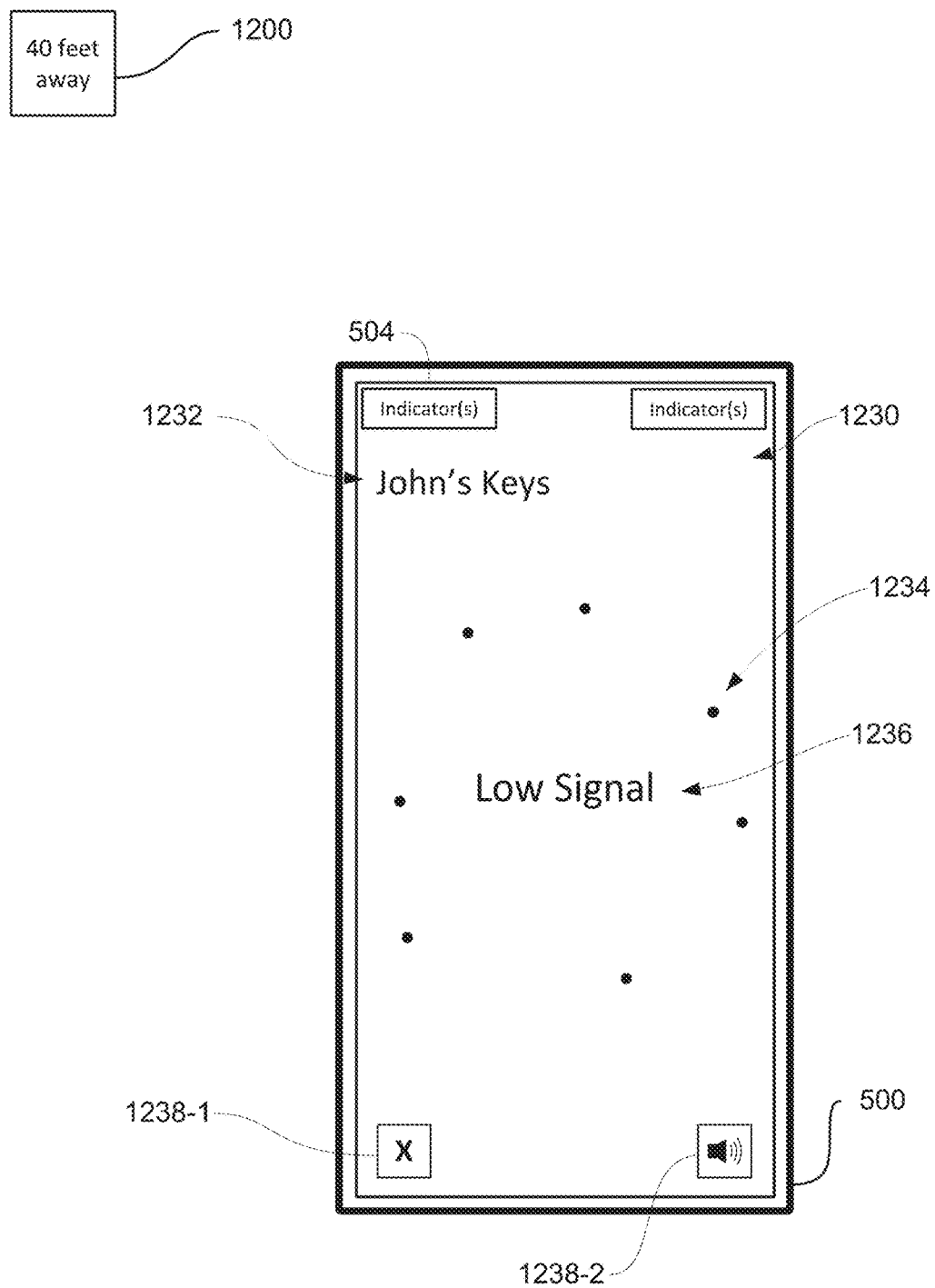
Figure 12F:
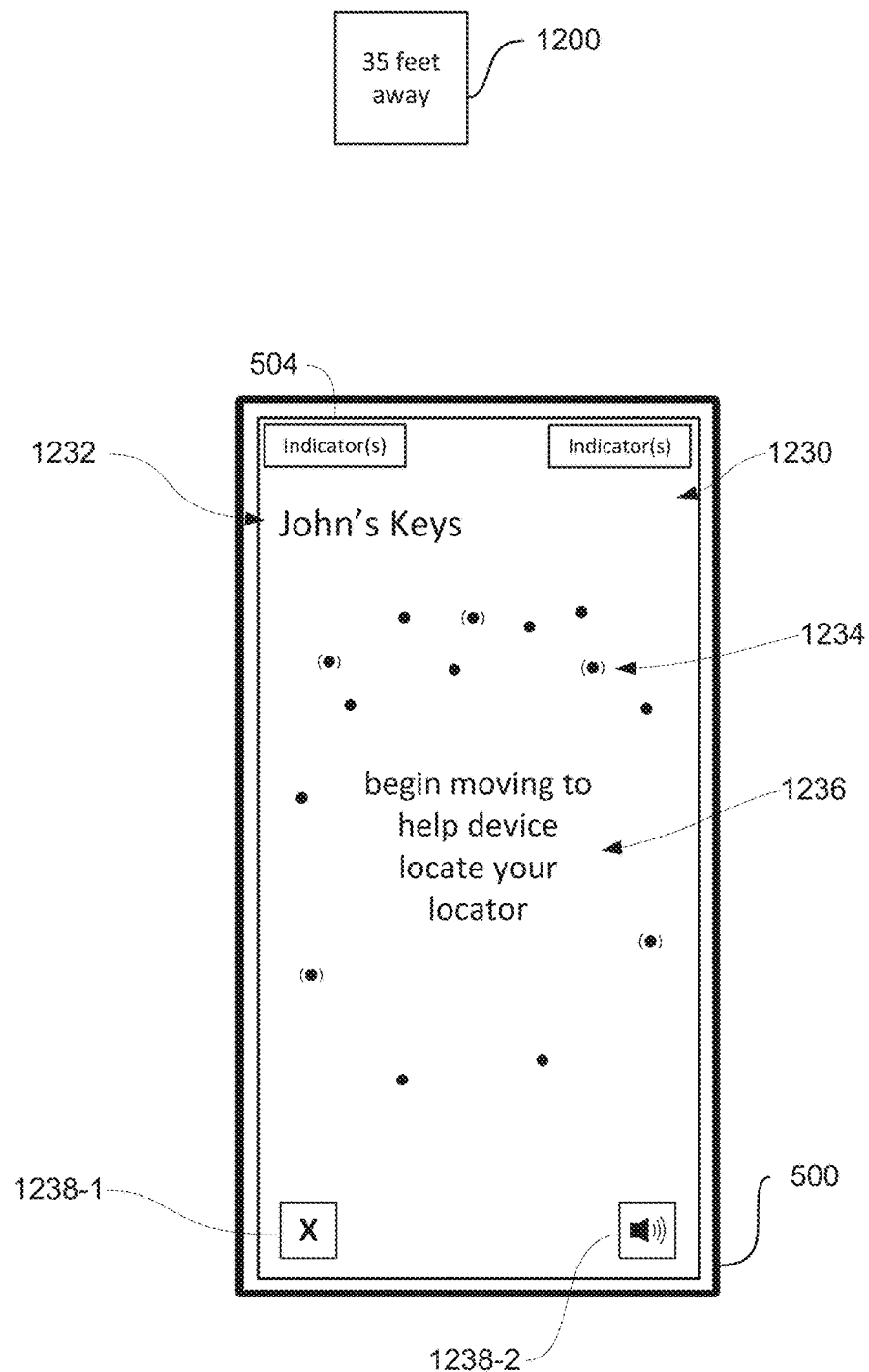
Figure 12G:
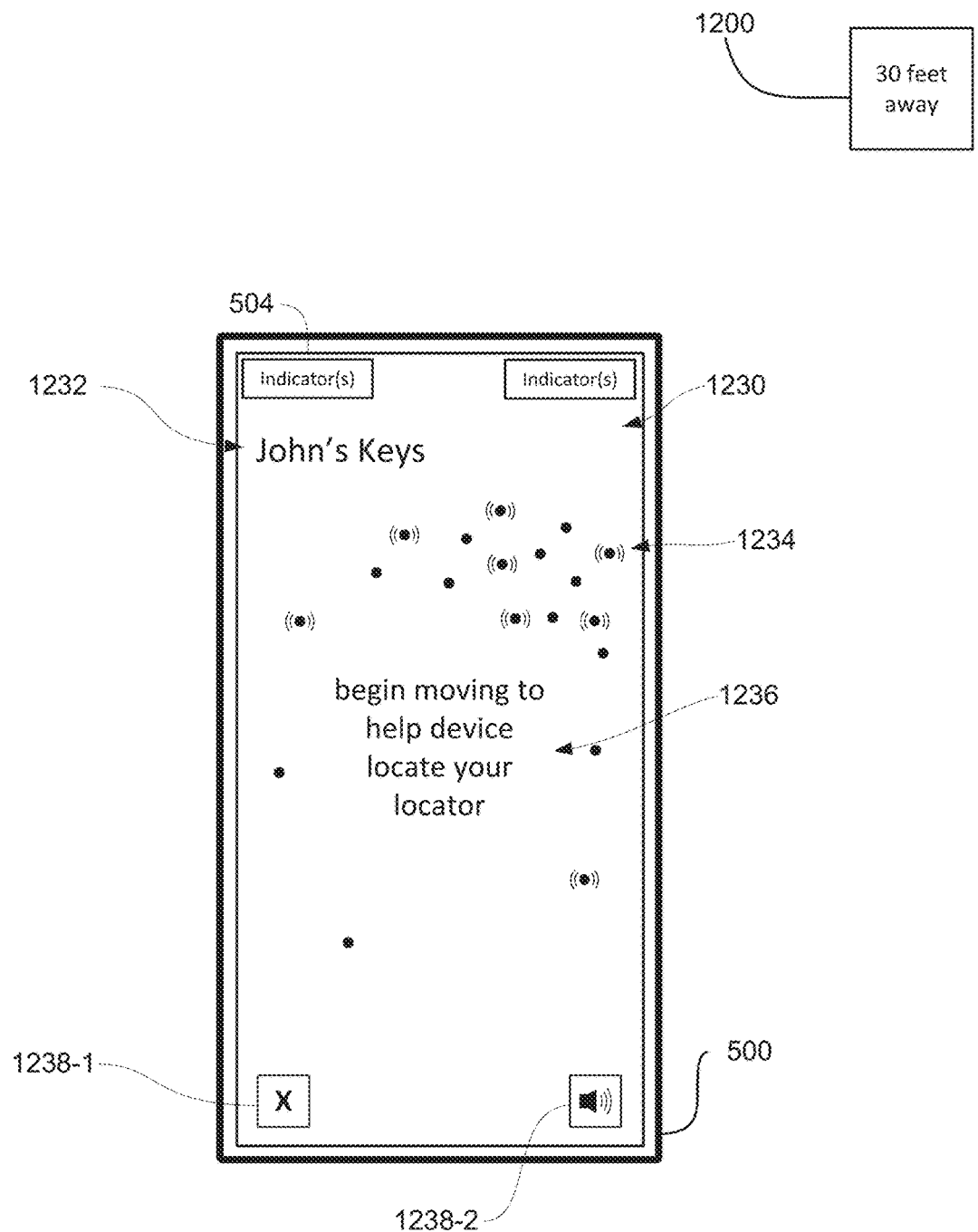
Figure 12H:
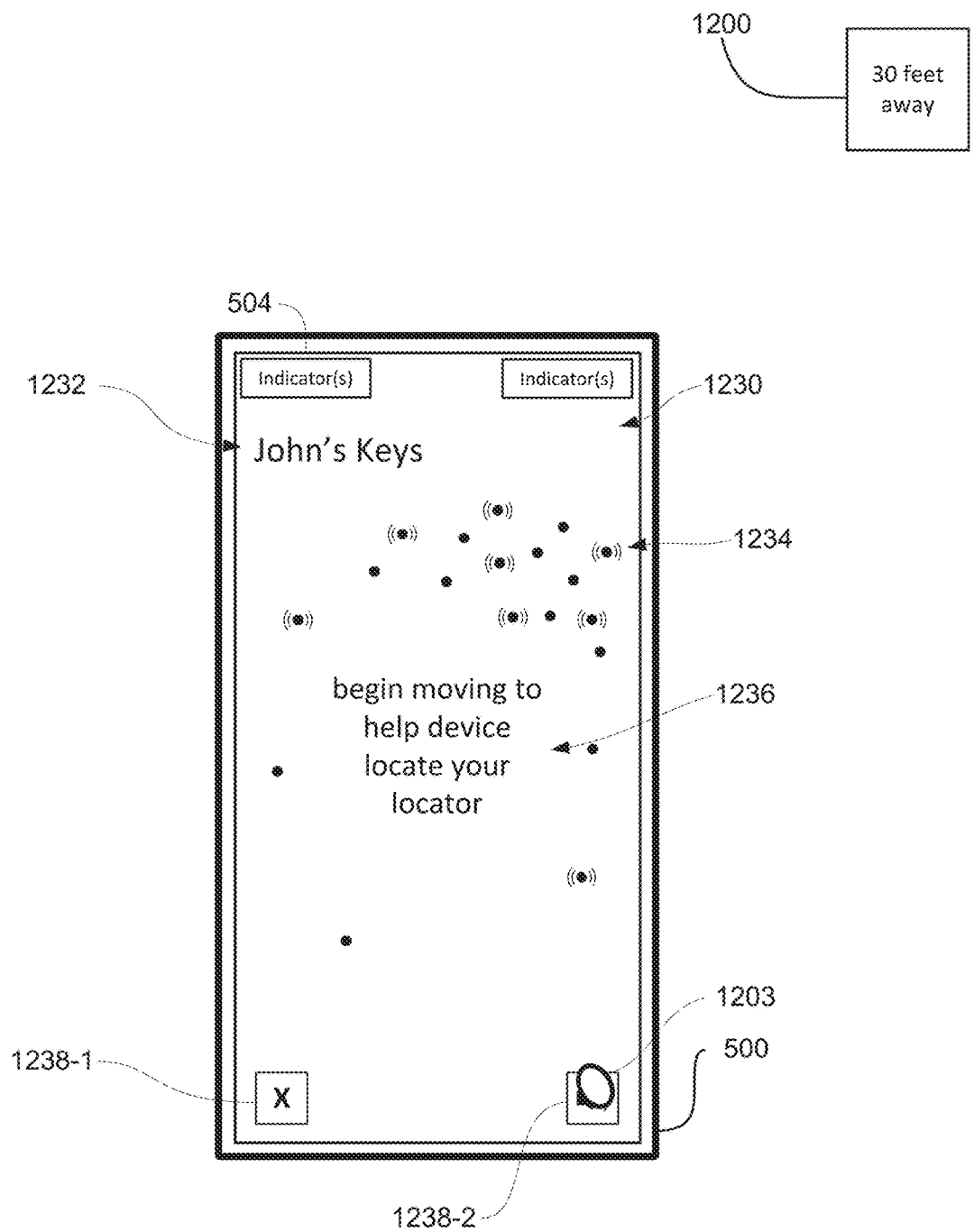
Figure 12I:
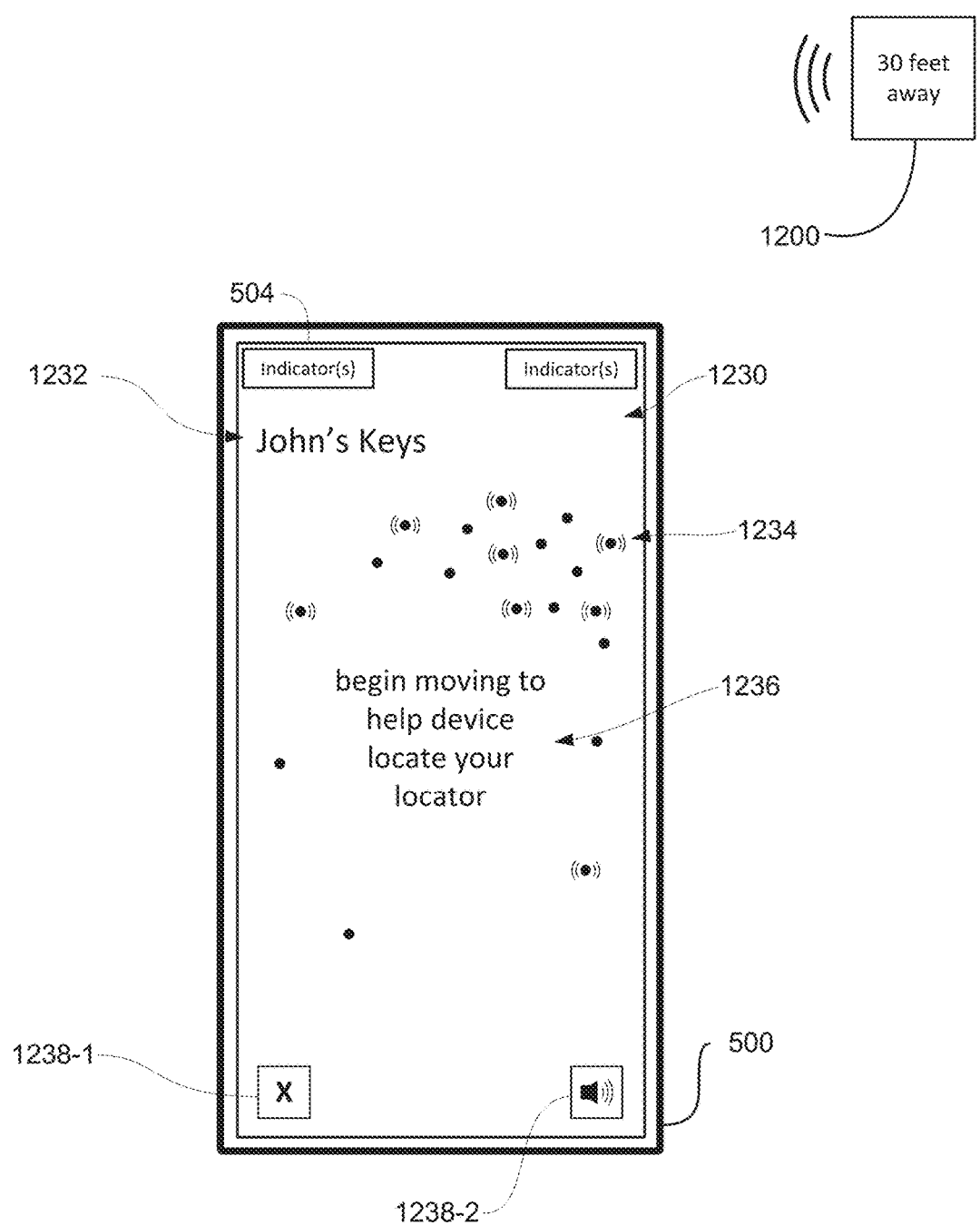

In some embodiments, in response to receiving a user input corresponding to a request for the remote locator object to play a sound, the electronic device causes (1148) the remote locator object to emit an audible tone, such as in FIGS. 10I and 12I (e.g., receiving a user input selecting a selectable option for the remote locator object to play a sound, transmitting a signal to the remote locator object or otherwise cause the remote locator object to play a sound). In some embodiments, the selectable option is displayed on the user interface that is displayed in response to selecting the selectable option to display additional information (e.g., the "Learn More" user interface). In some embodiments, the selectable option is displayed on the user interface that prompts the user to perform the predefined operation for confirming the request to ignore future alerts. In some embodiments, the selectable option is displayed on the user interface indicating that a lost remote locator object is tracking the user. In some embodiments, the selectable option is displayed on any of the user interfaces associated with the tracking alert.

The above-described manner of identifying the remote locator object (e.g., by causing the remote locator object to emit a sound) provides the user with an easy method of locating and identifying the remote locator object, which simplifies the interaction between the user and the electronic device and enhances the operability of the electronic device and makes the user-device interface more efficient (e.g., by providing the user with an option to cause the remote locator object to play a sound without requiring the user to search around to visually identify and find the remote locator object), which additionally reduces power usage and improves battery life of the electronic device by enabling the user to use the electronic device more quickly and efficiency.

In some embodiments, the remote locator object has been marked as lost (1150), such as in FIG. 10Q, and in accordance with a determination that the remote locator object is within a predetermined distance of the electronic device (e.g., the user performs an NFC tap gesture on the remote locator object with the electronic device, such as within 1 inch, 2 inches, 3 inches of the electronic device), the electronic device displays (1152), via the display device, an indication that the remote locator object has been marked as lost, a message from an owner of the remote locator object, and one or more selectable options that, when selected, initiate a process for communicating with the owner of the remote locator object, such as in FIG. 10R (e.g., displaying a user interface, different from the tracking alert, on the electronic device corresponding to the remote locator object). In some embodiments, the user interface includes an indication that the remote locator object has been marked as lost. In some embodiments, the user interface includes a message from the owner of the remote locator object. In some embodiments, the user interface includes one or more selectable options that are selectable to initiate a process to contact or otherwise communicate with the owner using a respective communication method (e.g., call, text, email). In some embodiments, the user interface includes a selectable option that is selectable to send the location of the remote locator object to the owner of the remote locator object (e.g., cause a notification to be displayed on the owner of the remote locator object's electronic device).

The above-described manner of displaying information about a lost remote locator object (e.g., by displaying information about the remote locator object when the user performs an NFC tap gesture on the remote locator object) provides the user with the ability to quickly and, without further user input, view information about a remote locator object that the user has found, which simplifies the interaction between the user and the electronic device and enhances the operability of the electronic device and makes the user-device interface more efficient (e.g., by allowing the user to tap the remote locator object with the user's electronic device and receive information on whether the remote locator object is lost, view a message from the owner, and provide options for contacting the owner), which additionally reduces power usage and improves battery life of the electronic device by enabling the user to use the electronic device more quickly and efficiency.

It should be understood that the particular order in which the operations in FIGS. 11A-11E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300 and 1400) are also applicable in an analogous manner to method 1100 described above with respect to FIGS. 11A-11E. For example, presenting tracking notifications described above with reference to method 1100 optionally have one or more of the characteristics of initializing the remote locator object, presenting separation notifications, and finding a remote locator object, etc., described herein with reference to other methods described herein (e.g., methods 700, 900, 1300 and 1400). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 11A-11E are, optionally, implemented by components depicted in FIGS. 1A-1B. For example, displaying operations 1128, 1132, 1140, 1142, 1144, 1146, and 1152, and detecting operations 1110, 1116, 1120, 1126, 1130, and 1138 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Locating a Remote Locator Object

Users interact with electronic devices in many different manners. In some embodiments, an electronic device is able to track the location of an object such as a remote locator object. In some embodiments, the remote locator object, which supports location tracking functions, can be attached to items that do not support location tracking functions. The embodiments described below provide ways in which an electronic device initiates a finding mode to find a remote locator object, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12FF illustrate exemplary ways in which an electronic device presents user interfaces for tracking and finding remote locator objects in accordance with some embodiments of the disclosure. The embodiments in these figures are used to illustrate the processes described below, including the processes described with reference to FIGS. 13A-13F and 14A-14D.

FIGS. 12A-12FF illustrate an electronic device 500 presenting user interfaces for tracking and finding remote locator objects. FIG. 12A illustrates an exemplary device 500 that includes touch screen 504. As shown in FIG. 12A, the electronic device 500 presents a user interface 1210. In some embodiments, user interface 1210 is similar to user interface 660 described above with respect to FIG. 6L.

In FIG. 12A, user input 1203 is received selecting selectable option 1216-1 while the remote locator object is two miles away from device 500. In some embodiments, in response to the user input, device 500 enters into a finding mode to find the remote locator object. In some embodiments, because the remote locator object is greater than a threshold distance away from device 500 (e.g., 50 feet, 500 feet, 1 mile, 2 miles, 3 miles, etc.), in response to the user input, device 500 will enter a map-based finding mode, as shown in FIG. 12B.

In FIG. 12B, user interface 1222 is a user interface for a map application that is displaying directions to the location of the remote locator object from device 500's current location. In some embodiments, the map displays icon 1221 corresponding to the user's current location, icon 1224 corresponding to the determined location of the remote locator object (e.g., "Keys"), and route 1222 corresponding to the path to take to reach the remote locator object. In some embodiments, user interface 1220 includes card 1224 for configuring the navigation mode and initiating navigation. In some embodiments, card 1224 includes description 1229 and selectable option 1226. In some embodiments, description 1229 includes information on the route's distance, the length of time of travel, whether the route is the fastest route, etc. In some embodiments, selectable option 1226 is selectable to begin navigation to the remote locator object. In some embodiments, card 1224 includes selectable options 1228-1, 1228-2, and 1228-3 to change the navigation mode. For example, selectable option 1228-1 is selectable to set the navigation for driving directions, selectable option 1228-2 is selectable to set the navigation for walking directions, and selectable option 1228-3 is selectable to set the navigation for public transportation directions.

In FIG. 12C, user input 1203 is received selecting selectable option 1216-1 in user interface 1210 while the remote locator object is 30 feet away from device 500. In some embodiments, in response to the user input, device 500 enters into a finding mode to find the remote locator object. In some embodiments, because the remote locator object is less than a threshold distance away from device 500 (e.g., 50 feet, 500 feet, 1 mile, 2 miles, 3 miles, etc.), in response to the user input, device 500 will enter a relative-location-based finding mode, as shown in FIG. 12D.

In FIG. 12D, user interface 1230 corresponds to a relative-location-based finding mode. In some embodiments, relative-location-based finding mode is a finding mode in which the device 500 guides the user to the location of the remote locator object by displaying a relative position of the remote locator object (e.g., similar to a compass).

In FIG. 12D, remote locator object 1200 is 30 feet away from device 500. In some embodiments, device 500 is able to determine that remote locator object 1200 is within the vicinity of device 500 but is unable to determine the precise location of remote locator object 1200 because the object is a certain distance away from device 500 where device 500 is out of (or near the limit of) the effective communication range of a respective wireless communication protocol (e.g., such as Bluetooth, RF, IR, etc.). In FIG. 12D, while remote locator object 1200 is at a first range of distances (e.g., 30 feet to 50 feet, 35 feet to 60 feet, etc.), user interface 1230 displays one or more indicators 1234 (e.g., dots) scattered around the display. In some embodiments, user interface 1230 includes text 1236 instructing the user to move the device around to help locate the remote locator object 1200. In some embodiments, the one or more indicators 1234 have a certain amount of vibration frequency and intensity. In some embodiments, as will be described in further detail below, the intensity and frequency of vibration of the one or more indicators increases as the remote locator object 1200 moves closer to device 500 (e.g., and decreases as the remote locator object 1200 moves further from device 500). In some embodiments, the one or more indicators 1234 are scattered randomly around the display. In some embodiments, the one or more indicators 1234 are biased towards (e.g., tending towards) the general direction of the remote locator object, as will be described in more detail below, with respect to FIGS. 12F-12I. In some embodiments, the one or more indicators 1234 change visual characteristics as the remote locator object moves closer to device 500, such as by becoming brighter as the object moves closer (and optionally darker as the object moves farther), changing color as the object moves closer, and/or changing opacity (becoming more opaque as the object moves closer and less opaque (e.g., more transparent) as the object moves farther). In some embodiments, more indicators 1234 are displayed as the object moves closer (e.g., and optionally fewer indicators 1234 are displayed as the object moves farther).

In some embodiments, user interface 1230 includes label 1232 indicating the remote locator object that the device 500 is tracking towards (e.g., John's Keys). In some embodiments, user interface 1230 includes selectable option 1238-1 and selectable option 1238-2. In some embodiments, selectable option 1238-1 is selectable to exit finding mode and return to the user interface that was displayed before device 500 entered into finding mode (e.g., user interface 1210). In some embodiments, selectable option 1238-2 is selectable to cause the remote locator object 1200 to emit an audible tone.

In FIG. 12E, the remote locator object 1200 moves further away from device 500 to a distance of 40 feet (e.g., device 500 moved and/or remote locator object 1200 moved). In some embodiments, remote locator object 1200 moves to a distance at which device 500 is unable to determine that the remote locator object 1200 is within the vicinity of device 500 (e.g., remove locator object 1200 has moved out of the effective range of a respective direct wireless communication medium). In some embodiments, in response to remote locator object 1200 being 40 feet away, user interface 1230 is updated such that text 1236 indicates that there is "Low Signal" between device 500 and remote locator object 1200. In some embodiments, the number of indicators 1234 on the user interface is decreased (e.g., as compared to FIG. 12D) because the remote locator object 1200 is now further away. In some embodiments, indicators 1234 have less vibrational intensity (or no vibrational intensity).

In FIG. 12F, the remote locator object 1200 moves closer to device 500 to a distance of 35 feet (e.g., device 500 moved and/or remote locator object 1200 moved). In some embodiments, device 500 is able to determine that remote locator object 1200 is within the vicinity of device 500 (but not the precise location). Thus, in FIG. 12F, text 1236 instructs the user to move around to help locate the remote locator object. In some embodiments, the one or more indicators have a vibration intensity and frequency similar to as in FIG. 12D.

In FIG. 12G, the remote locator object 1200 moves closer to device 500 to a distance of 30 feet (e.g., device 500 moved and/or remote locator object 1200 moved). In some embodiments, device 500 is able to determine that remote locator object 1200 is within the vicinity of device 500 (but not the precise location). In some embodiments, the one or more indicators begin to tend towards the determined direction of the remote locator object 1200. In some embodiments, the one or more indicators have a vibrational intensity and/or frequency that is greater than when the remote locator object was 35 feet away from device 500.

In FIG. 12H, user input 1203 is received selecting selectable option 1238-2. In some embodiments, in response to the user input, remote locator object 1200 emits an audible tone, as shown in FIG. 12I.

Figure 12J:
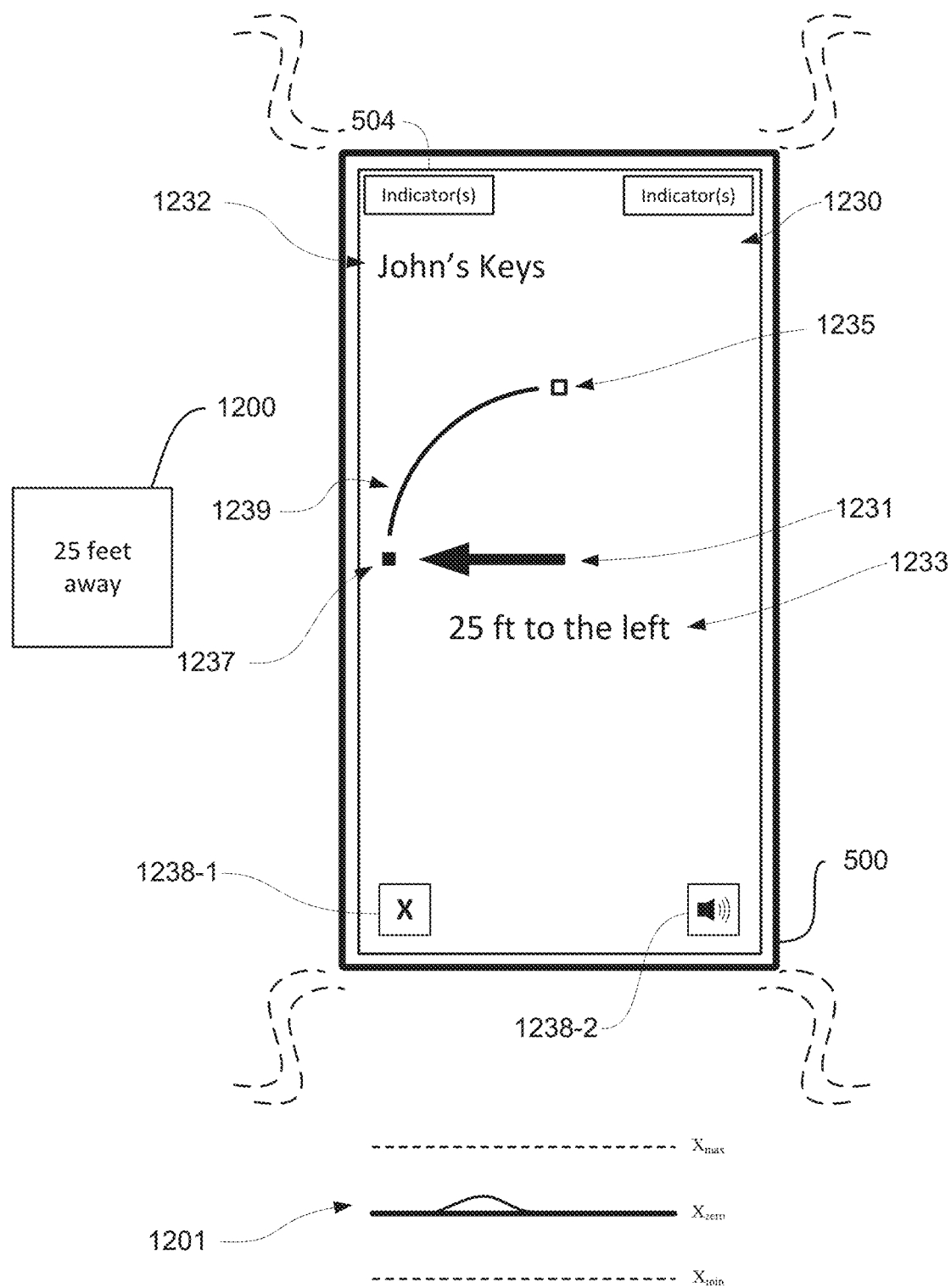

In FIG. 12J, the remote locator object 1200 moves closer to device 500 to a distance of 25 feet (e.g., device 500 moved and/or remote locator object 1200 moved). In some embodiments, device 500 is able to determine the precise location of remote locator object 1200. In some embodiments, in response to being able to determine the precise location of the remote locator object 1200 (e.g., in response to the remote locator object 1200 being within a threshold distance), user interface 1230 is updated to indicate the precise location of the remote locator object 1200. In some embodiments, user interface 1230 includes arrow 1231 that is pointed in the direction of the remote locator object (and in some embodiments no longer displays indicators 1234). In some embodiments, device 500 displays an animation of indicators 1234 converging together and forming into arrow 1231. In some embodiments, user interface 1230 includes text 1233 indicating the distance and the relative direction of the remote locator object (e.g., "25 feet to the left"). In some embodiments, user interface 1230 includes indicator 1235 that represents the "forward" or "ahead" direction of device 500. In some embodiments, user interface 1230 includes indicator 1237 indicating the direction of the remote locator object (e.g., such that arrow 1231 is pointed at indicator 1237). In some embodiments, user interface 1230 includes arc 1239 indicating the direction in which to turn the device (e.g., counter-clockwise) to align the "forward" direction of device 500 (e.g., indicator 1235) with the direction of the remote locator object 1200 (e.g., indicator 1237).

In some embodiments, while remote locator object 1200 is 25 feet away from device 500, device 500 emits a periodic tactile output. In some embodiments, the periodic tactile output is a "tap" with a low intensity (e.g., MicroTap), as illustrated by graph 1201. In some embodiments, the tactile output is a discrete "tap" at a respective frequency (e.g., every 1 second, every 0.5 seconds). As will be described in further detail below, in some embodiments, the frequency and/or intensity of the tactile output increases as the remote locator object 1200 moves closer to device 500 (e.g., and optionally decreases as the remote locator object 1200 moves farther from device 500). In some embodiments, when device 500 detects a change in orientation, device 500 emits a discrete tactile output (e.g., different from and optionally in addition to the discrete tap at a respective frequency, described above, that indicates distance) indicating that the device 500 detects that the orientation (e.g., distance and/or relative direction) has changed.

Figure 12K:
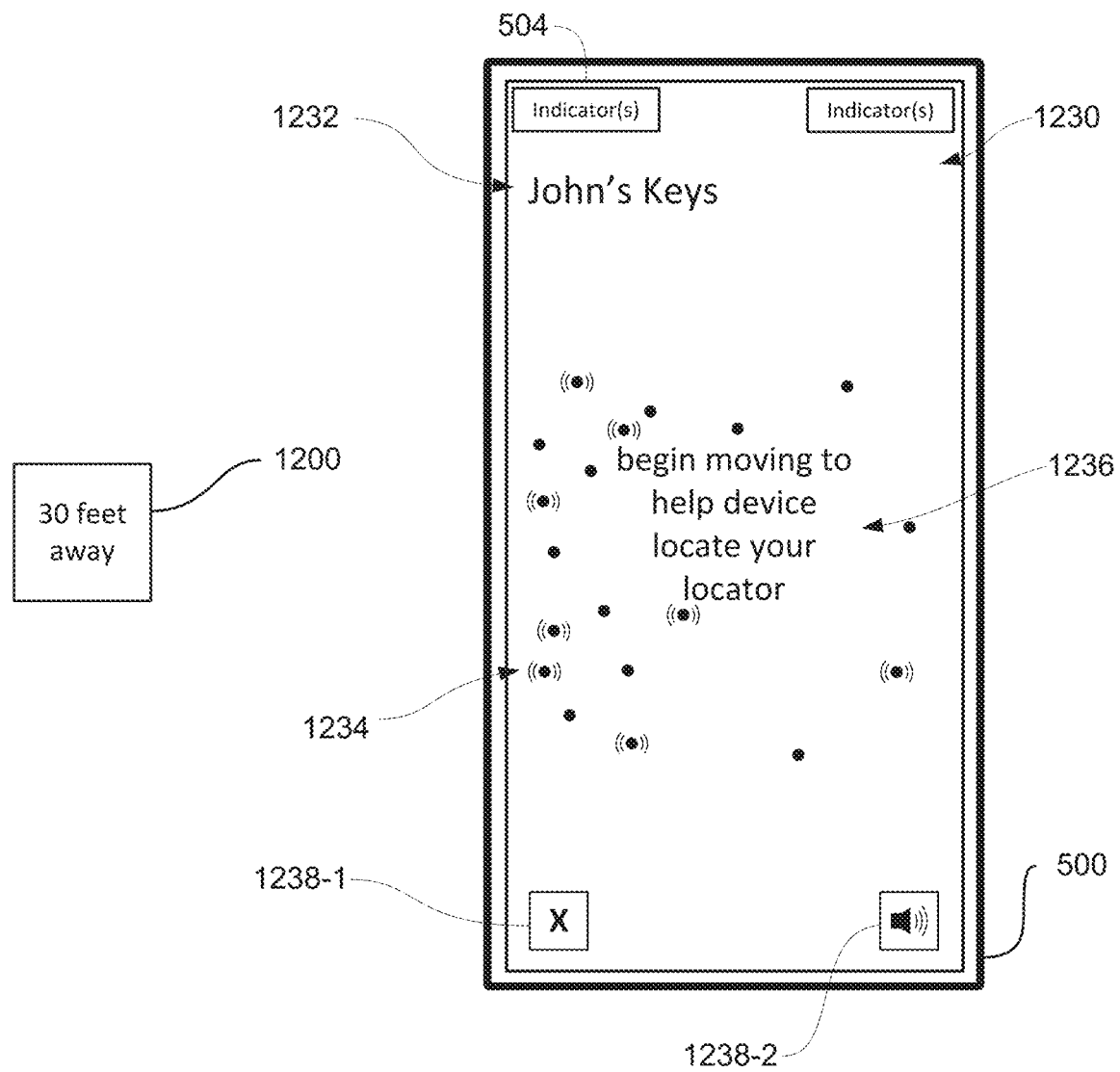

In FIG. 12K, the remote locator object 1200 moves farther away from device 500 to a distance of 30 feet away. In some embodiments, device 500 updates user interface 1230 to remove display of the precise location indicators (e.g., arrow 1231, indicators 1235, 1237, etc.), and displays the one or more indicators 1234 and text 1236 consistent with device 500 being able to determine that remote locator object is within the vicinity of device 500 but not the precise location (e.g., returns to displaying the user interface similar to the one discussed above with respect to FIG. 12H). In some embodiments, device 500 displays an animation of arrow 1231 breaking apart (e.g., dissolving) into indicators 1234. In some embodiments, device 500 does not output any tactile outputs. Thus, in some embodiments, user interface 1230 is switched between a precise directional mode and a non-precise directional mode based on the distance between device 500 and the remote locator object 1200.

Figure 12L:
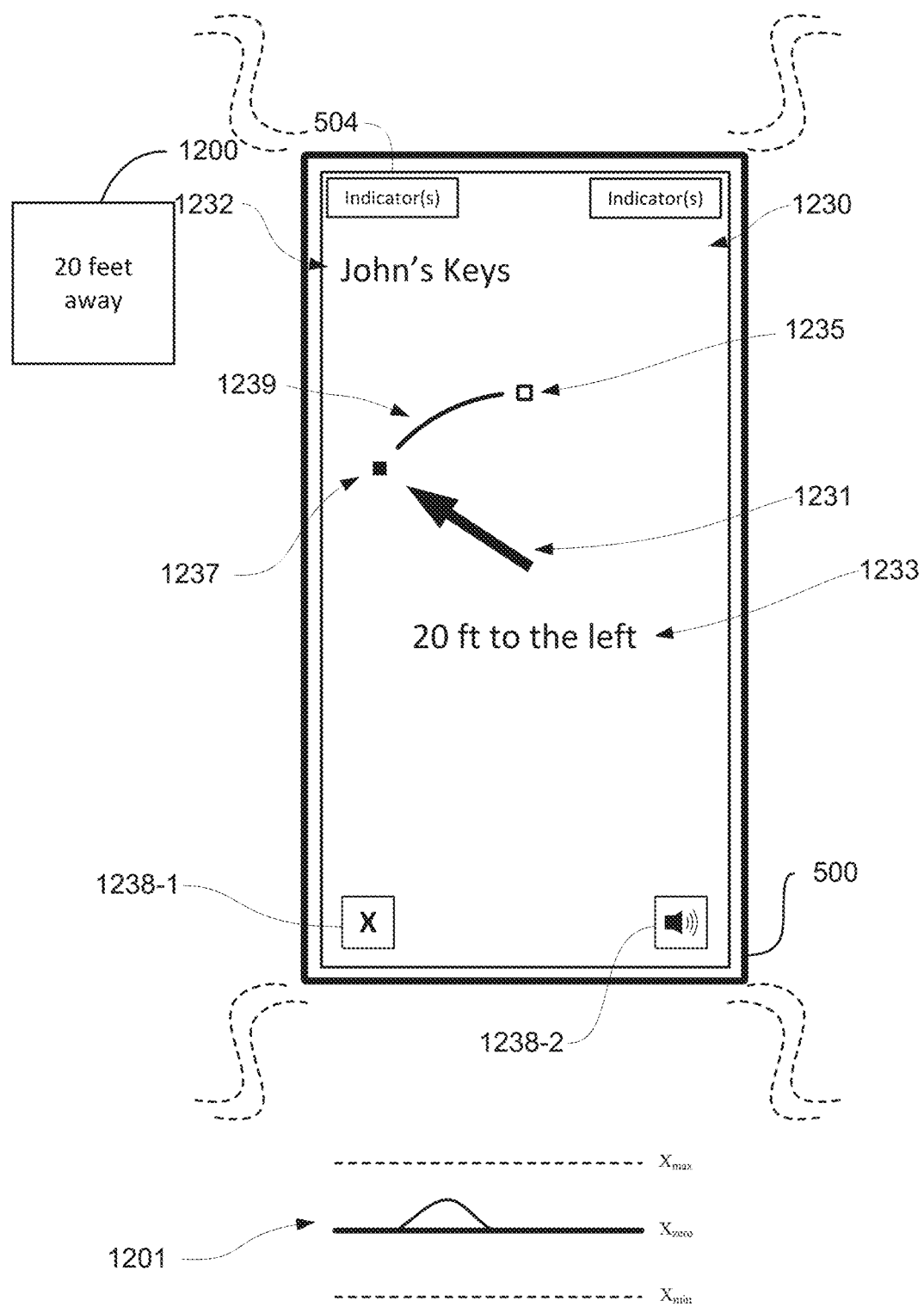

In FIG. 12L, the remote locator object 1200 moves back closer to device 500 to a distance of 20 feet (e.g., device 500 moved and/or remote locator object 1200 moved). In some embodiments, device 500 is again able to determine the precise location of remote locator object 1200. In some embodiments, in response to being able to determine the precise location of the remote locator object 1200 (e.g., in response to the remote locator object 1200 being within a threshold distance), user interface 1230 is updated to indicate the precise location of the remote locator object 1200. In some embodiments, user interface 1230 includes arrow 1231 that is pointed in the direction of the remote locator object. In some embodiments, user interface 1230 includes text 1233 indicating the distance and the relative direction of the remote locator object (e.g., "20 feet to the left"). In some embodiments, user interface 1230 includes indicator 1235 that represents the "forward" or "ahead" direction of device 500. In some embodiments, user interface 1230 includes indicator 1237 indicating the direction of the remote locator object (e.g., such that arrow 1231 is pointed at indicator 1237). In some embodiments, user interface 1230 includes arc 1239 indicating the direction with which to turn the device (e.g., counter-clockwise) to align the "forward" direction of device 500 (e.g., indicator 1235) with the direction of the remote locator object 1200 (e.g., indicator 1237). In some embodiments, in response to device 500 being at a distance of 20 feet from remote locator object 1200, device 500 outputs a discrete tactile output with an intensity greater than the intensity outputted when remote locator object 1200 was 25 feet from device 500, as shown by graph 1201. Thus, in some embodiments, the tactile output increases in frequency and/or intensity as the remote locator object moves closer to the device 500 (and optionally decreases in frequency and/or intensity as the distance increases).

Figure 12M:
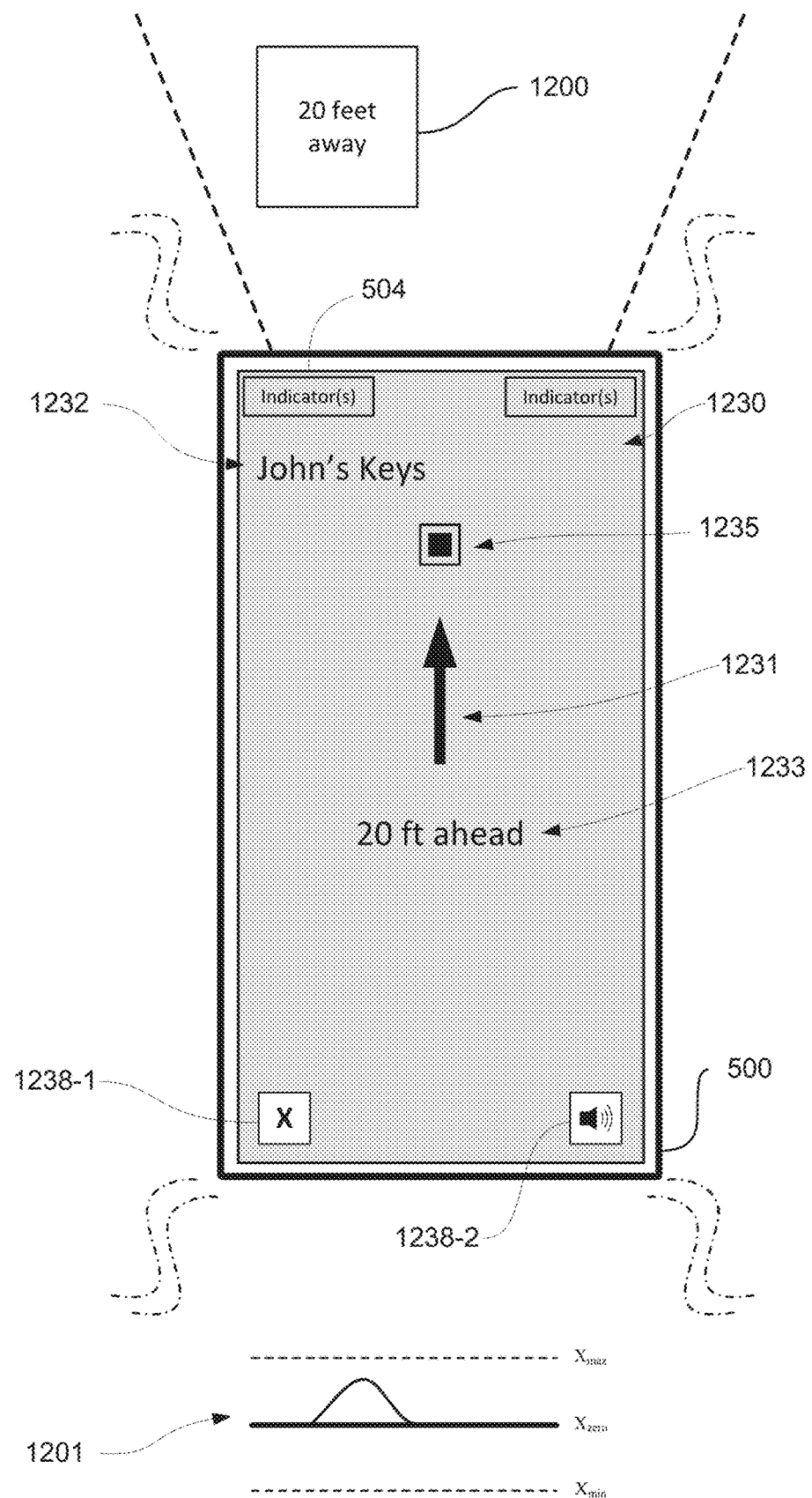

In FIG. 12M, the remote locator object 1200 moves to being aligned with the "forward" direction of device 500. In some embodiments, the background color of user interface 1230 changes (e.g., to green, from white) to indicate that the remote locator object 1200 is aligned with device 500. In some embodiments, text 1233 is updated to read "20 feet ahead". In some embodiments, indicator 1237 merges with indicator 1235 such that indicator 1235 optionally displays a ring around a black dot. In some embodiments, the black dot is a larger size than indicator 1235 when remote locator object 1200 is not aligned with device 500. In some embodiments, remote locator object 1200 is considered to be aligned with device 500 when remote locator object 1200 is within a predetermined range of angles in front of device 500 (e.g., 10 degrees, 15 degrees, 20 degrees, etc.). In some embodiments, the range of angles is constant as the user moves closer to remote locator object. In some embodiments, the range of angles increases as the user moves closer to remote locator object 1200 (e.g., the range of angles is a fixed cone and moving closer to remote locator object 1200 is similar to moving further up the cone such that a large range of angles is still considered to be within the fixed cone). In some embodiments, when remote locator object 1200 is aligned with device 500, the pattern of discrete tactile output is different from the pattern when remote locator object 1200 is not aligned with device 500. For example, in some embodiments, when remote locator object 1200 is not aligned with device 500, the pattern of discrete tactile outputs is tap-tap-tap (e.g., at a regular beat) and when remote locator object 1200 is aligned with device 500, the pattern is discrete tactile outputs is tap-taptap-tap (e.g., with double-beats or optionally with staccato beats). It is understood that these are merely an exemplary example and other discrete tactile output patterns are possible.

Figure 12N:
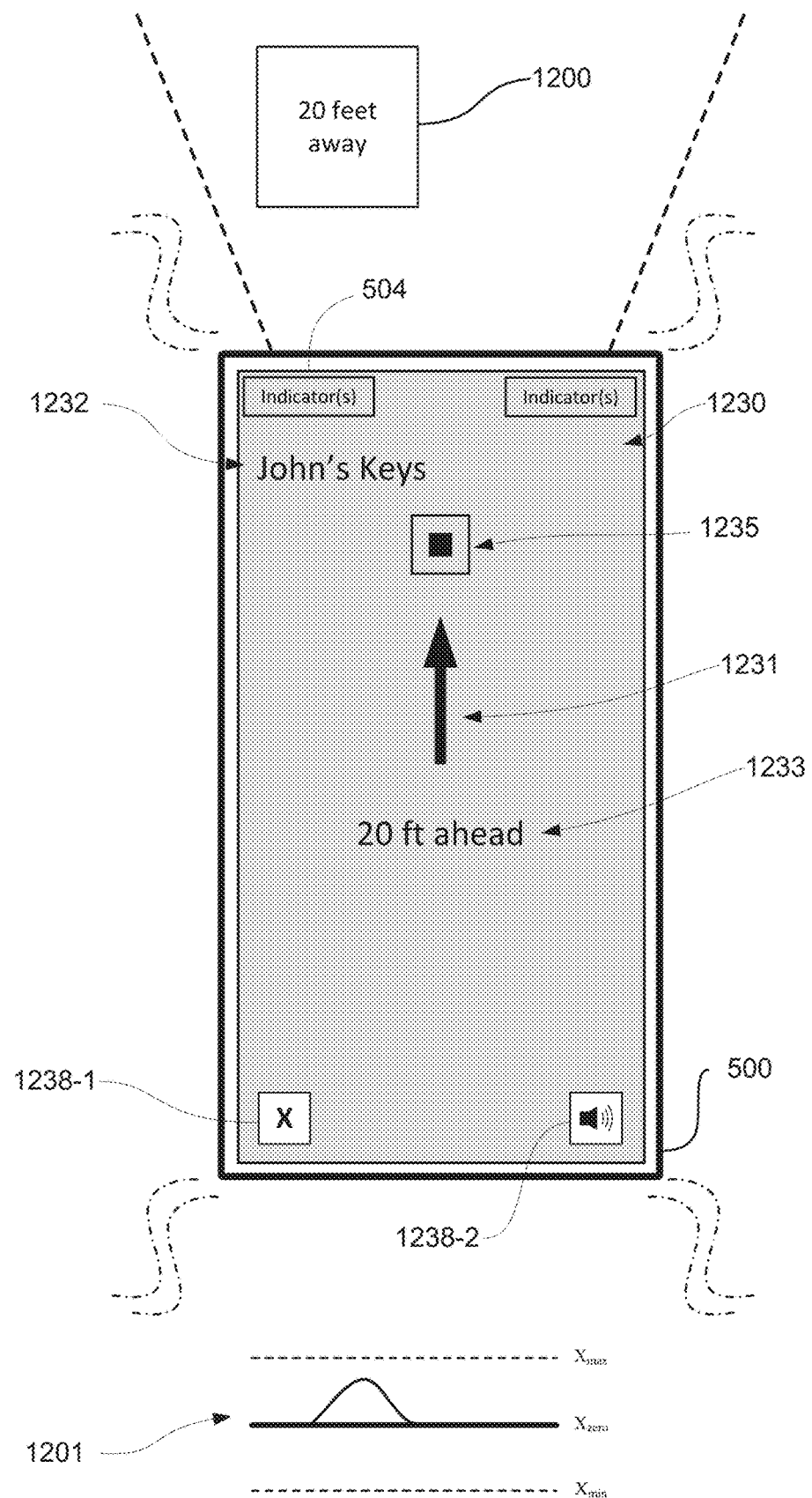
Figure 12O:
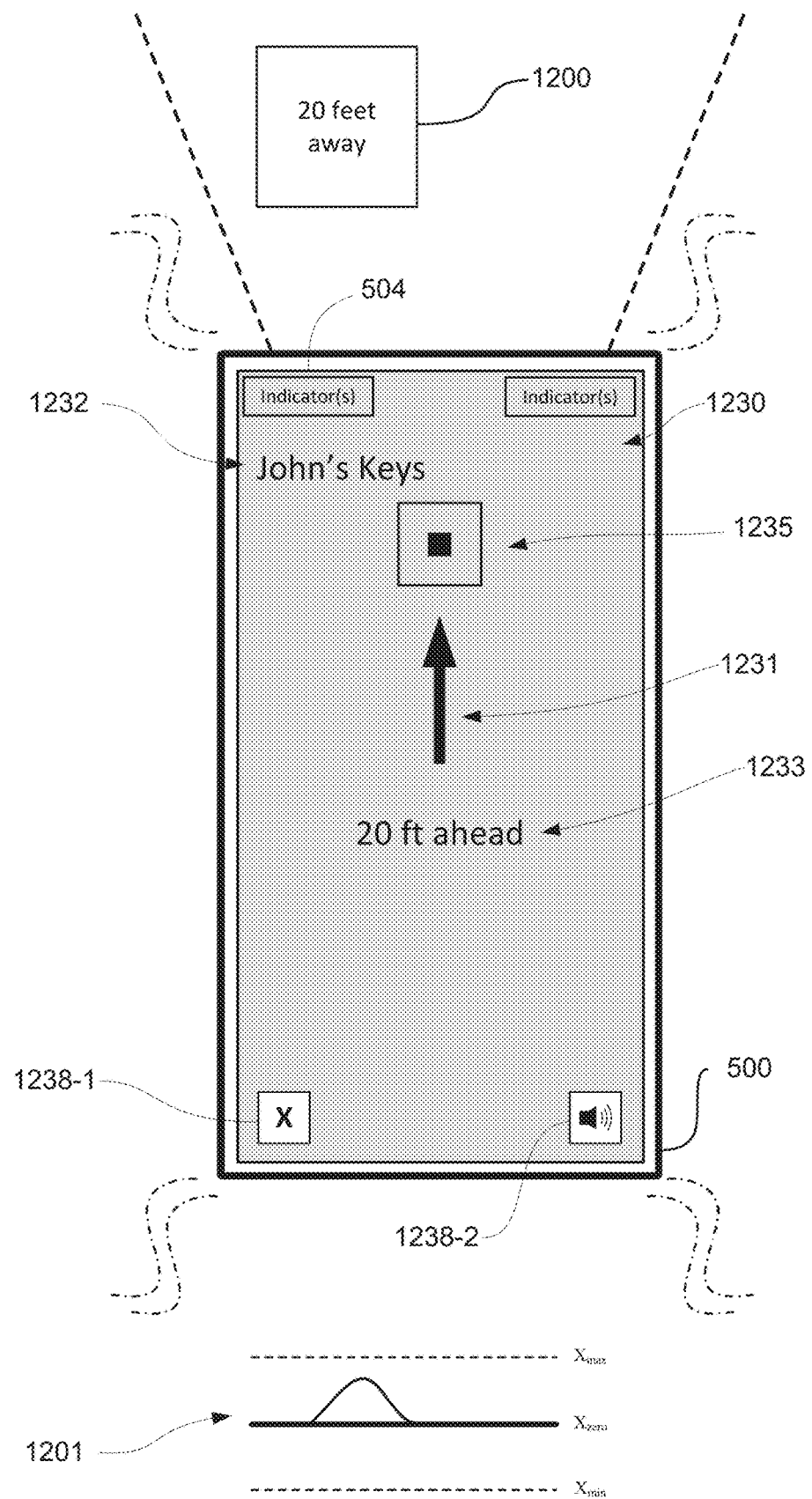

FIGS. 12N-12O illustrate the ring around indicator 1235 animating such as to increase in size around indicator 1235 in a pulsing manner (e.g., increase to a predetermined radius, collapse back to indicator 1235, and then increase in size again). In some embodiments, while remote locator object 1200 is located ahead of device 500 (e.g., aligned with device 500), this pulsing animation continues (in some embodiments, in addition to changes in the dot that will be described below).

Figure 12P:
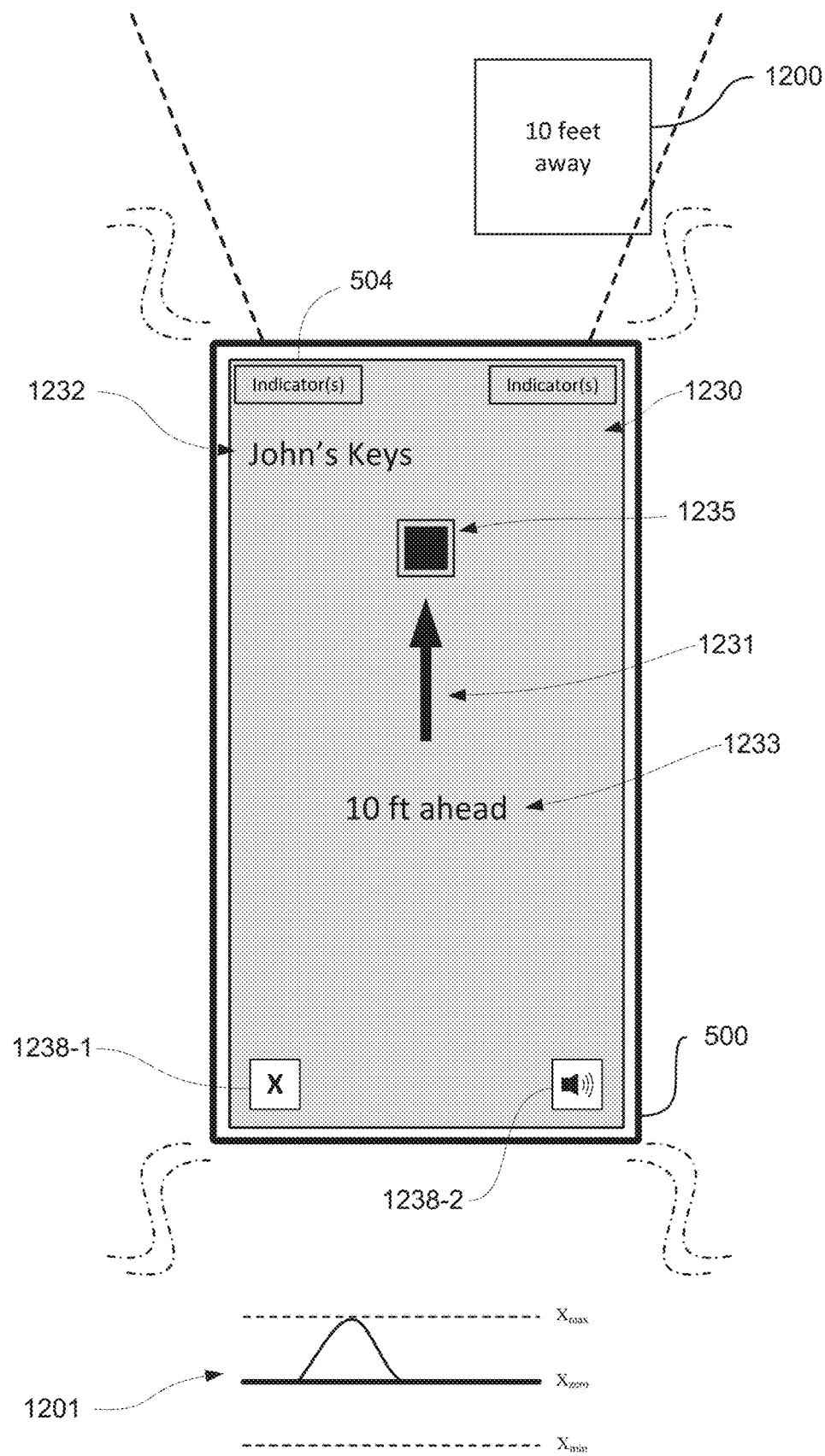

In FIG. 12P, remote locator object 1200 moves to a distance of 10 feet away from device 500. In some embodiments, remote locator object 1200 has moved slightly towards the right of device 500, but remains within the range of angles such that remote locator object 1200 is still considered to be aligned with device 500. In some embodiments, in response to remote locator object 1200 moving to 10 feet away from device 500, indicator 1235 increases in size (e.g., as opposed to when remote locator object 1200 was 20 feet away). In some embodiments, the discrete tactile output outputted/generated by device 500 is increased in intensity and/or frequency as indicated by graph 1201.

Figure 12Q:
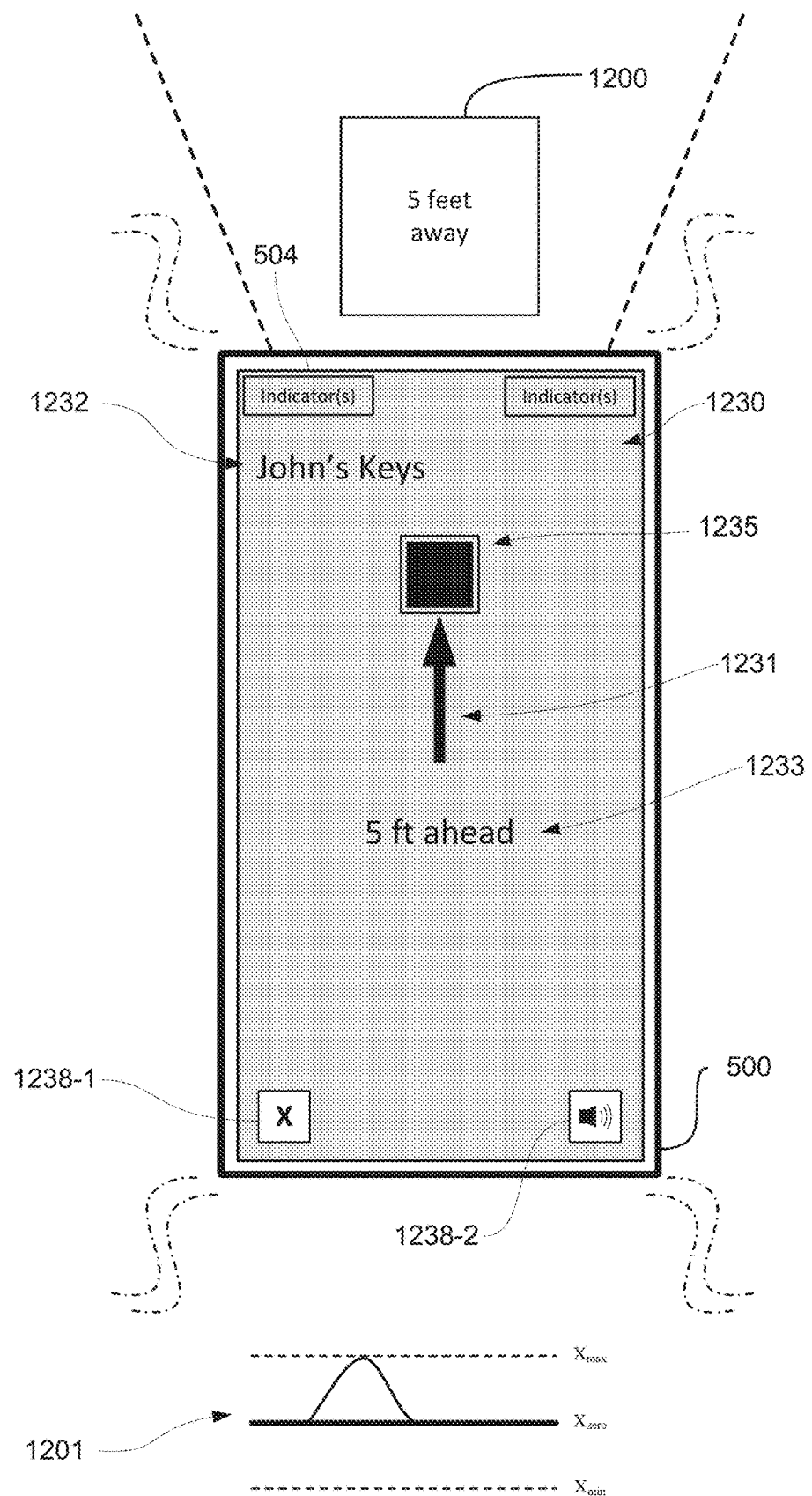

In FIG. 12Q, remote locator object 1200 moves to a distance of 5 feet away from device 500 while aligned with device 500. In some embodiments, in response to remote locator object 1200 moving to 5 feet away from device 500, indicator 1235 further increases in size (e.g., as opposed to when remote locator object 1200 was 10 feet away). In some embodiments, the discrete tactile output outputted by device 500 is increased in intensity and/or frequency.

Figure 12R:
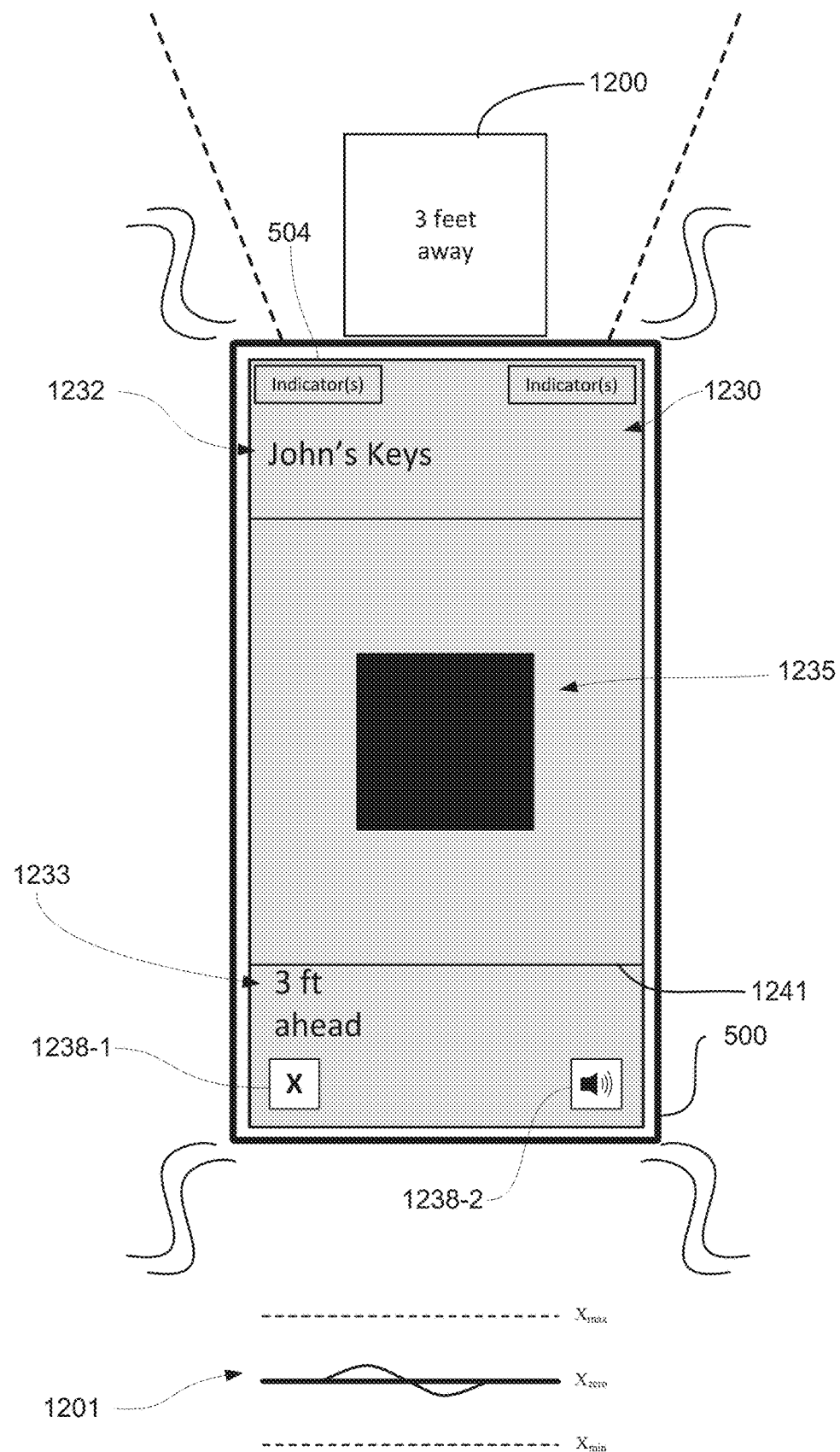

In FIG. 12Q, remote locator object 1200 moves to a distance of 3 feet away from device 500 while aligned with device 500. In some embodiments, remote locator object 1200 is within a predetermined distance from device 500 (e.g., 2 feet, 3 feet, 4 feet). In such embodiments, user interface 1230 is updated such that indicator 1235 is moved to the center of the display and has a size that is the same or similar as a representation of remote locator object 1200 (e.g., as will be shown below in FIG. 12U). In some embodiments, ring 1241 around indicator 1235 indicates the distance that device 500 is from the remote locator object 1200 (e.g., decreases as the distance decreases and increases as the distance increases). In some embodiments, user interface 1230 maintains display of text 1233 that indicates the distance and relative direction of remote locator object 1200. In some embodiments, while remote locator object 1200 is within the predetermined distance from device 500, device 500 outputs a continuous tactile output (e.g., vibration) as opposed to the discrete tactile outputs previously described, which optionally changes in intensity as the remote locator object 1200 moves closer to device 500. In FIG. 12R, device 500 outputs a continuous vibration at a low intensity, as shown by graph 1201.

Figure 12S:
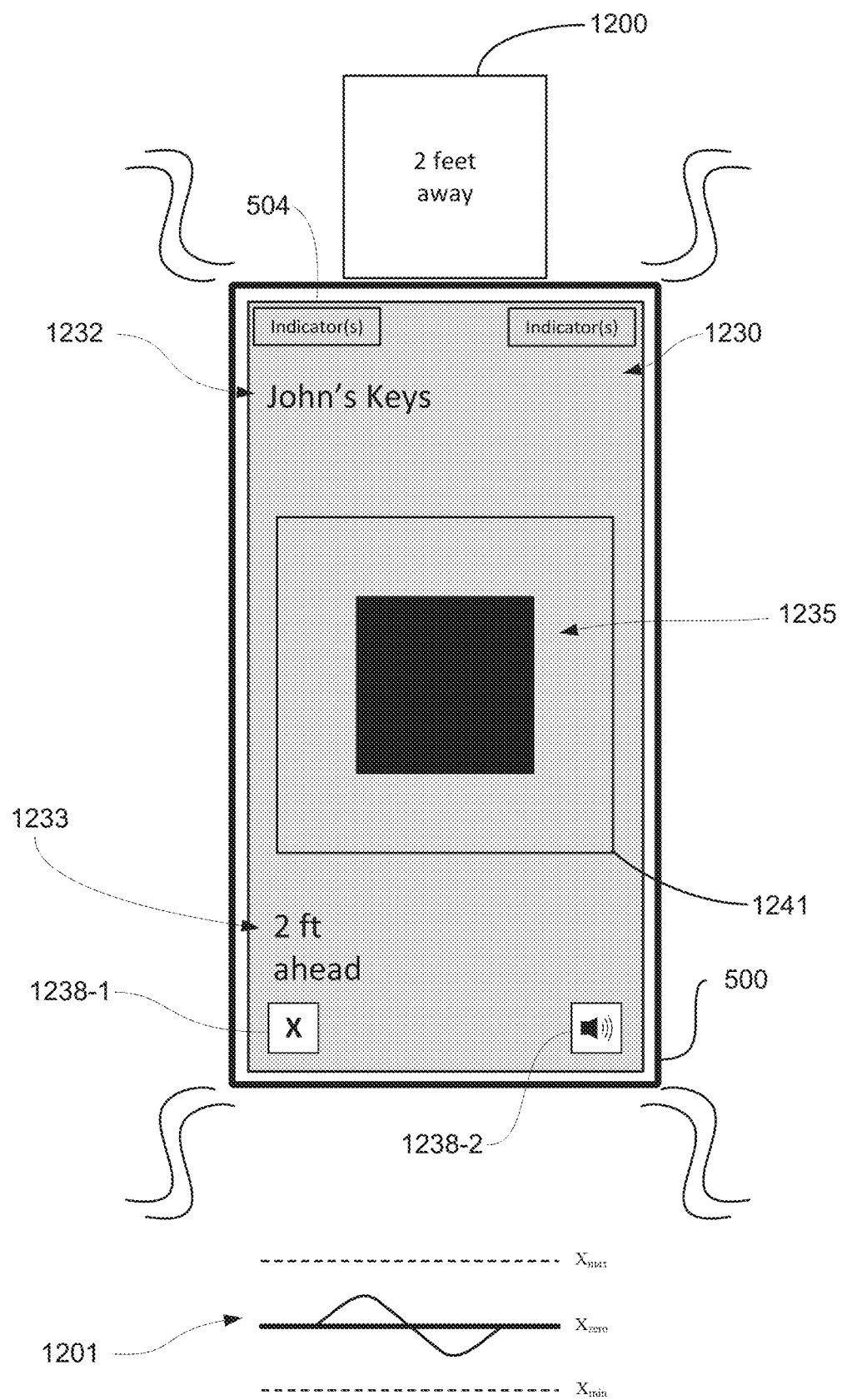

In FIG. 12S, remote locator object 1200 moves to a distance of 2 feet away from device 500 while aligned with device 500. In some embodiments, ring 1241 reduces in size around indicator 1235 to indicate the closer distance (in some embodiments, while indicator 1235 remains the same size as before). In some embodiments, device 500 outputs a continuous vibration of a higher intensity (e.g., as opposed to when remote locator object is 3 feet away), as shown by graph 1201.

Figure 12T:
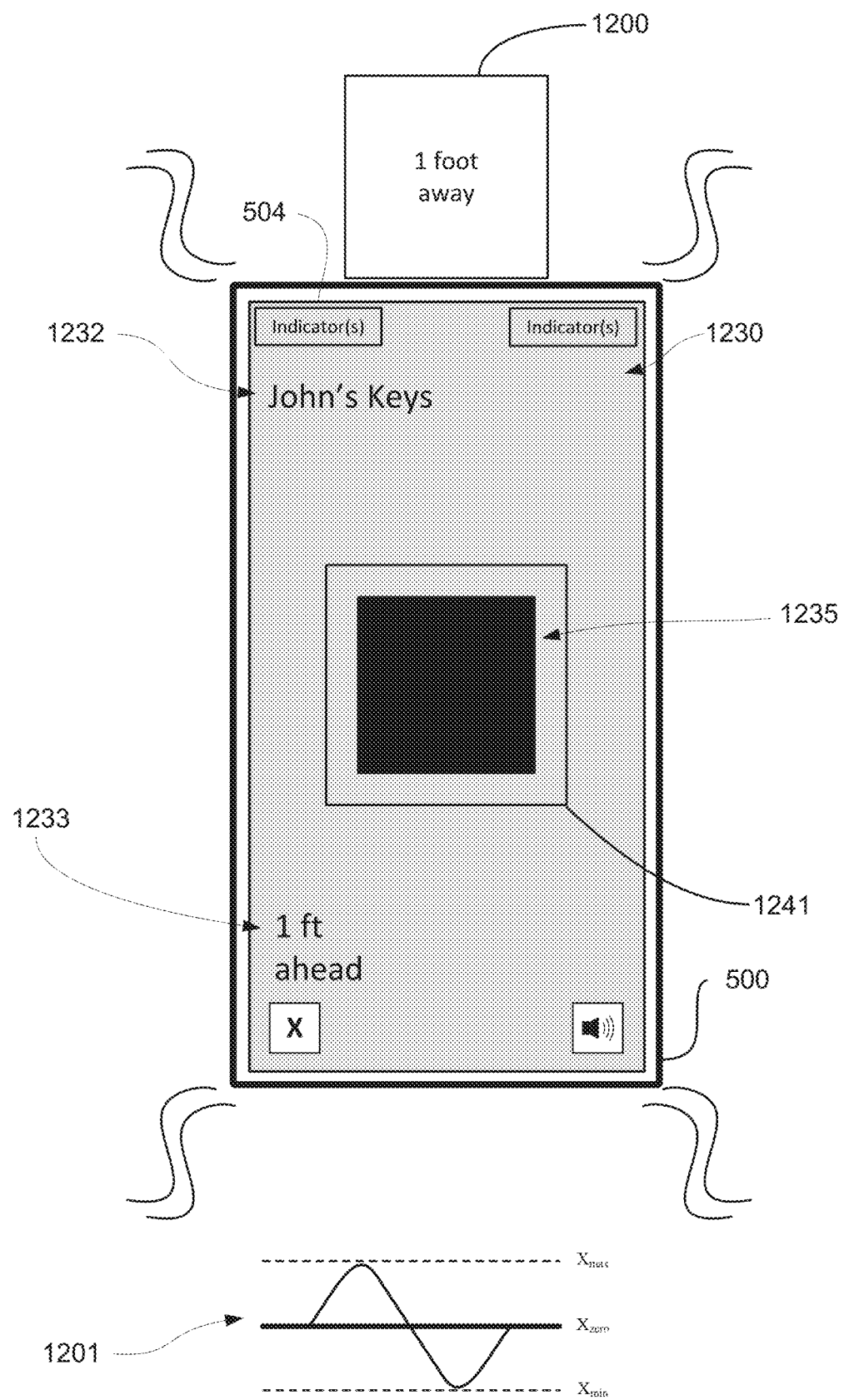

In FIG. 12T, remote locator object 1200 moves to a distance of 1 foot away from device 500 while aligned with device 500. In some embodiments, ring 1241 reduces in size around indicator 1235 to indicate the closer distance (in some embodiments, while indicator 1235 remains the same size as before). In some embodiments, device 500 outputs a continuous vibration of a higher intensity (e.g., as opposed to when remote locator object is 2 feet away), as shown by graph 1201.

Figure 12U:
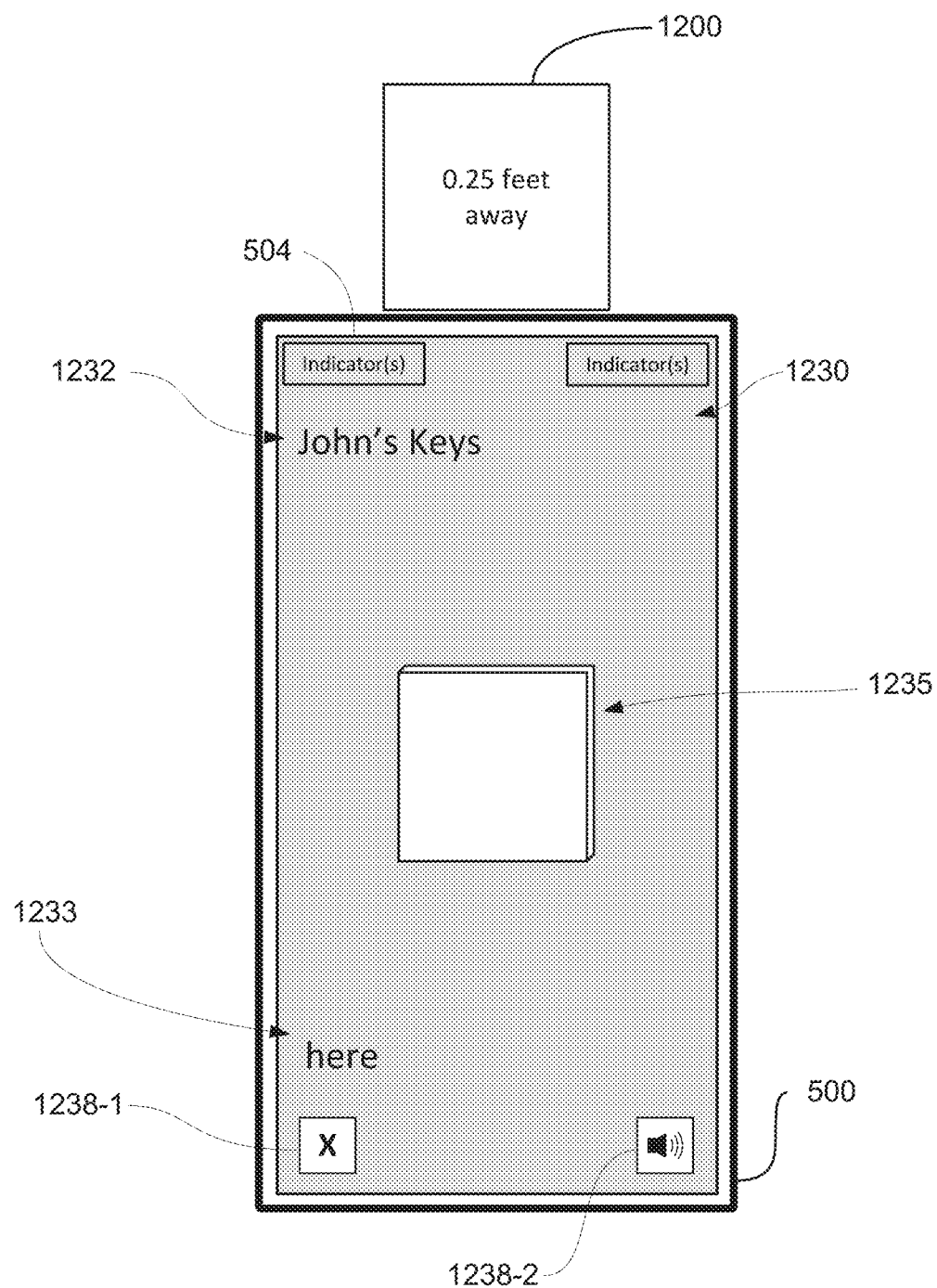
Figure 12V:
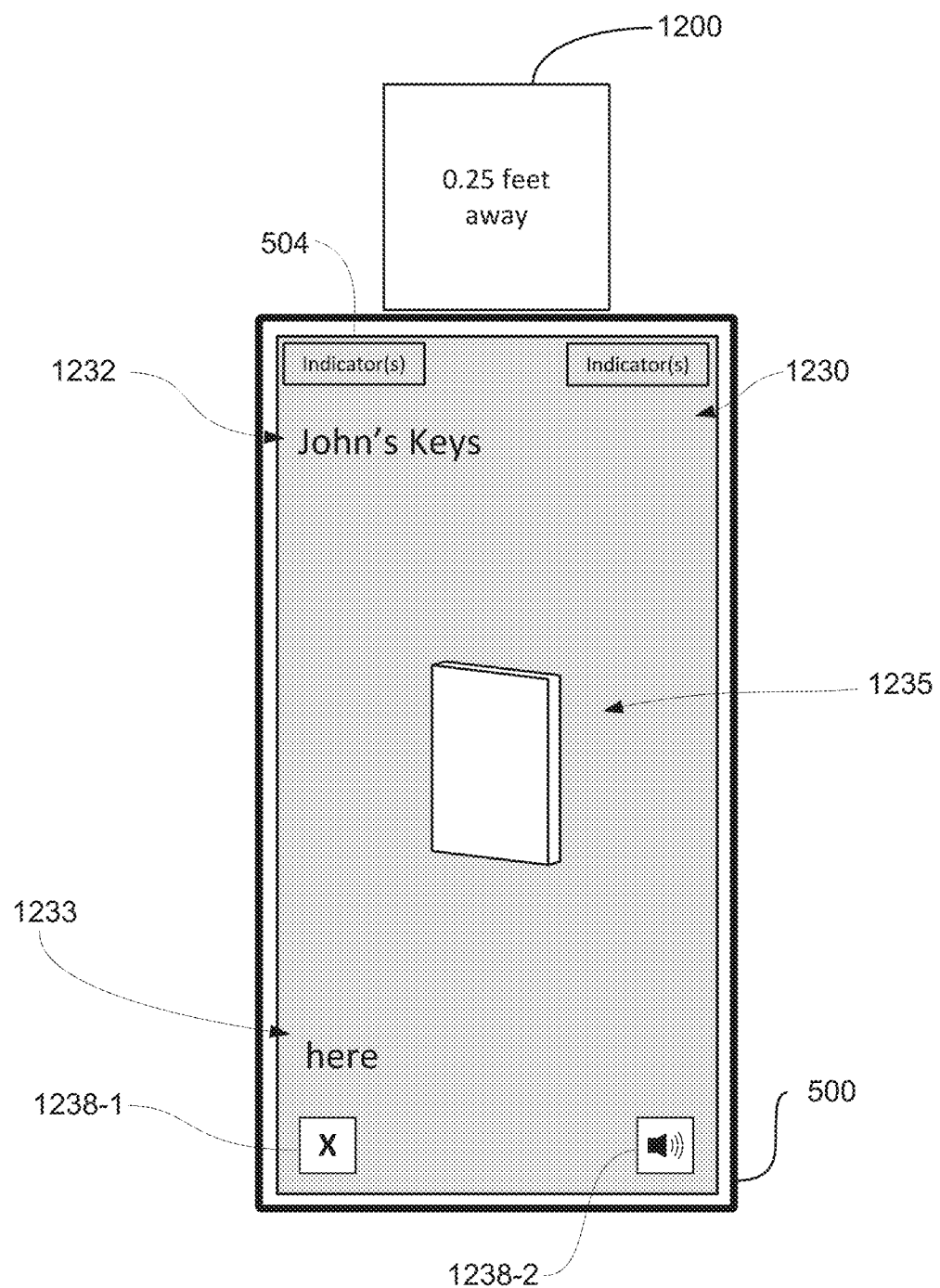

In FIG. 12U, remote locator object 1200 moves to the same location (or substantially the same location, such as 0.25 feet) as device 500. In some embodiments, ring 1241 is no longer displayed on user interface 1235, and indicator 1235 changes into a representation of the remote locator object 1200. In some embodiments, text 1233 is updated to read "here". In some embodiments, when remote locator is at the same or substantially the same location as device 500, device 500 does not provide tactile outputs. FIGS. 12U-12V illustrate that representation 1235 of the remote locator object 1200 is optionally a three dimensional animation or interactable model of remote locator object 1200.

Figure 12W:
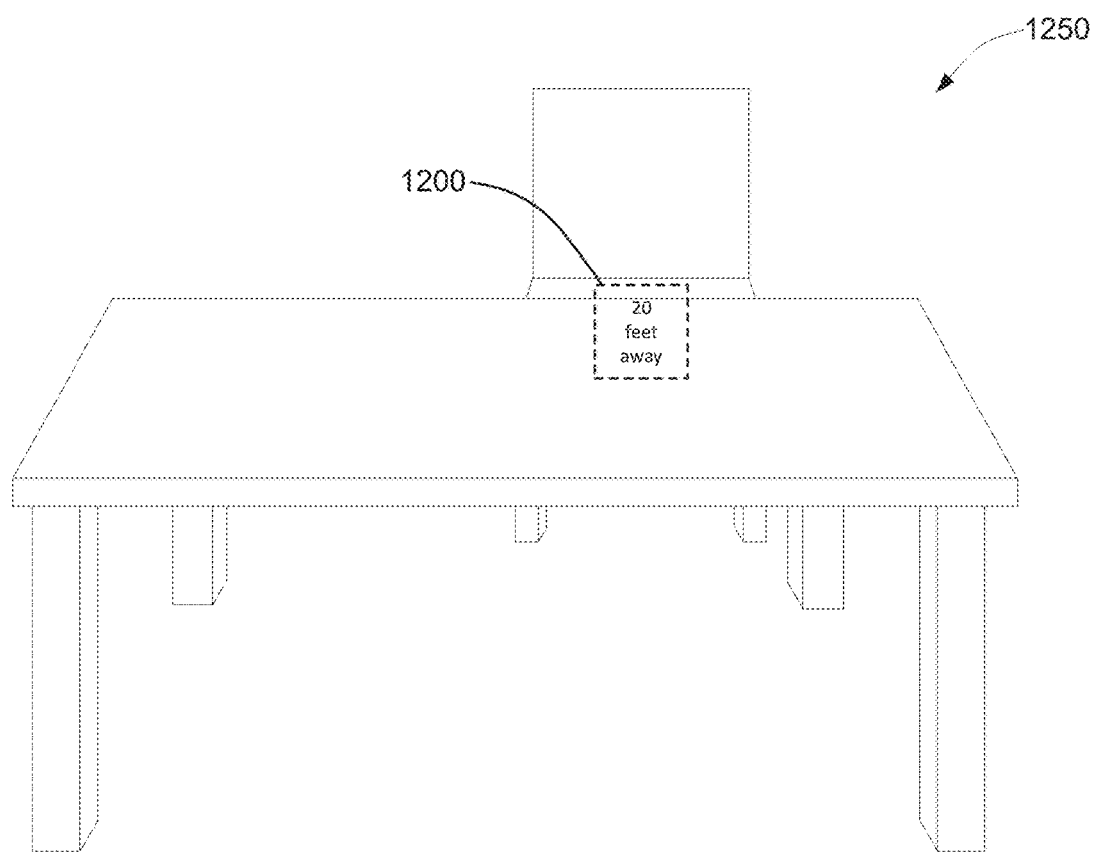
Figure 12W:
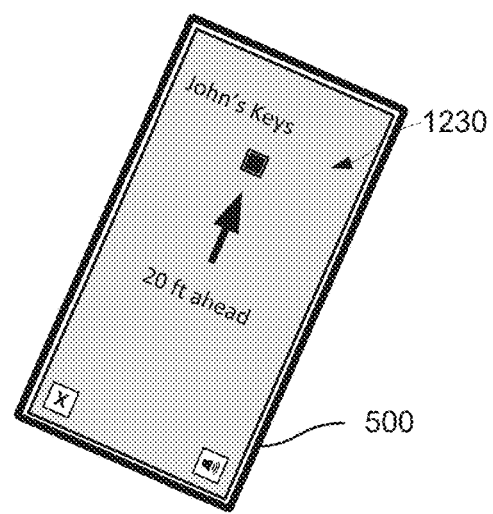

FIGS. 12W-12AA illustrate an exemplary method of locating a remote locator object using an augmented reality finding mode. In FIG. 12W, remote locator object 1200 is located in environment 1250 and is fully or partially obscured behind objects in environment 1250 (e.g., on a chair behind a table, as shown in FIG. 12W). In FIG. 12W, device 500 is in finding mode and is displaying user interface 1230 (e.g., similar to user interface 1230 described above with respect to FIG. 12O). In some embodiments, device 500 is substantially horizontal to the ground (for example, being held like a compass).

Figure 12X:
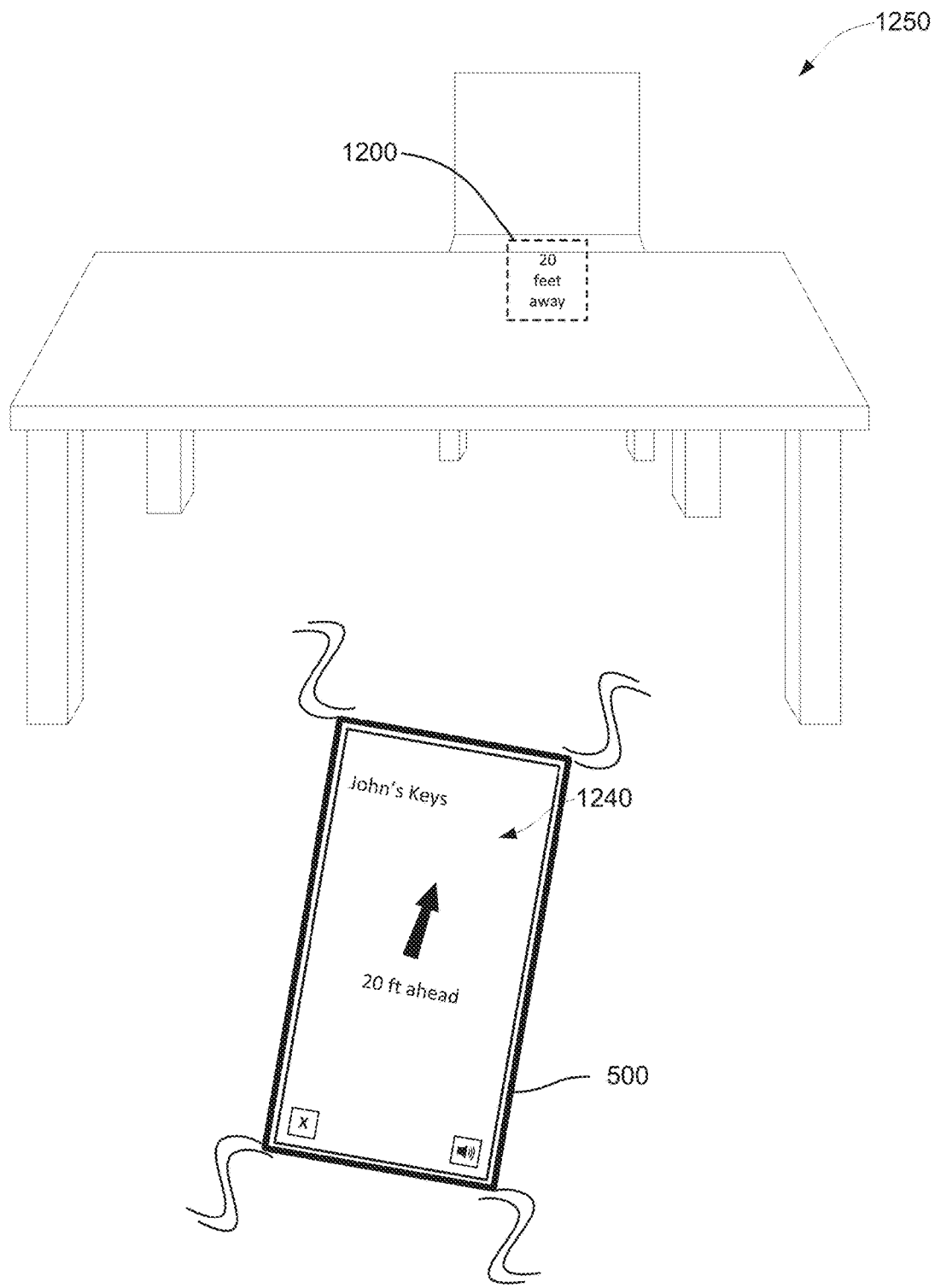

In FIG. 12X, the user begins raising device 500 to a vertical position (e.g., to be perpendicular with the ground, for example, being held up as if to take a picture). In some embodiments, in response to detecting that the user is raising device 500 to a vertical position, device 500 enters into an augmented reality (AR) finding mode, as shown in FIG. 12X. In some embodiments, when device 500 enters into AR finding mode, device 500 emits a tactile output (e.g., a single discrete tactile output, or a tap). In FIG. 12X, device 500 displays user interface 1240. In some embodiments, user interface 1240 corresponds to the AR finding mode and displays environment 1250 as captured by the camera of device 500. In some embodiments, user interface 1240 includes one or more AR elements overlaid over the display of environment 1250. For example, in FIG. 12X, user interface 1240 displays the label indicating the distance and relative location of the remote locator object, the identifier of the remote locator object, and the arrow. In some embodiments, the arrow is displayed by device 500 such that it is parallel to the ground (or is in some other relation with some other reference in environment 1250) while being oriented towards remote locator object 1200. Thus, in some embodiments, as device 500 tilts up or down (e.g., more or less perpendicular with respect to the ground), device 500 maintains display of the arrow as if it were perpendicular to the ground displayed in user interface 1240.

Figure 12Y:
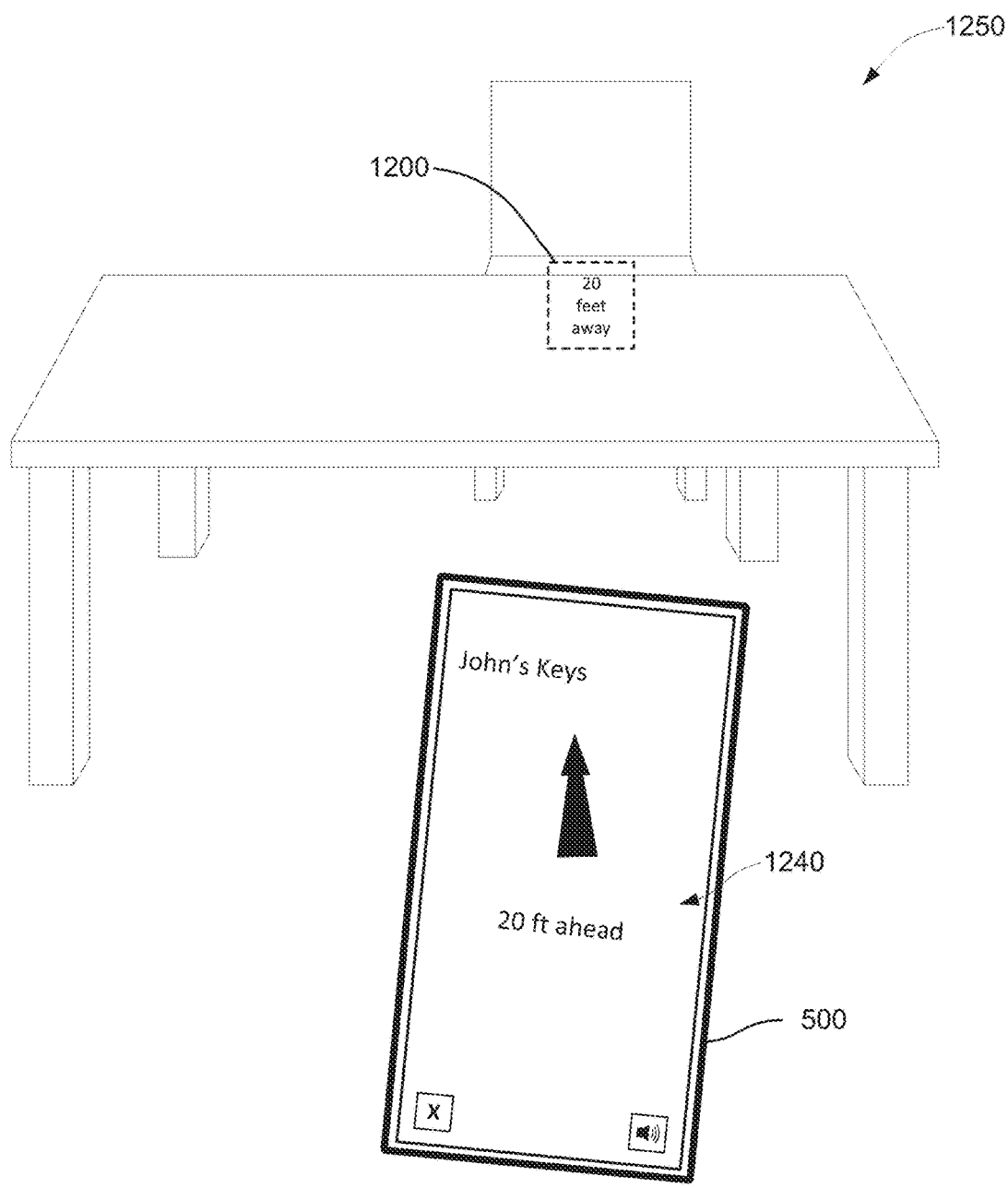

FIG. 12Y illustrates the user continuing to raise device 500 to a vertical position. In some embodiments, as described above, when device 500 is in the AR finding model, the arrow is an element (e.g., a two-dimensional or three-dimensional element) that points in the direction of the remote locator object in a three-dimensional environment displayed in user interface 1240. Thus, as device 500 is raised upwards, arrow appears to point "into" the display towards the location of remote locator object 1200 in three-dimensional space.

Figure 12Z:
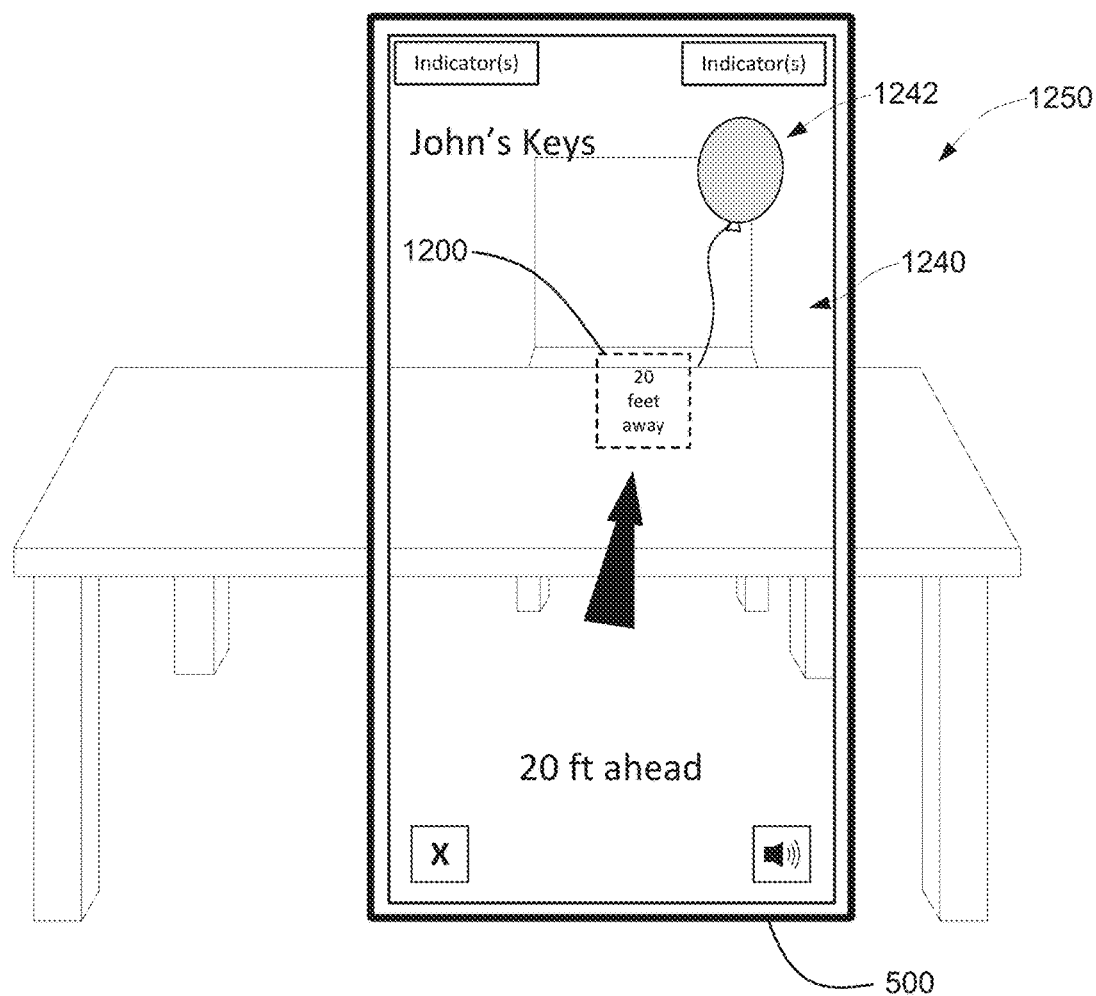
Figure 12A:
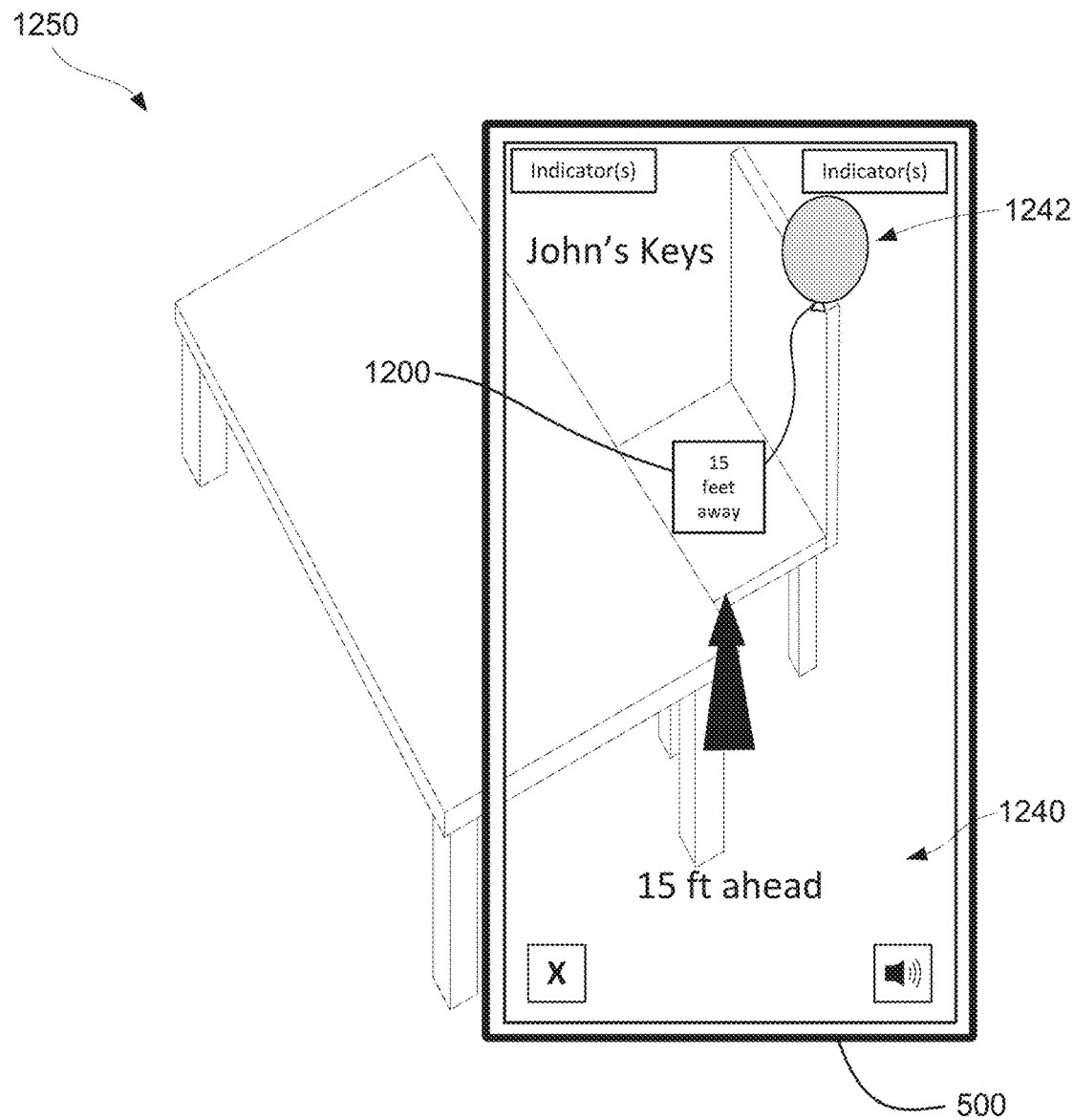
Figure 12B:
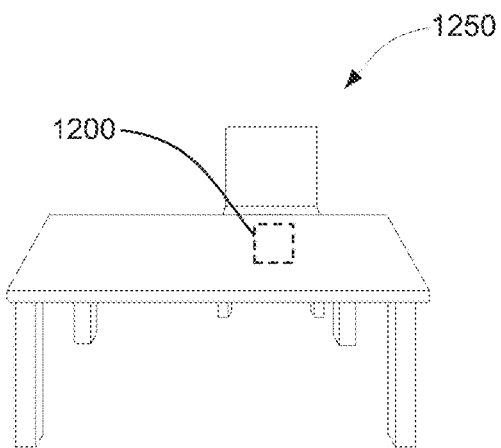
Figure 12B:
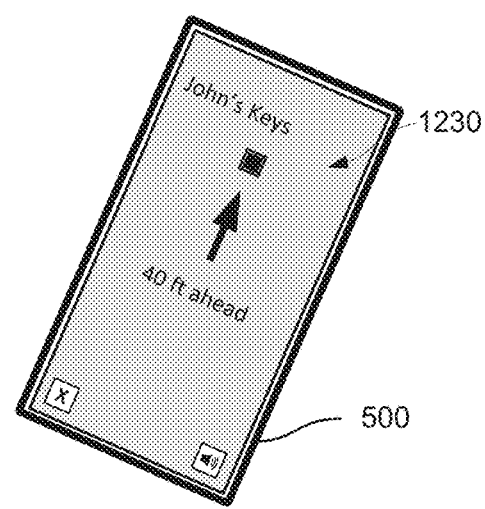
Figure 12C:
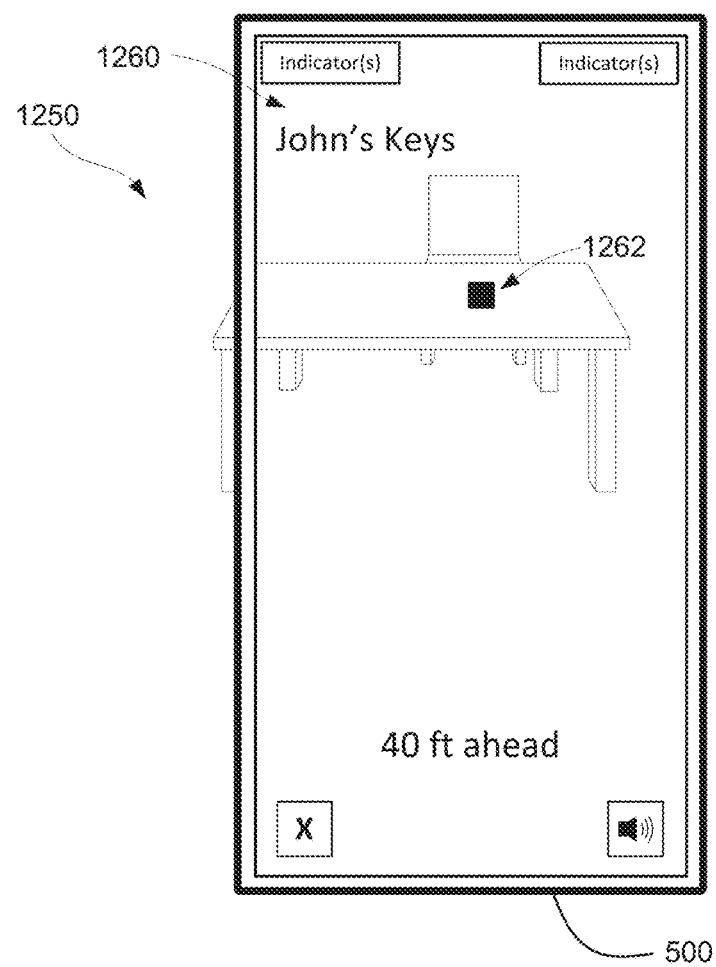
Figure 12D:
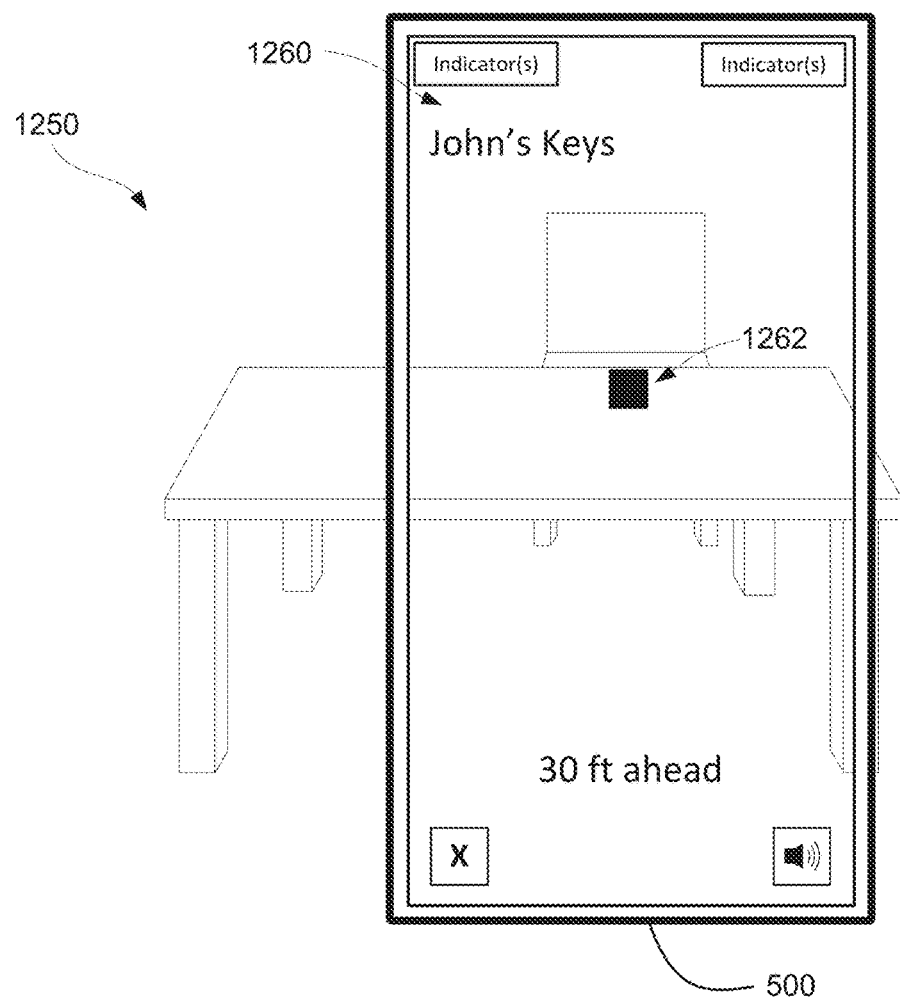
Figure 12E:
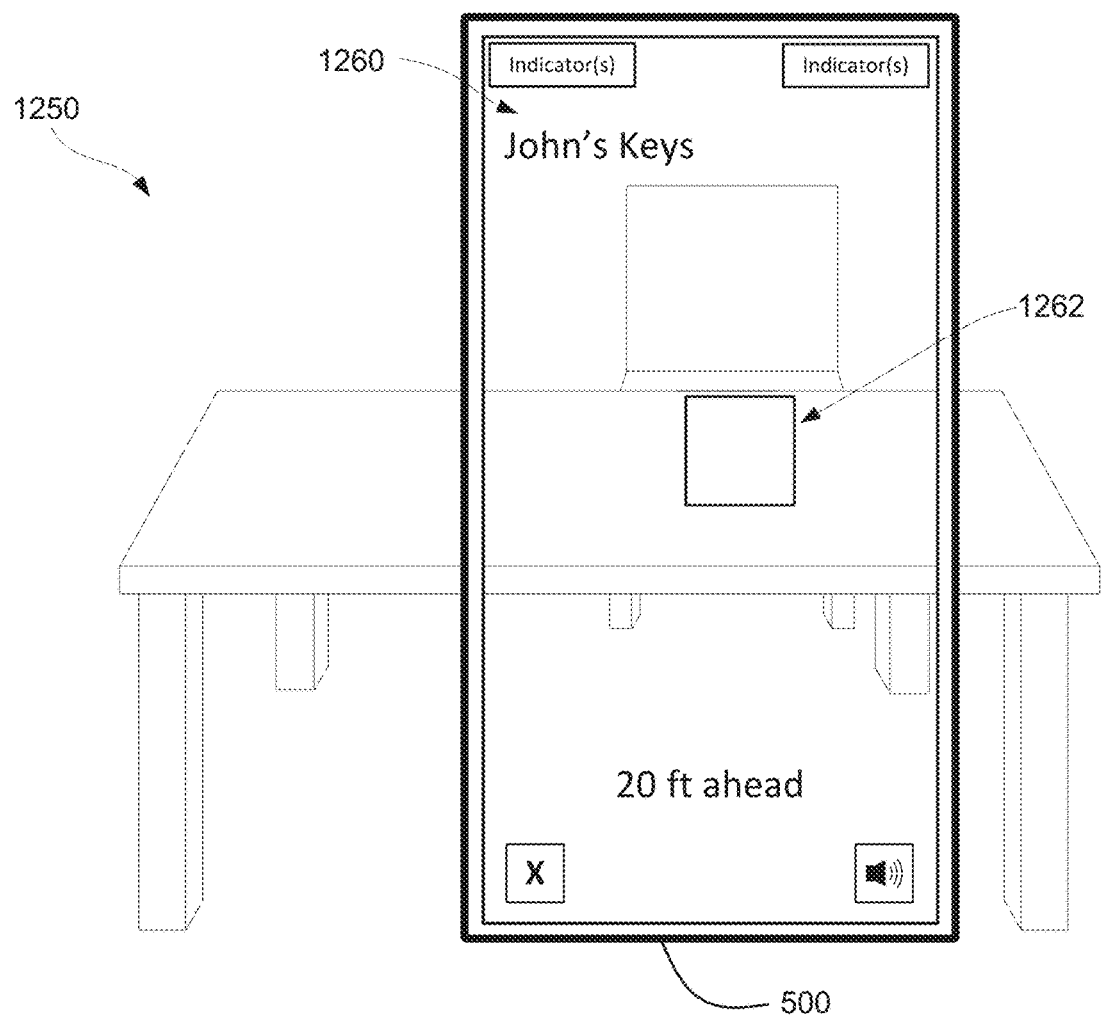
Figure 12F:
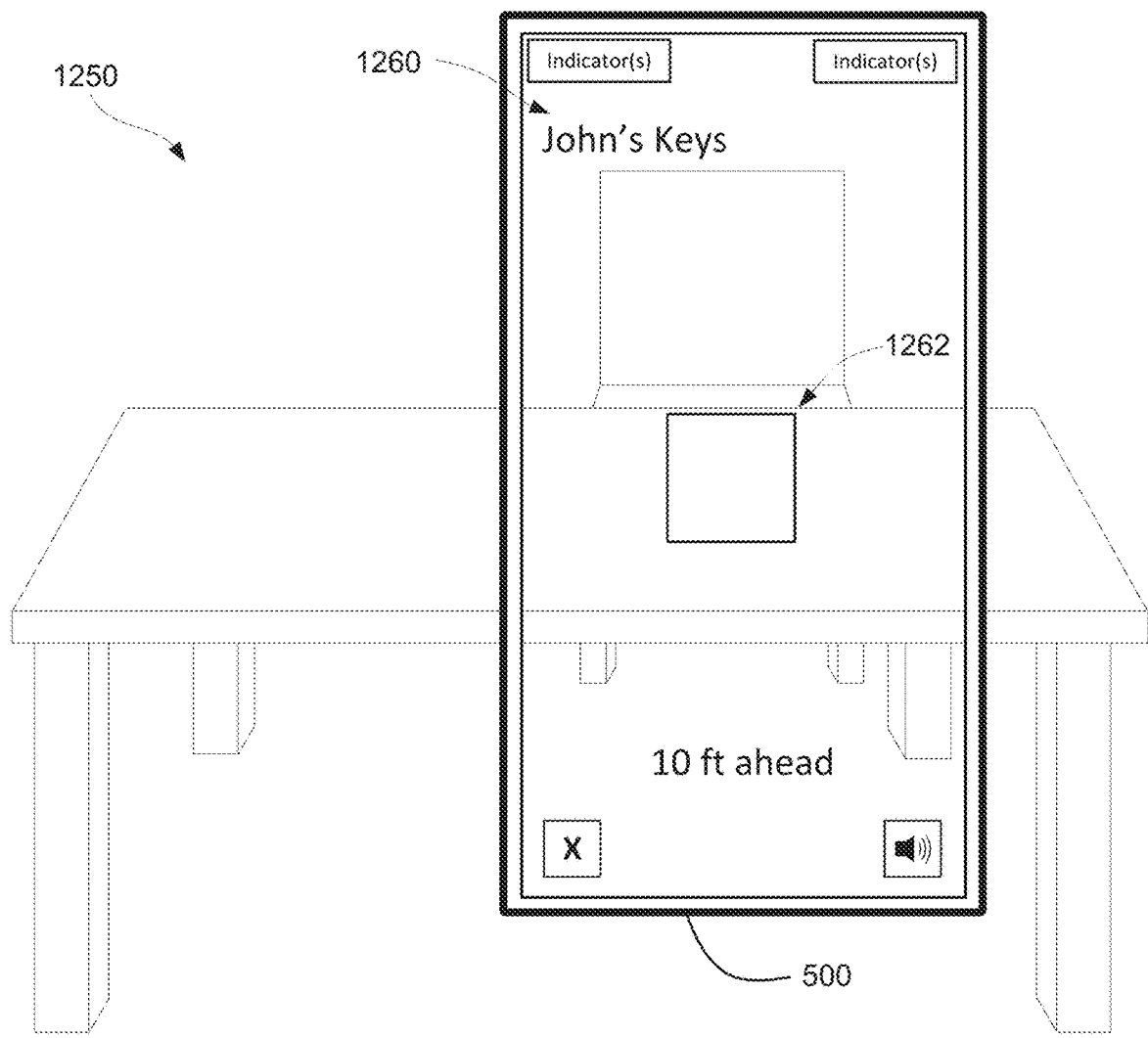
Figure 13A:
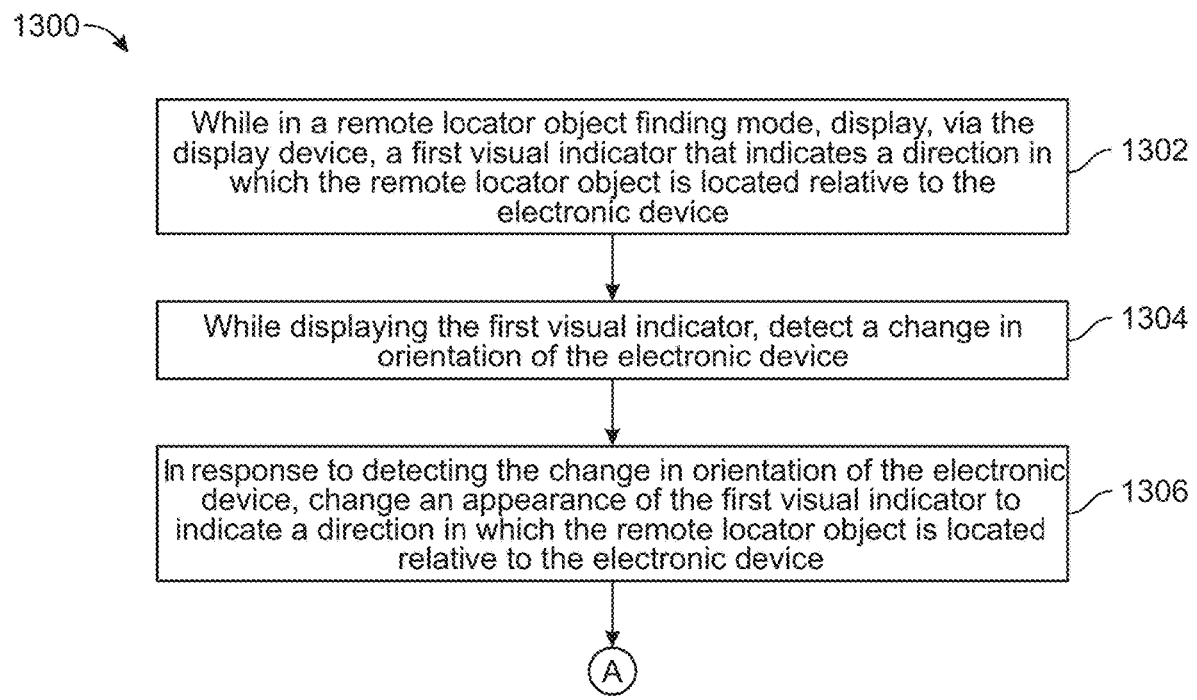
FIGS. 13A-13F are flow diagrams illustrating a method of presenting user interfaces for tracking and finding remote locator objects in accordance with some embodiments of the disclosure.
Figure 13B:
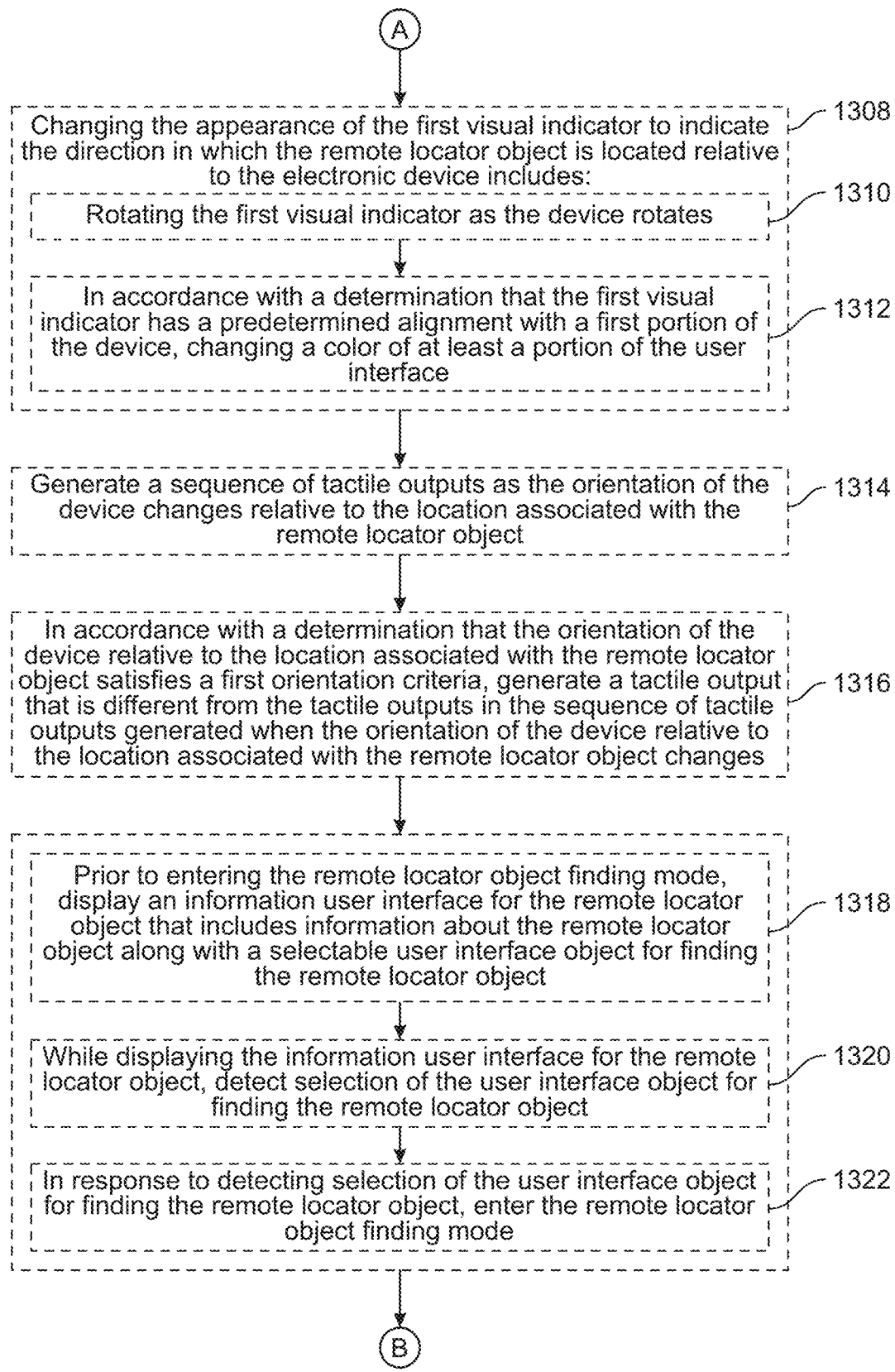
Figure 13C:
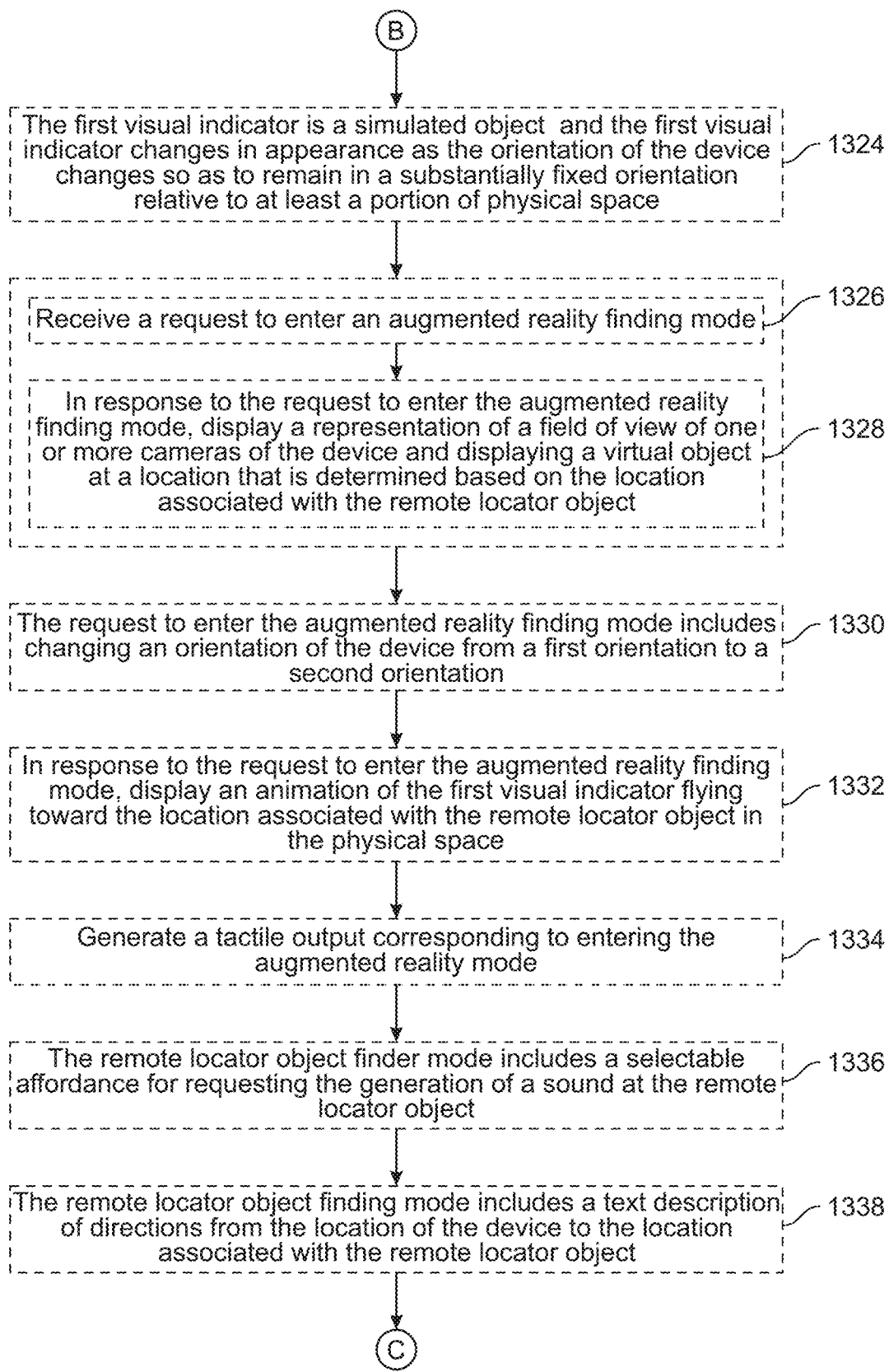
Figure 13D:
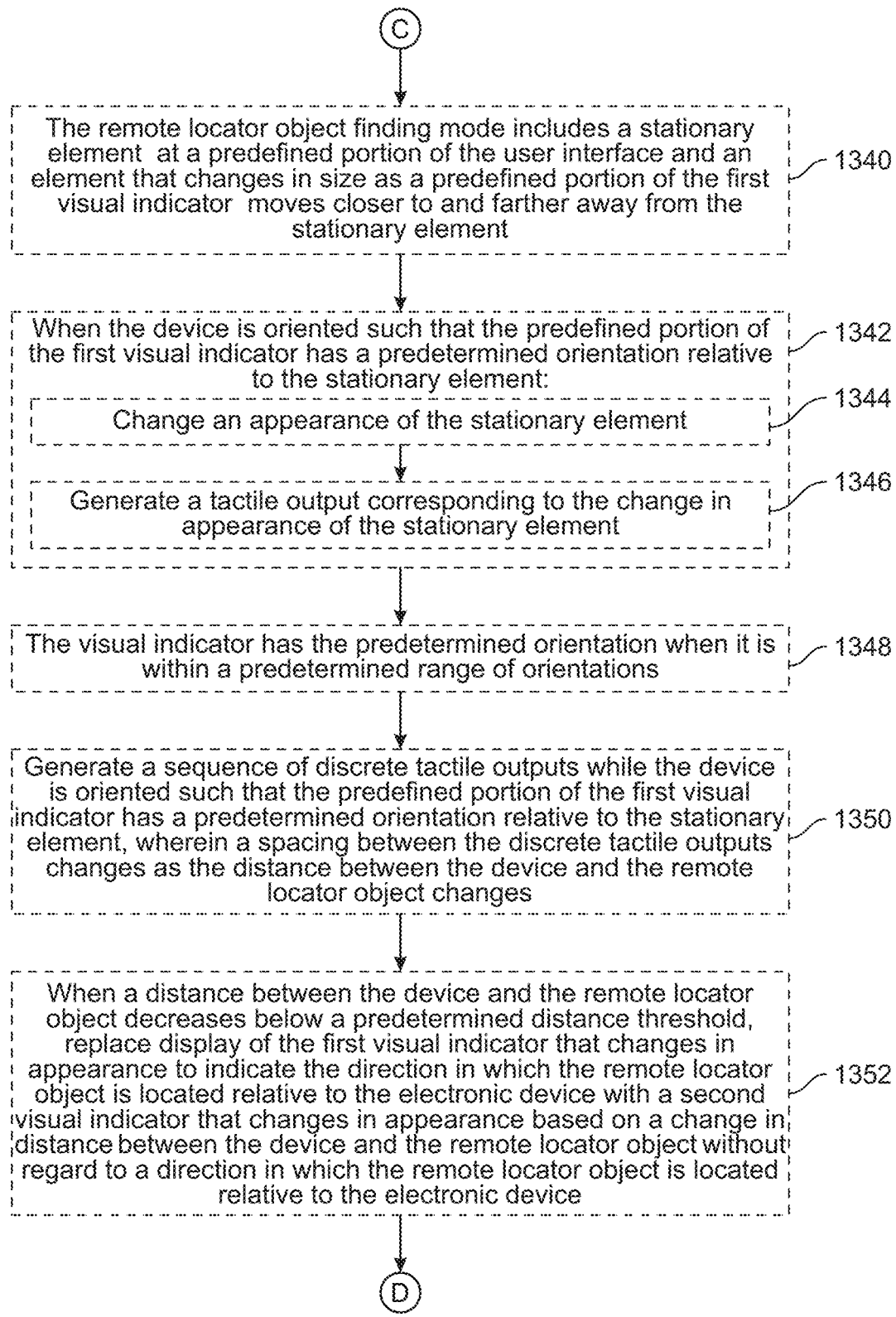
Figure 13E:
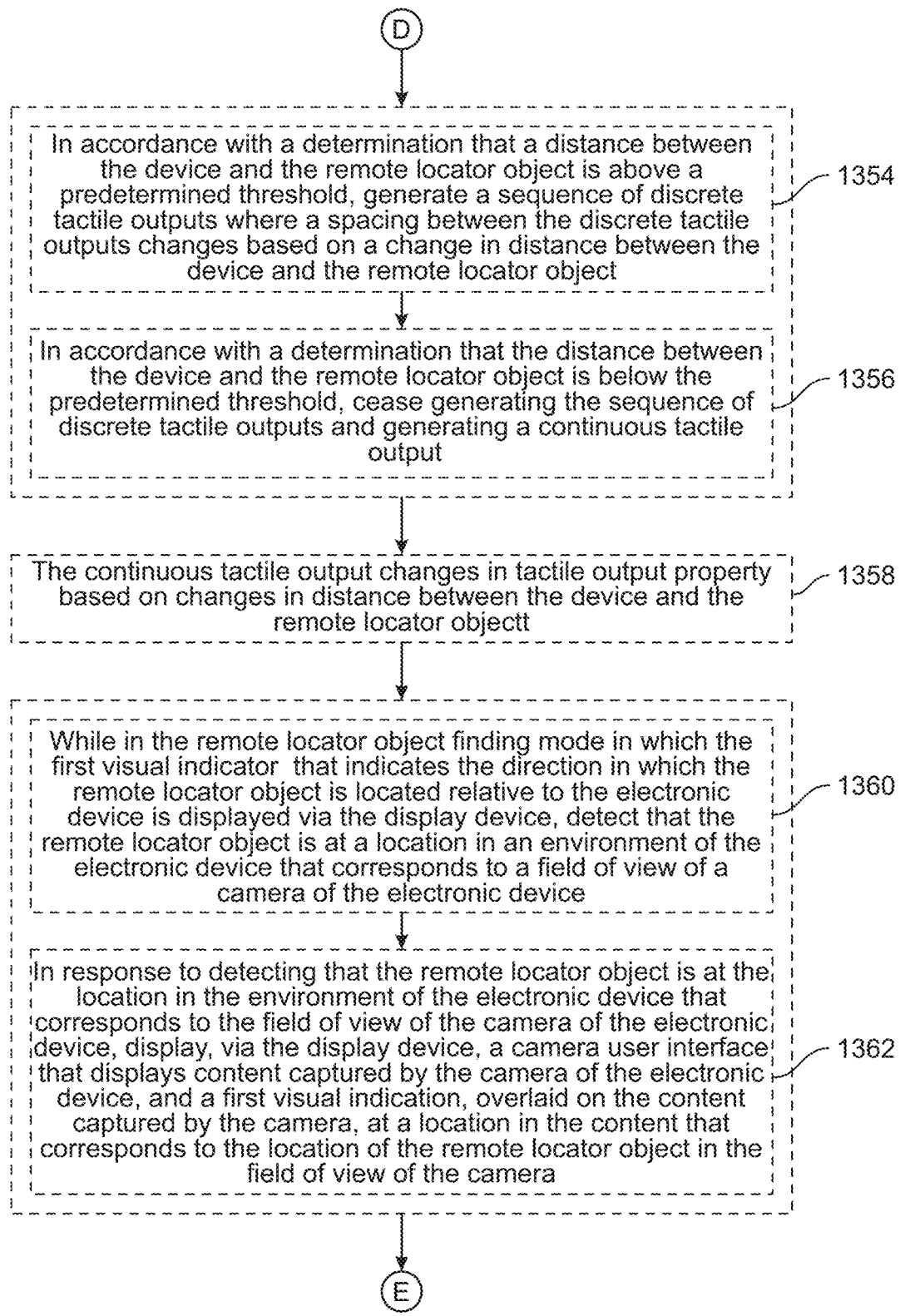
Figure 13F:
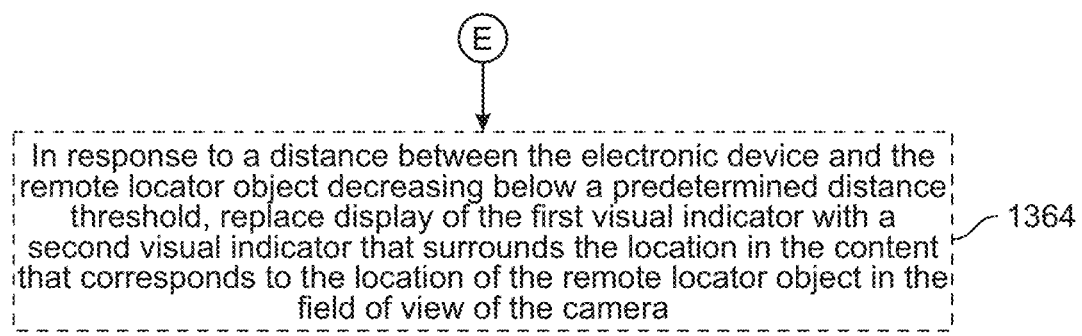
Figure 14A:
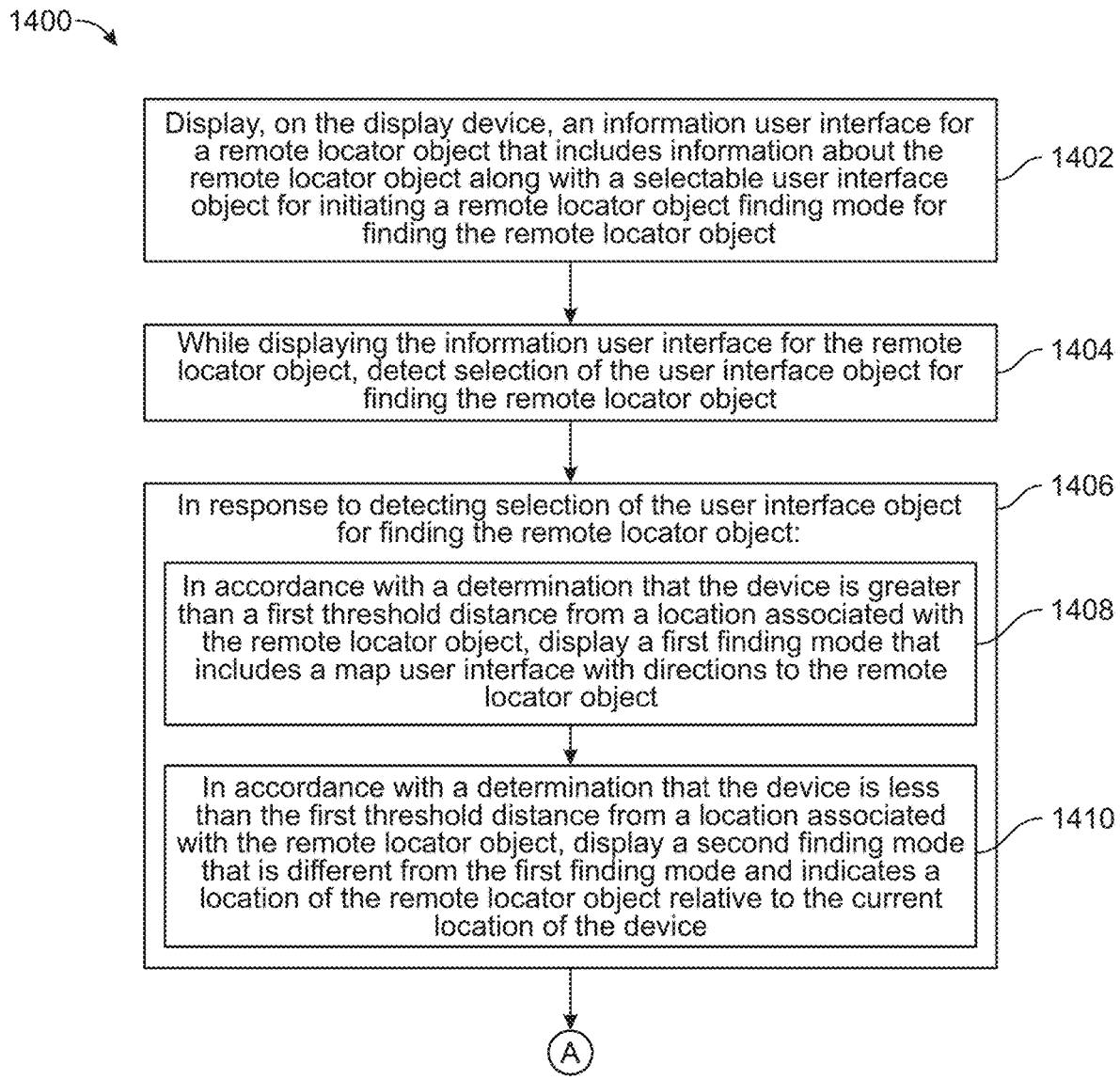
FIGS. 14A-14D are flow diagrams illustrating a method of presenting user interfaces for tracking and finding remote locator objects in accordance with some embodiments of the disclosure.
Figure 14B:
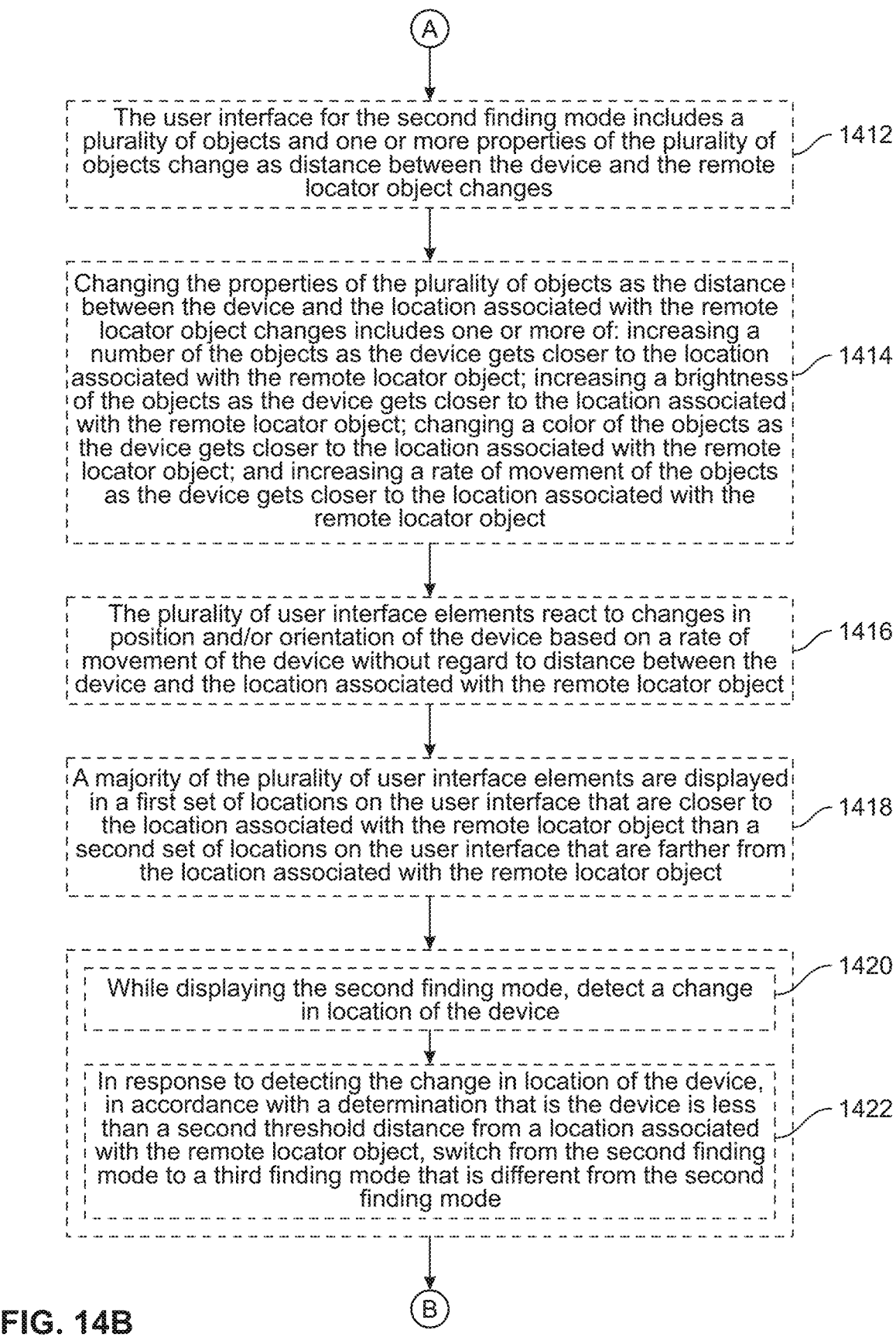
Figure 14C:
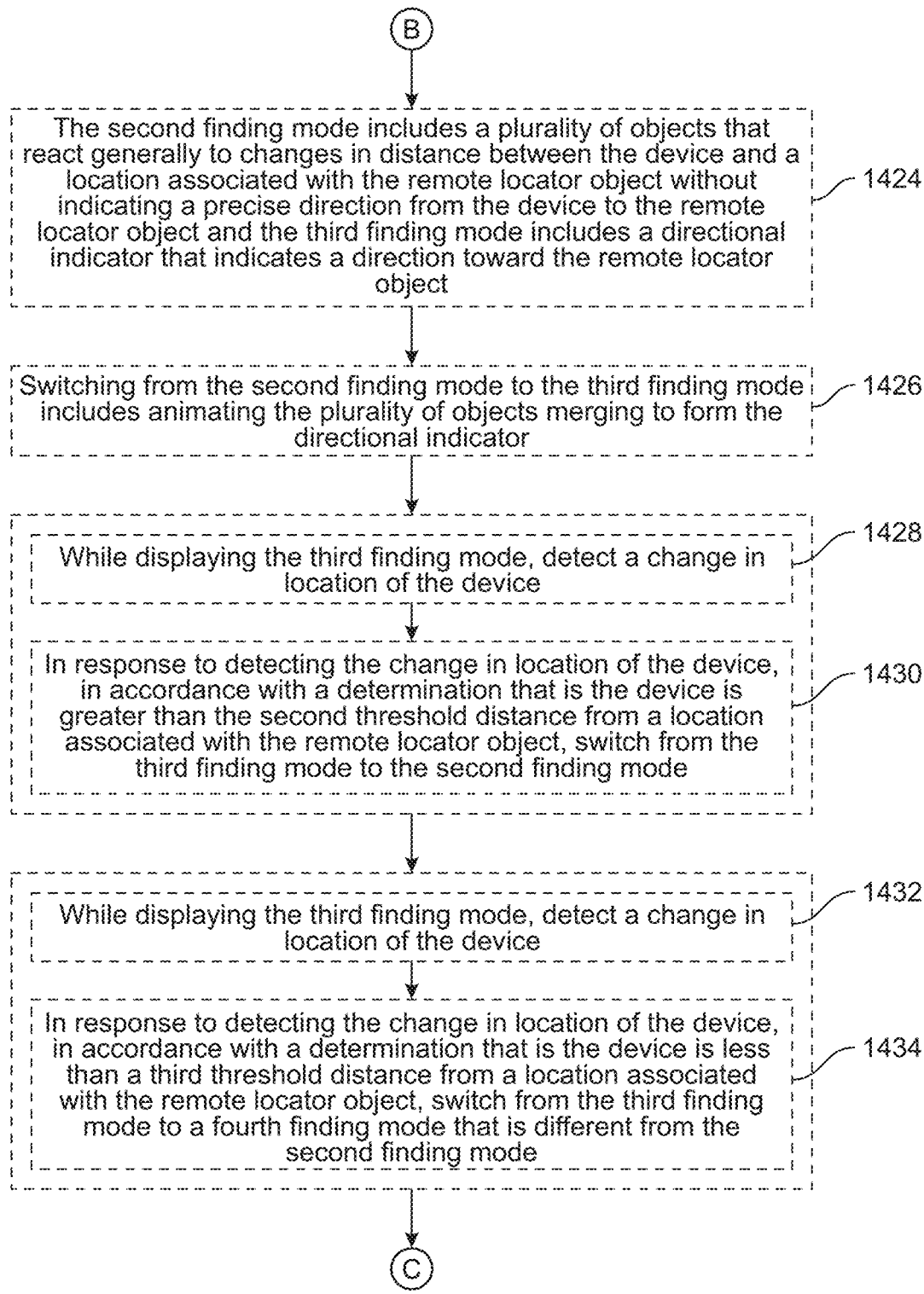
Figure 14D:
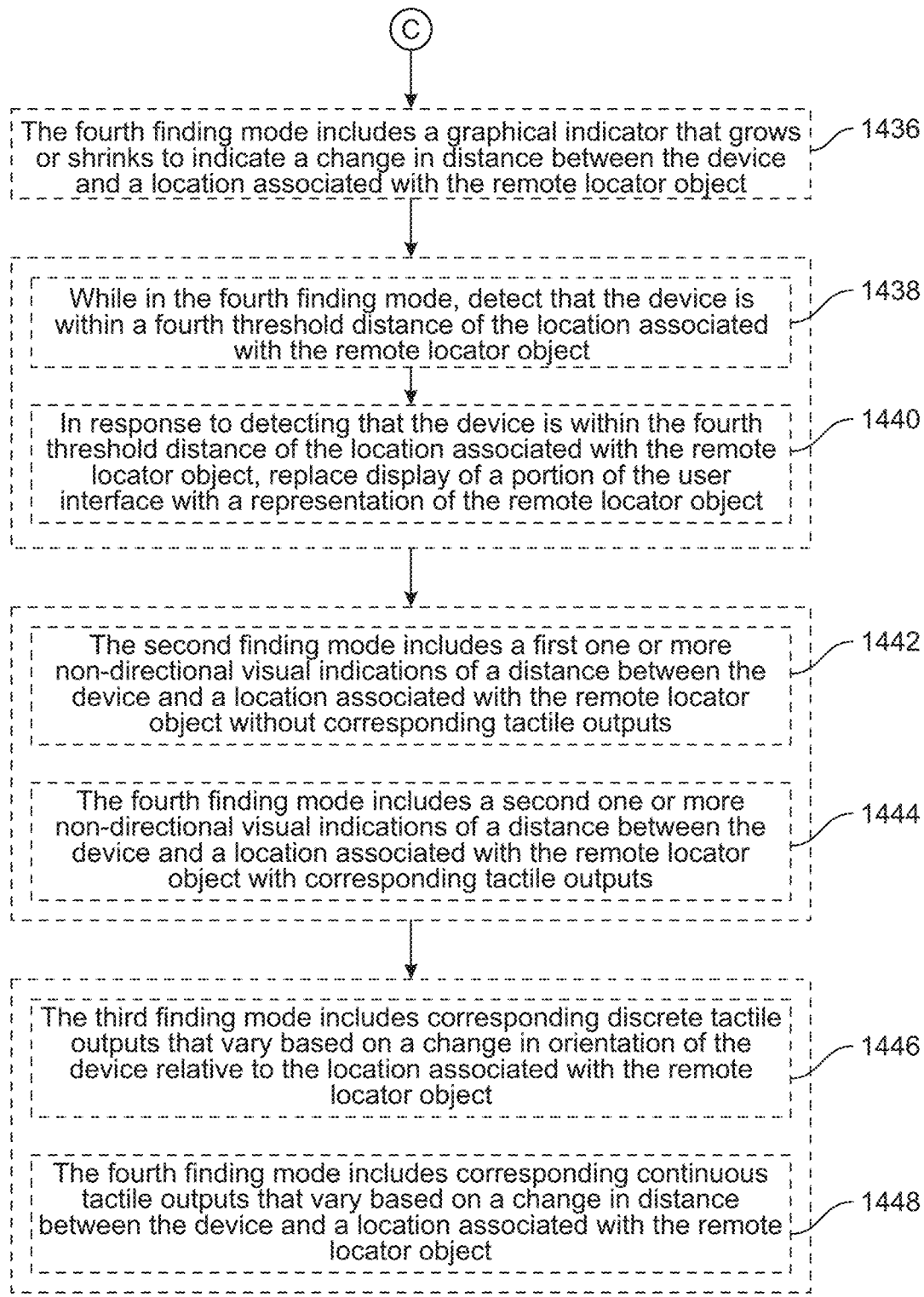

In FIG. 12Z, device 500 is now raised such that the camera of device 500 is facing the location of remote locator object 1200 and user interface 1240 displays environment 1250 including the location of remote locator object 1200. In some embodiments, when the location of remote locator object 1200 is shown on user interface 1240 (e.g., the camera of device 500 is facing the location of remote locator object 1200), the arrow is animated as if to fly towards the location of the remote locator object (e.g., when the remote locator object is shown on user interface 1240). In some embodiments, when the location of remote locator object 1200 is shown on user interface 1240, user interface 1240 displays balloon 1242 (or some other AR object) as if attached to or positioned with respect to remote locator object 1200. In some embodiments, as shown in FIG. 12Z, because remote locator object 1200 is obscured, balloon 1242 helps mark the hidden location of remote locator object 1200 (e.g., the string on the balloon attaches to remote locator object 1200 and is also partially obscured by the same object that obscures remote locator object 1200 (e.g., the table)). It is understood that any augmented reality element can be used to visually identify the location of the remote locator object 1200 (e.g., not necessarily a balloon).

FIG. 12AA illustrates the user rotating around environment 1250 so as to view environment 1250 from the side angle such that remote locator object 1200 is no longer obscured (e.g., by the table). In FIG. 12AA, user interface 1240 displays the unobscured location of remote locator object 1200 with balloon 1242 attached to the remote locator object. Thus, while in augmented reality finding mode, device 500 allows the user to move around the environment and the AR elements displayed on user interface 1240 automatically adjust to the user's movement such that remote locator object 1200 is continually identified by balloon 1242 (or any other suitable indicator).

FIGS. 12BB-12FF illustrate an alternative exemplary method of locating a remote locator object using an augmented reality finding mode. In some embodiments, remote locator object 1200 is located in environment 1250 and is optionally not obscured, partially obscured, or fully obscured behind objects in environment 1250 (e.g., on a table, behind a table, in the next room, across the street, etc.). In FIG. 12BB, remote locator object 1200 is fully obscured (e.g., on a chair behind a table, as indicated by the dotted lines). In FIG. 12BB, device 500 is in the finding mode and is displaying user interface 1230 (e.g., similar to user interface 1230 described above with respect to FIG. 12O). In some embodiments, device 500 is substantially horizontal to the ground (for example, being held like a compass).

In FIG. 12CC, device 500 is brought up vertically such that the camera on device 500 is facing toward environment 1250 and is able to capture the location of remote locator object 1200. In some embodiments, in response to determining that the camera on the device is able to capture the location of remote locator object 1200, device 500 enters into an AR finding mode and displays user interface 1260 that includes images of the physical space obtained by the one or more cameras of the device and one or more virtual elements that are not present in the physical space. In some embodiments the AR finding mode is displayed based whether or not the device is within a threshold distance of a location of the remote locator object (e.g., within 2, 5, 10, 20 or 50 feet) and/or whether a camera of the device has a field of view that includes an estimated location or determined location of the remote locator object. In some embodiments, the camera on the device periodically captures an image of the environment while device 500 is in the finding mode in FIG. 12BB to determine whether it is able to capture the location of remote locator object 1200 and enter into the AR finding mode. In some embodiments, device 500 determines the location of the remote locator object and places indicator 1262 at the location of the remote locator object in user interface 1260. In some embodiments, the orientation and/or distance of the device from the remote locator object is determined based on the camera images. In some embodiments, the orientation and/or distance of the device from the remote locator object is determined based on one or more other sensors of the device such as a GPS receiver, WiFi triangulation, an accelerometer, a gyroscope, an inertial measurement unit, or the like, or a combination of these various sensors. In some embodiments, indicator 1262 is an augmented reality element and is white, blue, red, black or any suitable color. In some embodiments, if remote locator object 1200 is obscured by an object in environment 1250, then indicator 1262 is displayed at the location on the user interface 1260 corresponding to the remote locator object 1200 as if the remote locator object 1200 is not obscured. In some embodiments, the size of indicator 1262 is based on the distance to the remote locator object 1200, as will be illustrated below.

In FIG. 12DD, the user moves device 500 closer to remote locator object 1200. In some embodiments, in response to remote locator object 1200 moving closer to device 500, the size of indicator 1262 is increased accordingly. For example, if remote locator object 1200 were not obscured, then it would be displayed larger because device 500 has moved closer to it, and indicator 1262 represents the size of the remote locator object 1200.

In FIG. 12EE, the user moves device 500 even closer to remote locator object 1200. In some embodiments, when device 500 moves within a threshold distance from remote locator object 1200 (e.g., 10 feet, 20 feet, 30 feet), then indicator 1262 is updated to become a ring surrounding the remote locator object 1200 that is displayed on user interface 1260. In some embodiments, the threshold distance in which indicator 1262 changes from a dot to a ring around remote locator object 1200 is the distance at which device 500 recognizes (e.g., optionally with an image recognition process), within environment 1250, that the remote locator object 1200 is the remote locator object 1200. In some embodiments, when device 500 recognizes the object as the remote locator object 1200, then indicator 1262 is changed into a ring that surrounds the remote locator object 1200 so as to highlight the exact location of remote locator object 1200. In some embodiments, indicator 1262 is displayed surrounding the location of the remote locator object 1200 (e.g., if remote locator object 1200 is obscured and thus not displayed on user interface 1262). In some embodiments, indicator 1262 changes from a dot to a ring in response to the device 500 moving within the threshold distance from remote locator object 1200 (e.g., without requiring that remote locator object 1200 be visible and/or identified/recognized by device 500).

In FIG. 12FF, the user moves device 500 even closer to remote locator object 1200. As shown in FIG. 12FF, indicator 1262 continues to increase in size proportionally to the size of remote locator object 1200 increasing in size on user interface 1260 (e.g., due to the camera moving closer to remote locator object 1200). It is understood that although the above-described AR finding mode illustrates the remote locator object on or near a table, the AR finding mode can be used when the remote locator object is completely obscured in another room, across a street, in another building, etc. For example, user interface 1260 optionally displays indicator 1262 as a dot at the location of the remote locator object until the user is able to move around the environment (e.g., cross the street, walk down the hall, etc.) and find the appropriate location at which remote locator object 1200 is located. In such embodiments, as soon as the user moves device 500 into a location where remote locator object 1200 is captured and recognized by device 500 (e.g., enters the room where remote locator object 1200 is located, moves around the table that is obscuring the remote locator object, etc.), then indicator 1262 is changed into the ring around remote locator 1200. In some embodiments, indicator 1262 changes into a ring without requiring that the user move to a location where remote locator object 1200 is captured and recognized by device 500.

FIGS. 13A-13F are flow diagrams illustrating a method 1300 of presenting user interfaces for tracking and finding remote locator objects in accordance with some embodiments, such as in FIGS. 12A-12FF. The method 1300 is optionally performed at an electronic device such as device 100, device 300, device 500 as described above with reference to FIGS. 1A-1B, 2-3, 4A-4B and 5A-5H. Some operations in method 1300 are, optionally combined and/or order of some operations is, optionally, changed.

As described below, the method 1300 provides ways to present user interfaces for tracking and finding remote locator objects. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 12J, an electronic device with a display device and one or more input devices (e.g., a mobile device (e.g., a tablet, a smartphone, a media player, or a wearable device) including a touch screen and wireless communication circuitry, or a computer including one or more of a keyboard, mouse, trackpad, and touch screen and wireless communication circuitry), while in a remote locator object finding mode, displays (1302), via the display device, a first visual indicator (e.g., an arrow) that indicates a direction in which the remote locator object is located relative to the electronic device, such as in FIG. 12J (e.g., display an arrow pointed in the direction where the remote locator object is determined to be located relative to the device). In some embodiments, a second indicator (e.g., a dot) is displayed that corresponds to the forward direction (e.g., 0° relative to the front of the device). In some embodiments, the first indicator (e.g., an arrow) is displayed that corresponds to the direction of the remote locator object (e.g., relative to the center of the display). In some embodiments, the arrow points from the center of the display towards the second indicator (e.g., thus pointing towards the remote locator object). In some embodiments, an arc is displayed between the first and second indicator to indicate to the user the direction to turn the device to align the remote indicator to device front (e.g., to rotate the device in the direction of the arc to cause alignment of the first indicator with the second indicator).

In some embodiments, while displaying the first visual indicator, the electronic device detects (1304) a change in orientation of the electronic device, such as in FIG. 12L (e.g., detect a rotation of the device towards or away from the remote locator object). In some embodiments, the change in orientation is detected using one or more sensors in the device. In some embodiments, the device includes an accelerometer, a gyroscope, a GPS sensor, or any other suitable sensor for determining the rotational position of the device. In some embodiments, in response to detecting the change in orientation of the electronic device, the electronic device changes (1306) an appearance of the first visual indicator (e.g., rotating the arrow) to indicate a direction in which the remote locator object is located relative to the electronic device, such as in FIG. 12L (e.g., as the device is rotated towards or away from the direction of the remote locator object, the display is updated to reflect the change in the direction of the remote locator object relative to the device). For example, when the device rotates towards the remote locator object (e.g., the front of the device is rotated towards the remote locator object), the arrow rotates to point towards the top of the device (e.g., in accordance with the position of the remote locator object) and/or the first indicator moves towards the first indicator (e.g., in accordance with the position of the remote locator object). Thus, the arrow and/or the first indicator are updated "live" to be pointed towards the remote locator object.

The above-described manner of indicating the direction of the remote locator object (e.g., by displaying an indicator in the direction of the remote locator object and updating the indicator as the device's orientation moves) provides the user with an easy and intuitive manner to find the remote locator object (e.g., by displaying an indicator in the direction of the remote locator object and updating the indicator as the user moves or rotates the device to find the remote locator object), which simplifies the interaction between the user and the electronic device and enhances the operability of the electronic device and makes the user-device interface more efficient (e.g., by providing the user with an easy method of finding the remote locator object using the electronic device), which additionally reduces power usage and improves battery life of the electronic device by enabling the user to use the electronic device more quickly and efficiency.

In some embodiments, changing the appearance of the first visual indicator to indicate the direction in which the remote locator object is located relative to the electronic device includes (1308) rotating the first visual indicator as the device rotates (1310), such as in FIG. 12L (e.g., rotating the arrow in accordance with the change in the orientation of the device relative to the remote locator object). In some examples, the arrow similar to a compass and points in the determined direction of the remote locator object and is updated (e.g., continuously, every 0.5 seconds, every 1 second, every time the orientation is determined to be changed, etc.) to reflect changes in orientation of the device relative to the remote locator object (e.g., as the electronic device moves around or rotates, or as the remote locator device is moved around).

In some embodiments, changing the appearance of the first visual indicator to indicate the direction in which the remote locator object is located relative to the electronic device also includes (1308) in accordance with a determination that the first visual indicator has a predetermined alignment with a first portion of the device, changing a color of at least a portion of the user interface (1312), such as in FIG. 12M (e.g., to indicate that the first visual indicator has the predetermined alignment with the first portion of the device). In some embodiments, the electronic device changes the color of the first visual indicator or a background behind the first visual indicator if the remote locator object is determined to be aligned ahead of the electronic device. In some embodiments, the first portion of the device is the top of the device and/or the front of the device (e.g., the side of the device opposite of the screen). In some embodiments, the remote locator object is determined to have a predetermined alignment if the electronic device is facing the remote locator object or if the lateral direction of the electronic device is pointed towards the remote locator object. In some embodiments, the remote locator object is determined to have a predetermined alignment if the remote locator object is within a certain angle of the direction of the electronic device (e.g., 10 degrees, 15 degrees, etc.). In some embodiments, when the remote locator object is determined to be aligned with the electronic device, the background of the user interface is updated to a different color (e.g., green, blue, etc.). In some embodiments, when the remote locator object is determined to be aligned with the electronic device, the first visual indicator (e.g., arrow) changes size, shape, and/or color.

The above-described manner of indicating the direction of the remote locator object (e.g., by changing the color of at least a portion of the user interface when the electronic device is aligned with the direction of remote locator object) provides for a quick and efficient manner of indicating that the electronic device is oriented in the correct direction, which simplifies the interaction between the user and the electronic device and enhances the operability of the electronic device and makes the user-device interface more efficient (e.g., by providing the user with a quick-glance method of determining that the user is facing the correct direction to locate the remote locator object), which additionally reduces power usage and improves battery life of the electronic device by enabling the user to use the electronic device more quickly and efficiency, while reducing errors in the usage of the device.

In some embodiments, the electronic device generates (1314) a sequence of tactile outputs as the orientation of the device changes relative to the location associated with the remote locator object, such as in FIG. 12L (e.g., producing a sequence of tactile outputs (e.g., tactile feedback, tactile vibrations, etc.) based on the orientation and/or distance of the electronic device with respect to the remote locator object). In some embodiments, the sequence of tactile outputs is a periodic tactile pulse at a respective frequency. In some embodiments, the frequency of the tactile pulse increases as the electronic device moves towards the remote locator object. In some embodiments, the frequency of the tactile pulse increases as the electronic device rotates towards alignment with the remote locator object. In some embodiments, a tactile pulse is generated whenever the device is rotated towards or is moved closer to the remote locator object (e.g., a pulse every 5 degree of rotation towards the remote locator object and/or a pulse every 3 feet closer the electronic device moves towards the remote locator object). In some embodiments, the strength and/or duration of the tactile output is changed (e.g., increased and/or decreased) when the electronic device rotates towards or moves closer to the remote locator object. In some embodiments, any characteristic of the sequence of tactile outputs is able to be changed or otherwise modified to alert the user that a change in orientation and/or distance has occurred and/or to encourage the user to move towards or rotate into alignment with the remote locator object.

The above-described manner of indicating the direction of the remote locator object (e.g., by providing a sequence of tactile outputs as the orientation of the device changes relative to the direction and/or location of the remote locator object) provides the user with instructions for finding the remote locator object without requiring the display of information or requiring the user to look at the display, which simplifies the interaction between the user and the electronic device and enhances the operability of the electronic device and makes the user-device interface more efficient (e.g., by providing the user with a non-visual method of finding the remote locator object without requiring the user to look at the device to determine whether the user is moving closer to or farther away from the remote locator object), which additionally reduces power usage and improves battery life of the electronic device by enabling the user to use the electronic device more quickly and efficiency.

In some embodiments, in accordance with a determination that the orientation of the device relative to the location associated with the remote locator object satisfies a first orientation criteria (e.g., the electronic device is pointed at or aligned with the remote locator object (e.g., within 10 degrees, 15 degrees, 20 degrees).), the electronic device generates (1316) a tactile output that is different from the tactile outputs in the sequence of tactile outputs generated when the orientation of the device relative to the location associated with the remote locator object changes, such as in FIG. 12M (e.g., when the electronic device is pointing at (e.g., aligned with) the location associated with the remote locator object such that the arrow is pointing toward a top of the electronic device, then generate a tactile output that is different from the tactile output that is generated when the electronic device is not pointed at (e.g., aligned with) the location associated with the remote locator object). In some embodiments, the tactile output has a higher intensity, longer duration, faster frequency, or a different output pattern than the tactile output that is generated when the electronic device is not pointed at (e.g., aligned with) the location associated with the remote locator object. In some embodiments, if the orientation of the device relative to the location associated with the remote locator object does not satisfy the first orientation criteria, then generate a different tactile output (e.g., the tactile output that is generated when the device is not pointed at or aligned with the location associated with the remote locator object.).

The above-described manner of indicating the direction of the remote locator object (e.g., by providing a tactile output when the electronic device has aligned with the direction of the remote locator object) provides quick and efficient tactile confirmation that the user is facing the correct direction, which simplifies the interaction between the user and the electronic device and enhances the operability of the electronic device and makes the user-device interface more efficient (e.g., by providing the user with tactile confirmation that the user is now facing the direction of the remote locator object without requiring the user to look at the display to perform the same determination), which additionally reduces power usage and improves battery life of the electronic device by enabling the user to use the electronic device more quickly and efficiency.

In some embodiments, prior to entering the remote locator object finding mode, the electronic device displays (1318) an information user interface for the remote locator object that includes information about the remote locator object (e.g., the information user interface includes a map and/or one or more affordances for changing settings for the remote locator object and/or performing operations associated with the remote locator object such as making the remote locator object make a sound) along with a selectable user interface object for finding the remote locator object, such as in FIG. 12C (e.g., one of the one or more affordances for performing operations associated with the remote locator object includes an affordance for initiating a process to find or locate the remote locator object (e.g., a finding or tracking mode).).

In some embodiments, while displaying the information user interface for the remote locator object, the electronic device detects (1320) selection of the user interface object for finding the remote locator object, such as in FIG. 12C. In some embodiments, in response to detecting selection of the user interface object for finding the remote locator object, the electronic device enters (1322) the remote locator object finding mode, such as in FIG. 12D (e.g., in response to a user input selecting a selectable option corresponding to a request to find the remote locator object, the device enters the remote locator object finding mode). In some embodiments, two different finding modes exist, including a map-based finding mode and the remote locator object finding mode based on the distance between the electronic device and the remote locator object. In some embodiments, if the distance between the electronic device and the remote locator object is above a threshold distance (e.g., 30 feet, 100 feet, 500 feet, 1 mile, 2 miles) then the electronic device enters into the map-based finding mode (e.g., similar to the map-based finding mode described below with respect to method 1400) in which a map is displayed with directions on how to travel from the current location to the location of the remote locator object. In some embodiments, entering map-based finding mode comprises launching a map application and optionally entering a navigation mode. In some embodiments, if the distance between the electronic device and the remote locator object is below the threshold distance, then the electronic device enters into the remote locator object finding mode.

The above-described manner of entering the remote locator object finding mode (e.g., by providing a selectable option for entering a finding mode on an information user interface) provides for a quick and efficient way of entering the finding mode, which simplifies the interaction between the user and the electronic device and enhances the operability of the electronic device and makes the user-device interface more efficient (e.g., without requiring the user to navigate to a separate user interface or perform additional inputs to enter a remote locator object finding mode), which additionally reduces power usage and improves battery life of the electronic device by enabling the user to use the electronic device more quickly and efficiency.

In some embodiments, the first visual indicator is a simulated object (e.g., a two dimensional arrow or a three dimensional arrow) and the first visual indicator changes in appearance as the orientation of the device changes so as to remain in a substantially fixed orientation relative to at least a portion of physical space (1324), such as in FIGS. 12X-12Z (e.g., the orientation of the arrow is fixed relative to the floor). In some embodiments, the orientation of the arrow rotates left or right based on the rotation (e.g., yaw rotation) of the device (e.g., similarly to a compass). In some embodiments, the arrow moves to simulate pointing into the device (e.g., in three dimensional space to maintain pointing in the direction of the remote locator object) when the device is pitched upwards such that the back (e.g., side of the device opposite of the display) is closer to the remote locator object.

The above-described manner of indicating the direction of the remote locator object (e.g., by maintaining the direction that the first visual indicator toward in three-dimensional space even as the user rotates, pans, or pitches the electronic device) provides for consistent representation of direction with respect to the physical space that the user and device occupy, which simplifies the interaction between the user and the electronic device and enhances the operability of the electronic device and makes the user-device interface more efficient (e.g., by displaying the location of the remote locator object in all three dimensions), which additionally reduces power usage and improves battery life of the electronic device by enabling the user to use the electronic device more quickly and efficiency.

In some embodiments, the electronic device receives (1326) a request to enter an augmented reality finding mode, such as in FIG. 12X (e.g., receiving a user input corresponding to a request to enter an augmented reality finding mode). In some embodiments, the user input includes a selection of a selectable option to enter an augmented reality finding mode. In some embodiments, the user input includes lifting the device (e.g., pitch rotation) such that the camera of the device (e.g., on a side opposite of the display) is facing forwards (e.g., or towards the remote locator object). In some embodiments, in response to the request to enter the augmented reality finding mode, the electronic device displays (1328) a representation of a field of view of one or more cameras of the device and displaying a virtual object at a location that is determined based on the location associated with the remote locator object, such as in FIG. 12Z (e.g., entering into an augmented reality mode in which one of more cameras of the device is used to capture the environment and display the environment on the display (e.g., displaying the reality)). In some embodiments, virtual objects are displayed in the environment on the display (e.g., augmenting the reality). In some embodiments, a virtual object such as a balloon is displayed floating over the location of the remote locator object, optionally with a string that ends at a location of the remote locator object. In some embodiments, the virtual object is fixed relative to the physical space such that when the field of view of the one or more cameras changes (e.g., based on a change in orientation of the cameras in the physical space), the virtual object moves on the display so as to maintain a fixed relation relative to the physical space). For example, as the user moves around in the environment, the one or more cameras capture that the user is moving around the environment and the environment on the display, including the virtual objects displayed in the environment on the display, are updated to reflect the movement of the device in the environment.

The above-described manner of indicating the direction of the remote locator object (e.g., by entering into an augmented reality finding mode and displaying a virtual object at the location of the remote locator object) provides the user with a visual indication of the exact location of the remote locator object (e.g., by displaying the user's environment on the display of the device as augmented reality displaying, in the augmented reality environment, an easily identifiable virtual object at the location of the remote locator object), which simplifies the interaction between the user and the electronic device and enhances the operability of the electronic device and makes the user-device interface more efficient (e.g., by more quickly finding the remote locator object by easily locating and moving towards the virtual object), which additionally reduces power usage and improves battery life of the electronic device by enabling the user to use the electronic device more quickly and efficiency.

In some embodiments, the request to enter the augmented reality finding mode includes changing an orientation of the device from a first orientation to a second orientation (1330), such as in FIG. 12X (e.g., from an orientation where the device is substantially parallel to the ground (e.g., an orientation within a first range of orientations) to an orientation where the device is substantially perpendicular to the ground (e.g., an orientation within a second range of orientations, different than the first range of orientations), such as raising the electronic device in a pitch direction.).

The above-described manner of entering an augmented reality finding mode (e.g., by entering the augmented reality finding mode when the user rotates the electronic device upwards) provides for a quick and efficient way of entering augmented reality finding mode (e.g., by automatically determining that the user likely wants to enter augmented reality mode when the user points a camera of the device forwards (e.g., as opposed to downwards)), which simplifies the interaction between the user and the electronic device and enhances the operability of the electronic device and makes the user-device interface more efficient (e.g., without requiring the user to perform additional inputs or navigate to a separate user interface to enter into augmented reality finding mode), which additionally reduces power usage and improves battery life of the electronic device by enabling the user to use the electronic device more quickly and efficiency.

In some embodiments, in response to the request to enter the augmented reality finding mode, the electronic device displays (1332) an animation of the first visual indicator flying toward the location associated with the remote locator object in the physical space, such as described in FIG. 12Z (e.g., in accordance with a determination that the device has changed from the first orientation to the second orientation, switching to the AR mode and animating the remote locator object moving toward the remote locator object (e.g., three dimensionally as if moving into the display)). In some embodiments, the display is displaying the environment and the visual indicator moves within the environment toward the location of the remote locator object. In some embodiments, the animation is of an arrow (e.g., the first visual indicator) flying towards the location of the remote locator object in the augmented reality environment.

The above-described manner of indicating the direction of the remote locator object (e.g., by displaying an animation of the visual indicator moving three dimensionally in the direction of the remote locator object when the device enters into augmented reality mode) quickly and efficiently provides the direction and location of the remote locator object when the device enters into augmented reality mode, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the electronic device generates (1334) a tactile output corresponding to entering the augmented reality mode, such as in FIG. 12X (e.g., a tactile output that corresponds to animation of the first visual indicator flying toward the location associated with the remote locator object, such as a single tap when the electronic device enters the augmented reality mode).

The above-described manner of entering an augmented reality finding mode (e.g., by generating a tactile feedback when the device enters into an augmented reality mode) provides the user with feedback that the device has entered augmented reality finding mode (e.g., by providing physical feedback that the user has entered into augmented reality mode), which simplifies the interaction between the user and the electronic device and enhances the operability of the electronic device and makes the user-device interface more efficient (e.g., by providing a non-visual indication that the user has entered augmented reality mode (e.g., in case the user inadvertently entered into augmented reality mode) without requiring the user to look at the display to determine that the user has entered into augmented reality mode), which additionally reduces power usage and improves battery life of the electronic device by enabling the user to use the electronic device more quickly and efficiency, while reducing errors in the usage of the device.

In some embodiments, the remote locator object finder mode includes a selectable affordance for requesting the generation of a sound at the remote locator object (1336), such as in FIG. 12H (e.g., in response to selection of the selectable affordance, sending an instruction to the remote locator object (optionally via a remote server) instructing the remote locator object to generate a sound).

The above-described manner of locating the remote locator object (e.g., by providing an option to cause the remote locator object to generate an audible sound) provides the user with an easy method of locating the remote locator object, which simplifies the interaction between the user and the electronic device and enhances the operability of the electronic device and makes the user-device interface more efficient (e.g., without requiring the user to use other non-auditory methods of finding the remote locator object), which additionally reduces power usage and improves battery life of the electronic device by enabling the user to use the electronic device more quickly and efficiency.

In some embodiments, the remote locator object finding mode includes a text description of directions from the location of the device to the location associated with the remote locator object (1338), such as in FIG. 12J (e.g., displaying, on the display, a direction to turn and a distance to the location associated with the remote locator object (e.g., "22 feet to the left"). In some embodiments, the text description is displayed below the first visual indicator that is pointed in the direction of the remote locator object. In some embodiments, the text description is updated as the distance to the remote locator object and/or orientation of the remote locator object relative to the electronic device changes.

The above-described manner of locating the remote locator object (e.g., by displaying a textual description of the location of the remote locator object relative to the device) provides the user with an easy method of locating the remote locator object, which simplifies the interaction between the user and the electronic device and enhances the operability of the electronic device and makes the user-device interface more efficient (e.g., without requiring the user to rotate or move around to determine the direction and distance of the remote locator object), which additionally reduces power usage and improves battery life of the electronic device by enabling the user to use the electronic device more quickly and efficiency.

In some embodiments, the remote locator object finding mode includes a stationary element (e.g., a dot that represents the forward direction of the device) at a predefined portion of the user interface and an element (e.g., an arc from the stationary element to the predefined portion of the first visual indicator) that changes in size as a predefined portion of the first visual indicator (e.g., a tip of the arrow) moves closer to and farther away from the stationary element (1340), such as in FIG. 12J (e.g., displaying in the user interface, an arrow pointed towards the remote locator object, a dot that represents device "north", and an arc between the dot and the tip of the arrow). In some embodiments, the arc indicates to the user the direction in which to turn the device to align the remote locator object with the electronic device (e.g., aligned with device "north"). In some embodiments, as the location of the remote locator object changes with respect to the electronic device, the arc changes size (e.g., becomes shorter or longer, respectively) based on whether the remote locator object is moving closer to of further away from alignment with the device.

The above-described manner of locating the remote locator object (e.g., by displaying a stationary element that represents the forward direction of the device and an arc from the stationary element to the tip of the arrow that is pointed towards the remote locator object) provides for a quick and efficient way of indicating the degree of misalignment of the electronic device with respect to the remote locator object, which simplifies the interaction between the user and the electronic device and enhances the operability of the electronic device and makes the user-device interface more efficient (e.g., without requiring the user to rotate or move around to determine which direction to face to align with the direction of the remote locator object), which additionally reduces power usage and improves battery life of the electronic device by enabling the user to use the electronic device more quickly and efficiency, while reducing errors in the usage of the device.

In some embodiments, when the device is oriented such that the predefined portion of the first visual indicator has a predetermined orientation relative to the stationary element (1342), such as in FIG. 12M (e.g., when the electronic device is aligned with the direction of the remote locator object (e.g., within 5 degrees, 10 degrees, 20 degrees) such that the first visual indicator is pointed towards the top of the device.), the electronic device changes (1344) an appearance of the stationary element (e.g., changing the size and/or color of the dot), and generates (1346) a tactile output corresponding to the change in appearance of the stationary element, such as in FIG. 12M (e.g., simultaneously with or after changing the appearance of the stationary element, generating a tactile output indicating to the user that the user has aligned the electronic device with the direction of the remote locator object, such as a single tap). Optionally, change a color of a portion of the user interface such as a color of the arrow or the background of the user interface.

The above-described manner of locating the remote locator object (e.g., by changing the appearance of the stationary element and providing a tactile output when the user has aligned the electronic device with the direction of the remote locator object) provides for an automatic manner of confirming that the electronic device is aligned with the direction of the remote locator object, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the visual indicator has the predetermined orientation when it is within a predetermined range of orientations (1348), such as in FIGS. 12M-12Q (e.g., when the alignment of the remote locator object is within a predefined range of angles (e.g., 10 degrees, 15 degrees, 20 degrees), then the visual indicator indicates that the device is aligned with the remote locator object. In some embodiments, the predetermined range of orientations is the same for different distances between the device and the remote locator object (e.g., as the device moves closer to the remote locator object, the range of angles considered to still be within alignment remains constant). In some embodiments, the predetermined range of orientations change (e.g., increasing in angular range or decreasing in angular range) based the distance between the device and the remote locator object.).

The above-described manner of locating the remote locator object (e.g., by displaying the visual indicator as aligned with the direction of the remote locator object when it is within a range of angles from alignment with the direction of the remote locator object) provides the user with a margin of error in aligning the electronic device with the remote locator object, which simplifies the interaction between the user and the electronic device and enhances the operability of the electronic device and makes the user-device interface more efficient (e.g., without unnecessarily indicating that the user is no longer aligned with the direction of the remote locator object when the user is only slightly misaligned while moving towards the remote locator object (e.g., while moving around other objects)), which additionally reduces power usage and improves battery life of the electronic device by enabling the user to use the electronic device more quickly and efficiency.

In some embodiments, the electronic device generates (1350) a sequence of discrete tactile outputs while the device is oriented such that the predefined portion of the first visual indicator has a predetermined orientation relative to the stationary element, wherein a spacing between the discrete tactile outputs changes as the distance between the device and the remote locator object changes, such as in FIGS. 12J-12Q (e.g., the spacing between the discrete tactile outputs decreases as the distance between the device and the remote locator object decreases and the spacing between the discrete tactile outputs increases as the distance between the device and the remote locator object increases (e.g., increasing the frequency of the tactile outputs)). In some embodiments, the amplitude and/or tactile output pattern of the tactile outputs in the sequence of discrete tactile outputs also changes based on the distance between the device and the remote locator object.

The above-described manner of locating the remote locator object (e.g., by changing the frequency of the tactile outputs as the user moves farther away from or closer to the remote locator object) provides for a quick and efficient manner of communicating the distance between the device and the remote locator object, which simplifies the interaction between the user and the electronic device and enhances the operability of the electronic device and makes the user-device interface more efficient (e.g., without requiring the user to look at the display to determine whether the user is moving in the correct direction), which additionally reduces power usage and improves battery life of the electronic device by enabling the user to use the electronic device more quickly and efficiency.

In some embodiments, when a distance between the device and the remote locator object decreases below a predetermined distance threshold (e.g., 2 feet, 3 feet, 4 feet), the electronic device replaces (1352) display of the first visual indicator that changes in appearance to indicate the direction in which the remote locator object is located relative to the electronic device with a second visual indicator that changes in appearance based on a change in distance between the device and the remote locator object without regard to a direction in which the remote locator object is located relative to the electronic device, such as in FIG. 12R (e.g., the second visual indicator comprises a dot and a ring around the dot). In some embodiments, the dot is the stationary item that is enlarged. In some embodiments, the ring around the dot shrinks down toward the dot as the device gets closer to the remote locator object.

The above-described manner of locating the remote locator object (e.g., by changing the first visual indicator into a second visual indicator when the user is within a threshold distance from the remote locator device) automatically provides a user interface for finding the remote locator object that provides additional information about the location of the remote locator object based on the distance to the remote locator object (e.g., by using the first visual indicator when the remote locator object is farther than a threshold distance and using the second visual indicator when the remote locator object is within the threshold distance), which simplifies the interaction between the user and the electronic device and enhances the operability of the electronic device and makes the user-device interface more efficient (e.g., by automatically switching to a different visual indicator to locate the remote locator object without requiring the user to perform additional inputs to activate the second visual indicator), which additionally reduces power usage and improves battery life of the electronic device by enabling the user to use the electronic device more quickly and efficiency.

In some embodiments, in accordance with a determination that a distance between the device and the remote locator object is above a predetermined threshold (e.g., the threshold at which the first visual indicator is replaced with the second visual indicator, such as 2 feet, 3 feet, 4 feet), the electronic device generates (1354) a sequence of discrete tactile outputs where a spacing between the discrete tactile outputs changes based on a change in distance between the device and the remote locator object, such as in FIG. 12Q (e.g., generating discrete tactile outputs based on the orientation and/or distance of the electronic device with respect to the remote locator object).

In some embodiments, in accordance with a determination that the distance between the device and the remote locator object is below the predetermined threshold, the electronic device ceases (1356) generating the sequence of discrete tactile outputs and generating a continuous tactile output, such as in FIG. 12R (e.g., generate a continuous vibration). In some embodiments, the continuous vibration increases in intensity as the user moves closer to the remote locator object (and decreases in intensity as the user moves away from the remote locator object). In some embodiments, if the user moves within the predetermined threshold and then moves back out of the predetermined threshold, the continuous tactile output ceases and the sequence of discrete tactile outputs resumes.

The above-described manner of locating the remote locator object (e.g., by changing from discrete tactile outputs to a continuous tactile output when the user moves within a predetermined distance threshold) provides for a quick and efficient manner of communicating that the distance between the device and the remote locator object has dropped to a predetermined distance, which simplifies the interaction between the user and the electronic device and enhances the operability of the electronic device and makes the user-device interface more efficient (e.g., without requiring the user to look at the display to determine how far the user is from the remote locator object), which additionally reduces power usage and improves battery life of the electronic device by enabling the user to use the electronic device more quickly and efficiency.

In some embodiments, the continuous tactile output changes in tactile output property (e.g., amplitude and/or frequency) based on changes in distance between the device and the remote locator object (1358), such as in FIGS. 12R-12T (e.g., increasing in amplitude and/or intensity as the distance between the device and the remote locator object decreases and/or increasing in frequency as the distance between the device and the remote locator object decreases). In some embodiments, the amplitude, intensity, and/or frequency decreases as the distance between the device and the remote locator object increases.

The above-described manner of locating the remote locator object (e.g., by changing the amplitude, intensity, and/or frequency of the tactile outputs as the user moves closer to or farther away from the remote locator object) provides for a quick and efficient manner of communicating whether the user is moving towards or away from the remote locator object, which simplifies the interaction between the user and the electronic device and enhances the operability of the electronic device and makes the user-device interface more efficient (e.g., without requiring the user to look at the display to determine whether the user is moving in the correct direction), which additionally reduces power usage and improves battery life of the electronic device by enabling the user to use the electronic device more quickly and efficiency.

In some embodiments, while in the remote locator object finding mode in which the first visual indicator (e.g., an arrow) that indicates the direction in which the remote locator object is located relative to the electronic device is displayed via the display device, the electronic device detects (1360) that the remote locator object is at a location in an environment of the electronic device that corresponds to a field of view of a camera of the electronic device, such as in FIG. 12CC (e.g., determining that the camera of the electronic device is capturing (or would be capturing, if it were activated) a field of view of the environment that includes the location of the remote locator object). In some embodiments, while in a finding mode, the camera of the electronic device periodically scans the visible field of view of the camera to determine whether the location of the remote locator object falls within the visible field of view of the camera. In some embodiments, the electronic device determines whether the remote locator object would be within the field of view of the camera without using the camera to make such a determination, such as based on directional information of the remote locator object and/or orientation information for the electronic device.

In some embodiments, in response to detecting that the remote locator object is at the location in the environment of the electronic device that corresponds to the field of view of the camera of the electronic device, the electronic device displays (1362), via the display device, a camera user interface that displays content captured by the camera of the electronic device, and a first visual indication, overlaid on the content captured by the camera, at a location in the content that corresponds to the location of the remote locator object in the field of view of the camera, such as in FIG. 12CC (e.g., if the field of view captured by the camera is determined to include the location of the remote locator object, then update the user interface to display a camera user interface). In some embodiments, the camera user interface displays the currently visible field of view of the camera (e.g., the display displays what the camera is capturing). In some embodiments, an indicator is displayed on the camera user interface that indicates the determined location of the remote locator object. In some embodiments, the first visual indication is a balloon with a string attached to the balloon and ending at the location of the remote locator object. In some embodiments, the first visual indication is a dot that indicates the current location of the remote locator object (e.g., white dot, red dot, etc.). In some embodiments, the camera user interface is an augmented reality user interface. In some embodiments, if the device is already in an augmented reality display mode (e.g., in response to the user lifting up the electronic device), then the augmented reality user interface includes the first visual indication at the location of the remote locator object.

The above-described manner of locating the remote locator object (e.g., by determining that the camera of the device is capturing a view that includes the remote locator object and automatically entering a camera user interface, displaying the view that includes the remote locator object, and displaying a visual indication of the location of the remote locator object) provides the user with a viewfinder-style method of locating the remote locator object, which simplifies the interaction between the user and the electronic device and enhances the operability of the electronic device and makes the user-device interface more efficient (e.g., by automatically entering into camera-style locating method without requiring the user to perform additional inputs or separately activate the camera user interface), which additionally reduces power usage and improves battery life of the electronic device by enabling the user to use the electronic device more quickly and efficiency.

In some embodiments, in response to a distance between the electronic device and the remote locator object decreasing below a predetermined distance threshold (e.g., 2 feet, 3 feet, 4 feet, or any distance in which the remote locator object is captured by the camera and is clearly seen and displayed on the camera user interface), the electronic device replaces (1364) display of the first visual indicator with a second visual indicator that surrounds the location in the content that corresponds to the location of the remote locator object in the field of view of the camera, such as in FIG. 12EE (e.g., morphing the first visual indicator into the second visual indicator). In some embodiments, the second visual indicator is a ring or other circular element. In some embodiments, the ring is displayed around the remote locator object. In some embodiments, the electronic device recognizes the remote locator object in the field of view as the remote locator object that the user is looking for and the ring surrounds the remote locator object to highlight to the user the location of the remote locator object. In some embodiments, the ring is displayed when the device reaches a threshold distance from the remote locator object (e.g., without the requirement that the electronic device recognizes the remote locator object in the field of view of the camera). In some embodiments, the ring gets larger as the electronic device gets closer to the remote locator object, and smaller as the electronic device gets further from the remote locator object. In some embodiments, the remote locator object is visible (e.g., not obscured) and remote locator object is displayed on the electronic device (e.g., because it is captured by the camera of the device), and the ring (e.g., a virtual element that is added to the display of the environment) encircles the remote locator object in the environment captured by the camera. In some embodiments, the remote locator object is obscured (e.g., fully or partially) and thus is not displayed on the electronic device (e.g., because the camera is unable to capture the remote locator object due to its being obscured), and the ring surrounds the determined location of the remote locator object.

The above-described manner of locating the remote locator object (e.g., by displaying a visual indicator around the remote locator object) provides the user with a visual method of locating the remote locator object (e.g., by displaying a visual indicator at the location of the remote locator object overlaid on display of the user's environment, which highlights the location of the remote locator object), which simplifies the interaction between the user and the electronic device and enhances the operability of the electronic device and makes the user-device interface more efficient (e.g., without requiring the user to search within the camera user interface to find the remote locator object in the displayed field of view), which additionally reduces power usage and improves battery life of the electronic device by enabling the user to use the electronic device more quickly and efficiency.

It should be understood that the particular order in which the operations in FIGS. 13A-13F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and 1400) are also applicable in an analogous manner to method 1300 described above with respect to FIGS. 13A-13F. For example, remote locator object finding mode described above with reference to method 1300 optionally have one or more of the characteristics of initializing the remote locator object, presenting separation notifications, presenting tracking notifications, and finding a remote locator object, etc., described herein with reference to other methods described herein (e.g., methods 700, 900, 1100, and 1400). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 13A-13F are, optionally, implemented by components depicted in FIGS. 1A-1B. For example, displaying operations 1302, 1318, 1328, 1332, and 1362, detecting operations 1304, 1320, and 1360, and receiving operation 1326 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 14A-14D are flow diagrams illustrating a method 1400 of presenting user interfaces for tracking and finding remote locator objects in accordance with some embodiments, such as in FIGS. 12A-12FF. The method 1400 is optionally performed at an electronic device such as device 100, device 300, device 500 as described above with reference to FIGS. 1A-1B, 2-3, 4A-4B and 5A-5H. Some operations in method 1400 are, optionally combined and/or order of some operations is, optionally, changed.

As described below, the method 1400 provides ways to present user interfaces for tracking and finding remote locator objects. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 12A, an electronic device with a display device and one or more input devices (e.g., a mobile device (e.g., a tablet, a smartphone, a media player, or a wearable device) including a touch screen and wireless communication circuitry, or a computer including one or more of a keyboard, mouse, trackpad, and touch screen and wireless communication circuitry) displays (1402), on the display device, an information user interface for a remote locator object that includes information about the remote locator object (e.g., a map, one or more affordances for changing settings for the remote locator object and/or performing operations associated with the remote locator object such as making the remote locator object make a sound) along with a selectable user interface object for initiating a remote locator object finding mode for finding the remote locator object, such as in FIG. 12A (e.g., a selectable option for finding or otherwise locating the remote locator object). In some embodiments, selection of the selectable option causes the device to enter an object finding mode. In some embodiments, depending on the distance from the electronic device to the remote locator object, the device enters into different finding modes.

In some embodiments, while displaying the information user interface for the remote locator object, the electronic device detects (1404) selection of the user interface object for finding the remote locator object, such as in FIG. 12A (e.g., the user selects the selectable option for locating the remote locator object). In some embodiments, in response to detecting selection of the user interface object for finding the remote locator object (1406), in accordance with a determination that the device is greater than a first threshold distance from a location associated with the remote locator object (e.g., 100 feet, 0.5 miles, 1 mile, 2 miles, etc.), the electronic device displays (1408) a first finding mode that includes a map user interface with directions to the remote locator object, such as in FIG. 12B (e.g., enter into a first finding mode to locate the remote locator object). In some embodiments, the first finding mode comprises using a map to locate the remote locator object. In some embodiments, the map is a different application than the application that is displaying the information user interface (e.g., a dedicated map application). In some embodiments, the map automatically determines and displays directions to travel from the current location of the electronic device to the location associated with the remote locator object. In some embodiments, the map determines the directions based on walking, driving, or public transportation services. In some embodiments, the map uses the mode of transportation that is appropriate based on the distance (e.g., walking if less than 1 mile and driving if more than 1 mile, etc.). In some embodiments, the map includes streets and street info, and an overlay that displays the recommended route along those streets from the current location of the device to the location of the remote locator object.

In some embodiments, in accordance with a determination that the device is less than the first threshold distance from a location associated with the remote locator object (e.g., less than 100 feet, etc.) the electronic device displays (1410) a second finding mode that is different from the first finding mode and indicates a location of the remote locator object relative to the current location of the device, such as in FIG. 12D (e.g., enter into a second finding mode to locate the remote locator object). In some embodiments, the first threshold distance is the effective range of a direct wireless communication protocol such as Bluetooth (e.g., the device is less than the first threshold distance if the device is able to communicate with the remote locator object using said direct wireless communication protocol, and is greater than the first threshold distance if the device is not able to communicate with the remote locator object using said direct wireless communication protocol). In some embodiments, the second finding mode comprises displaying a user interface that uses the electronic device as a compass-like device for locating the remote locator object. For example, the device is able to determine the direction of the remote locator object and guide the user to move in the determined direction (e.g., by turning the electronic device in the direction of the remote locator object). In some embodiments, in the second finding mode, visual indicators are displayed on the display to indicate the direction and/or distance of the remote locator object, such as described in method 1300 above. In some embodiments, the second finding mode does not include a map and/or street directions overlaid on the map). The first and second finding modes are also described with reference to method 1300 above.

The above-described manner of locating a remote locator object (e.g., by entering into a first locator mode that includes using a map to locate a remote locator object when the remote locator object is farther than a certain distance and entering into a second locator mode that includes indicating the relative position of the remote locator object when the remote locator object is closer than the distance) provides the user with the best mode of locating the remote locator object depending on the distance of the remote locator object from the electronic device (e.g., by locating the remote locator object using a map when the remote locator object is farther than a threshold distance away from the electronic device such that the use of a map is a useful method of locating the remote locator object, and using a different, relative location-based locating method when the remote locator object is less than a threshold distance away from the electronic device such that the use of the relative location-based locating method is a more useful method of locating the remote locator object (e.g., as compared to the use of a map)), which simplifies the interaction between the user and the electronic device and enhances the operability of the electronic device and makes the user-device interface more efficient (e.g., by automatically providing the user with the more appropriate method of locating the remote locator object based on distance from the remote locator object without requiring the user to separately determine whether to switch locating modes and then navigate to a separate user interface or perform additional inputs to switch locating modes), which additionally reduces power usage and improves battery life of the electronic device by enabling the user to use the electronic device more quickly and efficiency.

In some embodiments, the user interface for the second finding mode includes a plurality of objects and one or more properties of the plurality of objects change as distance between the device and the remote locator object changes (1412), such as in FIG. 12D (e.g., the second finding mode includes displaying a user interface that includes one or more objects that react to changes in distance between the device and the remote locator changes). In some embodiments, the one or more objects comprises one or more dots scattered around the user interface (e.g., a cloud of dots) that increase in size, move around, or vibrate based on the orientation, distance, and/or direction of the remote locator object.

The above-described manner of locating a remote locator object (e.g., by displaying a plurality of objects that change properties as the distance and/or orientation between the device and the remote locator object changes) provides the user with an indication that the electronic device is attempting to locate the remote locator object but is unable to provide a precise direction and/or distance, which simplifies the interaction between the user and the electronic device and enhances the operability of the electronic device and makes the user-device interface more efficient (e.g., by changing the properties of the plurality of objects to indicate to the user that the electronic device is actively attempting to locate the remote locator object and is reactive to the user's movement), which additionally reduces power usage and improves battery life of the electronic device by enabling the user to use the electronic device more quickly and efficiency.

In some embodiments, changing the properties of the plurality of objects as the distance between the device and the location associated with the remote locator object changes includes one or more of (e.g., any one of or any combination of the following): increasing a number of the objects as the device gets closer to the location associated with the remote locator object (e.g., displaying more dots on the user interface as the distance to the remote locator object decreases and/or displaying fewer dots on the user interface as the distance to the remote locator object increases); increasing a brightness of the objects as the device gets closer to the location associated with the remote locator object (e.g., changing brightness and/or opacity of the dots based on the distance to the remote locator object); changing a color of the objects as the device gets closer to the location associated with the remote locator object (e.g., changing from black to green, or from grey to black, etc. as the distance to the remote locator object decreases); and increasing a rate of movement of the objects as the device gets closer to the location associated with the remote locator object (1414), such as in FIG. 12F (e.g., the dots vibrate (e.g., have a certain entropy)). In some embodiments, as the distance to the remote locator object decreases, the dots vibrate more quickly or cover more distance (e.g., increased entropy).

The above-described manner of locating a remote locator object (e.g., by changing the properties of the plurality of objects as the distance and/or orientation between the device and the remote locator object changes) provides the user with a general indication of the location and direction of the remote locator object even if the device is unable to determine the exact location of the remote locator object, which simplifies the interaction between the user and the electronic device and enhances the operability of the electronic device and makes the user-device interface more efficient (e.g., by changing the properties of the plurality of objects to indicate to the user may be moving toward the remote locator object), which additionally reduces power usage and improves battery life of the electronic device by enabling the user to use the electronic device more quickly and efficiency.

In some embodiments, the plurality of user interface elements react to changes in position and/or orientation of the device based on a rate of movement of the device without regard to distance between the device and the location associated with the remote locator object (1416), such as in FIGS. 12F-12G (e.g., to encourage the user to move the device around and get a better idea of where the remote locator object is located). In some embodiments, the dots move around the user interface as the device is rotated (e.g., yaw direction). In some embodiments, the dots move around to maintain a certain orientation with the remote locator object (e.g., the objects remain in the same three dimensional location even as the device is rotated). In some embodiments, the objects generally move in a direction towards the remote locator object.

The above-described manner of locating a remote locator object (e.g., by changing the plurality of objects based on the motion of the device) provides the user with an indication that the electronic device is reactive to the user's movement and is attempting to locate the remote locator object, which simplifies the interaction between the user and the electronic device and enhances the operability of the electronic device and makes the user-device interface more efficient (e.g., by changing the position of the plurality of objects to indicate to the user that the electronic device is reactive to the user's movement while actively attempting to locate the remote locator object), which additionally reduces power usage and improves battery life of the electronic device by enabling the user to use the electronic device more quickly and efficiency.

In some embodiments, a majority of the plurality of user interface elements are displayed in a first set of locations on the user interface that are closer to the location associated with the remote locator object than a second set of locations on the user interface that are farther from the location associated with the remote locator object (1418), such as in FIGS. 12F-12G (e.g., the dots are biased towards the direction of the remote locator object (e.g., as if magnetically attracted towards the remote locator object)). In some embodiments, not all dots are in the direction of the remote locator object. In some embodiments, more dots are biased toward the direction of the remote locator object the closer the remote locator object is from the electronic device. For example, if the remote locator object is far away from the electronic device such that the direction and/or location of the remote locator object is not precise, then the dots are not biased towards any direction. In some embodiments, as the electronic device moves closer to the remote locator object and the direction and/or location of the remote locator object is determined with more precision, then more and more dots are biased towards the determined direction.

The above-described manner of locating a remote locator object (e.g., by biasing the plurality of objects in the direction of the remote locator object) provides the user with a general indication of the direction of the remote locator object even when the precise location of the remote locator object is not known to help encourage the user to move in that direction such that a more precise location can be determined, which simplifies the interaction between the user and the electronic device and enhances the operability of the electronic device and makes the user-device interface more efficient (e.g., by moving the plurality of objects in a biased way to encourage the user to move in the direction of the remote locator object), which additionally reduces power usage and improves battery life of the electronic device by enabling the user to use the electronic device more quickly and efficiency.

In some embodiments, while displaying the second finding mode, the electronic device detects (1420) a change in location of the device, such as in FIG. 12J (e.g., moving the device towards or farther away from the remote locator object). In some embodiments, in response to detecting the change in location of the device, in accordance with a determination that is the device is less than a second threshold distance (e.g., a distance that is less than the first threshold distance, such as 20 feet, 25 feet, 30 feet, etc.) from a location associated with the remote locator object, the electronic device switches (1422) from the second finding mode to a third finding mode that is different from the second finding mode, such as in FIG. 12J (e.g., switching to a mode in which, instead of displaying the plurality of objects, displaying a directional indicator, similarly to the remote finding mode described above with respect to method 1300). In some embodiments, the second threshold distance is the effective distance of one or more communication protocols for determining a distance and/or direction of the remote locator object. For example, within a particular distance, a particular communication protocol (e.g., Bluetooth) is able to provide distance and/or directional information, then the electronic device switches to the third finding mode when the remote locator object is within that particular distance and remains in the second finding mode when the remote locator object is above that particular distance. In accordance with a determination that is the device is more than the second threshold distance from a location associated with the remote locator object, maintaining the device in the second finding mode. In some embodiments, if the device moves from being less than the second threshold distance to being greater than the threshold distance, than the device switches from the third finding mode back to the second finding mode. It is understood that although the electronic device is described as moving, this disclosure contemplates that the remote locator object can also move towards or farther away from the electronic device and the electronic device reacts to the change in relative distance and/or orientation as described above.

The above-described manner of switching finding modes (e.g., by displaying a directional indicator when the electronic device is within a certain distance of the remote locator object) provides the user with a more precise method of locating the remote locator object (e.g., by displaying a directional indicator when the electronic device is able to determine the location and direction of the remote locator device with a certain precision), which simplifies the interaction between the user and the electronic device and enhances the operability of the electronic device and makes the user-device interface more efficient (e.g., by automatically changing to a more precise mode of locating the remote locator object without requiring the user to perform extra inputs to activate the more precise mode of locating the remote locator object), which additionally reduces power usage and improves battery life of the electronic device by enabling the user to use the electronic device more quickly and efficiency.

In some embodiments, the second finding mode includes a plurality of objects that react generally to changes in distance between the device and a location associated with the remote locator object (e.g., a cloud of dots) without indicating a precise direction from the device to the remote locator object (e.g., the cloud of dots move around on the user interface when the distance and/or location of the remote locator object relative to the device changes; in some embodiments, the cloud of dots tend towards the direction of the remote locator object, but does not provide a precise indication of the direction or distance of the remote locator object) and the third finding mode includes a directional indicator (e.g., an arrow) that indicates a direction toward the remote locator object (1424), such as in FIG. 12J (e.g., the directional indicator points towards the determined direction of the remote locator object (e.g., instead of tending towards the direction of the remote locator object)).

The above-described manner of locating a remote locator object (e.g., by displaying a plurality of objects that do not indicate a precise direction of the remote locator object when the device is unable to determine the precise location of the remote locator object and displaying a directional indicator that displays a more precise direction of the remote locator object when the device is able to determine a more precise location of the remote locator object) provides the user with the most appropriate indication of the location and/or direction of the remote locator object, which simplifies the interaction between the user and the electronic device and enhances the operability of the electronic device and makes the user-device interface more efficient (e.g., by providing the user with the appropriate indicator based on the ability of the device to determine the location of the remote locator object without requiring the user to separately determine whether the device is actually able to provide an accurate distance and direction of the remote locator object), which additionally reduces power usage and improves battery life of the electronic device by enabling the user to use the electronic device more quickly and efficiency.

In some embodiments, switching from the second finding mode to the third finding mode includes animating the plurality of objects merging to form the directional indicator (1426), such as in FIG. 12J (e.g., the user interface displays an animation of the cloud of dots converting into the arrow.).

The above-described manner of locating a remote locator object (e.g., by animating the plurality of objects into a directional indicator) provides the user with an indication that the user has now moved within a certain threshold distance and the electronic device is able to determine with more precision the direction of the remote locator object (e.g., by morphing the cloud of dots (which indicated that the electronic device is unable to determine a precise direction) into a directional indicator (which indicates that the electronic device is able to determine a more precise direction), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, while displaying the third finding mode, the electronic device detects (1428) a change in location of the device, such as in FIG. 12K (e.g., moving the device towards or farther away from the remote locator object). In some embodiments, in response to detecting the change in location of the device, in accordance with a determination that is the device is greater than the second threshold distance (or a hysteresis threshold distance that is slightly greater than or less than the second threshold distance) from a location associated with the remote locator object, the electronic device switches (1430) from the third finding mode to the second finding mode, such as in FIG. 12K (e.g., if the device moves back to being farther than the second threshold distance, then switching back to the second finding mode). In some embodiments, in accordance with a determination that is the device is less than the third threshold distance from a location associated with the remote locator object, maintaining the device in the third finding mode. In some embodiments, the device displays an animation of the arrow breaking apart into the plurality of dots.

The above-described manner of switching finding modes (e.g., by switching to back to the second finding mode if the distance to the remote locator object changes to being above the second threshold distance) allows the electronic device to indicate to the user that the electronic device has moved farther away from the remote locator object such that a more precise direction and/or location can no longer be determined, which simplifies the interaction between the user and the electronic device and enhances the operability of the electronic device and makes the user-device interface more efficient (e.g., by automatically switching to a second finding mode that is more appropriate for finding the object when the user moves out of the second threshold distance without requiring the user to perform additional inputs to activate the second finding mode), which additionally reduces power usage and improves battery life of the electronic device by enabling the user to use the electronic device more quickly and efficiency.

In some embodiments, while displaying the third finding mode, the electronic device detects (1432) a change in location of the device, such as in FIG. 12R (e.g., moving the device towards or farther away from the remote locator object). In response to detecting the change in location of the device, in accordance with a determination that is the device is less than a third threshold distance (e.g., a distance that is less than the second threshold distance, such as 2 feet, 3 feet, 4 feet) from a location associated with the remote locator object, the electronic device switches (1434) from the third finding mode to a fourth finding mode that is different from the second finding mode, such as in FIG. 12R (e.g., switching to a fourth finding mode in which the directional indicator is not shown). In some embodiments, while in the fourth finding mode, the user interface displays non-directional indicators. In some embodiments, while in the fourth finding node, the user interface continues to display a textual indicator of the distance to the remote locator object. In some embodiments, while in the fourth finding mode, the textual indicator does not indicate the direction of the location of the remote locator object. In some embodiments, in accordance with a determination that is the device is more than the third threshold distance from a location associated with the remote locator object, maintaining the device in the third finding mode.

The above-described manner of switching finding modes (e.g., by switching to a fourth finding mode when the distance to the remote locator object is within a third threshold distance) provides the user with a fourth finding mode that is more appropriate for finding the object when the distance reaches a certain threshold, which simplifies the interaction between the user and the electronic device and enhances the operability of the electronic device and makes the user-device interface more efficient (e.g., by automatically switching to a fourth finding mode that is more appropriate for finding the object within the threshold distance without requiring the user to perform additional inputs to activate the fourth finding mode), which additionally reduces power usage and improves battery life of the electronic device by enabling the user to use the electronic device more quickly and efficiency.

In some embodiments, the fourth finding mode includes a graphical indicator that grows or shrinks to indicate a change in distance between the device and a location associated with the remote locator object (1436), such as in FIG. 12R (e.g., a ring expands or contracts as the device moves closer or farther away from the remote locator object). In some embodiments, the user interface displays a dot in the center of the ring and the ring expands or contacts into the dot to represent the device moving closer to or farther away from the remote locator object. In some embodiments, the ring expands as the device moves closer to the remote locator object (e.g., increasing proportionally to the remote locator object increasing in size on the display due to the perspective effect). In some embodiments, the ring contracts as the device moves farther away from the remote locator object (e.g., decreasingly proportionally to the remote locator object decreasing in size on the display.

The above-described manner of locating a remote locator object (e.g., by displaying a circular graphical indicator that shrinks as the user moves closer to the remote locator object) provides the user with a quick and efficient visual indication that the user is closing in on the location of the remote locator object, which simplifies the interaction between the user and the electronic device and enhances the operability of the electronic device and makes the user-device interface more efficient (e.g., by providing the user with a visual indicator that the user is nearing the location of the remote locator object), which additionally reduces power usage and improves battery life of the electronic device by enabling the user to use the electronic device more quickly and efficiency.

In some embodiments, while in the fourth finding mode, the electronic device detects (1438) that the device is within a fourth threshold distance of the location associated with the remote locator object, such as in FIG. 12U. In some embodiments, in response to detecting that the device is within the fourth threshold distance of the location associated with the remote locator object, the electronic device replaces (1440) display of a portion of the user interface with a representation of the remote locator object, such as in FIG. 12U (e.g., replacing the dot that represents the top of the device (e.g., the stationary element described above with respect to method 1300) with a three dimensional model of the remote locator object optionally with an animated transition transforming the dot into the three dimensional model of the remote locator object). In some embodiments, the user interface displays an animation of the dot increasing in size until it reaches the final size of the model of the remote locator object.

The above-described manner of locating a remote locator object (e.g., by changing the display of the dot into the display of the remote locator object) provides the user with an indication that the user is now at the location of the remote locator object (e.g., by displaying an illustration of the remote locator object) and automatically provide a visualization of the remote locator object that can be used to identify the remote locator object in physical space, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the second finding mode includes a first one or more non-directional visual indications of a distance between the device and a location associated with the remote locator object without corresponding tactile outputs (1442), such as in FIG. 12D (e.g., during the second finding mode, a non-directional visual indication is used to guide the user in locating the remote locator object without generating any tactile outputs). In some embodiments, the fourth finding mode includes a second one or more non-directional visual indications of a distance between the device and a location associated with the remote locator object with corresponding tactile outputs (1444), such as in FIG. 12R (e.g., during the fourth finding mode, a non-directional visual indication is also used to guide the user in locating the remote locator object (optionally a different non-directional visual indication than that used in the second finding mode)). In some embodiments, during the fourth finding mode, a vibration that changes in frequency and/or amplitude as the device gets closer to or further away from the remote locator object is also generated.

The above-described manner of providing tactile feedback (e.g., by providing tactile feedback during the fourth finding mode, but not during the second finding mode) provides the user with a physical feedback that the user is close or moving towards the remote locator object in a mode when the device is able to determine with more precision that the device actually is moving towards the remote locator object (e.g., without requiring the user to interrupt his or her search and look away from the environment and look at the device to determine whether the user is moving closer to the remote locator object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the third finding mode includes corresponding discrete tactile outputs that vary based on a change in orientation of the device relative to the location associated with the remote locator object (1446), such as in FIG. 12J (e.g., during the third finding mode, the tactile outputs that are produced are discrete (e.g., discrete "taps") and optionally provided at a particular frequency). In some embodiments, the fourth finding mode includes corresponding continuous tactile outputs that vary based on a change in distance between the device and a location associated with the remote locator object (1448), such as in FIG. 12R (e.g., a continuous vibration that changes in frequency and/or amplitude as the device gets closer to or further away from the remote locator object).

The above-described manner of providing tactile feedback (e.g., by producing discrete tactile outputs during the third finding mode and continuous tactile outputs during the fourth finding mode) provides the user with tactile feedback that the user has moved from a certain distance from the remote locator object to a very close distance from the remote locator object such that the user should be able to easily find and/or see the remote locator object, which simplifies the interaction between the user and the electronic device and enhances the operability of the electronic device and makes the user-device interface more efficient (e.g., without requiring the user to look at the display to determine that the user is close enough to visually find the remote locator object), which additionally reduces power usage and improves battery life of the electronic device by enabling the user to use the electronic device more quickly and efficiency.

It should be understood that the particular order in which the operations in FIGS. 14A-14D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and 1300) are also applicable in an analogous manner to method 1400 described above with respect to FIGS. 14A-14D. For example, remote locator object finding mode described above with reference to method 1400 optionally have one or more of the characteristics of initializing the remote locator object, presenting separation notifications, presenting tracking notifications, and finding a remote locator object, etc., described herein with reference to other methods described herein (e.g., methods 700, 900, 1100, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 14A-14D are, optionally, implemented by components depicted in FIGS. 1A-1B. For example, displaying operations 1402, 1408, 1410, detecting operations 1404, 1420, 1428, 1432, and 1438, and receiving operations are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the ability for users to track and locate items that may be of interest to them. The present disclosure contemplates that in some instances, this gathered data may include personal information data that uniquely identifies or can be used to identify a specific person. Such personal information data can include location-based data, online identifiers, demographic data, date of birth, telephone numbers, email addresses, home addresses, data or records relating to a user's health or level of fitness (e.g., vital signs measurements, medication information, exercise information), or any other personal information.

The present disclosure recognizes that the use of such personal information data, in the present technology, can be used to the benefit of users. Further, other uses for personal information data that benefit the user are also contemplated by the present disclosure. In some embodiments, the personal information data can be used to identify the location of remote locator objects and/or identify the location of the user. Accordingly, use of such personal information data enables users to identify, find, and otherwise interact with remote locator objects. In some embodiments, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Further, such collection/sharing should occur only after receiving the consent of the users or other legitimate basis specified in applicable law. Personal information from users should be collected for legitimate uses only. Such information regarding the use of personal data should be prominent and easily accessible by users, and should be updated as the collection and/or use of data changes. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application. That is, the present disclosure contemplates that hardware and/or software elements can be provided to prevent or block access to such personal information data.

Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Moreover, it is the intent of the present disclosure that personal information data should be managed and handled in a way to minimize risks of unintentional or unauthorized access or use.

Therefore, although the present disclosure broadly covers use of personal information data to implement one or more various disclosed embodiments, the present disclosure also contemplates that the various embodiments can also be implemented without the need for accessing such personal information data. For example, location data and notifications can be delivered to users based on aggregated non-personal information data or a bare minimum amount of personal information. That is, the various embodiments of the present technology are not rendered inoperable due to the lack of all or a portion of such personal information data.

Personally identifiable information data should be managed and handled so as to minimize risks of unintentional or unauthorized access or use, and the nature of authorized use should be clearly indicated to users. It is well understood that the use of personally identifiable information should follow privacy policies and practices that are generally recognized as meeting or exceeding industry or governmental requirements for maintaining the privacy of users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising, at an electronic device with one or more wireless antenna, a display device, and one or more input devices:
    while a remote locator object that is associated with a user other than a user of the electronic device is near the electronic device,
    in accordance with a determination that the remote locator object meets tracking criteria, automatically presenting, without user input, a tracking alert that indicates that the remote locator object that is not associated with the user meets the tracking criteria;
    while displaying the tracking alert, receiving, via the one or more input devices, a sequence of one or more inputs directed to the tracking alert; and
    in response to receiving the sequence of one or more inputs directed to the tracking alert, concurrently displaying, via the display device:
        a first selectable option that is selectable to ignore future alerts that the remote locator object meets the tracking criteria for a predetermined time threshold, wherein future alerts that the remote locator object meets the tracking criteria are re-enabled without user input after the predetermined time threshold when selection of the first selectable option is detected; and
        a second selectable option that is selectable to ignore future alerts that the remote locator object meets the tracking criteria for a duration of time different from the predetermined time threshold.

2. The method of claim 1, wherein the tracking criteria include one or more of: a requirement that a location associated with the remote locator object is within a predetermined threshold distance of a location associated with the user, a requirement that the location associated with the remote locator object has remained within a threshold distance of a location associated with the user for at least a threshold amount of time, a requirement that the remote locator object is not associated with the user, and a requirement that the remote locator object is reporting location to another user.

3. The method of claim 1, wherein the tracking alert includes a selectable option that includes information enabling the user to visually identify the remote locator object.

4. The method of claim 1, further including:
    detecting a sequence of one or more inputs that includes selection of the first selectable option to ignore future alerts that the remote locator object meets the tracking criteria; and
    in response to detecting the sequence of one or more inputs that includes selection of the first selectable option to ignore future alerts that the remote locator object meets the tracking criteria, forgoing display of future alerts that the remote locator object meets the tracking criteria for the predetermined time threshold.

5. The method of claim 4, further including, in response to detecting the sequence of one or more inputs that includes selection of the first selectable option to ignore future alerts that the remote locator object meets the tracking criteria, adding the remote locator object to a set of physical objects that are available to be viewed in a location tracking status user interface on the device.

6. The method of claim 1, further including:
    detecting a sequence of one or more inputs that includes selection of the second selectable option to ignore future alerts that the remote locator object meets the tracking criteria; and
    in response to detecting the sequence of one or more inputs that includes selection of the second selectable option to ignore future alerts that the remote locator object meets the tracking criteria, forgoing display of future alerts that the remote locator object meets the tracking criteria.

7. The method of claim 1, further including:
    detecting a sequence of one or more inputs that includes selection of the second selectable option to ignore future alerts that the remote locator object meets the tracking criteria; and
    in response to detecting the sequence of one or more inputs that includes selection of the second selectable option to ignore future alerts that the remote locator object meets the tracking criteria, prompting the user to perform a predefined operation that includes both the remote locator object and the device to confirm the input to ignore future alerts that the remote locator object meets the tracking criteria.

8. The method of claim 7, wherein the predefined operation includes bringing the remote locator object within a predetermined distance of the electronic device.

9. The method of claim 1, further including:
    Detecting a sequence of one or more inputs that includes selection of a third selectable option to display additional information about the remote locator object that meets the tracking criteria; and
    in response to detecting the sequence of one or more inputs that includes selection of the third selectable option to display additional information about that the remote locator object that meets the tracking criteria, displaying an option to disable the remote locator object.

10. The method of claim 9, further including:
detecting selection of the option to disable the remote locator object; and
in response to detecting selection of the option to disable the remote locator object, displaying instructions that, if followed, will prevent the remote locator object from reporting its location.

11. The method of claim 1, further including, in accordance with a determination that the user has requested to ignore future alerts that the remote locator object meets the tracking criteria, in response to obtaining information indicating that an amount of separation between a location associated with the user and a location associated with the remote locator object has increased beyond a first separation threshold, generating, at the electronic device, a separation alert indicating that the remote locator object has been separated from the user.

12. The method of claim 1, further including, in accordance with a determination that the remote locator object has been marked as lost, the tracking alert includes an indication that the remote locator object has been marked as lost.

13. The method of claim 12, including:
detecting a sequence of one or more inputs including an input directed to the tracking alert that corresponds to a request to display a message from an owner of the remote locator object; and
in response to detecting the one or more inputs including the input directed to the tracking alert, displaying a message from the owner of the remote locator object.

14. The method of claim 13, including while displaying the message from the owner, displaying one or more selectable options that, when selected, initiate a process for communicating with the owner.

15. The method of claim 14, further including:
while displaying the message from the owner, displaying an option to disable the remote locator object; and
in response to detecting selection of the option to disable the remote locator object, display instructions that, if followed, will prevent the remote locator object from reporting its location.

16. The method of claim 1, further including:
in response to receiving a user input corresponding to a request for the remote locator object to play a sound, causing the remote locator object to emit an audible tone.

17. The method of claim 1, wherein the remote locator object has been marked as lost, and the method further includes:
in accordance with a determination that the remote locator object is within a predetermined distance of the electronic device, displaying, via the display device, an indication that the remote locator object has been marked as lost, a message from an owner of the remote locator object, and one or more selectable options that, when selected, initiate a process for communicating with the owner of the remote locator object.

18. The method of claim 1, wherein displaying the first and second selectable options is in accordance with a determination that the sequence of one or more inputs is a first sequence of one or more inputs, the method further including:
in response to receiving the sequence of one or more inputs directed to the tracking alert, and in accordance with a determination that the sequence of one or more inputs is a second sequence of one or more inputs, displaying, via the display device, a third selectable option that is selectable to display instructions for disassembling the remote locator object.

19. The method of claim 1, further including:
while displaying the first selectable option and the second selectable option, receiving, via the one or more input devices, an input corresponding to a request to ignore future alerts that the remote locator object meets the tracking criteria; and
after receiving the input corresponding to the request to ignore future alerts that the remote locator object meets the tracking criteria, displaying, via the display device, a location tracking status user interface, wherein the location tracking status user interface includes:
a representation of the remote locator object and an indication of a location of the remote locator object; and
a representation of a first physical object associated with the user of the electronic device and an indication of a location of the first physical object.

20. The method of claim 1, further including:
in response to receiving the sequence of one or more inputs directed to the tracking alert, displaying, via the display device, a card user interface, wherein the card user interface includes a representation of a map that indicates a current location of the remote locator object, and the first selectable option and the second selectable option.

21. An electronic device, comprising:
one or more processors;
memory; and
one or more programs, wherein the one or more programs are stored in the memory and configured to be executed by the one or more processors, the one or more programs including instructions for:
while a remote locator object that is associated with a user other than a user of the electronic device is near the electronic device,
in accordance with a determination that the remote locator object meets tracking criteria, automatically presenting, without user input, a tracking alert that indicates that the remote locator object that is not associated with the user meets the tracking criteria;
while displaying the tracking alert, receiving, via one or more input devices, a sequence of one or more inputs directed to the tracking alert; and
in response to receiving the sequence of one or more inputs directed to the tracking alert, concurrently displaying, via a display device:
a first selectable option that is selectable to ignore future alerts that the remote locator object meets the tracking criteria for a predetermined time threshold, wherein future alerts that the remote locator object meets the tracking criteria are re-enabled without user input after the predetermined time threshold when selection of the first selectable option is detected; and
a second selectable option that is selectable to ignore future alerts that the remote locator object meets the tracking criteria for a duration of time different from the predetermined time threshold.

22. The electronic device of claim 21, wherein the tracking criteria include one or more of: a requirement that a location associated with the remote locator object is within a predetermined threshold distance of a location associated with the user, a requirement that the location associated with the remote locator object has remained within a threshold distance of a location associated with the user for at least a threshold amount of time, a requirement that the remote locator object is not associated with the user, and a requirement that the remote locator object is reporting location to another user.

23. The electronic device of claim 21, wherein the tracking alert includes a selectable option that includes information enabling the user to visually identify the remote locator object.

24. The electronic device of claim 21, the one or more programs further including instructions for:
  detecting a sequence of one or more inputs that includes selection of the first selectable option to ignore future alerts that the remote locator object meets the tracking criteria; and
  in response to detecting the sequence of one or more inputs that includes selection of the first selectable option to ignore future alerts that the remote locator object meets the tracking criteria, forgoing display of future alerts that the remote locator object meets the tracking criteria for the predetermined time threshold.

25. The electronic device of claim 24, the one or more programs further including instructions for:
  in response to detecting the sequence of one or more inputs that includes selection of the first selectable option to ignore future alerts that the remote locator object meets the tracking criteria, adding the remote locator object to a set of physical objects that are available to be viewed in a location tracking status user interface on the device.

26. The electronic device of claim 21, the one or more programs further including instructions for:
  detecting a sequence of one or more inputs that includes selection of the second selectable option to ignore future alerts that the remote locator object meets the tracking criteria; and
  in response to detecting the sequence of one or more inputs that includes selection of the second selectable option to ignore future alerts that the remote locator object meets the tracking criteria, forgoing display of future alerts that the remote locator object meets the tracking criteria.

27. The electronic device of claim 21, the one or more programs further including instructions for:
  detecting a sequence of one or more inputs that includes selection of the second selectable option to ignore future alerts that the remote locator object meets the tracking criteria; and
  in response to detecting the sequence of one or more inputs that includes selection of the second selectable option to ignore future alerts that the remote locator object meets the tracking criteria, prompting the user to perform a predefined operation that includes both the remote locator object and the device to confirm the input to ignore future alerts that the remote locator object meets the tracking criteria.

28. The electronic device of claim 27, wherein the predefined operation includes bringing the remote locator object within a predetermined distance of the electronic device.

29. The electronic device of claim 21, the one or more programs further including instructions for:
  detecting a sequence of one or more inputs that includes selection of a third selectable option to display additional information about the remote locator object that meets the tracking criteria; and
  in response to detecting the sequence of one or more inputs that includes selection of the third selectable option to display additional information about that the remote locator object that meets the tracking criteria, displaying an option to disable the remote locator object.

30. The electronic device of claim 29, the one or more programs further including instructions for:
  detecting selection of the option to disable the remote locator object; and
  in response to detecting selection of the option to disable the remote locator object, displaying instructions that, if followed, will prevent the remote locator object from reporting its location.

31. The electronic device of claim 21, the one or more programs further including instructions for:
  in accordance with a determination that the user has requested to ignore future alerts that the remote locator object meets the tracking criteria, in response to obtaining information indicating that an amount of separation between a location associated with the user and a location associated with the remote locator object has increased beyond a first separation threshold, generating, at the electronic device, a separation alert indicating that the remote locator object has been separated from the user.

32. The electronic device of claim 21, the one or more programs further including instructions for:
  in accordance with a determination that the remote locator object has been marked as lost, the tracking alert includes an indication that the remote locator object has been marked as lost.

33. The electronic device of claim 32, the one or more programs further including instructions for:
  detecting a sequence of one or more inputs including an input directed to the tracking alert that corresponds to a request to display a message from an owner of the remote locator object; and
  in response to detecting the one or more inputs including the input directed to the tracking alert, displaying a message from the owner of the remote locator object.

34. The electronic device of claim 33, the one or more programs further including instructions for:
  while displaying the message from the owner, displaying one or more selectable options that, when selected, initiate a process for communicating with the owner.

35. The electronic device of claim 34, the one or more programs further including instructions for:
  while displaying the message from the owner, displaying an option to disable the remote locator object; and
  in response to detecting selection of the option to disable the remote locator object, display instructions that, if followed, will prevent the remote locator object from reporting its location.

36. The electronic device of claim 21, the one or more programs further including instructions for:
  in response to receiving a user input corresponding to a request for the remote locator object to play a sound, causing the remote locator object to emit an audible tone.

37. The electronic device of claim 21, the one or more programs further including instructions for:
  in accordance with a determination that the remote locator object is within a predetermined distance of the electronic device, displaying, via the display device, an indication that the remote locator object has been marked as lost, a message from an owner of the remote locator object, and one or more selectable options that, when selected, initiate a process for communicating with the owner of the remote locator object.

38. The electronic device of claim 21, wherein displaying the first and second selectable options is in accordance with a determination that the sequence of one or more inputs is a first sequence of one or more inputs, the one or more programs further including instructions for:

in response to receiving the sequence of one or more inputs directed to the tracking alert, and in accordance with a determination that the sequence of one or more inputs is a second sequence of one or more inputs, displaying, via the display device, a third selectable option that is selectable to display instructions for disassembling the remote locator object.

39. The electronic device of claim 21, the one or more programs further including instructions for:

while displaying the first selectable option and the second selectable option, receiving, via the one or more input devices, an input corresponding to a request to ignore future alerts that the remote locator object meets the tracking criteria; and after receiving the input corresponding to the request to ignore future alerts that the remote locator object meets the tracking criteria, displaying, via the display device, a location tracking status user interface, wherein the location tracking status user interface includes:

a representation of the remote locator object and an indication of a location of the remote locator object; and a representation of a first physical object associated with the user of the electronic device and an indication of a location of the first physical object.

40. The electronic device of claim 21, the one or more programs further including instructions for:

in response to receiving the sequence of one or more inputs directed to the tracking alert, displaying, via the display device, a card user interface, wherein the card user interface includes a representation of a map that indicates a current location of the remote locator object, and the first selectable option and the second selectable option.

41. A non-transitory computer readable storage medium storing one or more programs, the one or more programs comprising instructions, which when executed by one or more processors of an electronic device, cause the electronic device to perform a method comprising:

while a remote locator object that is associated with a user other than a user of the electronic device is near the electronic device, in accordance with a determination that the remote locator object meets tracking criteria, automatically presenting, without user input, a tracking alert that indicates that the remote locator object that is not associated with the user meets the tracking criteria;

while displaying the tracking alert, receiving, via one or more input devices, a sequence of one or more inputs directed to the tracking alert; and in response to receiving the sequence of one or more inputs directed to the tracking alert, concurrently displaying, via a display device:

a first selectable option that is selectable to ignore future alerts that the remote locator object meets the tracking criteria for a predetermined time threshold, wherein future alerts that the remote locator object meets the tracking criteria are re-enabled without user input after the predetermined time threshold when selection of the first selectable option is detected; and a second selectable option that is selectable to ignore future alerts that the remote locator object meets the tracking criteria for a duration of time different from the predetermined time threshold.

42. The non-transitory computer readable storage medium of claim 41, wherein the tracking criteria include one or more of: a requirement that a location associated with the remote locator object is within a predetermined threshold distance of a location associated with the user, a requirement that the location associated with the remote locator object has remained within a threshold distance of a location associated with the user for at least a threshold amount of time, a requirement that the remote locator object is not associated with the user, and a requirement that the remote locator object is reporting location to another user.

43. The non-transitory computer readable storage medium of claim 41, wherein the tracking alert includes a selectable option that includes information enabling the user to visually identify the remote locator object.

44. The non-transitory computer readable storage medium of claim 41, the one or more programs further including instructions for:

detecting a sequence of one or more inputs that includes selection of the first selectable option to ignore future alerts that the remote locator object meets the tracking criteria; and in response to detecting the sequence of one or more inputs that includes selection of the first selectable option to ignore future alerts that the remote locator object meets the tracking criteria, forgoing display of future alerts that the remote locator object meets the tracking criteria for the predetermined time threshold.

45. The non-transitory computer readable storage medium of claim 44, the one or more programs further including instructions for:

in response to detecting the sequence of one or more inputs that includes selection of the first selectable option to ignore future alerts that the remote locator object meets the tracking criteria, adding the remote locator object to a set of physical objects that are available to be viewed in a location tracking status user interface on the device.

46. The non-transitory computer readable storage medium of claim 41, the one or more programs further including instructions for:

detecting a sequence of one or more inputs that includes selection of the second selectable option to ignore future alerts that the remote locator object meets the tracking criteria; and in response to detecting the sequence of one or more inputs that includes selection of the second selectable option to ignore future alerts that the remote locator object meets the tracking criteria, forgoing display of future alerts that the remote locator object meets the tracking criteria.

47. The non-transitory computer readable storage medium of claim 41, the one or more programs further including instructions for:

detecting a sequence of one or more inputs that includes selection of the second selectable option to ignore future alerts that the remote locator object meets the tracking criteria; and in response to detecting the sequence of one or more inputs that includes selection of the second selectable option to ignore future alerts that the remote locator object meets the tracking criteria, prompting the user to perform a predefined operation that includes both the remote locator object and the device to confirm the input to ignore future alerts that the remote locator object meets the tracking criteria.

48. The non-transitory computer readable storage medium of claim 47, wherein the predefined operation includes bringing the remote locator object within a predetermined distance of the electronic device.

49. The non-transitory computer readable storage medium of claim 41, the one or more programs further including instructions for:
    detecting a sequence of one or more inputs that includes selection of a third selectable option to display additional information about the remote locator object that meets the tracking criteria; and
    in response to detecting the sequence of one or more inputs that includes selection of the third selectable option to display additional information about that the remote locator object that meets the tracking criteria, displaying an option to disable the remote locator object.

50. The non-transitory computer readable storage medium of claim 49, the one or more programs further including instructions for:
    detecting selection of the option to disable the remote locator object; and
    in response to detecting selection of the option to disable the remote locator object, displaying instructions that, if followed, will prevent the remote locator object from reporting its location.

51. The non-transitory computer readable storage medium of claim 41, the one or more programs further including instructions for:
    in accordance with a determination that the user has requested to ignore future alerts that the remote locator object meets the tracking criteria, in response to obtaining information indicating that an amount of separation between a location associated with the user and a location associated with the remote locator object has increased beyond a first separation threshold, generating, at the electronic device, a separation alert indicating that the remote locator object has been separated from the user.

52. The non-transitory computer readable storage medium of claim 41, the one or more programs further including instructions for:
    in accordance with a determination that the remote locator object has been marked as lost, the tracking alert includes an indication that the remote locator object has been marked as lost.

53. The non-transitory computer readable storage medium of claim 52, the one or more programs further including instructions for:
    detecting a sequence of one or more inputs including an input directed to the tracking alert that corresponds to a request to display a message from an owner of the remote locator object; and
    in response to detecting the one or more inputs including the input directed to the tracking alert, displaying a message from the owner of the remote locator object.

54. The non-transitory computer readable storage medium of claim 53, the one or more programs further including instructions for:
    while displaying the message from the owner, displaying one or more selectable options that, when selected, initiate a process for communicating with the owner.

55. The non-transitory computer readable storage medium of claim 54, the one or more programs further including instructions for:
    while displaying the message from the owner, displaying an option to disable the remote locator object; and
    in response to detecting selection of the option to disable the remote locator object, display instructions that, if followed, will prevent the remote locator object from reporting its location.

56. The non-transitory computer readable storage medium of claim 41, the one or more programs further including instructions for:
    in response to receiving a user input corresponding to a request for the remote locator object to play a sound, causing the remote locator object to emit an audible tone.

57. The non-transitory computer readable storage medium of claim 41, the one or more programs further including instructions for:
    in accordance with a determination that the remote locator object is within a predetermined distance of the electronic device, displaying, via the display device, an indication that the remote locator object has been marked as lost, a message from an owner of the remote locator object, and one or more selectable options that, when selected, initiate a process for communicating with the owner of the remote locator object.

58. The non-transitory computer readable storage medium of claim 41, wherein displaying the first and second selectable options is in accordance with a determination that the sequence of one or more inputs is a first sequence of one or more inputs, the one or more programs further including instructions for:
    in response to receiving the sequence of one or more inputs directed to the tracking alert, and in accordance with a determination that the sequence of one or more inputs is a second sequence of one or more inputs, displaying, via the display device, a third selectable option that is selectable to display instructions for disassembling the remote locator object.

59. The non-transitory computer readable storage medium of claim 41, the one or more programs further including instructions for:
    while displaying the first selectable option and the second selectable option, receiving, via the one or more input devices, an input corresponding to a request to ignore future alerts that the remote locator object meets the tracking criteria; and
    after receiving the input corresponding to the request to ignore future alerts that the remote locator object meets the tracking criteria, displaying, via the display device, a location tracking status user interface, wherein the location tracking status user interface includes:
        a representation of the remote locator object and an indication of a location of the remote locator object; and
        a representation of a first physical object associated with the user of the electronic device and an indication of a location of the first physical object.

60. The non-transitory computer readable storage medium of claim 41, the one or more programs further including instructions for:
    in response to receiving the sequence of one or more inputs directed to the tracking alert, displaying, via the display device, a card user interface, wherein the card user interface includes a representation of a map that indicates a current location of the remote locator object, and the first selectable option and the second selectable option.

* * * * *

UNITED STATES PATENT AND TRADEMARK OFFICE
CERTIFICATE OF CORRECTION

PATENT NO. : 11,966,556 B2  
APPLICATION NO. : 17/452971  
DATED : April 23, 2024  
INVENTOR(S) : Arian Behzadi et al.

Page 1 of 1

It is certified that error appears in the above-identified patent and that said Letters Patent is hereby corrected as shown below:

In the Claims

In Column 116, Line 60, in Claim 9, delete "Detecting" and insert -- detecting --.

Signed and Sealed this  
Seventh Day of October, 2025

John A. Squires  
*Director of the United States Patent and Trademark Office*